(12) United States Patent
Dupray

(10) Patent No.: US 8,135,413 B2
(45) Date of Patent: Mar. 13, 2012

(54) PLATFORM AND APPLICATIONS FOR WIRELESS LOCATION AND OTHER COMPLEX SERVICES

(75) Inventor: Dennis J. Dupray, Golden, CO (US)

(73) Assignee: TracBeam LLC, Golden, CO (US)

( * ) Notice: Subject to any disclaimer, the term of this patent is extended or adjusted under 35 U.S.C. 154(b) by 657 days.

(21) Appl. No.: 11/838,213

(22) Filed: Aug. 13, 2007

(65) Prior Publication Data

US 2007/0287473 A1  Dec. 13, 2007

Related U.S. Application Data

(63) Continuation-in-part of application No. 10/297,449, filed on Dec. 6, 2002, now Pat. No. 7,714,778, and a continuation-in-part of application No. 09/194,367, filed on Nov. 24, 1998, and a continuation-in-part of application No. 10/337,807, filed on Jan. 6, 2003, now abandoned.

(60) Provisional application No. 60/349,100, filed on Jan. 16, 2002.

(51) Int. Cl.
*H04W 88/02* (2009.01)
(52) U.S. Cl. .................................. 455/456.1
(58) Field of Classification Search ............. 455/456.1, 455/422.1; 342/357.01, 457, 451; 701/204
See application file for complete search history.

(56) References Cited

U.S. PATENT DOCUMENTS

| | | | |
|---|---|---|---|
| 3,646,580 A | 2/1972 | Fuller et al. | |
| 3,886,553 A | 5/1975 | Bates | |
| 4,023,176 A | 5/1977 | Currie et al. | |
| 4,232,313 A | 11/1980 | Fleishman | |
| 4,347,618 A | 8/1982 | Kavouras et al. | |
| 4,438,439 A | 3/1984 | Shreve | |
| 4,475,010 A | 10/1984 | Huensch et al. | |
| RE31,962 E | 7/1985 | Brodeur | |
| 4,542,744 A | 9/1985 | Barnes et al. | |
| 4,630,057 A | 12/1986 | Martin | |
| 4,636,795 A | 1/1987 | Dano | |
| 4,651,157 A | 3/1987 | Gray et al. | |
| 4,670,758 A | 6/1987 | Campbell | |
| 4,700,374 A | 10/1987 | Bini | |
| 4,721,958 A | 1/1988 | Jenkin | |
| 4,740,792 A | 4/1988 | Sagey et al. | |
| 4,742,357 A | 5/1988 | Rackley | |
| 4,799,062 A | 1/1989 | Sanderford, Jr. et al. | |
| 4,857,840 A | 8/1989 | Lanchais | |
| 4,860,352 A | 8/1989 | Laurance et al. | |

(Continued)

FOREIGN PATENT DOCUMENTS

EP  0177203  4/1986

(Continued)

OTHER PUBLICATIONS

U.S. Appl. No. 08/191,984, filed Feb. 4, 1994, Loomis.

(Continued)

*Primary Examiner* — Diane Mizrahi
(74) *Attorney, Agent, or Firm* — Dennis J. Dupray

(57) ABSTRACT

A network services architecture is disclosed that allows complex services, such as wireless location services, to be more easily integrated into a telecommunications network. In particular, location based services utilizing a wireless location gateway can be more easily integrated into the network. Additionally, disclosed are techniques for facilitating the handling of requests for emergency services wherein the location of mobile station is required.

25 Claims, 33 Drawing Sheets

U.S. PATENT DOCUMENTS

| | | |
|---|---|---|
| 4,864,313 A | 9/1989 | Konneker |
| 4,870,576 A | 9/1989 | Tornetta |
| 4,876,550 A | 10/1989 | Kelly |
| 4,879,713 A | 11/1989 | Ichiyoshi |
| 4,888,593 A | 12/1989 | Friedman et al. |
| 4,914,689 A | 4/1990 | Quade et al. |
| 4,952,772 A | 8/1990 | Zana |
| 4,990,922 A | 2/1991 | Young et al. |
| 4,992,796 A | 2/1991 | Apostolos |
| 5,003,317 A | 3/1991 | Gray et al. |
| 5,008,679 A | 4/1991 | Effland et al. |
| 5,017,926 A | 5/1991 | Ames et al. |
| 5,032,989 A | 7/1991 | Tornetta |
| 5,034,898 A | 7/1991 | Lu et al. |
| 5,043,736 A | 8/1991 | Darnell et al. |
| 5,045,852 A | 9/1991 | Mitchell et al. |
| 5,045,861 A | 9/1991 | Duffett-Smith |
| 5,055,851 A | 10/1991 | Sheffer |
| 5,075,694 A | 12/1991 | Donnangelo et al. |
| 5,092,343 A | 3/1992 | Spitzer et al. |
| 5,099,245 A | 3/1992 | Sagey |
| 5,111,209 A | 5/1992 | Toriyama |
| 5,119,102 A | 6/1992 | Barnard |
| 5,119,104 A | 6/1992 | Heller |
| 5,136,686 A | 8/1992 | Koza |
| 5,142,590 A | 8/1992 | Carpenter et al. |
| 5,155,490 A | 10/1992 | Spradley, Jr. et al. |
| 5,163,004 A | 11/1992 | Rentz |
| 5,166,694 A | 11/1992 | Russell et al. |
| 5,177,489 A | 1/1993 | Hatch |
| 5,184,347 A | 2/1993 | Farwell et al. |
| 5,191,342 A | 3/1993 | Alsup et al. |
| 5,193,110 A | 3/1993 | Jones et al. |
| 5,202,829 A | 4/1993 | Geier |
| 5,208,756 A | 5/1993 | Song |
| 5,212,765 A | 5/1993 | Skeirik |
| 5,212,804 A | 5/1993 | Choate |
| 5,214,789 A | 5/1993 | George |
| 5,216,611 A | 6/1993 | McElreath |
| 5,218,367 A | 6/1993 | Sheffer et al. |
| 5,218,618 A | 6/1993 | Sagey |
| 5,218,716 A | 6/1993 | Comroe et al. |
| 5,223,844 A | 6/1993 | Mansell et al. |
| 5,225,842 A | 7/1993 | Brown et al. |
| 5,233,541 A | 8/1993 | Corwin et al. |
| 5,235,633 A | 8/1993 | Dennison et al. |
| 5,243,530 A | 9/1993 | Stanifer et al. |
| 5,251,273 A | 10/1993 | Betts et al. |
| 5,260,711 A | 11/1993 | Sterzer |
| 5,278,892 A | 1/1994 | Bolliger et al. |
| 5,280,295 A | 1/1994 | Kelley et al. |
| 5,280,472 A | 1/1994 | Gilhousen et al. |
| 5,282,261 A | 1/1994 | Skeirik |
| 5,293,642 A | 3/1994 | Lo |
| 5,293,645 A | 3/1994 | Sood |
| 5,295,180 A | 3/1994 | Vendetti et al. |
| 5,311,195 A | 5/1994 | Mathis et al. |
| 5,317,323 A | 5/1994 | Kennedy et al. |
| 5,319,374 A | 6/1994 | Desai et al. |
| 5,325,419 A | 6/1994 | Connolly et al. |
| 5,327,144 A | 7/1994 | Stilp et al. |
| 5,331,550 A | 7/1994 | Stafford et al. |
| 5,343,209 A | 8/1994 | Sennott et al. |
| 5,349,631 A | 9/1994 | Lee |
| 5,359,521 A | 10/1994 | Kyrtsos et al. |
| 5,363,110 A | 11/1994 | Inamiya |
| 5,365,447 A | 11/1994 | Dennis |
| 5,365,450 A | 11/1994 | Schuchman et al. |
| 5,365,516 A | 11/1994 | Jandrell |
| 5,365,544 A | 11/1994 | Schilling |
| 5,373,456 A | 12/1994 | Ferkinhoff et al. |
| 5,373,546 A | 12/1994 | Holzermer |
| 5,379,224 A | 1/1995 | Brown et al. |
| 5,388,147 A | 2/1995 | Grimes |
| 5,388,259 A | 2/1995 | Fleischman et al. |
| 5,389,934 A | 2/1995 | Kass |
| 5,390,339 A | 2/1995 | Bruckert et al. |
| 5,392,052 A | 2/1995 | Eberwine |
| 5,394,158 A | 2/1995 | Chia |
| 5,394,435 A | 2/1995 | Weerackody |
| 5,395,366 A | 3/1995 | D'Andrea et al. |
| 5,398,302 A | 3/1995 | Thrift |
| 5,402,520 A | 3/1995 | Schnitta |
| 5,402,524 A | 3/1995 | Bauman et al. |
| 5,408,586 A | 4/1995 | Skeirik |
| 5,408,588 A | 4/1995 | Ulug |
| 5,410,737 A | 4/1995 | Jones |
| 5,416,712 A | 5/1995 | Geier et al. |
| 5,420,914 A | 5/1995 | Blumhardt |
| 5,422,813 A | 6/1995 | Schuchman et al. |
| 5,426,745 A | 6/1995 | Baji et al. |
| 5,434,927 A | 7/1995 | Brady et al. |
| 5,438,644 A | 8/1995 | Fu |
| 5,438,688 A | 8/1995 | Masaki |
| 5,444,451 A | 8/1995 | Johnson et al. |
| 5,448,754 A | 9/1995 | Ho et al. |
| 5,457,736 A | 10/1995 | Cain et al. |
| 5,461,390 A | 10/1995 | Hoshen |
| 5,465,082 A | 11/1995 | Chaco |
| 5,473,602 A | 12/1995 | McKenna et al. |
| 5,479,397 A | 12/1995 | Lee |
| 5,479,482 A | 12/1995 | Grimes |
| 5,485,163 A | 1/1996 | Singer et al. |
| 5,502,757 A | 3/1996 | Bales et al. |
| 5,506,864 A | 4/1996 | Schilling |
| 5,508,707 A | 4/1996 | LeBlanc et al. |
| 5,508,708 A | 4/1996 | Ghosh et al. |
| 5,510,801 A | 4/1996 | Engelbrecht et al. |
| 5,512,908 A | 4/1996 | Herrick |
| 5,513,111 A | 4/1996 | Wortham |
| 5,513,243 A | 4/1996 | Kage |
| 5,513,246 A | 4/1996 | Jonsson et al. |
| 5,515,285 A | 5/1996 | Garrett, Sr. et al. |
| 5,515,378 A | 5/1996 | Roy, III et al. |
| 5,515,419 A | 5/1996 | Sheffer |
| 5,517,667 A | 5/1996 | Wang |
| 5,519,760 A | 5/1996 | Borkowski et al. |
| 5,526,001 A | 6/1996 | Rose et al. |
| 5,526,357 A | 6/1996 | Jandrell |
| 5,526,466 A | 6/1996 | Takizawa |
| 5,537,460 A | 7/1996 | Holliday, Jr. et al. |
| 5,546,445 A | 8/1996 | Dennison et al. |
| 5,555,257 A | 9/1996 | Dent |
| 5,555,286 A | 9/1996 | Tendler |
| 5,559,520 A | 9/1996 | Barzegar et al. |
| 5,561,704 A | 10/1996 | Salimando |
| 5,561,840 A | 10/1996 | Alvesalo et al. |
| 5,563,611 A | 10/1996 | McGann et al. |
| 5,563,931 A | 10/1996 | Bishop et al. |
| 5,564,079 A | 10/1996 | Olsson |
| 5,570,412 A | 10/1996 | LeBlanc |
| 5,572,218 A | 11/1996 | Cohen et al. |
| 5,574,648 A | 11/1996 | Pilley |
| 5,577,169 A | 11/1996 | Prezioso |
| 5,579,535 A | 11/1996 | Orlen et al. |
| 5,581,490 A | 12/1996 | Ferkinhoff et al. |
| 5,581,596 A | 12/1996 | Hogan |
| 5,583,513 A | 12/1996 | Cohen |
| 5,583,517 A | 12/1996 | Yokev et al. |
| 5,588,038 A | 12/1996 | Snyder |
| 5,592,180 A | 1/1997 | Yokev et al. |
| 5,594,425 A | 1/1997 | Ladner et al. |
| 5,594,740 A | 1/1997 | LaDue |
| 5,594,782 A | 1/1997 | Zicker et al. |
| 5,596,625 A | 1/1997 | LeBlanc |
| 5,600,705 A | 2/1997 | Maenpaa |
| 5,600,706 A | 2/1997 | Dunn et al. |
| 5,602,903 A | 2/1997 | LeBlanc et al. |
| 5,604,765 A | 2/1997 | Bruno et al. |
| 5,608,410 A | 3/1997 | Stilp et al. |
| 5,610,815 A | 3/1997 | Gudat et al. |
| 5,610,972 A | 3/1997 | Emery et al. |
| 5,611,704 A | 3/1997 | Kamizono et al. |
| 5,612,703 A | 3/1997 | Mallinckrodt |
| 5,613,041 A | 3/1997 | Keeler et al. |
| 5,613,205 A | 3/1997 | Dufour |
| 5,614,914 A | 3/1997 | Bolgiano et al. |

| Patent No. | Date | Inventor(s) |
|---|---|---|
| 5,617,565 A | 4/1997 | Augenbraun et al. |
| 5,619,522 A | 4/1997 | Dube |
| 5,619,552 A | 4/1997 | Karppanen et al. |
| 5,621,848 A | 4/1997 | Wang |
| 5,625,668 A | 4/1997 | Loomis et al. |
| 5,625,748 A | 4/1997 | McDonough et al. |
| 5,627,547 A | 5/1997 | Ramaswamy et al. |
| 5,629,707 A | 5/1997 | Heuvel et al. |
| 5,631,469 A | 5/1997 | Carrieri et al. |
| 5,634,051 A | 5/1997 | Thomson |
| 5,638,486 A | 6/1997 | Wang et al. |
| 5,640,103 A | 6/1997 | Petsche et al. |
| 5,646,630 A | 7/1997 | Sheynblat et al. |
| 5,649,065 A | 7/1997 | Lo et al. |
| 5,652,570 A | 7/1997 | Lepkofker |
| 5,657,487 A | 8/1997 | Doner |
| 5,663,734 A | 9/1997 | Krasner |
| 5,673,322 A | 9/1997 | Pepe et al. |
| 5,675,344 A | 10/1997 | Tong et al. |
| 5,675,788 A | 10/1997 | Husick et al. |
| 5,686,924 A | 11/1997 | Trimble et al. |
| 5,701,328 A | 12/1997 | Schuchman et al. |
| 5,710,328 A | 1/1998 | Spivey et al. |
| 5,710,758 A | 1/1998 | Soliman et al. |
| 5,710,918 A | 1/1998 | Lagarde et al. |
| 5,717,406 A | 2/1998 | Sanderford et al. |
| 5,719,584 A | 2/1998 | Otto |
| 5,724,047 A | 3/1998 | Lioio et al. |
| 5,724,648 A | 3/1998 | Shaughnessy et al. |
| 5,724,660 A * | 3/1998 | Kauser et al. ............... 455/456.2 |
| 5,727,057 A | 3/1998 | Emery et al. |
| 5,729,549 A | 3/1998 | Kostreski et al. |
| 5,732,074 A | 3/1998 | Spaur et al. |
| 5,732,354 A * | 3/1998 | MacDonald ............... 455/456.2 |
| 5,736,964 A | 4/1998 | Ghosh et al. |
| 5,737,431 A | 4/1998 | Brandstein et al. |
| 5,740,048 A | 4/1998 | Abel et al. |
| 5,742,509 A | 4/1998 | Goldberg et al. |
| 5,742,905 A | 4/1998 | Pepe et al. |
| 5,754,955 A | 5/1998 | Ekbatani |
| 5,764,756 A | 6/1998 | Onweller |
| 5,774,802 A | 6/1998 | Tell et al. |
| 5,774,805 A | 6/1998 | Zicker |
| 5,774,829 A | 6/1998 | Cisneros et al. |
| 5,774,869 A | 6/1998 | Toader |
| 5,786,773 A | 7/1998 | Murphy |
| 5,787,235 A | 7/1998 | Smith et al. |
| 5,787,354 A | 7/1998 | Gray et al. |
| 5,790,953 A | 8/1998 | Wang et al. |
| 5,790,974 A | 8/1998 | Tognazzini |
| 5,799,016 A | 8/1998 | Onweller |
| 5,802,454 A | 9/1998 | Goshay et al. |
| 5,802,492 A | 9/1998 | DeLorme et al. |
| 5,802,518 A | 9/1998 | Karaev et al. |
| 5,805,670 A | 9/1998 | Pons et al. |
| 5,809,415 A | 9/1998 | Rossmann |
| 5,815,417 A | 9/1998 | Orr et al. |
| 5,815,538 A | 9/1998 | Grell et al. |
| 5,815,814 A | 9/1998 | Dennison et al. |
| RE35,916 E | 10/1998 | Dennison et al. |
| 5,819,273 A | 10/1998 | Vora et al. |
| 5,819,301 A | 10/1998 | Rowe et al. |
| 5,822,539 A | 10/1998 | van Hoff |
| 5,831,977 A | 11/1998 | Dent |
| 5,832,367 A | 11/1998 | Bamburak et al. |
| 5,835,857 A | 11/1998 | Otten |
| 5,835,907 A | 11/1998 | Newman |
| 5,838,562 A | 11/1998 | Gudat et al. |
| 5,842,130 A | 11/1998 | Oprescu-Surcobe et al. |
| 5,844,522 A | 12/1998 | Sheffer et al. |
| 5,845,198 A | 12/1998 | Bamburak et al. |
| 5,845,267 A | 12/1998 | Ronen |
| 5,857,181 A | 1/1999 | Augenbraun et al. |
| 5,864,313 A | 1/1999 | Speck et al. |
| 5,864,755 A | 1/1999 | King et al. |
| 5,867,495 A | 2/1999 | Elliott et al. |
| 5,867,799 A | 2/1999 | Lang et al. |
| 5,870,029 A | 2/1999 | Otto et al. |
| 5,872,539 A | 2/1999 | Mullen |
| 5,873,040 A | 2/1999 | Dunn et al. |
| 5,873,076 A | 2/1999 | Barr et al. |
| 5,875,394 A | 2/1999 | Daly et al. |
| 5,875,401 A | 2/1999 | Rochkind |
| 5,883,598 A | 3/1999 | Parl et al. |
| 5,890,068 A | 3/1999 | Fattouche et al. |
| 5,892,441 A | 4/1999 | Woolley et al. |
| 5,893,091 A | 4/1999 | Hunt et al. |
| 5,895,436 A | 4/1999 | Savoie et al. |
| 5,901,358 A | 5/1999 | Petty et al. |
| 5,903,844 A | 5/1999 | Bruckert et al. |
| 5,905,455 A | 5/1999 | Heger et al. |
| 5,906,655 A | 5/1999 | Fan |
| 5,913,170 A | 6/1999 | Wortham |
| 5,914,675 A | 6/1999 | Tognazzini |
| 5,917,405 A | 6/1999 | Joao |
| 5,917,449 A | 6/1999 | Sanderford et al. |
| 5,917,866 A | 6/1999 | Pon |
| 5,920,873 A | 7/1999 | Van Huben et al. |
| 5,924,090 A | 7/1999 | Krellenstein |
| 5,926,133 A | 7/1999 | Green, Jr. |
| 5,930,699 A | 7/1999 | Bhatia |
| 5,930,717 A | 7/1999 | Yost et al. |
| 5,933,421 A | 8/1999 | Alamouti et al. |
| 5,933,822 A | 8/1999 | Braden-Harder et al. |
| 5,936,572 A | 8/1999 | Loomis et al. |
| 5,938,721 A | 8/1999 | Dussell et al. |
| 5,943,014 A | 8/1999 | Gilhousen |
| 5,945,948 A | 8/1999 | Buford et al. |
| 5,948,040 A | 9/1999 | DeLorme et al. |
| 5,949,815 A | 9/1999 | Pon |
| 5,952,969 A | 9/1999 | Hagerman et al. |
| 5,959,568 A | 9/1999 | Woolley |
| 5,963,866 A | 10/1999 | Palamara et al. |
| 5,966,658 A | 10/1999 | Kennedy, III et al. |
| 5,969,673 A | 10/1999 | Bickley |
| 5,973,643 A | 10/1999 | Hawkes et al. |
| 5,977,913 A | 11/1999 | Christ |
| 5,978,840 A | 11/1999 | Nguyen et al. |
| 5,982,324 A | 11/1999 | Watters et al. |
| 5,982,891 A | 11/1999 | Ginter et al. |
| 5,983,214 A | 11/1999 | Lang et al. |
| 5,987,329 A | 11/1999 | Yost et al. |
| 5,999,124 A | 12/1999 | Sheynblat |
| 5,999,126 A | 12/1999 | Ito |
| 6,009,334 A | 12/1999 | Grubeck et al. |
| 6,014,102 A | 1/2000 | Mitzlaff et al. |
| 6,021,371 A | 2/2000 | Fultz |
| 6,023,241 A | 2/2000 | Clapper |
| 6,026,304 A * | 2/2000 | Hilsenrath et al. ......... 455/456.2 |
| 6,028,551 A | 2/2000 | Schoen et al. |
| 6,029,161 A | 2/2000 | Lang et al. |
| 6,031,490 A | 2/2000 | Forssen et al. |
| 6,034,635 A | 3/2000 | Gilhousen |
| 6,038,668 A | 3/2000 | Chipman et al. |
| 6,046,683 A | 4/2000 | Pidwerbetsky et al. |
| 6,047,192 A | 4/2000 | Maloney et al. |
| 6,061,064 A | 5/2000 | Reichlen |
| 6,064,339 A | 5/2000 | Wax et al. |
| 6,064,942 A | 5/2000 | Johnson et al. |
| 6,097,958 A | 8/2000 | Bergen |
| 6,101,178 A | 8/2000 | Beal |
| 6,101,390 A | 8/2000 | Jayaraman et al. |
| 6,101,391 A | 8/2000 | Ishizuka et al. |
| 6,108,555 A | 8/2000 | Maloney et al. |
| 6,108,557 A * | 8/2000 | Wax et al. .................. 455/456.2 |
| 6,112,095 A * | 8/2000 | Wax et al. .................. 455/456.1 |
| 6,115,611 A | 9/2000 | Kimoto et al. |
| 6,122,520 A | 9/2000 | Want et al. |
| 6,138,003 A | 10/2000 | Kingdon et al. |
| 6,154,745 A | 11/2000 | Kari et al. |
| 6,157,621 A | 12/2000 | Brown et al. |
| 6,167,274 A | 12/2000 | Smith |
| 6,181,928 B1 | 1/2001 | Moon |
| 6,185,282 B1 | 2/2001 | Boeckman et al. |
| 6,185,427 B1 | 2/2001 | Krasner et al. |
| 6,202,023 B1 | 3/2001 | Hancock et al. |
| 6,236,365 B1 | 5/2001 | LeBlanc et al. |
| 6,240,285 B1 | 5/2001 | Blum et al. |

| | | |
|---|---|---|
| 6,243,587 B1 | 6/2001 | Dent et al. |
| 6,249,245 B1 | 6/2001 | Watters et al. |
| 6,249,252 B1 | 6/2001 | Dupray |
| 6,295,502 B1 | 9/2001 | Hancock et al. |
| 6,301,463 B1 | 10/2001 | Dao et al. |
| 6,304,833 B1 | 10/2001 | Ferkinhoff et al. |
| 6,308,072 B1 | 10/2001 | Labedz et al. |
| 6,317,718 B1 | 11/2001 | Fano |
| 6,321,092 B1 | 11/2001 | Fitch et al. |
| 6,324,404 B1 | 11/2001 | Dennison et al. |
| 6,330,452 B1 | 12/2001 | Fattouche et al. |
| 6,381,464 B1 | 4/2002 | Vannucci |
| 6,385,302 B1 | 5/2002 | Antonucci et al. |
| 6,385,541 B1 | 5/2002 | Blumberg et al. |
| 6,415,018 B1 | 7/2002 | Antonucci et al. |
| 6,438,380 B1 | 8/2002 | Bi et al. |
| 6,490,450 B1 | 12/2002 | Batni et al. |
| 6,496,776 B1 | 12/2002 | Blumberg et al. |
| 6,519,232 B1 | 2/2003 | Becher |
| 6,519,463 B2 | 2/2003 | Tendler |
| 6,522,875 B1 | 2/2003 | Dowling et al. |
| 6,529,143 B2 | 3/2003 | Mikkola et al. |
| 6,549,130 B1 | 4/2003 | Joao |
| 6,549,768 B1 | 4/2003 | Fraccaroli |
| 6,571,279 B1 | 5/2003 | Herz et al. |
| 6,584,307 B1 | 6/2003 | Antonucci et al. |
| 6,594,483 B2 | 7/2003 | Nykanen et al. |
| 6,597,983 B2 | 7/2003 | Hancock |
| 6,650,619 B1 | 11/2003 | Schuster et al. |
| 6,650,902 B1 | 11/2003 | Richton |
| 6,677,894 B2 | 1/2004 | Sheynblat et al. |
| 6,683,538 B1 | 1/2004 | Wilkes, Jr. |
| 6,707,421 B1 | 3/2004 | Drury et al. |
| 6,731,940 B1 * | 5/2004 | Nagendran ............... 455/456.1 |
| 6,751,626 B2 | 6/2004 | Brown et al. |
| 6,754,482 B1 | 6/2004 | Torabi |
| 6,813,501 B2 | 11/2004 | Kinnunen et al. |
| 6,819,929 B2 | 11/2004 | Antonucci et al. |
| 6,826,481 B2 | 11/2004 | Root et al. |
| 6,834,195 B2 | 12/2004 | Brandenberg et al. |
| 6,839,628 B1 | 1/2005 | Tu |
| 6,845,400 B2 | 1/2005 | Macpherson et al. |
| 6,847,825 B1 | 1/2005 | Duvall et al. |
| 6,871,140 B1 | 3/2005 | Florance et al. |
| 6,873,850 B2 | 3/2005 | Dowling et al. |
| 6,912,545 B1 | 6/2005 | Lundy et al. |
| 6,950,876 B2 | 9/2005 | Bright et al. |
| 6,952,101 B2 | 10/2005 | Gupta |
| 6,952,181 B2 | 10/2005 | Karr et al. |
| 7,047,019 B1 | 5/2006 | Cox et al. |
| 7,171,189 B2 | 1/2007 | Bianconi et al. |
| 7,228,140 B2 | 6/2007 | Anctil et al. |
| 7,245,910 B2 | 7/2007 | Osmo |
| 7,254,559 B2 | 8/2007 | Florance et al. |
| 2001/0022558 A1 | 9/2001 | Dupray et al. |
| 2002/0035605 A1 | 3/2002 | McDowell et al. |
| 2002/0111154 A1 | 8/2002 | Eldering et al. |
| 2003/0032409 A1 | 2/2003 | Hutcheson et al. |
| 2003/0040324 A1 | 2/2003 | Eldering et al. |
| 2003/0126250 A1 | 7/2003 | Jhanji |
| 2003/0146871 A1 | 8/2003 | Karr et al. |
| 2003/0148774 A1 | 8/2003 | Naghian et al. |
| 2003/0222820 A1 | 12/2003 | Karr et al. |
| 2004/0022258 A1 | 2/2004 | Tsukada et al. |
| 2004/0198386 A1 * | 10/2004 | Dupray ............... 455/456.1 |
| 2004/0266457 A1 * | 12/2004 | Dupray ............... 455/456.5 |
| 2005/0288958 A1 | 12/2005 | Eraker et al. |
| 2006/0025158 A1 | 2/2006 | Leblanc et al. |
| 2006/0276201 A1 | 12/2006 | Dupray |
| 2006/0294147 A1 | 12/2006 | Root et al. |
| 2008/0113672 A1 | 5/2008 | Karr et al. |
| 2008/0133126 A1 | 6/2008 | Dupray |
| 2008/0167049 A1 | 7/2008 | Karr et al. |
| 2009/0048938 A1 | 2/2009 | Dupray |
| 2010/0063829 A1 | 3/2010 | Dupray |

FOREIGN PATENT DOCUMENTS

| | | |
|---|---|---|
| EP | 0546758 | 6/1993 |
| EP | 0689369 | 12/1995 |
| EP | 0811296 | 12/1997 |
| EP | 0870203 | 10/1998 |
| EP | 0923817 | 6/1999 |
| EP | 1045604 | 10/2000 |
| GB | 1605207 | 10/1983 |
| GB | 2155720 | 9/1985 |
| JP | 10-013961 | 1/1998 |
| WO | WO 93/04453 | 3/1993 |
| WO | WO 94/01978 | 1/1994 |
| WO | WO 94/11853 | 5/1994 |
| WO | WO 94/15412 | 7/1994 |
| WO | WO 94/27161 | 11/1994 |
| WO | WO 95/03598 | 2/1995 |
| WO | WO 95/34177 | 12/1995 |
| WO | WO 96/14588 | 5/1996 |
| WO | WO 96/20542 | 7/1996 |
| WO | WO 97/01228 | 1/1997 |
| WO | WO 97/22888 | 6/1997 |
| WO | WO 97/24010 | 7/1997 |
| WO | WO 97/26750 | 7/1997 |
| WO | WO 97/38540 | 10/1997 |
| WO | WO 97/41654 | 11/1997 |
| WO | WO 97/50002 | 12/1997 |
| WO | WO 98/00982 | 1/1998 |
| WO | WO 98/02824 | 1/1998 |
| WO | WO 98/08314 | 2/1998 |
| WO | WO 98/10307 | 3/1998 |
| WO | WO 98/14018 | 4/1998 |
| WO | WO 98/59506 | 12/1998 |
| WO | WO 99/33293 | 7/1999 |
| WO | WO 99/45732 | 9/1999 |
| WO | WO 00/04730 | 1/2000 |
| WO | WO 00/29979 | 5/2000 |
| WO | WO 00/41090 | 7/2000 |
| WO | WO 00/41412 | 7/2000 |
| WO | WO 00/50844 | 8/2000 |
| WO | WO 01/44998 | 6/2001 |
| WO | WO 01/60086 | 8/2001 |
| WO | WO 01/95642 | 12/2001 |
| WO | WO 02/065250 | 8/2002 |

OTHER PUBLICATIONS

U.S. Appl. No. 08/246,149, filed May 19, 1994, Lepkofker.
U.S. Appl. No. 08/355,901, filed Dec. 13, 1994, Schoen.
U.S. Appl. No. 09/176,587, filed Oct. 21, 1998.
U.S. Appl. No. 09/194,367, Nov. 24, 1998, Dupray.
U.S. Appl. No. 60/017,269, May 13, 1996, Maloney.
U.S. Appl. No. 60/017,899, May 17, 1996, Maloney.
U.S. Appl. No. 60/025,855, Sep. 9, 1996, Leblanc.
U.S. Appl. No. 60/035,691, Jan. 16, 1997, Maloney.
U.S. Appl. No. 60/038,037, Feb. 7, 1997, Christ.
"After Allowance Amendment under C.F.R. 1.312", filed Jul. 10, 2007, for U.S. Appl. No. 10/262,413, 23 pages.
"Amendment and Response to Office Action Dated May 5, 2006 in the Claims:", filed Nov. 30, 2006, for U.S. Appl. No. 10/262,338, 27 pages.
"Duplicate Claims Filed in a Previous Preliminary Amendment", filed May 23, 2007, for U.S. Appl. No. 09/770,838, 23 pages.
"ARGOS: Basic Description of the Argos System"; ARGOS; 7 pgs.
"Location Systems and Technologies", 1994, Wireless Emergency Services JEM Report, Annex A pp. 42-46 and Appendix A pgs. 1-2.
"The Measearch Engine Years: Fit the First", 1992, http://www.conman.org/people/spc/refs/search.hpl.html, pgs. 1-3.
Abowd et al., A Mobile context-Aware Tour Guide, Sep. 23, 1996 Baltzer Journals.
Abowd et al., A Mobile context-Aware Tour Guide, Wireless Networks 3 (1997), pp. 421-433.
Baldazo, "Navigating with a Web Compass: Quarterdeck Harnessess Leading-edge "Metasearch" Technology to Create a Smart Agent that Searches the Web and organizes the Results", Mar. 1996, BYTE, pp. 97-98.
Beck et al.; "Simulation Results on the Downlink of a Qualcomm-like DS-CDMA-System Over Multipath fading channels"; Sep. 1994 pp. 1-7.
Botafogo, "Cluster Analysis for Hypertext Systems", Jun. 1993, ACM-SIRIG, pp. 116-124.

Caffery et al.; "Overview of Radiolocation in CDMA Cellular Systems"; IEEE Communications Magazine; Apr. 1998; pp. 38-45.
Caffery et al.; "Radio Location in Urban CDMA Microcells"; International Symposium on Personal, Indoor, and Mobil Radio Communications, Sep. 1995; 5 pgs.
Caffery, J. and Stüüber, G. L., "Vehicle Location and Tracking for IVHS in CDMA Microcells," International Symposium on Personal, Indoor, and Mobile Radio Communications, pp. 1227-1231, Sep. 1994.
Callan, James P., et al., "Searching Distributed Collections With Inference Networks," 18th Annual International ACM SIGIR Conference on Research and Development in Information Retrieval, 1995.
CC Docket No. 94-102, Before the Federal Communications Commission, in the Matter of Revision of the Commission's Rules to Ensure Compatibility with Enhanced 911 Emergency Calling Systems; "Comments of Harris Government Communication Systems Division A Division of Harris Corporation", filed Sep. 25, 1996.
CC Docket No. 94-102, Before the Federal Communications Commission, in the Matter of Revision of the Commission's Rules to Ensure Compatibility with Enhanced 911 Emergency Calling Systems; "Reply Comments of KSI Inc. and MULIC Inc." filed Oct. 25, 1996.
CC Docket No. 94-102, Before the Federal Communications Commission, in the Matter of Revision of the Commission's Rules to Ensure Compatibility with Enhanced 911 Emergency Calling Systems; ex parte communication from Cambridge Positioning Systems Ltd. received Apr. 14, 1997 by the Commission.
CC Docket No. 94-102, Before the Federal Communications Commission, in the Matter of Revision of the Commission's Rules to Ensure Compatibility with Enhanced 911 Emergency Calling Systems; ex parte communication from GeoTek Communications, Inc. received Apr. 14, 1997 by the Commission.
CC Docket No. 94-102, Before the Federal Communications Commission, in the Matter of Revision of the Commission's Rules to Ensure Compatibility with Enhanced 911 Emergency Calling Systems; ex parte communication from National Strategies, Inc., regarding enhanced 911 system trial by TruePosition, Inc. and New Jersey Office of Emergency Telecommunications Services, received Aug. 8, 1997 by the Commission.
CC Docket No. 94-102, Before the Federal Communications Commission, in the Matter of Revision of the Commission's Rules to Ensure Compatibility with Enhanced 911 Emergency Calling Systems; ex parte communication from SnapTrack, Inc., received Jun. 27, 1997 by the Commission.
CC Docket No. 94-102, Before the Federal Communications Commission, in the Matter of Revision of the Commission's Rules to Ensure Compatibility with Enhanced 911 Emergency Calling Systems; ex parte communication from XYPOINT Corporation, Inc. received Jul. 28, 1997 by the Commission.
Chan et al., "Multipath Propagation Effects on a CDMA Cellular System", 1994, IEEE, pp. 848-855.
Cheverst, et al. "Using context as a Crystal Ball: Rewards and Pitfalls", Distributed Multimedia Research Group, Pub. Yr. 2000, Dept. of Computing, Lancaster University, Lancaster, LA14YR, U.K., 5 pgs.
Cheverst, et al. Experiences of Developing and Deploying a Context-Aware Tourist Guide: The GUIDE Project; "Mobile Computing Networking", pp. 20-31, 2000 (url = "citeseer.ist.psu.edu/cheverst00experiences.html").
Communication from U.S. Patent and Trademark Office, Re: U.S. Appl. No. 08/355,901, Advisory Action, Dated: Aug. 11, 1998.
Communication from U.S. Patent and Trademark Office, Re: U.S. Appl. No. 08/355,901, Advisory Action, Dated: Nov. 4, 1998.
Communication from U.S. Patent and Trademark Office, Re: U.S. Appl. No. 08/355,901, Advisory Action, Dated: Oct. 9, 1998.
Communication from U.S. Patent and Trademark Office, Re: U.S. Appl. No. 08/355,901, Advisory Action, Dated: Sep. 9, 1998.
Communication from U.S. Patent and Trademark Office, Re: U.S. Appl. No. 08/355,901, Examiner Interview Summary Record, Dated: Aug. 13, 1996.
Communication from U.S. Patent and Trademark Office, Re: U.S. Appl. No. 08/355,901, Office Action Summary, Dated: Jun. 24, 1998.
Communication from U.S. Patent and Trademark Office, Re: U.S. Appl. No. 08/355,901, Office Action Summary, Dated: Mar. 14, 1997.
Communication from U.S. Patent and Trademark Office, Re: U.S. Appl. No. 08/355,901, Office Action Summary, Dated: Mar. 17, 1998.
Communication from U.S. Patent and Trademark Office, Re: U.S. Appl. No. 08/355,901.
Communication from U.S. Patent and Trademark Office, Re: U.S. Appl. No. 08/355,901, Response from Examiner regarding communication filed on Dec. 26, 1995, Dated Jul. 23, 1996.
Dailey, D.J., "Demonstration of an Advanced Public Transportation System in the Context of an IVHS Regional Architecture," paper presented at the First World Congress on Applications of Transport Telematics and Intelligent Vehicle-Highway Systems, Nov. 30-Dec. 3, 1994.
Dailey, D.J., et al., "ITS Data Fusion," Final Research Report, Research Project T9903, Task 9, ATIS/ATMS Regional IVHS Demonstration, University of Washington, Apr. 1996.
Dey, "Understanding and Using Context", Personal and Ubiquitous Computing Journal, vol. 5(1), 2001. pp. 4-7.
Driscoll, "Wireless Caller Location Systems", 1998, GSP World Advanstar Communications, Inc., www.gpsworld.com/1198/1198driscol.html, pp. 1-8.
Dutta et al., "Modified Adaptive Multiuser Detector for DS-CDMA in Multipath Fading", Prior to Dec. 22, 1997, pp. 1-7.
Ergon Proprietary; "Performance Analyses Brief: Microminiature Emergency Locator Systems (MELS)"; May 1996.
Evans, 1998, "New Satellites for Personal Communications," Scientific American, 278(4):70-77.
Fechner et al., A Hybrid Neural Network Architecture for Automatic Object Recognition, 1994, IEEE, pp. 187-194.
Fels et al., "Progress of C-Map: A Context_Aware Mobile Assistant", ATR Media Integration & Communication Research Laboratories, Seida-cho, Soraku-gun, Kyoto, 619-02, Japan, Publication year 1998.
from http:/www.uswcorp.com/laby.htm,, Release concerning RadioCamera™, printed Sep. 14, 1998.
Gallant, "Neural Network Learning and Expert Systems", 1994, The MIT Press, pp. 132-137.
Gaspard et al., "Position Assignment in Digital Cellular Mobile Radio Networks (e.g. GSM) derived from Measurements at the Protocol Interface", Prior to Dec. 22, 1997, pp. 1-5.
Goldbsmith et al., "A Measurement-Based Model for Predicting Coverage Areas of Urban Microcells", 1993, IEEE, pp. 1013-1023.
Hills, 1998, Terrestrial Wireless Networks, Scientific American, 278(4):86-91.
Ichitsubo et al., "A Statistical Model for Microcellular Multipath Propagation Environment", Prior to Dec. 22, 1997, Wireless Systems Laboratories, pp. 1-6.
Iida et al. "Multi-Agent Architecture for Seamless Personal Communications", NetMedia Research Center, Fujitsu Laboratories Ltd., 1999, pp. 1-7.
Iwayama et al., "Cluster-Based Text Catagorization: A Comparison of Category Search Strategies", 1995, ACM-SIGIR, pp. 273-279.
Johnson, "Smart Technology Busting Out All Over Web", Jun. 15, 1998, Electronic Engineering Times, 1012 pp. 1-6.
Junius et al., "New Methods for Processing GSM Radio Measurement Data: Applications for Locating, Handover, and Network Management", 1994, Communication Network, Aachen University of Technology, pp. 338-342.
Karanta, Ilkka, "Intelligent Agents in Mobile Services", VTT Information Technolgy, Oct. 2, 1997.
Kennemann, Olrik, "Continuous Location of Moving GSM Mobile Stations by Pattern Recognition Techniques," Fifth IEEE International Symposium on Personal, Indoor and Mobile Radio Communications (PIMRC '94), pp. 630-634, IEEE, Sep. 1994.
Kosko, "Fuzzy Systems as Universal Approximators", 1994, IEEE, pp. 1329-1333.
Lawrence et al., "Northern Light Search Engine Leads the Pack-Others Fall Behind", May 1, 1998, Online Newsletter, 19(5)pp. 1-2.
Lepkofker; U.S. Appl. No. 08/246,149 Entitled Individual Location System; May 19, 1994.

Long et al., Rapid Prototyping of Mobile Context-Aware Applications: The Cyberguide Case Study; 2nd ACM International Conference on Mobile Computing and Networking, 1996 (MobiCom '96).

Loran; 1992; "Users Handbook 1992 Edition"; U.S. Coast Guard, Radionavigation Division; 28 pgs.

Low, "Comparison of Urban Propagation Models with CW-Measurements", 1992, IEEE Deutsche Bundespost Telekom, pp. 936-942.

Maloney; U.S. Appl. No. 60/035,691, filed Jan. 16, 1997 Entitled "Robust, Efficienct, Localization System".

Mardiraju et al., "Neural Networks for Robust Image Feature Classification: A Comparative Study", 1994, IEEE, pp. 423-430.

Marmasse et al., "Location-aware Information Delivery with comMotion", Mit Media Laboratory, 20 Ames Street, Cambridge, MA 02139, USA, Publication: HUC 2000 Proceeding, pp. 157-171, publication year 2000.

Meadow, "Text Information Retrieval Systems", 1992, Academic Press, pp. 204-209.

Miller, RT, et al., "Protein fold recognition by sequence threading: tools and assessment techniques," Journal Announcement, Department of Biochemistry and Molecular Biology, University College, London, United Kingdom, Jan. 1996.

Mynatt et al., "Designing Audio Aura", published in CHI '98 Conference Proceedings, publication yr. 1998.

Newton; 1981; "The Near-Term Potential of Doppler Location"; John Hopkins APL Technical Digest; pp. 16-31.

Notess, "Internet Search Engine Update", Jul. 1, 1998, Online, vol. v22:nr, pp. 1-3.

Orphanoudakis, C.E., et al., "I2 Cnet: Content-Based Similarity Search in Geographically Distributed Repositories of Medical Images," vol, 20(4), pp. 193-207, Computerized Medical Imaging and Graphics, 1996.

Pascoe et al., "Human-Computer-Giraffe Interaction: HCI in the Field", Workshop on Human Computer Interaction with Mobile Devices, Glasgow, Scotland, publ yr: 1998.

Pelton, 1998, "Telecommunications for the 21st Century," Scientific American, 278(4):80-85.

Pop et al.; "Site Engineering for Indoor Wireless Spread Spectrum Communications"; Jun. 2001; 3 pgs.

Ramanathan et al.; "A Survey of Routing Techniques for Mobile Communications Networks"; Mobile Networks and Applications; Oct. 1996; vol. 1(2); pp. 1-31.

Randell et al, "The Shopping Jacket: Wearable Computing for the Consumer", Personal Technologies, 4, 2000, pp. 241-244.

Rizzo et al.; "Integration of Location Services in the Open Distributed Office"; Technical Report 14-94, Computing Laboratory, University of Kent, Cantebury, United Kingdom; Aug. 1994; pp. 1-14.

Salcic;"AGPCS—An Automatic GSM-based Positioning and Communication System" Proceedings of GeoComputation 1997 & SIRC 1997; Aug. 1997; pp. 15-22.

Schopp, Michael, "User Modelling and Performance Evaluation of Distributed Location Management for Personal Communications Services," Proceedings of the 15th International Teletraffic Congress (ITC) 15, Washington, D.C., 1997, S. 23-34.

Smith, Jr., "Passive Location of Mobile Cellular Telephone Terminals," IEEE, CH3031—2/91/0000-0221, 1991 pp. 221-225.

Sousa et al., "Delay Spread Measurements for the Digital Cellular Channel in Toronto", 1994, IEEE, pp. 837-847.

Spiteri et al., "An Architecture to Support Storage and Retrieval of Events", Proceedings of Middleware 1998, IFIP International Conference on Distributed Systems Platfors and Open Distributed Processing, Lancaster, UK, Sep. 1998.

Striglis et al., "A Multistage RAKE Receiver for Improved Capacity of CDMA Systems", 1994, IEEE Vehicular Technology Conference, pp. 1-5.

Stutzmann et al., 1998, "Moving Beyond Wireless Voice Systems," Scientific American, 278(4):92-93.

Wang Baldonado et al., "SenseMaker: An Information-Exploration Interface Supporting the Contextual Evolution of a User's Interests", 1997, ACM-CHI, pp. 11-18.

Weiss et al., "HyPursuit: A Hierarcical Network Search Engine that Exploits Content-Link Hypertext Clustering", 1996, Hypertext, pp. 180-193.

Wittenben et al., "A Low Cost Noncoherent Receiver with Adaptive Antenna Combining for High Speed Wireless Lans", Prior to Dec. 22, 1997, ASCOM Systec AG, pp. 1-4.

Wolfe et al., "Field Strength Prediction in Indoor Environments with Neural Networks", Prior to Dec. 22, 1997, pp. 1-5.

U.S. Appl. No. 12/861,817, filed Aug. 23, 2010, Dupray.

U.S. Appl. No. 11/746,753, filed May 10, 2007, Dupray.

"Services Beyond Airtime," Release concerning RadioCamera™, available at http:/www.uswcorp.com/laby.htm, printed Sep. 14, 1998, 10 pages.

Brumitt et al., "EasyLiving: Technologies for Intelligent Environments," 2000, pp. 1-12.

Campadello et al., "Using Mobile and Intelligent Agents to Support Nomadic Users," 6th International Conference of Intelligence in Networks (ICIN2000), Jan. 17-20, 2000, Bordeaux, France.

Dartmouth College, "Soldiers, Agents and Wireless Networks: A Report on a Military Application," PAAM 2000.

Goodman, "The Wireless Internet: Promises and Challenges," IEEE, 2000, pp. 1-6.

Pitoura et al., "Locating Objects in Mobile Computing," IEEE, 2001, pp. 1-43.

Official Action for U.S. Appl. No. 11/464,880, mailed Jul. 22, 2008.

Official Action for U.S. Appl. No. 11/464,880, mailed Feb. 23, 2010.

Notice of Allowability for U.S. Appl. No. 11/464,880, mailed Aug. 9, 2010.

Bass, Tim, "Intrusion Detection Systems and Multisensor Data Fusion: Creating Cyberspace Situational Awareness," Communications of the ACM, Apr. 2000, vol. 43, No. 4, pp. 100-105.

Wylie et al., "The Non-Line of Sight Problem in Mobile Location Estimation," Proc. IEEE ICUPC, Cambridge, Mass, USA, Sep.-Oct. 1996, vol. 2, pp. 827-831.

U.S. Appl. No. 13/037,337, filed Feb. 28, 2011, Dupary et al.

Official Action for U.S. Appl. No. 10/297,449, mailed Jul. 27, 2005.

Official Action for U.S. Appl. No. 10/297,449, mailed Feb. 23, 2006.

Notice of Allowability for U.S. Appl. No. 10/297,449, mailed Oct. 4, 2006.

Notice of Allowability for U.S. Appl. No. 10/297,449, mailed Aug. 10, 2007.

Notice of Allowability for U.S. Appl. No. 10/297,449, mailed Nov. 14, 2007.

Notice of Allowability for U.S. Appl. No. 10/297,449, mailed Mar. 31, 2008.

Notice of Allowability for U.S. Appl. No. 10/297,449, mailed Sep. 9, 2008.

Notice of Allowability for U.S. Appl. No. 10/297,449, mailed Jan. 8, 2009.

Notice of Allowability for U.S. Appl. No. 10/297,449, mailed May 29, 2009.

Official Action for U.S. Appl. No. 12/021,222, mailed Dec. 17, 2010.

Official Action for U.S. Appl. No. 10/337,807, mailed Mar. 25, 2005.

Official Action for U.S. Appl. No. 10/337,807, mailed Feb. 13, 2007.

* cited by examiner

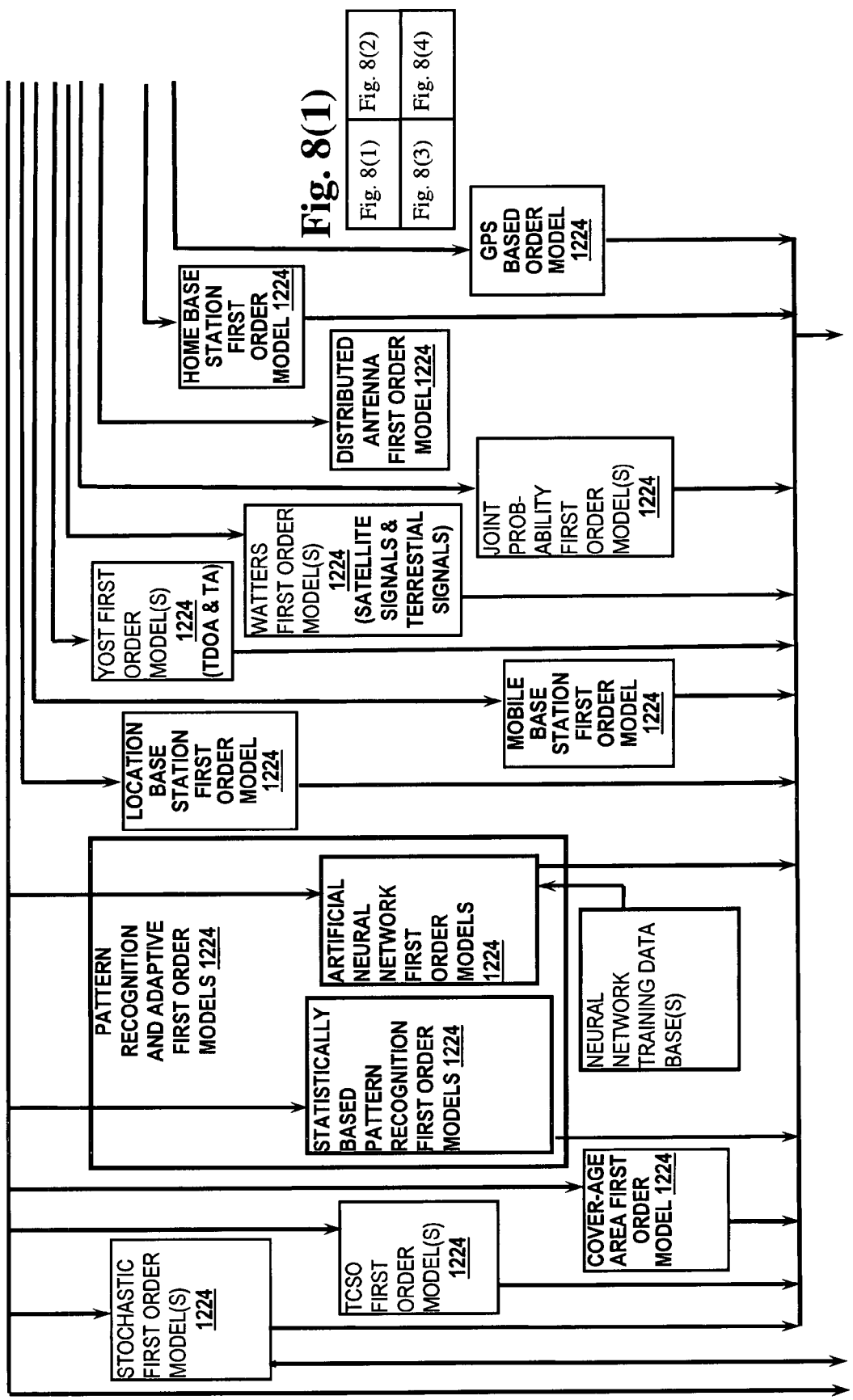

*FOM_ID*: First Order Model ID (providing this Location Hypothesis); note, since it is possible for location hypotheses to be generated by other than the FOM's, in general this field identifies the module that generated this location hypothesis.

*MS_ID*: The identification of the target MS to which this location hypothesis applies.

*pt_est*: The most likely location point estimate of the target MS

*valid_pt*: Boolean indicating the validity of "pt_est"

*area_est*: Location Area Estimate of the target MS provided by the FOM. This area estimate will be used whenever "image_area" below is NULL.

*valid_area*: Boolean indicating the validity of "area_est" (one of "pt_est" and "area_est" must be valid).

*adjust*: Boolean (true iff adjustments to the fields of this location hypothesis are to be performed in the Context Adjuster Module).

*pt_covering*: reference to a substantially minimal area (e.g., mesh cell) covering of "pt_est". Note, since this MS may be substantially on a cell boundary, this covering may in some cases include more than one cell.

*image_area*: reference to an area (e.g., mesh cell) covering of the image cluster set area for "pt_covering" (see detailed description of the function, "confidence_adjuster"). Note that if this field is not NULL, then this is the target MS location estimate used by the Location Center instead of "area_est".

FIG. 9A

*extrapolation_area*: reference to (if non-NULL) an extrapolated MS target estimate area provided by the Location Extrapolator submodule of the Hypothesis Analyzer. That is, this field, if non_NULL, is an extrapolation of the "image_area" field if it exists, otherwise this field is an extrapolation of the "area_est" field. Note other extrapolation fields may also be provided depending on the embodiment of the present invention, such as an extrapolation of the "pt_covering".

*confidence*: A real value in the range [0, +1.0] indicating a likelihood (e.g., probability) that the target MS is in (or out) of a particular area. If positive: if "image_area" exists, then this is a measure of the likelihood that the target MS is within the area represented by "image_area," else if "image_area" has not been computed (e.g., "adjust" is FALSE), then "area_est" must be valid and this is a measure of the likelihood that the target MS is within the area represented by "area_est." If negative, then "area_est" must be valid and this is a measure of the likelihood that the target MS is NOT in the area represented by "area_est". If it is zero (near zero), then the likelihood is unknown.

*Original_Timestamp*: Date and time that the location signature cluster for this location hypothesis was received by the CDMA Filter Subsystem,

*Active_Timestamp*: Run-time field providing the time to which this location hypothesis has had its MS location estimate(s) extrapolated (in the Location Extrapolator of the Hypothesis Analyzer). Note that this field is initialized with the value from the "Original_Timestamp" field.

*Processing Tags and environmental categorizations*: For indicating particular types of environmental classifications not readily determined by the Original_Timestamp field (e.g., weather, traffic), and restrictions on location hypothesis processing.

*loc_sig_cluster*: Access to location signature signal characteristics provided to the First Order Models by the CDMA Filter Subsystem; i.e., access to the "loc sigs" (received at "timestamp" regarding the location of the target MS)

*descriptor*: Optional descriptor (from the First Order Model indicating why/how the Location Area Estimate and Confidence Value were determined).

FIG. 9B

FIG. 15: LOCATION PROVISIONING VIA MULTIPLE CMRS

Signal Processing Subsystem 1220

PLATFORM AND APPLICATIONS FOR WIRELESS LOCATION AND OTHER COMPLEX SERVICES

RELATED APPLICATIONS

The present application is a continuation in part of U.S. patent application Ser. No. 10/297,449 filed Dec. 6, 2002, and is also a continuation in part of U.S. patent application Ser. No. 10/337,807 filed Jan. 6, 2003, which claims the benefit of U.S. Provisional Patent Application Ser. No. 60/349,100 filed Jan. 4, 2002. The entire disclosure of the above-identified patent applications are incorporated by reference herein.

FIELD OF THE INVENTION

The present invention is directed generally to a system and method for providing complex network services requiring interactions between various network accessible applications and/or services, and in particular where such complex services utilize or require the location of a wireless mobile station, and more particularly, to the utilization of a plurality wireless location service providers via, e.g., a wireless location gateway. Additionally, the present invention is directed to a platform for enabling such complex services, and to identifying such novel services that may be provided by such a platform. Thus, the present invention is directed to complex network services such as location based services for locating people or objects, and in particular, to a system and method for locating wireless mobile stations. The present invention is further directed to combining location results from a plurality of mobile station location estimators such as is provided by a wireless location gateway.

BACKGROUND

There is great interest in providing existing infrastructures for wireless communication systems with the capability for locating people and/or objects in a cost effective manner. Such a capability would be invaluable in a variety of situations, especially in emergency, crime situations and mobile commerce. There are numerous competing wireless location technologies that purport to effectively locate wireless mobile stations (as used herein this term includes, e.g., mobile phones, short message devices (SMS), electronic container tracking tags, micro-transceivers for personal location and/or emergency, and mobile transmitters such as can be used on battlefield or military reconnaissance, surveillance or tracking; additionally, in a more general context, this term includes vehicles, and other mobile units such as railroad cars, watercraft, and aircraft containing a device that can be located wirelessly). These technologies can be generally classified as:
  (a) handset centric wherein a portion of the location processing is performed at the mobile stations, and in particular, each such mobile station (MS) includes specialized electronics specifically for performing location. In most cases, such specialized electronics are for detecting and receiving satellite (or more generally, non-terrestrial transmitters and/or transceivers) signals that can then be used in determining a location of the MS;
  (b) network centric wherein the wireless communication network(s) with which the MS is in contact handle substantially all location specific processing. As one skilled in the art will understand, there are various wireless location technologies that are available such as location technologies based on time difference of arrival (TDOA), time of arrival (TOA), timing advance (TA) techniques, angle of arrival (AOA), multipath pattern matching techniques; and
  (c) hybrid systems wherein there are specialized location electronics at the handset ("handset" being used herein as an equivalent to mobile station unless stated otherwise), but a non-trivial amount of the location processing is performed at a network site rather at the MS. An example of such a hybrid system is what is known as network assisted GPS systems, wherein GPS signals are obtained at the MS (with the assistance network received information) and GPS timing information is transmitted from the MS to the network for performing MS location computations.

The wide variety of wireless location techniques can provide, under appropriate circumstances, the following advantages:
  (a) if the techniques are used in combination, a more reliable and accurate wireless location capability can be provided. In particular, when an embodiment of one wireless location technique is known to be less than satisfactory in a particular geographic area, an alternative embodiment (or alternative technique) can be used to obtain an MS's location(s). Additionally, two different embodiments and/or techniques can be applied substantially simultaneously for locating an MS. In this latter case, a location resolver is likely needed to determine a "most likely" resulting MS location estimate. Note, that wireless location systems for combining wireless location techniques is described in the following international and U.S. patent applications which are each incorporated fully by reference herein:
    i. U.S. Provisional Patent Application No. 60/025,855 filed Sep. 9, 1996;
    ii. U.S. Provisional Patent Application No. 60/044,821, filed Apr. 25, 1997;
    iii. U.S. Provisional Application No. 60/056,590, filed Aug. 20, 1997;
    iv. International Patent Application No. PCT/US97/15933 filed Sep. 8, 1997 entitled "LOCATION OF A MOBILE STATION USING A PLURALITY OF COMMERCIAL WIRELESS INFRASTRUCTURES" by LeBlanc, Dupray, and Karr;
    v. International Patent Application No. PCT/US97/15892 filed Sep. 8, 1997; entitled "LOCATION OF A MOBILE STATION" by Dupray, and Karr
    vi. U.S. patent application Ser. No. 09/194,367 filed Nov. 24, 1999 entitled "Location Of A Mobile Station" by Dupray, and Karr;
    vii. U.S. patent application Ser. No. 09/176,587 filed Oct. 21, 1998 entitled "Wireless Location System For Calibrating Multiple Location Estimators" by Dupray;
    viii. U.S. Pat. No. 6,236,365 filed Jan. 22, 1999 entitled "Location of a Mobile Station Using A Plurality Of Commercial Infrastructures" by LeBlanc, Dupray and Karr;
    ix. U.S. Pat. No. 6,235,365 filed: Apr. 23, 1999 entitled "WIRELESS LOCATION USING MULTIPLE LOCATION ESTIMATORS" by Dupray; and
    x. International Patent Application No. PCT/US01/17957 filed Jun. 4, 2001 entitled "A Wireless Location Gateway And Applications Therefor" by Dupray; and
  (b) if a primary wireless location technique fails (e.g., due to an electronics malfunction), then assuming an alternative technique is available that does not use, e.g., the malfunctioning electronics of the primary technique, then the alternative technique can be used for MS location.

However, the variety of wireless location techniques available is also problematic for at least the following reasons:

(a) a request for an MS location can require either the requester to know the wireless location service provider of the geographical area where the MS is likely to be, or to contact a location broker that is able to, e.g., determine a communication network covering the geographical area within which the MS is currently residing and activate (directly or through the MS's wireless service provider) an appropriate wireless location service. In the art, the technology enabling such a location broker capability has been referred to as a "wireless location gateway". An embodiment of such a gateway is described in the PCT/US97/15892 reference identified above;

(b) for communication networks relying on handset centric and/or hybrid systems for MS location, MSs roaming from networks using only network centric location capabilities will likely not have the specialized electronics needed for being located, and accordingly many location related network services will not be available such as emergency services (e.g., E911 in the U.S.).

(c) different location techniques have different reliability and accuracy characteristics. Thus, the wireless location technology may need to be selected according to the requirements of the location requesting application. For example, location requesting applications that require relatively precise location information are emergency rescue, and certain military related applications (e.g., battlefield data fusion, battlefield maneuvers and/or military command, control and communication (C3)).

Accordingly, it would be desirable to integrate into a single wireless location broker or wireless location gateway as many location techniques as possible (or commercially feasible) so that location requests can be fulfilled without the requester needing to know what location technique is used. It would be further desirable for roaming MSs to be able to be located in coverage areas where a wireless location technique is different from the one (or more) techniques supported in the primary subscription area for the MS. Additionally, it would be desirable to provide new applications for which MS location information can be applied via, e.g., a wireless location gateway.

OBJECTS OF THE DISCLOSURE RELATING TO WIRELESS LOCATION

It is an objective of the present disclosure to provide a system and method for accurately locating people and/or objects in a cost effective manner wherein a location requester can obtain an MS location without needing to provide location technique specific information with the request.

It is a further object the present disclosure to provide wireless location without the requester knowing the particulars of a communication network with which the MS may be in contact, e.g., the commercial radio service provider (CMRS), the wireless communications protocol, etc. Furthermore, wireless location may be determined in two or three spacial dimensions depending upon, e.g., the requirements of the location requesting application and the wireless location technologies available in the area where the MS resides.

Yet another objective is to provide a low cost location system and method, adaptable to wireless telephony/Internet systems, for using a plurality of location techniques for increasing MS location accuracy and consistency. In particular, the plurality of location techniques (embodied in "location estimators" also denoted "first order models" or FOMs herein) may be: activated according to any one or more of a number of activation strategies such as: (i) concurrent activation (e.g., for obtaining two location estimates of an MS location), (ii) data-driven activation (e.g., activated when appropriate input data is available), (iii) priority activation (e.g., an attempt to activate a preferred FOM is first performed, and if unsuccessful, or a result unsatisfactory, then an attempt at activating a different second FOM is performed), (iv) "most recent location" (e.g., for obtaining the most recently determined MS location).

Yet an other objective of the present disclosure is to provide, in combination with MS wireless location estimates, one or more of:

i. dimensional information such as an indication as to whether the location is in two dimensions (e.g., generally corresponding to a location on a two dimensional representation of a geographical area) or three dimensions (e.g., additionally having an elevation component corresponding to a floor in a high rise building above or below the surrounding terrestrial surface), ii. timing information such as a timestamp indicative of when the MS is presumed to have been at a corresponding estimated location (e.g., generally, when corresponding wireless signal measurements were first obtained), iii. MS movement information such as velocity, direction of movement, acceleration, iv. performance information indicating, e.g., a likely accuracy and/or reliability of the corresponding location estimate, and/or likely variance in the location estimate (such variance may be different along different dimensions, particularly elevation), and/or status information indicative of success or failure in locating the MS, v. billing information indicating, e.g., a cost for the location information and/or who is to be billed and/or itemizations of discounts, taxes or tariffs for the wireless location service performed, vi. descriptive information as to who requested the location of the MS, vii. use permissions indicating who can access the MS location estimate, e.g., there may be two MS location requests pending for the same MS, once a location estimate is determined one of the pending requests may be eligible for receiving the estimate while the other is not, network statistics, viii. descriptive information as to whether location enhancement techniques were used such as snap an estimated MS location to a nearest likely roadway (e.g., given an MS direction of travel, speed and previous location estimates), and/or ix. additional descriptive information such as identifying the location techniques used, the priority given to determining the MS location, the identity of location service provider(s) used in determining the MS location.

Yet another object is to (or be able to) integrate into a wireless location gateway a large number of MS location techniques such as:

(2.1) time-of-arrival wireless signal processing techniques;

(2.2) timing advance techniques (e.g., as provided in the GSM wireless standard);

(2.2) time-difference-of-arrival wireless signal processing techniques;

(2.3) adaptive wireless signal processing techniques having, for example, learning capabilities and including, for instance, artificial neural net and/or genetic algorithm processing;
(2.4) signal processing techniques for matching MS location signals with wireless signal characteristics of known areas;
(2.5) conflict resolution techniques for resolving conflicts in hypotheses for MS location estimates;
(2.6) techniques for enhancing MS location estimates through the use of both heuristics and historical data associating MS wireless signal characteristics with known locations and/or environmental conditions;
(2.7) angle of arrival techniques (also denoted direction of arrival) for estimating an angle and/or direction of wireless signals transmitted from an MS;
(2.8) location techniques that use satellite signals such as GPS signals received at the MS; e.g., network assisted GPS location techniques, or non-network assisted GPS location techniques;
(2.9) wireless location techniques that use Doppler, phase coherency, and other signal characteristics for determining MS location, MS velocity and MS direction of movement;
(2.10) calibration techniques that utilize wireless signal measurement survey data (e.g., signal measurements at verified geographical locations) for adjusting or calibrating a wireless location technique according to such survey data of a coverage area;
(2.11) hybrid wireless location techniques that combine two or more of the above location techniques (2.1)-(2.10) or other wireless location techniques.

A related object is to integrate handset centric, network centric and hybrid systems so that the problems identified hereinabove are mitigated.

Note that it is a further objective of the present disclosure to provide a "plug and play" capability for new wireless location estimators and wireless location requesting application, wherein new location estimators and/or application can be easily incorporated into an embodiment of the present disclosure. For example, such plug and play capability may include providing an interface that allows substantially automatic integration of new FOMs, wherein such integration maybe at a central site or at a mobile unit such as an MS. Regarding integration into a mobile unit, such a plug and play capability may be particularly important in military contexts where data fusion may be required. For example, in a battlefield context it may be desirable to have a relatively small number of command units (mobile or otherwise) that are in contact with a higher level chain of command and/or provide battlefield analysis applications. However, if one or more of the command units (e.g., soldiers, tanks, helicopters, etc.) are disabled or otherwise are unable to properly communicate it may that software embodiments of wireless location technologies and/or certain applications requiring wireless locations must be able to migrate between the command units to thereby maintain appropriate battlefield communications and/or combat coordination. More particularly, military applications that, once provided with locations of friendly and enemy units, analyze a global or overall view of a battlefield may be computationally intensive enough so that it is not be practical to have such applications reside on every mobile unit, even though it may be necessary for such applications to migrate between mobile units according to casualties and other computational tasks and/or security constraints that can dynamically arise.

Yet another object is to provide novel applications for wireless location that benefit from an integration of different location techniques.

Yet another object of the present disclosure is to provide a wireless platform that may be used substantially uniformly across a large number of wireless applications, and in particular, wireless applications that utilize wireless location.

DEFINITIONS

The following definitions are provided for convenience. In general, the definitions here are also defined elsewhere in this document as well.

(3.1) The term "wireless" herein is, in general, an abbreviation for "digital wireless", and in particular, "wireless" refers to digital radio signaling using one of standard digital protocols such as Advanced Mobile Phone Service (AMPS), Narrowband Advanced Mobile Phone Service CNAMPS), code division multiple access (CDMA) and Time Division Multiple Access (TDMA), Global Systems Mobile (GSM), and time division multiple access (TDMA) as one skilled in the art will understand. However, other wireless protocols are also within the scope of the present disclosure in that the disclosure is not dependent upon a particular wireless signaling convention. Additionally, it is intended that the scope of the disclosure also encompass analog signal transmissions to the extent permissible, and in some contexts may also include signals in bandwidths other than radio such as optical and infrared.

(3.2) As used herein, the term "mobile station" (equivalently, MS) refers to a wireless device that is at least a transmitting device, and in most cases is also a wireless receiving device, such as a portable radio telephony handset. Note that in some contexts herein instead of, or in addition to, MS, the following terms are also used: "personal station" (PS), and "location unit" (LU) or mobile unit. In general, these terms may be considered synonymous. Note that examples of various MSs are identified in the Background section above.

(3.3) The terms, "wireless infrastructure" (or simply "infrastructure"), denotes one or more of: (a) a network for one or more of telephony communication services, (b) a collection of commonly controlled transceivers for providing wireless communication with a plurality of MSs, (c) the wireless Internet or portions thereof, (d) that portion of communications network that receives and processes wireless communications with wireless mobile stations. In particular, this infrastructure may in one embodiment include: (i) telephony wireless base stations (BS) such as those for radio mobile communication systems based on CDMA, AMPS, NAMPS, TDMA, and GSM wherein the base stations provide a network of cooperative communication channels with an air interface to the MS, and (ii) a conventional telecommunications interface with a Mobile Switch Center (MSC). Thus, an MS user within an area serviced by the base stations may be provided with wireless communication throughout the area by user transparent communication transfers (i.e., "handoffs") between the user's MS and these base stations in order to maintain effective telephony service. The mobile switch center (MSC) provides communications and control connectivity among base stations and the public telephone network. Note that in some contexts (e.g., military and/or emergency) at least some of the MSs may also provide base station capabilities such as receiving and transmitting communications between two other MSs, e.g., wherein these two other MSs may be out of range for communicating directly with one another.

(3.4) The phrase, "composite wireless signal characteristic values" denotes the result of aggregating and filtering a collection of measurements of wireless signal samples, wherein these samples are obtained from the wireless communication between an MS to be located and the base station infrastructure (e.g., a plurality of networked base stations). However, other phrases are also used herein to denote this collection of derived characteristic values depending on the context and the likely orientation of the reader. For example, when viewing these values from a wireless signal processing perspective of radio engineering, as in the descriptions of the subsequent Detailed Description sections concerned with the aspects of the present disclosure for receiving MS signal measurements from the base station infrastructure, the phrase typically used is: "RF signal measurements". Alternatively, from a data processing perspective, the phrases: "location signature cluster" and "location signal data" are used to describe signal characteristic values between the MS and the plurality of infrastructure base stations substantially simultaneously detecting MS transmissions. Moreover, since the location communications between an MS and the base station infrastructure typically include simultaneous communications with more than one base station, a related useful notion is that of a "location signature" (also denoted "loc sig" herein) which is the composite wireless signal characteristic values for signal samples between an MS (e.g., to be located) and a single base station. Also, in some contexts, the phrases: "signal characteristic values" or "signal characteristic data" are used when either or both a location signature(s) and/or a location signature cluster(s) are intended.

(3.5) The phrases "profile", "subscriber profile", and "user profile", in general, will be used interchangeably. These phrases denote a collection of information residing on a network to which the user subscribes or is registered to receive network services. In most cases, it is believed that a user will have such a network profile, wherein it may include substantially any user information that is required to allow or prohibit access, activation, or fulfillment of one or more network services by the user, or by another user where the requested service by the other user requires accessing information about the user that is identified as being confidential or private.

SUMMARY DISCUSSION

The present disclosure relates to a method and system for performing wireless mobile station location and using resulting locations in services provided to wireless subscribers. In one aspect, the present disclosure describes a wireless mobile station location computing method and system that utilizes multiple wireless location computational estimators (these estimators also denoted herein as MS location hypothesizing computational models, "first order models", FOMs, and/or "location estimating models"), for providing location estimates of a target mobile station MS. Moreover, in the event that ambiguities and/or conflicts between the location estimates arise, such ambiguities and/or conflicts may be effectively and straightforwardly resolved. Moreover, the present disclosure provides a technique for calibrating the performance of each of the location estimators so that a confidence value (e.g., a probability) can be assigned to each generated location estimate. Additionally, the present disclosure provides a straightforward technique for using the confidence values (e.g., probabilities) for deriving a resulting most likely location estimate of a target wireless mobile station.

In one aspect, the present disclosure relates to a novel computational method and architecture for synergistically combining the results of a plurality of computational models in a straightforward way that allows the models to be calibrated relative to one another so that differences in results generated by the models can be readily resolved. Accordingly, the computational method and architecture of the present disclosure may be applied to a wide range applications where synergies between multiple models is expected to be enhance performance.

In another more general aspect of the present disclosure, its multiple model gateway architecture may used for other application domains beyond wireless location. For example, application domains related to evaluating, diagnosing, monitoring and/or predicting a condition or state of affairs in the application domain. For example, such application domains can be in the areas of medical, electronic, and/or network evaluation, diagnosis, monitoring and/or prediction. However, other application domains are within the scope of the disclosure.

To further elaborate, for a particular application domain and a corresponding particular application having access to a plurality of computational models (each generating a hypothetical estimate or evaluation of a desired result(s) from/in a space of hypothesis results), the present disclosure describes, at a high level, as any method or system that performs the following steps:

(4.1.1) A step of determining a classification scheme for determining an input class (C) for each input data set obtained for a condition or state of affairs to be evaluated by the particular application, wherein this input data set (or portions thereof) are to be supplied to the plurality of computational models (FOMs). For determining each input class, there is a range, $R_C$, of a plurality of ranges, from a space (the hypothesis space) of possible resulting hypotheses (or evaluations) that could be output by the FOMs. The input data sets of this input class C are identified as those input data sets that are expected to have their corresponding desired result(s), generated by the particular application, in the range R.

Some examples will be illustrative. For a wireless location system as the "particular application", the present step, in one embodiment, determines geographical subareas of a wireless network coverage area that have "similar" wireless signal characteristics. Such subareas may be relatively easy to determine, and there may be no constraint on the size of the subareas. The intention is to determine: (a) such a subarea as only a general area where a target MS to be located must reside, and (b) the subarea should be relatively homogeneous regarding at least one wireless signaling characteristic. Accordingly, in one embodiment of the present step, (a) and (b) are believed to be substantially satisfied by grouping together into the same input class the wireless signal data sets (i.e., input data sets) from corresponding target MS locations wherein at each of the target MS locations: (i) the set of base stations detected by the target MS (at the location) is substantially the same, and/or (b) the set of base stations detecting the target MS is substantially the same set of base stations.

Classification schemes in other application domains are also within the scope of the present step. For example, in diagnosis applications (e.g., medical, electronic, network, electromechanical), symptoms (e.g., input data sets) are generally classified according to their corresponding diagnoses. Also, in automated or electronic scene, object or image recognition such classification schemes may be used.

In some application domains, the present step may in viewed as a pre-filter or pre-selection capability for reducing subsequent computational overhead, e.g., so that only appropriate FOMs are activated (such appropriateness may be as much a function of economics and/or contractual agreements as it is the input data set available and the FOMs that are available).

Note for that more complex classifications, there are numerous techniques and commercial packages for determining such a classification scheme. In particular, the statistically based system, "CART" (acronym for Classification and Regression Trees) by ANGOSS Software International Limited of Toronto, Canada is one such package. Further, note that this step is intended to provide reliable but not necessarily highly accurate ranges R for the desired results. Also note that in some applications there may be only a single input class. Accordingly, in this latter case the present step may be omitted entirely.

(4.1.2) A step of calibrating each of the plurality of computational models (FOMs) so that each subsequent hypothesis generated by one of the models has a confidence value (e.g., probability or other measurement) associated therewith that is indicative of the likeliness of the hypothesis being correct. The calibrating of this step is performed using the classes of the input classification scheme determined in the above step (4.1.1). Note that there may be only a single class (such as if step (4.1.1) were omitted). In one embodiment of present step, each FOM is supplied with inputs from a given fixed input class, wherein each of these inputs are for a known condition (or state of affairs) and/or a condition that can be verified as to its identity. In particular, the identity of the known condition constitutes a "correct" hypothesis (i.e., a desired result) with which outputs from FOMs can be compared and/or further processed. Subsequently, the performance of each model is determined for the input class and a confidence value is assigned to the model for inputs received from the input class. Note that this procedure is repeated with each input class available from the input classification scheme. In performing this procedure, an application domain specific criteria is used to determine whether the hypotheses generated by the models identify the desired results in the hypothesis space. Accordingly, for each of the models, when supplied with an input data set from a fixed input class, the hypothesis generated by the model will be given the confidence value determined for this input class as an indication of the likelihood of the generated hypothesis being correct (i.e., the desired result). Note that the confidence value for each generated hypothesis may be computed as a probability that the hypothesis is correct.

Note that for a wireless location application, the criteria (in one embodiment) is whether a location hypothesis contains the actual location where the MS was when the corresponding input data set (wireless signal measurements) were communicated between this MS and the wireless network.

For applications related to the diagnosis of electronic systems, this criteria may be whether an hypothesis identifies a proper functional unit such as a circuit board or chip.

For economic forecasting applications, this criteria may be whether an hypothesis is within a particular range of the correct hypothesis. For example, if an application according to the present disclosure predicts the U.S. gross national product (GNP) six months into the future according to certain inputs (defining input data sets), then hypotheses generated from historical data that has associated therewith the actual corresponding GNP (six months later), may be used for calibrating each of the plurality of economic forecasting models (FOMs). Thus, the application specific criteria for this case may be that a generated hypothesis is within, say, 10% of the actual corresponding six month GNP prediction.

For identifying a known object such as an air or space borne, terrestrial vehicle, or watercraft, the criteria may be whether an hypothesis actually identifies the object.

For geophysical analysis applications (e.g., for identifying and/or classifying and/or mapping mineral deposits, oil, aquifers or seismic faults), the criteria may be whether an hypothesis provides a correct analysis.

Note that the applications described herein are illustrative, but not comprehensive of the scope of the present disclosure. Further note that this step typically is performed at least once prior to inputting input data sets whose resulting hypotheses are to be used to determine the desired or correct results. Additionally, once an initial calibration has been performed, this step may also be performed: (a) intermittently between the generation of hypotheses, and/or (b) substantially continuously and in parallel with the generation of hypotheses by the models.

(4.1.3) A step of providing one or more input data sets to the models (FOMs) for generating a plurality of hypotheses, wherein the result(s) desired to be hypothesized are unknown. Moreover, note that the generated hypotheses are preferred to have a same data structure definition.

For example, for a wireless location system, the present step provides an input data set including the composite signal characteristic values to one or more MS location hypothesizing computational models, wherein each such model subsequently determines one or more initial estimates (also denoted location hypotheses) of the location of the target MS. Note that one or more of these model may be based on, for example, the signal processing techniques 2.1 through 2.3 above.

(4.1.4) A step of adjusting or modifying the generated hypotheses output by the models, wherein for such an hypothesis, adjustments may be performed on one or both of its hypothesized result H.R, and its confidence value for further enhancing the performance of embodiments of the disclosure. In one embodiment of this step, H.R is used as an index to retrieve other results from an archival database, wherein this database associates hypothesized results with their corresponding desired or correct results. Thus, H.R may be used to identify data from other archived hypothesized results that are "nearby" to H.R, and subsequently use the nearby data to retrieve the corresponding desired results. Thus, the set of retrieved desired results may be used to define a new "adjusted" hypothesis.

For example, for a wireless location system utilizing the present disclosure, each location hypothesis, H, identifies an area for a target MS, and H can used to identify additional related locations included in archived hypotheses generated by the same FOM as generated H. For instance, such related locations may be the area centroids of the archived hypotheses, wherein these centroids reside within the area hypothesized by H. Accordingly, such centroids may be used to retrieve the corresponding actual verified MS locations (i.e., the corresponding desired results), and these retrieved verified locations may be used to generate a new adjusted area that is likely to be more accurate than H. In particular, a convex hull of the verified locations may be used as a basis for determining a new location hypothesis of the target MS. Moreover, this aspect of the present disclosure may include the preprocessing of such adjustments throughout a wireless coverage area to produce a geolocation vector gradient field, wherein for each archived hypotheses H (having $L_H$ as an MS location estimate) for a designated FOM, throughout the coverage area, a corresponding verified location version $VL_H$ is determined. Subsequently, the adjustment vector $AV_H = (VL_H - L_H)$ is determined as one of the adjustment vectors of the vector gradient field. Thus, $L_H$ and $AV_H$ are associated in the data archive as a record of the vector gradient field. Accordingly, when a location hypothesis H0 for a target MS at an unknown location is generated (the hypothesis H0 having L0 as the target MS location estimate), records within the vector gradient field having their corresponding location $L_H$ "near" L0, (e.g., within area of a predetermined distance about L0 or a "neighborhood: of L0) can be retrieved. Accordingly, an adjustment to L0 can be determined as a function of the $L_H$ and $AV_H$ values of the retrieved records. Note that an adjustment to L0 may be simply an average of these $AV_H$ vectors for the retrieved records. Alternatively, the $AV_H$ values may be weighted such that the $AV_H$ having $L_H$ closer to L0 are more influential in the resulting derived location for the target MS. More generally, the adjustment technique includes a method for interpolating an adjustment at L0 from the verified adjustments at locations about L0. Enhancements on such adjustment/interpolation techniques are also within the scope of the present disclosure. For example, the weightings (or other terms of an such an interpolation technique) may be combined with other known wireless signal characteristics of the area such as an identification of: (a) a known sharp change in the geolocation gradient vector field, and/or (b) a subarea having reduced wireless transmission capabilities, and/or (c) a subarea wherein the retrieved records for the subarea have their estimates $L_H$ widely spaced apart, and/or (d) a subarea wherein there is an insufficient number of retrieved records.

For other application domains, the present step requires a first technique to determine both "nearby" archived data from previously archived hypotheses, and a second technique to determine an "adjusted" hypothesis from the retrieved desired results. In general, such techniques can be relatively straightforward to provide when the hypothesized results reside in a vector space, and more particularly, in a Cartesian product of the real numbers. Accordingly, there are numerous applications that can be configured to generate hypothesized results in a vector space (or Cartesian product of the real numbers). For instance, economic financial forecasting applications typically result in numeric predictions where the first and second techniques can be, e.g., substantially identical to the centroid and convex hull techniques for the wireless location application; and (4.1.5) A step of subsequently computing a "most likely" target MS location estimate is computed. for outputting to a location requesting application such as 911 emergency, the fire or police departments, taxi services, etc. Note that in computing the most likely target MS location estimate a plurality of location hypotheses may be taken into account. In fact, it is an important aspect of the present disclosure that the most likely MS location estimate is determined by computationally forming a composite MS location estimate utilizing such a plurality of location hypotheses so that, for example, location estimate similarities between location hypotheses can be effectively utilized.

Referring to (4.1.3) there may be hypotheses for estimating not only desired result(s), but also hypotheses may be generated that indicate where the desired result(s) is not. Thus, if the confidence values are probabilities, an hypothesis may be generated that has a very low (near zero) probability of having the desired result. As an aside, note that in general, for each generated hypothesis, H, having a probability, P, there is a dual hypothesis $H^c$ that may be generated, wherein the $H^c$ represents the complementary hypothesis that the desired result is in the space of hypothesized results outside of H. Thus, the probability that the desired result(s) is outside of the result hypothesized by H is 1−P. Accordingly, with each location hypothesis having a probability favorably indicating where a desired result may be (i.e., P>=0.5), there is a corresponding probability for the complement hypothesis that indicates where the desired result(s) is unlikely to be. Thus, applying this reasoning to a wireless location application utilizing the present disclosure, then for an hypothesis H indicating that the target MS is in a geographical area A, there is a dual location estimate $H^c$ that may be generated, wherein the $H^c$ represents the area outside of A and the probability that the target MS is outside of A is 1−P. Thus, with each location hypothesis having a probability favorably indicating where a target MS may be (i.e., P>=0.5), there is a corresponding probability for the complement area not represented by the location hypothesis that does not favor the target MS being in this complement area. Further, note that similar dual hypotheses can be used in other applications using the multiple model architecture of the present disclosure when probabilities are assigned to hypotheses generated by the models of the application.

Referring to (4.1.3) as it relates to a wireless location system provided by the present disclosure, note that, it is an aspect of the present disclosure to provide location hypothesis enhancing and evaluation techniques that can adjust target MS location estimates according to historical MS location data and/or adjust the confidence values of location hypotheses according to how consistent the corresponding target MS location estimate is: (a) with historical MS signal characteristic values, (b) with various physical constraints, and (c) with various heuristics. In particular, the following capabilities are provided by the present disclosure:

(5.1) a capability for enhancing the accuracy of an initial location hypothesis, H, generated by a first order model, $FOM_H$, by using H as, essentially, a query or index into an historical data base (denoted herein as the location signature data base). Note, this data base may include: (a) a plurality of previously obtained location signature clusters (i.e., composite wireless signal characteristic values) such that for each such cluster there is an associated actual or verified MS locations where an MS communicated with the base station infrastructure for locating the MS, and (b) previous MS location hypothesis estimates from $FOM_H$ derived from each of the location signature clusters stored according to (a). Alternatively this data base include a location error gradient field for the know location errors for $FOM_H$;

(5.2) a capability for analyzing composite signal characteristic values of wireless communications between the target MS and the base station infrastructure, wherein such values are compared with composite signal characteristics values of known MS locations (these latter values being archived in the location signature data base). In one instance, the composite signal characteristic values used to generate various location hypotheses for the target MS are compared against wireless signal data of known MS locations stored in the location signature data base for determining the reliability of the location hypothesizing models for particular geographic areas and/or environmental conditions;

(5.3) a capability for reasoning about the likeliness of a location hypothesis wherein this reasoning capability uses heuristics and constraints based on physics and physical properties of the location geography;

(5.4) an hypothesis generating capability for generating new location hypotheses from previous hypotheses.

As also mentioned above in (2.3), the present embodiments of the present disclosure may utilize adaptive signal processing techniques. One particularly important utilization of such techniques includes the automatic tuning of such embodiments so that, e.g., such tuning can be applied to adjusting the values of location processing system parameters that affect the processing performed by such embodiments. For example, such system parameters as those used for determining the size of a geographical area to be specified when retrieving location signal data of known MS locations from the historical (location signature) data base can substantially affect the location processing. In particular, a system parameter specifying a minimum size for such a geographical area may, if too large, cause unnecessary inaccuracies in locating an MS. Accordingly, to accomplish a tuning of such system parameters, an adaptation engine is included in the present disclosure for automatically adjusting or tuning parameters used by embodiments of the present disclosure. Note that in one embodiment, the adaptation engine is based on genetic algorithm techniques.

Embodiments of the present disclosure may include one or more FOMs that may be generally denoted as classification models wherein such FOMs are trained or calibrated to associate particular composite wireless signal characteristic values with a geographical location where a target MS could likely generate the wireless signal samples from which the composite wireless signal characteristic values are derived. Further, embodiments of the present disclosure may include the capability for training and retraining such classification FOMs to automatically maintain the accuracy of these models even though substantial changes to the radio coverage area may occur, such as the construction of a new high rise building or seasonal variations (due to, for example, foliage variations). As used herein, "training" refers to iteratively presenting "training data" to a computational module for changing the behavior of the module so that the module may perform progressively better as it learns appropriate behavioral responses to the training data. Accordingly, training may include, for example, the repeated input of training data to an artificial neural network, or repeated statistical regression analyses on different and/or enhanced training data (e.g., statistical sample data sets). Note that other embodiments of a trained pattern matching FOMs for wireless location are disclosed in U.S. Pat. No. 6,026,304, titled "Radio Transmitter Location Finding for Wireless Communication Network Services and Management," filed Jan. 8, 1997 and issued Feb. 15, 2000, having Hilsenrath and Wax as inventors, this patent being incorporated herein fully by reference.

It is well known in the wireless telephony art that the phenomenon of signal multipath and shadow fading renders most analytical location computational techniques such as time-of-arrival (TOA) or time-difference-of-arrival (TDOA) substantially error prone in urban areas and particularly in dense urban areas without further statistical correlation processing such as such super resolution as disclosed in U.S. Pat. No. 5,890,068 by Fattouche et. al. issued on Mar. 30, 1999 and incorporated fully herein by reference. Moreover, it may be the case that even though such additional processing is performed, the multipath phenomenon may still be problematic. However, this same multipath phenomenon also may produce substantially distinct or peculiar signal measurement patterns, wherein such a pattern coincides with a relatively small geographical area. Thus, embodiments of the present disclosure may include a FOM(s) that utilizes multipath as an advantage for increasing accuracy. Moreover, it is worthwhile to note that the utilization of classification FOMs in high multipath environments is especially advantageous in that high multipath environments are typically densely populated. Thus, since such environments are also capable of yielding a greater density of MS location signal data from MSs whose actual locations can be obtained, there can be a substantial amount of training or calibration data captured by an embodiment of the present disclosure for training or calibrating such classification FOMs and for progressively improving the MS location accuracy of such models.

It is also an aspect of the present disclosure that classification FOMs may be utilized that determine target MS locations by correlating and/or associating network anomalous behavior with geographic locations where such behavior occurs. That is, network behaviors that are problematic for voice and/or data communication may be used advantageously for locating a target MS. For example, it is well known that wireless networks typically have within their coverage areas persistent subareas where voice quality is problematic due to, e.g., measurements related to high total errors, a high error rate, or change in error rate. In particular, such measurements may be related to frame error rates, redundancy errors, co-channel interference, excessive handoffs between base stations, and/or other call quality measurements. Additionally, measurements may be used that are related to subareas where wireless communication between the network and a target MS is not sufficient to maintain a call (i.e., "deadzones"). Thus, information about such so called problematic behaviors may used by, e.g., a location estimator (FOM) to generate a more accurate estimate of a target MS. For example, such network behavioral measurements may be provided for training an artificial neural network and/or for providing to a statistical regression analysis technique and/or statistical prediction models (e.g., using principle decomposition, partial least squares, or other regression techniques) for associating or correlating such measurements with the geographic area for which they likely derive. Moreover, note that such network behavioral measurements can also be used to reduce the likelihood of a target MS being in an area if such measurements are not what would be expected for the area.

It is also an aspect of the present disclosure that FOMs themselves may be hybrid combinations of MS location techniques. For example, an embodiment of the present disclosure may include a FOM that uses a combination of Time Difference of Arrival (TDOA) and Timing Advance (TA) location measurement techniques for locating the target MS, wherein such a technique may require only minor modifications to the wireless infrastructure. In particular, such a FOM may provide reduced MS location errors and reduced resolution of ambiguities than are present when these techniques are used separately. One embodiment of such a FOM (also denoted the Yost Model or FOM herein) is disclosed in U.S. Pat. No. 5,987,329 filed Jul. 30, 1997 and issued Nov. 16, 1999 titled: "System and Method for Mobile Telephone Location Measurement Using a Hybrid Technique" having Yost and Panchapakesan as inventors, this patent being fully incorporated herein by reference.

Additionally, note that FOMs related to the Yost Model may also be incorporated into embodiments of the present disclosure wherein an elliptical search restriction location technique may also be utilized. In particular, such a technique is disclosed in U.S. patent application, having U.S. Pat. No. 5,930,717, and titled: "System and Method Using Elliptical Search Area Coverage in Determining the Location of a Mobile Terminal", filed Jul. 30, 1997, by Yost et. al. which is also fully incorporated by reference herein.

It is also a related aspect of the present disclosure to include a plurality of stationary, low cost, low power "location detection base stations" (LBS), each such LBS having both restricted range MS detection capabilities, and a built-in MS. Accordingly, a grid of such LBSs can be utilized for providing wireless signaling characteristic data (from their built-in MSs) for: (a) (re)training such classification FOMs, and (b) calibrating the FOMs so that each generated location hypothesis has a reliable confidence value (e.g., probability) indicative of the likeliness of the target MS being in an area represented by the location hypothesis.

It is a further aspect of the present disclosure that the personal communication system (PCS) infrastructures currently being developed by telecommunication providers offer an appropriate localized infrastructure base upon which to build various personal location systems (PLS) employing the present disclosure and/or utilizing the techniques disclosed herein. In particular, the present disclosure is especially suitable for the location of people and/or objects using code division multiple access (CDMA) wireless infrastructures, although other wireless infrastructures, such as, time division multiple access (TDMA) infrastructures and GSM are also contemplated. CDMA general principles are described, for example, in U.S. Pat. No. 5,109,390, to Gilhausen, et al, which is also incorporated herein by reference.

As mentioned in (1.7) and in the discussion of classification FOMs above, embodiments of the present disclosure may include components (e.g., FOMs) that can substantially automatically retrain themselves to compensate for variations in wireless signal characteristics (e.g., multipath) due to environmental and/or topographic changes to a geographic area serviced by an embodiment of the present disclosure. For example, in one embodiment, the present disclosure optionally includes low cost, low power base stations, denoted location base stations (LBS) above, providing, for example, CDMA pilot channels to a very limited area about each such LBS. The location base stations may provide limited voice traffic capabilities, but each is capable of gathering sufficient wireless signal characteristics from an MS within the location base station's range to facilitate locating the MS. Thus, by positioning the location base stations at known locations in a geographic region such as, for instance, on street lamp poles and road signs, additional MS location accuracy can be obtained. That is, due to the low power signal output by such location base stations, for there to be signaling control communication (e.g., pilot signaling and other control signals) between a location base station and a target MS, the MS must be relatively near the location base station. Additionally, for each location base station not in communication with the target MS, it is likely that the MS is not near to this location base station. Thus, by utilizing information received from both location base stations in communication with the target MS and those that are not in communication with the target MS, an embodiment of the present disclosure may substantially narrow the possible geographic areas within which the target MS is likely to be. Further, by providing each location base station (LBS) with a co-located stationary wireless transceiver (denoted a built-in MS above) having similar functionality to an MS, the following advantages are provided:

(6.1) assuming that the co-located base station capabilities and the stationary transceiver of an LBS are such that the base station capabilities and the stationary transceiver communicate with one another, the stationary transceiver can be signaled by another component(s) of the present disclosure to activate or deactivate its associated base station capability, thereby conserving power for the LBS that operates on a restricted power such as solar electrical power;

(6.2) the stationary transceiver of an LBS can be used for transferring target MS location information obtained by the LBS to a conventional telephony base station;

6.3) since the location of each LBS is known and can be used in location processing, an embodiment of the present disclosure is able to (re)train itself in geographical areas having such LBSs. That is, by activating each LBS stationary transceiver so that there is signal communication between the stationary transceiver and surrounding base stations within range, wireless signal characteristic values for the location of the stationary transceiver are obtained for each such base station. Accordingly, such characteristic values can then be associated with the known location of the stationary transceiver for training various of the location processing modules of the present disclosure such as the classification FOMs discussed above. In particular, such training and/or calibrating may include:

(i) (re)training FOMs;

(ii) adjusting the confidence value initially assigned to a location hypothesis according to how accurate the generating FOM is in estimating the location of the stationary transceiver using data obtained from wireless signal characteristics of signals between the stationary transceiver and base stations with which the stationary transceiver is capable of communicating;

(iii) automatically updating the previously mentioned historical data base (i.e., the location signature data base), wherein the stored signal characteristic data for each stationary transceiver can be used for detecting environmental and/or topographical changes (e.g., a newly built high rise or other structures capable of altering the multipath characteristics of a given geographical area); and (iv) tuning of the location system parameters, wherein the steps of: (a) modifying various system parameters and (b) testing the performance of the modified location system on verified mobile station location data (including the stationary transceiver signal characteristic data), these steps being interleaved and repeatedly performed for obtaining better system location accuracy within useful time constraints.

One embodiment of the present disclosure utilizes a mobile (location) base station (MBS) that can be, for example, incorporated into a vehicle, such as an ambulance, police car, or taxi. Such a vehicle can travel to sites having a transmitting target MS, wherein such sites may be randomly located and the signal characteristic data from the transmitting target MS at such a location can consequently be archived with a verified location measurement performed at the site by the mobile location base station. Moreover, it is important to note that such a mobile location base station as its name implies also includes base station electronics for communicating with mobile stations, though not necessarily in the manner of a conventional infrastructure base station. In particular, a mobile location base station may (in one embodiment) only monitor signal characteristics, such as MS signal strength, from a target MS without transmitting signals to the target MS. Alternatively, a mobile location base station can periodically be in bi-directional communication with a target MS for determining a signal time-of-arrival (or time-difference-of-arrival) measurement between the mobile location base station and the target MS. Additionally, each such mobile location base station includes components for estimating the location of the mobile location base station, such mobile location base station location estimates being important when the mobile location base station is used for locating a target MS via, for example, time-of-arrival or time-difference-of-arrival measurements as one skilled in the art will appreciate. In particular, a mobile location base station can include:

(7.1) a mobile station (MS) for both communicating with other components of the present disclosure (such as a location processing center of the present disclosure);
(7.2) a GPS receiver for determining a location of the mobile location base station;
(7.3) a gyroscope and other dead reckoning devices; and
(7.4) devices for operator manual entry of a mobile location base station location.

Furthermore, a mobile location base station includes modules for integrating or reconciling distinct mobile location base station location estimates that, for example, can be obtained using the components and devices of (7.1) through (7.4) above. That is, location estimates for the mobile location base station may be obtained from: GPS satellite data, mobile location base station data provided by the location processing center, dead reckoning data obtained from the mobile location base station vehicle dead reckoning devices, and location data manually input by an operator of the mobile location base station.

The location estimating system of the present disclosure offers many advantages over existing location systems. The present disclosure employs a number of distinctly different location estimators which provide a greater degree of accuracy and/or reliability than is possible with existing wireless location systems. For instance, the location models provided may include not only the radius-radius/TOA and TDOA techniques but also adaptive techniques such as artificial neural net techniques and the techniques disclosed in the U.S. Pat. No. 6,026,304 by Hilsenrath et. al. incorporated fully by reference herein, and angle or direction of arrival techniques as well as substantially any other wireless location technique wherein appropriate input data can be obtained. Note that hybrid location estimators based on combinations of such techniques (such as the location technique of U.S. Pat. No. 5,987,329 by Yost et. al.) may also be provided by embodiments of the present disclosure.

It is also an aspect of the present disclosure that various embodiments may provide various strategies for activating, within a single MS location instance, one or more location estimators (FOMs), wherein each such activated location estimator is provided with sufficient wireless signal data input for the activation. In one embodiment, one such strategy may be called "greedy" in that substantially as many location estimators may be activated as there is sufficient input (additionally, time and resources as well) for activation. Note that some wireless location techniques are dependent on specialized location related devices being operational such as fixed or network based receivers, antennas, transceivers, and/or signal processing equipment. Additionally note that some location techniques also require particular functionality to be operable in the MS; e.g., functionality for detecting one or more location related signals from satellites (more generally non-terrestrial transmitting stations). For example, the signals may be GPS signals. Accordingly, certain wireless location techniques may have their activations dependent upon whether such location related devices and/or MS functionality are available and operable for each instance of determining an MS location. Thus, for each MS wireless location instance, location estimators may be activated according to the operable features present during an MS location instance for providing input activation data.

Embodiments of the present disclosure may be able to adapt to environmental changes substantially as frequently as desired. Thus, an embodiment of the present disclosure may be able to take into account changes in the location topography over time without extensive manual data manipulation. Moreover, the present disclosure can be utilized with varying amounts of signal measurement inputs. Thus, if a location estimate is desired in a very short time interval (e.g., less than approximately one to two seconds), then the present disclosure can be used with only as much signal measurement data as is possible to acquire during an initial portion of this time interval. Subsequently, after a greater amount of signal measurement data has been acquired, additional more accurate location estimates may be obtained. Note that this capability can be useful in the context of 911 emergency response in that a first quick coarse wireless mobile station location estimate can be used to route a 911 call from the mobile station to a 911 emergency response center that has responsibility for the area containing the mobile station and the 911 caller. Subsequently, once the 911 call has been routed according to this first quick location estimate, by continuing to receive additional wireless signal measurements, more reliable and accurate location estimates of the mobile station can be obtained.

Moreover, there are numerous additional advantages of the system of the present disclosure when applied in communication systems using, e.g., CDMA. The location system of the present disclosure readily benefits from the distinct advantages of the CDMA spread spectrum scheme. Namely, these advantages include the exploitation of radio frequency spectral efficiency and isolation by (a) monitoring voice activity, (b) management of two-way power control, (c) provisioning of advanced variable-rate modems and error correcting signal encoding, (d) inherent resistance to fading, (e) enhanced privacy, and (f) multiple "rake" digital data receivers and searcher receivers for correlation of signal multipaths.

At a more general level, it is an aspect of the present disclosure to demonstrate the utilization of various novel computational paradigms such as:

(8.1) providing a multiple FOM computational architecture (as illustrated in FIG. 8) wherein:
  (8.1.1) the hypotheses may be generated by modular independent hypothesizing computational models (FOMs), wherein the FOMs have been calibrated to thereby output confidence values (probabilities) related to the likelihood of correspondingly generated hypotheses being correct;
  (8.1.2) the location hypotheses from the FOMs may be further processed using additional amounts of application specific processing common or generic to a plurality of the FOMs;
  (8.1.3) the computational architecture may enhance the hypotheses generated by the FOMs both according to past performance of the models and according to application specific constraints and heuristics without requiring complex feedback loops for recalibrating one or more of the FOMs;

(8.1.4) the FOMs are relatively easily integrated into, modified and extracted from the computational architecture; and (8.2) providing a computational paradigm for enhancing an initial estimated solution to a problem by using this initial estimated solution as, effectively, a query or index into an historical data base of previous solution estimates and corresponding actual solutions for deriving an enhanced solution estimate based on past performance of the module that generated the initial estimated solution.

The multiple FOM architecture provided herein is useful in implementing solutions in a wide range of applications. In fact, most of the Detailed Description hereinbelow can be immediately translated into other application areas, as one skilled in the art of computer application architectures will come to appreciate. For example, the following additional applications are within the scope of the present disclosure:

(9.1) document scanning applications;

(9.2) diagnosis and monitoring applications such as medical diagnosis/monitoring, communication network diagnosis/monitoring. Note that in many cases, the domain wherein a diagnosis is to be performed has a canonical hierarchical order among the components within the domain. For example, in automobile diagnosis, the components of an auto may be hierarchically ordered according to ease of replacement in combination within function. Thus, within an auto's electrical system (function), there may be a fuse box, and within the fuse box there will be fuses. Thus, these components may be ordered as follows (highest to lowest): auto, electrical system, fuse box, fuses. Thus, if different diagnostic FOMs provided different hypotheses as to a problem with an auto, the confidence values for each component and its subcomponents maybe summed together to provide a likelihood value that the problem within the component. Accordingly, the lowest component having, for example, at least a minimum threshold of summed confidences can be selected as the most likely component for either further analysis and/or replacement. Note that such summed confidences may be normalized by dividing by the number of hypotheses generated from the same input so that the highest summed confidence is one and the lowest is zero. Further note that this example is merely representative of a number of different diagnosis and/or prediction applications to which the present disclosure is applicable, wherein there are components that have canonical hierarchical decompositions. For example, a technique similar to the auto illustration above may be provided for the diagnosis of computer systems, networks (LANs, WANs, Internet and telephony networks), medical diagnosis from, e.g., x-rays, MRIs, sonograms, etc;

(9.3) robotics applications such as scene and/or object recognition. That is, various FOMs may process visual image input differently, and it may be that for expediency, an object is recognized if the summed confidence values for the object being recognized is above a certain threshold;

(9.4) seismic and/or geologic signal processing applications such as for locating oil and gas deposits;

(9.5) recognition of terrestrial and/or airborne objects from satellites, wherein there may be various spectral bands monitored.

(9.6) modeling of physical phenomena such as for assessing models of motion of physical phenomena through a fluid, wherein such motion causes an acoustic signal that traverses an uncertain path, and which is received by sensors with uncertain biases, in the presence of noise. An example of such modeling using a multiple hypothesis architecture is disclosed in U.S. Pat. No. 6,304,833, filed Apr. 27, 1999 by Ferkinhoff, et al. and incorporated fully herein by reference.

(9.7) Additionally, note that this architecture need not have all modules co-located. In particular, it is an additional aspect of the present disclosure that various modules can be remotely located from one another and communicate with one another via telecommunication transmissions such as telephony technologies (ISDN, virtual private networks, POTS, DSL, etc.) and/or the Internet. Accordingly, the present disclosure is particularly adaptable to such distributed computing environments. For example, some number of the first order models may reside in remote locations and communicate their generated hypotheses via the Internet.

In an alternative embodiment of the present disclosure, the processing following the generation of location hypotheses (each having an initial location estimate) by the first order models may be such that this processing can be provided on Internet user nodes and the first order models may reside at various Internet server sites. In this configuration, an Internet user may request hypotheses from such remote first order models and perform the remaining processing at his/her node. Moreover, embodiments of the present disclosure may access FOMs at sites distributed on other communication networks such as a local area network in a hotel, or an ad hoc network in a battlefield, military or emergency scenario.

Additionally, note that it is within the scope of the present disclosure to provide one or more central location development or repository sites that may be networked to, for example, geographically dispersed location centers providing location services according to the present disclosure, wherein the FOMs may be accessed, substituted, enhanced or removed dynamically via network connections (via, e.g., the Internet or other network) with a central location development or repository site. Thus, a small but rapidly growing municipality in substantially flat low density area might initially be provided with access to, for example, two or three FOMs for generating location hypotheses in the municipality's relatively uncluttered radio signaling environment. However, as the population density increases and the radio signaling environment becomes cluttered by, for example, thermal noise and multipath, additional or alternative FOMs may be transferred via the network to the location center for the municipality.

Note that in some embodiments of the present disclosure, since there may be a lack of sequencing between the FOMs and subsequent processing of hypotheses (e.g., location hypotheses, or other application specific hypotheses), the FOMs can be incorporated into an expert system, or another computational architecture for performing "intelligent" processing if desired. For example, for an expert system architecture, each FOM may be activated from an antecedent of an expert system rule. Thus, the antecedent for such a rule can evaluate to TRUE if the FOM outputs a location hypothesis, and the consequent portion of such a rule may put the output location hypothesis on a list of location hypotheses occurring in a particular time window for subsequent processing by the location center. Alternatively, activation of the FOMs may be in the consequents of such expert system rules. That is, the antecedent of such an expert system rule may determine if the conditions are appropriate for invoking the FOM(s) in the rule's consequent.

Embodiments of the present disclosure may also be configured as a blackboard system with intelligent agents (FOMs). In this embodiment, each of the intelligent agents is calibrated using archived data so that for each of the input data sets provided either directly to the intelligent agents or to the blackboard, each hypothesis generated and placed on the blackboard by the intelligent agents has a corresponding confidence value indicative of an expected validity of the hypothesis.

Of course, other software architectures may also to used in implementing the processing of the location center without departing from scope of the present disclosure. In particular, object-oriented architectures are also within the scope of the present disclosure. For example, the FOMs may be object methods on an MS location estimator object, wherein the estimator object receives substantially all target MS location signal data output by the signal filtering subsystem. Alternatively, software bus architectures are contemplated by the present disclosure, as one skilled in the art will understand, wherein the software architecture may be modular and facilitate parallel processing.

Wireless Application Platform Services and Architecture

It is yet another aspect of the present disclosure to provide a platform or architecture for providing wireless application services to wireless subscribers. In particular, the present disclosure includes a service providing platform that is substantially uniform over a plurality of different wireless application services, and in particular wireless location based services, and/or, short and/or instant messaging services, and in particularly in combination with Internet access for such services as mobile commerce (also known as "mcommerce"), personal communications with friends and family, wireless games, wireless assessment of an emergency situation (e.g., where voice data, picture data. e.g., from camera phones, is obtained, as well as data transmissions from on-site emergency assessment and/or analysis equipment such as chemical analyzers, radiation analyzers, biochemical hazard analyzers, etc.). Accordingly, this platform may be considered as a wireless location application hub, wherein a single instance (or substantially duplicate copies) of the platform can provide a plurality of different wireless services to wireless subscribers. In particular, such a platform can provide robust generic wireless data communication capabilities that are required or desirable by a wide variety of wireless application services, and particularly services using wireless location capabilities. For example, such data communication capabilities provided by such a platform can include:

(a) user profile processing: E.g., (i) using user profile information for identifying and/or predicting information that is likely to be of interest to the user; (ii) gathering user profile information from not only receiving such profile information from the user, but also performing data mining operations on various public data sources for obtaining further user profile information about specific users as well as more general demographic profile information, and (iii) maintaining limitations or constraints on the content and/or types of information that can be stored in the user's profile.

(b) data encryption processing: E.g., encryption/decryption of a user's personal profile, encryption/decryption of a user's location (e.g., such user location encryption may be particularly advantageous in a user witness protection program).

(c) data privacy processing: E.g., there may be only certain individuals or designated agents that can view and/or modify a user's profile; additionally, there may be certain portions of a user's profile that can not be accessed without appropriate permissions (e.g., financial information, home address, social security number, etc.). Thus, various profile data items can be grouped together, wherein each such group may be provided with corresponding access permissions and/or restrictions. For example, there may be a first group of data items that can be accessed with substantially all access privileges of the user. Individuals and/or designated agents having this access may include: parents (e.g., where the user is under the age of say, 15), children of elderly parents. Optionally, a second smaller group of profile data items may include, e.g., some financial information, social security number, and other user identifications, wherein individuals and/or designated agents having access to this second group may include a spouse and/or close family members. Optionally, a third group of profile data items may include: professional and/or some personal information that would be useful for a designated corporate agent that is, e.g., subsidizing the use of the mobile station. Such a corporate agent may be, e.g., the user's employer. Accordingly, the user's employer may be allowed to view mobile station use records, as well as modify restrictions on the services that can be accessed via the mobile station (e.g., Internet transmission of full length movies or other pay per view services). Other groupings of profile data items are, of course, possible such as a fourth grouping of user profile information related to personal or professional commercial transactions that the user may desire to perform, e.g., buy/sell a car, bicycle, or pair of shoes, buy/sell tickets to a particular event (sports event or other entertainment), buy/sell travel accommodations. Note that the fourth group may be only viewed by pre-authorized or pre-qualified agents, such as those identified individually and/or aggregately by the user or a user designated agent (such as an agent for an electronic yellow pages enterprise, an Internet search service, and/or an Internet product discounter). Optionally, another grouping of profile data items may be for an organization to which the user is affiliated such as a professional organization (e.g., American Medical Association, American Bar Association, or other professional organization). There may be other profile data groups for religious, personal, and/or political organization user affiliations with corresponding access privileges and restrictions.

(d) data exposure processing: E.g., for various inquiries for information about a user, the user may provide criteria about what information may be exposed. Thus, for an anonymous inquiry received due to, e.g., the location of the user, the user may provide criteria for exposing certain interests such as interests in cars, types of music, etc. Note the processing here may be similar to that of the data privacy above, and in some embodiments may be substantially identical therewith. However, if sophisticated profile capabilities are accessible to mobile station users, inconsistencies can occur within such a profile wherein the user wishes to leave his/her profile groups unaltered, but still exercise additional control such as exclude all accesses from a particular person, and/or exclude all accesses for a particular period of time, and/or provide access to particular profile data items for a particular time period or when the user is in a particular geographical location and/or when the accessing agent is in a particular geographical location or relationship to the user's geographical location. Thus, in one embodiment, the data exposure processing contemplated here may be a more dynamic version of the data privacy processing above, wherein, e.g., user location, time periods, and/or accessing agent location may be taken into account. Additionally and/or alternatively, the data exposure processing contemplated here may function as a profile access supervisor or controller that can override (temporarily or until countermanding input is provided) more stable long term profile access criteria such as the profile data groups and their corresponding access privileges and/or restrictions described above.

Note that in one embodiment of the present disclosure, a network service provider or other authorized agent may provide predetermined groups of profile data together with corresponding access permissions/restrictions that allow the user to easily construct profile data groups (with their corresponding access permissions/restrictions) and assign individuals and/or categories of entities to such groups. Thus, the user may provide network input to create the first, second and fourth data profile groups described above. Subsequently, the user may be able to exclude all profile access by a particular organization, individual or business without the user modifying the profile groupings.

It is important to note here that in the term "access" as used regarding profile data not only encompasses the discovery of such information by network agents that may actively search user profiles for particular types of information, but also encompasses the active exposure of such profile data to selected enterprises, organizations, and/or individuals. In particular, a network service provider or other authorized agent may be granted permission to distribute portions of the user's profile to certain entities. For example, a user may request that his/her profile include information that he/she wishes to purchase various brand names of expensive clothing, but only when these brands are on sale. Thus, such profile information may be actively distributed to selected businesses.

(e) constraint checking and rule activation processing: E.g., evaluating application specific conditions in a substantially uniform manner across a plurality of different applications according to, e.g., data stored in a constraint database(s), a rule base(s), and/or a user profile database(s)), (f) transaction processing: for certain wireless applications transaction based user interactions are most appropriate wherein there is the ability to initiate, commit, and roll back or undo a series of data communications as one skilled in the art will understand. Moreover, it is desirable that such a transaction processing capability provide for multilevel transactions wherein one instance of a transaction can be within another, (g) data synchronization: e.g., providing a duplicate copy of a collection of data from one point on a communications network to another point on the network, (h) event or transaction logging: e.g., for some wireless applications the interactions with users are sufficiently important to warrant storing a trace of such interactions, (i) common interfaces: e.g., substantially uniform interfaces between an embodiment of the wireless application platform of the present disclosure and both a plurality of wireless applications as well as users of such applications, (j) wireless location request triggering mechanisms: e.g., (i) for requesting the information related to users of nearby wireless mobiles when the requesting user is at a particular location or area (e.g., at a ski resort, walking through a downtown area), or at a particular time of day; or (ii) for requesting periodic locations of persons (e.g., employees, salespersons, friends, relatives, etc) or assets (e.g., a furniture shipment), or sensitive materials (e.g., toxic wastes being transported across country), or (iii) providing wireless advertising or purchasing incentives.

Moreover, an application platform according to the present disclosure may support such service functions as (a)-(j) immediately above via standard telephony and/or network functionality including WAP, BlueTooth, WIFI, and other wireless (and wired) application protocols. It is important to note that the term WAP is being used generically to refer to any wireless Internet protocol, including HDML and any future wireless Internet protocols that may be developed. The following examples are provided of some competing technologies that for the purposes of the present description will be referred to generically as WAP. For instance, Web content may be delivered as existing HTML. However, Internet content may be provided wirelessly as proposed by Spyglass'Prism technology or i-mode which is popular in Japan. As a further example, Internet content can be processed through a template model that reads existing HTML content and fits the data to a template optimized for various types of wireless mobile stations such as the system proposed by Everypath.com. As another example, the data content can be delivered to a Palm Pilot or other PDA or handheld device that uses a proprietary protocol. Thus it is an aspect of the present disclosure to provide an inventive wireless application platform wherein applications can be substantially implemented by providing application specific data which can be used to drive the application processing performed by, e.g., the above listed functions.

It is important to note that the platform of the present disclosure is particularly useful for cost effectively and quickly making "complex" network services available to subscribers; e.g., network services that require far more additional network coordination and communication between various network components (of one or more different networks) than services such as voice and data communication, and various enhancements to these basic services. For example, for wireless location based services, at least the following network services and components must communicate appropriately for performing at least some of the following functions: (i) wireless signal measurements related to the location of a target MS must be captured and routed to a wireless location entity for determining a location estimate of the target mobile station; (ii) a component such as a wireless location gateway, must determine what wireless location technology to activate to determine the target mobile station's location; moreover, such a determination is likely dependent upon the capabilities of the target mobile station, capabilities of wireless network (e.g., the wireless carrier with which the target mobile station is currently communicating) to support particular wireless location technologies, and/or the ability of the wireless carrier to communicate with particular wireless location service provider; (iii) billing for determining the location estimate must be determined; (iv) a location request may be received from various sources; (v) privacy and/or security issues must be resolved; (vi) location data representations may need to be resolved between a wireless location providing service and a location based application; (vii) a capability for iteratively frequently performing such a wireless location may be required, and appropriate network provisioning allocated thereto such as in tracking a mobile station; (viii) wireless locations may require a verification capability such as a callback mechanism as described in International Patent Application PCT/US00/40989 titled "Geographically Constrained Network Services", filed Sep. 25, 2000 by Goldberg and Dupray and having International Publication No. WO 02/00316, this reference being fully incorporated herein by reference; (ix) the location based application's output be may media rich in the sense that graphical and/or image representations may need to communicated to the user and/or to another network destination; thus, network congestion may occur due to increased network bandwidth required; (x) a wireless location based application may be only an intermediate step in enabling another application; e.g., in the International Patent Application by Goldberg and Dupray cited above, a wireless location verification application may be performed prior to a wireless network financial transaction such as a wireless gaming wager to assure that the subscriber is in a location that allows such, or a download of a geographically restricted software product (e.g., a software product that can only be downloaded and/or utilized in a particular geographical region or country such as the U.S. or Canada due to, for instance, national security concerns and/or patent violation, or other legal violations on the use of the software outside of the particular area); (xi) location based games are popular in some areas, and such games may also utilize short messaging services (SMS); thus, coordination and communication between the game application, a wireless location service provider, and the SMS provider must be performed; (xii) it is generally perceived that location based advertising is viewed with distain by subscribers since such advertising has been not much more than a location based broadcast vehicle for advertising; accordingly, what is believed desired is an "intelligent" location based advertising capability such as is disclosed herein and in International Patent Application No. PCT/US01/17957 filed Jun. 4, 2001 entitled "A Wireless Location Gateway And Applications Therefor" by Dupray incorporated herein fully by reference; however, such intelligence may likely require additional complexity such as accessing subscriber profiles, activating network triggering mechanisms or network daemons or intelligent subscriber network software agents to determine when and/or where a subscriber request is satisfied such as a request for obtaining tickets to a local sporting event that is sold out.

It has been suggested that the most commercially viable location based services have yet to be determined, and that in order to determine such services, numerous location based applications will have to be developed and marketed to gain experience in what services subscribers will pay for and to provide subscribers with experience in using such services. However, due to the complexity of developing applications for such services, if a generic or uniform platform such as is provided by the present disclosure is not utilized, the overhead and financial risk in developing such services may be beyond the financial risk tolerance as well as the technical expertise of wireless carriers and/or third party network service developers to surmount. Various examples of complex network services have been developed and/or described in the relevant art. For example, U.S. Pat. No. 5,742,905 by Peppe et. al. filed Sep. 19, 1994, titled "Personal Communications Internetworking" fully incorporated herein by reference discloses:

"a personal communications internetwork providing a network subscriber with the ability to remotely control the receipt and delivery of wireless and wireline voice and text messages. The network operates as an interface between various wireless and wireline networks, and also performs media translation, where necessary. The subscriber's message receipt and delivery options are maintained in a database which the subscriber may access by wireless or wireline communications to update the options programmed in the database. The subscriber may be provided with CallCommand service which provides real-time control of voice calls while using a wireless data terminal or PDA."

As a further example, International Patent Application PCT/IB00/01995 Jhanji having International Publication No. WO 144998 and titled "IMPROVED SYSTEMS FOR COMMUNICATING CURRENT AND FUTURE ACTIVITY INFORMATION AMONG MOBILE INTERNET USERS AND METHODS THEREFOR" is fully incorporated herein by reference, wherein this application discloses:

"there is provided a search facility wherein a user may search among all users and/or posted information (or at least users and/or information to which the searcher has access privilege) for postings or users based on some search criteria. Since substantially all user profiles and posted information are kept in the database subsystem, such data is available to those, having the proper access privilege. By way of example, a certain user may perform a search among selected ones of her friends for those currently engaged in shopping activities or planning to go shopping. As another example, a certain user may perform a search to check on the status, location, or activity pertaining to a specific other user. As another example, a given user may wish to search for anyone in the public who is interested in a particular activity, who may be in a particular location, or who may have a certain profile characteristic of interest. Since many of the items of information pertaining to user activities are time-sensitive, searches preferably take into account the time component whenever appropriate (e.g., for activity currently taking place or proposed in the future). Along with user profile and activity, the invention permits users to find one another based on location and time, as well as having a degree of control over the privacy of their user profile and posted information."

However, it is believed that most commercially viable complex network services have yet to be developed, and the present disclosure is directed to both such novel new network services, and a method and system for rapidly providing such services to subscribers, wherein the applications providing such services use various combinations of, e.g., SMS, MS location services/applications, email services/applications, voice and data transmission services/applications, Internet access, Internet accessible applications, and/or voice over IP services/applications.

Moreover, note that the network services platform of the present disclosure may also be utilized to expedite providing other subscriber services, complex or otherwise. For example, "intelligent" electronic yellow page capabilities may require capabilities such as (xii) above regardless of whether such capabilities include a location based component.

It is believed that there are two general types of wireless services that can be easily supported by the present disclosure: (i) services (denoted "called services" herein) where the wireless subscriber initiates an activation substantially by placing a telephony call for service activation (e.g., services similar to E911), and (ii) services (denoted "connection services" herein) that are activated by a subscriber navigating a previously established network (e.g., Internet) connection where the establishment of the network connection provides virtually no information about what subsequent network services that may be activated by the subscriber. Such called services may interface directly with an embodiment of the platform of the present disclosure, wherein the embodiment may be for a single wireless carrier or may provide such services for multiple carriers. Moreover, for connection services, such services may be of two types:

(1) connection services that make use of the capabilities of an embodiment of the platform of the present disclosure; e.g., a "platform aware" application for providing such a connection service might inspect a network (e.g., Internet) path by which an activation was received by a subscriber, wherein the inspection would determine whether there is a platform embodiment by which the platform aware application can communicate for receiving appropriate additional information such as subscriber location, type of mobile device, subscriber profile attributes (e.g., authorizations for billing a profile designated entity), and/or for transmitting information to the platform for billing for and/or logging the activated connection service (e.g., an electronic yellow pages subsidiary of a wireless carrier may be activated, via the Internet, by a merchant for advertising an eminent sale and the expense incurred is automatically incorporated into the merchant's bill with the carrier, or, e.g., providing a corporation with an integrated billing, auditing and employee wireless profile management system for telecommunications and Internet services wherein a platform embodiment of the present disclosure acts as a common interface for both managing employee profiles for access to network services, and billing the corporation for employee network accesses to billable network services whose enabling applications are "platform aware"; and (2) connection services that do not make use of the capabilities of the platform of the present disclosure. However, even for these services the platform of the present disclosure may provide substantial benefits. It is believed that in many (if not most cases) wherein connection services are accessed via a platform of the present disclosure, that the entity providing the connection to the network (e.g., an Internet service provider) for such connection services will be "platform aware". Accordingly, information from a subscriber's profile can be requested and/or "pushed" to the network connection providing entity so that, e.g., this entity can prohibit access to certain network information, or can push corporate specific information to an employee for incorporation in to the employee's network connection device (e.g., MS) such as: (i) an updated preferred vendor list, (ii) a download of a new customer record management system, and/or (iii) periodically automatically update a corporate employee address book.

Note, that the functionality of (2) immediately above may be, of course, available to the "platform aware" applications as well.

Thus, it is an aspect of the platform of the present disclosure to provide for the distribution and use of subscriber or user profile information over a plurality of different types of communication networks (e.g., networks having different transmission characteristics such as: network bandwidth, the data types that can be effectively presented to users, the reliability or quality of service of network transmissions, and/or the transmission protocols and/or services provided). For example, networks that can classified as different are: different wireless telephony networks (CDMA, TDMA, GSM), wireline telephony networks (PSTNs), the Internet or other packet switched networks (e.g., networks using WAP). Thus, where there is profile information provided for the communication capabilities of individual ones of the communication networks and/or the services offered on individual ones of the communication networks, the platform coordinates fulfillment of complex service requests that may require the fulfillment of a plurality of subordinate service requests on potentially different ones of these communication networks according to, e.g., information in a user profile that is accessed by the platform for controlling at least portions of the fulfillment of the complex service request.

Furthermore, it is a particular aspect of the platform of the present disclosure to enable easy implementation of wireless location related applications. For example, embodiments of the platform disclosed herein have "plug and play" interfaces so that applications for fulfilling service requests need only identify to the platform their requirements and the platform coordinates the activation and routing of results from other applications operatively attached to the platform.

Examples of wireless location applications enabled by embodiments of the present disclosure follow. Wireless applications related to intelligent advertising (e.g., personalized advertising driven by information disclosed by a subscriber or user) may be provided by an embodiment of the disclosure, wherein the user's location is used in determining the advertising provided. Alternatively, wireless applications for providing games and gaming may also be provided by an embodiment of the platform disclosed herein. Moreover, for gaming, the platform may support wireless Internet gaming wherein the geographic location of a wireless player is taken into account for determining any legal restrictions that must be obeyed in order to conform with gaming laws where the user is located. Additional wireless services or applications expeditiously enabled by the disclosure include: introductions of wireless users with likely or stated shared interests (possibly based on location proximity), labor management and tracking, asset management and tracking, and sightseeing. Other applications are provided in the Detailed Description hereinbelow.

It is an aspect of the present disclosure that for at least some wireless applications, a geographical proximity subsystem or engine is accessed for determining when the application invoking (or location monitored) user or a tracked asset is in proximity to a particular entity (e.g., a location, person, or moving object) that the proximity engine outputs a message to the corresponding invoked application. Conversely, the proximity engine may be used for determining when two or more entities become further apart than some predetermined distance (e.g., hikers, or children from their home).

It is a further aspect of the present disclosure that a wireless services platform as described herein provide such wireless applications to wireless users in an "always on" or "always accessible" capability much like broadcast television wherein the user has access to a predetermined number of wireless services/applications, and the user can selectively activate/deactivate such services/applications depending upon the user's input. However, it is also an aspect of the present disclosure to go beyond the broadcast television paradigm in that: (i) a plurality of such applications can be concurrently active, and (ii) such applications can be activated/deactivated according to various criteria such as user location, time of day, proximity to/from a particular location or entity. Moreover, this "always accessible" capability may be presented at the user's wireless mobile station via a graphical user interface such that a proactive intelligent collection of applications is available, wherein such applications may function as, e.g., electronic agents or extensions of a user so that such an agent can, e.g., (i) alert the user of location based circumstances to which the user would not otherwise be aware, (ii) arrange or facilitate communications between users that are in proximity to one another when it is determined that such communication is likely desired by both parties wherein these users may have no a priori knowledge of one another and/or their common interests. Moreover, embodiments of the present disclosure are intended to support "intelligent" wireless communication between a user and a plurality of different wireless applications via (at least in one embodiment) substantially the same wireless services platform wherein such applications may be, e.g., considered as intelligent agents of the user for providing the user with information about products, services, people, objects, and/or locations about which the user may have an interest but which the user has both insufficient knowledge, and an insufficient knowledge to prearrange the obtaining of such information. For example, a user may input user profile information to the wireless services platform indicating that the user should be alerted when any other user that is presumed to be walking (or stationary), and is nearby (e.g., within 200 feet), and has a profile indicating that he/she is receptive to contact, and is interested in purchasing early Asian art. In particular, such alerts may be very useful if, e.g., a user is a seller of such art and is attending a well attended art auction or museum displaying Asian art. As another example, if a user is on an airplane, the user may be alerted to other users on the airplane wherein it may likely that communication between the two users would be a mutually beneficial based on the (personal or professional) profiles of the users.

Moreover, the present disclosure is novel in that it provides a user with a mobile station interface that allows the user to have a plurality of such intelligent location sensitive agents/applications active simultaneously wherein the user is wirelessly notified when any one or more of these agents/applications detect a condition or circumstance that may be of interest to the user. Thus, the user may have one or more business related agents/applications active (e.g., for contacting potential nearby buyers or sellers of products or services), in combination with one or more personal needs related agents/applications (e.g., for meeting a possible nearby compatible mate, or someone interested in East European folk dancing, or for purchasing a nearby bicycle below a particular price), in combination with one or more agents/applications related to nearby entertainment. Moreover such agents/applications may be explicitly turned on or off by the user at any time (e.g., the user may manually request an immediate one time query of other users within a specified proximity), as well as the user may provide criteria for activating and deactivating such agents/applications according to time schedules, and/or the user's location. Thus, the user may request automatic deactivation of personal agents while at work, and activation of such agents when the user is detected as being away from work. Moreover, the present disclosure may offer a plurality generic agents/applications which the user can then customize. For example, a first sales representative for a particular company may request wireless downloads of current prices for a first collection of products or services while a second sales representative may request wireless downloads of current prices for a second different collection of products or services. More generally, the present disclosure supports wireless synchronization between a corporate enterprise wide data repository and various corporate subentities such as subsidiaries, salespersons or other employees, wherein access to the data repository and wireless data synchronization with a particular view or subset of the data repository is dependent upon the subentity's access permissions as provided by the corporation.

Additionally, the wireless platform disclosed herein may provide services so that applications/agents can perform data mining of various network accessible databases to provide verification of data of interest to a user. For example, a user that travels frequently may request that a wireless application perform data mining via, e.g., Internet search engines for currently available nearby movies, concerts, lecturers, and special events whenever the user activates the application. As other examples, a user may request data mining be performed to determine information such as: the legal description or owner of a particular property given the property's address, or the average income of households within one mile of the user's location. As other examples, a user may request data mining to be performed for automatically entering information into the user's profile and/or validating information in his/her profile and/or another user's profile.

Additionally, it is an aspect of the present disclosure that requests for location information by a user and/or applications activated by the user are coordinated so that there is efficient use of wireless location network capabilities. For example, a first wireless application may be activated by a user for requesting information related to nearby users that have an interest in health products (e.g., the user may be an owner of a health food store). Additionally, the user may have another wireless agent/application active for requesting information about nearby individuals that appear to be compatible with the user. Accordingly, the frequency of receiving information on nearby users, and the sharing of results between the two active agents/applications can provide better utilization of network resources.

It is another aspect of the present disclosure that when a request for user information is received such as due to a location based proximity query, there is a sequence of steps and interactions between the requesting user and the queried user which can lead from substantial anonymity to (if desired by both parties) personal contact in a non-threatening and comfortable manner. In particular, as an intermediate step from substantial anonymity to possibly meeting face-to-face, it is an aspect of the present disclosure to provide an instant messaging type service between the requesting user and a queried user wherein the two users can converse without the identity of the other user being automatically provided by the network.

Also disclosed herein is a method for providing network services to a plurality of mobile units, comprising the following steps (1)-(5):

Step 1: receiving, from a plurality of requesting sources, requests for location based services;
wherein to fulfill a first of the requests, there is a requirement for at least a first estimated location of a first of a plurality of mobile units, said at least first estimated location for use by a first location based service in fulfilling the first request;
wherein to fulfill a second of the requests, there is a requirement for at least a second estimated location of a second of the mobile units, said at least second estimated location for use by a second location based service in fulfilling the second request;

Step 2: first determining a first destination for the first location based service for transmitting the first estimated location;

Step 3: second determining a second destination for the second location based service for transmitting the second estimated location, wherein the first and second location based services are different;

Step 4: first communicating, to a first receiving source, a first communication responsive to the first request, wherein said first communication is dependent upon a first result from the first location based service;
wherein the first location based service determines the first result after receiving the first estimated location;
wherein the first request is used in identifying the first receiving source; and Step 5: second communicating, to a second receiving source, a second communication responsive to the second request, wherein said second communication is dependent upon a second result from the second location based service;

wherein the second location based service determines the second result after receiving the second estimated location;

wherein the second request is used in identifying the second receiving source;

wherein the steps of at least one of (a) and (b) following are performed:

(a) first contacting a billing system for authorizing access to network services for the first request;

wherein the first contacting step is performed prior to the first estimated location being determined;

second contacting the same billing system for authorizing access to network services for the second request;

wherein the second contacting step is performed prior to the second estimated location being determined; and (b) the step of first determining, includes a step of selecting the first location based service from a plurality of location based services wherein each of the plurality of location based services is for fulfilling the first request, wherein said step of selecting includes obtaining data indicative of a load on each of two of the plurality of location based services and using the data to determine the first destination.

Further features and advantages of the present disclosure are provided by the figures and detailed description accompanying present summary.

BRIEF DESCRIPTION OF THE DRAWINGS

FIGS. 9A and 9B are a high level data structure diagram describing the fields of a location hypothesis object generated by the first order models 1224 of the location center.

DETAILED DESCRIPTION

Detailed Description Introduction

When performing wireless location as described herein, substantial improvements in radio location can be achieved since CDMA and other advanced radio communication infrastructures can be used for enhancing radio location. For example, the capabilities of IS-41 and advanced intelligent network (AIN) already provide a coarse-granularity of wireless location, as is necessary to, for example, properly direct a terminating call to an MS. Such information, originally intended for call processing usage, can be re-used in conjunction with the wireless location processing described herein to provide wireless location in the large (i.e., to determine which country, state and city a particular MS is located), and wireless location in the small (i.e., which location, plus or minus a few hundred feet a given MS is located).

Figure 4:
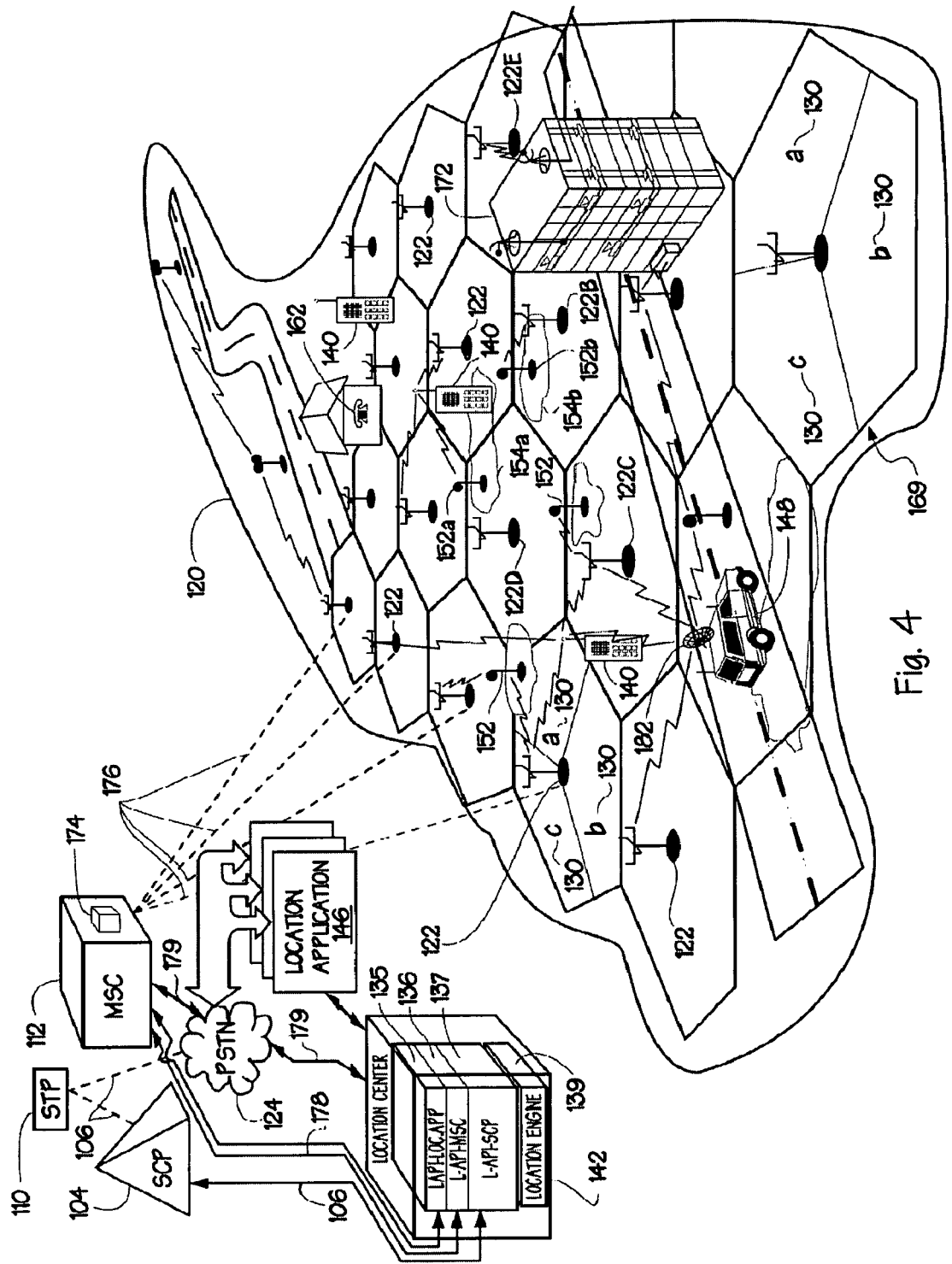
FIG. 4 illustrates an overall view of a wireless radio location network architecture, based on advanced intelligent network (AIN) principles.

FIG. 4 is a high level diagram of one embodiment of a wireless radiolocation architecture for the present disclosure. Accordingly, this figure illustrates the interconnections between the components of a wireless cellular communication network, such as, a typical PCS network configuration and various components that are specific to the present disclosure. In particular, as one skilled in the art will understand, a typical wireless (PCS) network includes:

(a) a (large) plurality of wireless mobile stations (MSs) 140 for at least one of voice related communication, visual (e.g., text such as is provided by a short message service) related communication, and according to present disclosure, location related communication. Note that some of the MSs 140 may include the electronics and corresponding software to detect and process signals from non-terrestrial transmission stations such as GPS and/or GLONASS satellites. Moreover, note that such non-terrestrial transmission stations can also be high attitude aircraft which, e.g., can hover over a metropolitan area thereby facilitating wireless communications;

(b) a mobile switching center (MSC) 112;

(c) a plurality of wireless cell sites in a radio coverage area 120, wherein each cell site includes an infrastructure base station such as those labeled 122 (or variations thereof such as 122A-122D). In particular, the base stations 122 denote the standard high traffic, fixed location base stations used for voice and data communication with a plurality of MSs 140, and, according to the present disclosure, also used for communication of information related to locating such MSs 140. Additionally, note that the base stations labeled 152 are more directly related to wireless location enablement. For example, as described in greater detail hereinbelow, the base stations 152 may be low cost, low functionality transponders that are used primarily in communicating MS location related information to the location center 142 (via base stations 122 and the MSC 112). Note that unless stated otherwise, the base stations 152 will be referred to hereinafter as location base station(s) 152 or simply LBS(s) 152;

(d) a public switched telephone network (PSTN) 124 (which may include signaling system links 106 having network control components such as: a service control point (SCP) 104, one or more signaling transfer points (STPs) 110.

In addition, the present disclosure provides one or more location centers/gateways 142. Such gateways may be described at a high level as follows.

Location Center/Gateway 142 Description

A location center/gateway 142, (also be referred to as a location center/gateway, or simply gateway), in response to a location request received at the location center, can request activation of one or more of a plurality of wireless location techniques in order to locate an MS 140.

Figure 18:
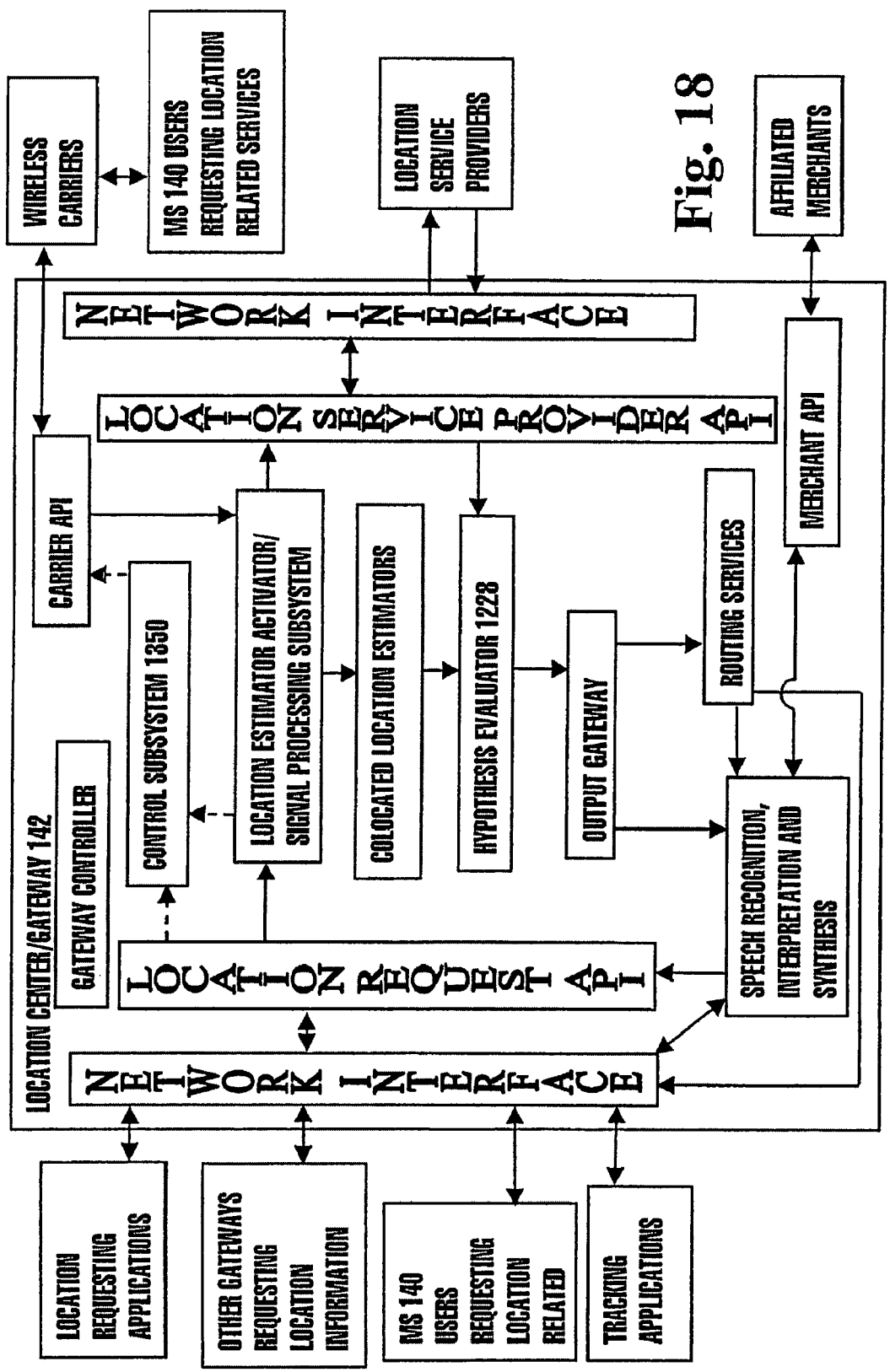
FIG. 18 is a block diagram further illustrating a wireless location gateway.

Various embodiments are provided herein of the location center/gateway 142. In particular, FIG. 18 is block diagram illustrating another embodiment of the location center/gateway 142 of the present disclosure. Note that the wireless location gateway activation requests may be dependent upon, e.g., (a) a wireless network with which the MS 140 may be in contact, such a network may be:
  (i) a commercial mobile radio network supporting telephony functionality,
  (ii) a short messaging service or paging network;
  (iii) a wireless network of beacons for providing location related information such as GPS and LORAN C,
  (iv) wireless carrier independent networks for performing wireless location such as the wireless location network provided by Times Three, Suite #220, Franklin Atrium, 3015 5th Avenue N.E, Calgary, AB T2A 6TB,
  (v) a wireless broadcasting network for use in activating an MS 140 of, e.g., a stolen vehicle such as is provided by LoJack Corporation, 333 Elm Street, Dedham, Mass. 02026, and/or
  (vi) a hybrid network including portions of wireless networks each network providing different types of signal measurements for performing wireless location);

(b) the location signal measurement obtaining capabilities of the wireless network with which the MS may be in contact. For example, such a network may only support a network centric location technique;

(c) the functionality of the MS 140 such as: the type(s) of wireless signals which can be detected and processed by the MS such as:
  (i) non-terrestrial signals such as GPS signals,
  (ii) signals from wireless beaconing/broadcasting systems such as for LORAN C signals or stolen vehicle broadcast networks for activating an MS 140 attached to the stolen vehicle, or
  (iii) wireless telephony protocols like CDMA, TDMA, and/or GSM, (d) a likely location of the target MS 140. For example, if the target MS 140 is likely to be in Japan rather than the United States, then the location service provider contacted by the gateway 142 may be different from the location service provider if the MS is likely to be in the U.S.

Moreover, regarding the plurality of wireless location techniques (embodiments thereof also denoted herein as "location estimators") for which activation may be requested by the gateway, these techniques may be co-located with the gateway, accessible via a network including: (i) local area networks, and (ii) wide area networks such as a telephony (wired or wireless) network, the Internet or a cable network. The gateway 142 may supply to one or more of the location estimators, measurements of communications between the MS 140 and one or more networks for determining a location of the MS 140. Alternatively, instead of supplying such measurements (locally or remotely, and, via a network or otherwise), the gateway 142 may provide, with the location activation request, an identification of where the measurements may be obtained (e.g., one or more network addresses). In yet another alternative, such a gateway 142 may also send request(s) to the network(s) having such MS communication measurements to forward them to particular location estimators. Note, that in performing these tasks, the gateway 142 may receive with a location request (or may retrieve in response thereto) information regarding the functionality of the target MS 140, e.g., as discussed above. Accordingly, such information may be used in selecting the location estimator to which an activation request is provided. Thus, the gateway 142 may be the intermediary between location requesting applications and the location estimators, thereby providing a simple, uniform application programming interface (API) for such applications substantially independently of the location estimators that are activated to fulfill such location requests. Moreover, the gateway 142 (or embodiments thereof) can substantially ease the burden on geolocation service providers by providing a substantially uniform method for obtaining target MS/network signal data for use in locating the target MS. Thus, by interfacing to the gateway 142, a location service provider may substantially reduce the number and complexity of its data exchange interfaces with the wireless networks for obtaining target MS/network signal data. Similarly, the networks capturing such signal data may also reduce the complexity and number of their interfaces for providing such signal data to location service providers. Additionally, note that the gateway may also fulfill location requests wherein the location is for a stationary and/or wireline handset instead of a mobile station 140. Accordingly, the gateway 142 may request access to, e.g., phone location information stored in a carrier's database of premise provisioning equipment as one skilled in the art will understand.

In some embodiments of the gateway 142, it may also facilitate in the providing of certain location related services in addition to providing, e.g., MS 140 locations. In particular, one or more of the following location related services may be facilitated by the gateway 142 or may be made operative via the wireless location capabilities of the gateway 142. However, note that the following location related services can, in general, be provided without use of a gateway 142, albeit, e.g., in a likely more restricted context wherein not all available wireless location estimating techniques are utilized, and/or by multiplying the number of interfaces to geolocation service providers (e.g., distinct wireless location interfaces provided directly to each wireless location service provider utilized). Further note that at some of these applications are described in greater detail in later sections herein:

(10.1) Routing instructions for directing a vehicle or person to get to a desired destination. Note, that there are various forms of utilizing MS location capabilities to determine an appropriate route, and related teachings are provided in copending U.S. patent application titled, "Wireless Location Using A Plurality of Commercial Network Infrastructures," by F. W. LeBlanc, Dupray and Karr filed Jan. 22, 1999 and having U.S. Pat. No. 6,236,365 issued May 22, 2001 which is fully incorporated herein by reference, and by the following two copending U.S. patent applications which are also incorporated herein by reference: (i) "Location Of A Mobile Station" filed Nov. 24, 1999 having application Ser. No. 09/194,367 whose inventors are Dupray and Karr, and (ii) "A Wireless Location System For Calibrating Multiple Location Estimators" filed Oct. 21, 1998 having application Ser. No. 09/176,587 whose inventor is Dupray. Additionally, other routing services may also be provided by the gateway 142 (or by service providers in cooperation with the gateway). For example, the gateway 142 may cooperate with an automated speech recognition interpretation and synthesis unit for providing substantially automated interactive communication with an MS 140 for providing spoken directions. Note that such directions may be provided in terms of street names and/or descriptions of the terrain (e.g., "the glass high rise on the left having pink tinted glass").

(10.2) Advertising may be directed to an MS 140 according to its location. In at least some studies it appears that MS 140 users do not respond well to unsolicited wireless advertisement whether location based or otherwise. However, in response to certain user queries for locally available merchandise, certain advertisements may be viewed in a more friendly light. Thus, by allowing an MS user to contact, e.g., a wireless advertising portal by voice or via wireless Internet, and describe certain merchandise desired (e.g., via interacting with an automated speech interaction unit) the user may be able to describe and receive (at his/her MS 140) visual displays of merchandise that may satisfy such a user's request. For example, an MS user may provide a spoken request such as: "I need a shirt, who has specials near here?".

(10.3) Applications that combine routing with safety for assisting MS users with requests such as "How do I get back to the hotel safely?";

(10.4) Applications that combine routing with sight seeing guided tour where routing is interactive and depending on feedback from users regarding, e.g., user interests;

(10.5) Applications using Internet picture capture with real time voice capture and MS location (e.g., sightseeing, security, and law enforcement), (10.6) Intelligent transportation (e.g., voice commanded vehicles)

(10.7) Applications that monitor whether or not a person or object (e.g., a vehicle) is within a predetermined boundary. Note, that such as application may automatically provide speech output to the MS user (or other authorized user) when the person or object is beyond the predetermined boundary;

(10.8) Applications that route to an event and automatically determine parking availability and where to park;

(10.9) Traffic/weather condition routing

Further note that various architectures for the location center/location gateway are within the scope of the disclosure including a distributed architecture wherein in addition to the FOMs being possibly remotely accessed (e.g., via a communications network such as the Internet), the gateway itself may be distributed throughout one or more communication networks. Thus, a location request received at a first location gateway portion may be routed to a second location gateway portion (e.g., via the Internet). Such a distributed gateway may be considered a "meta-gateway" and in fact such gateway portions may be fully functioning gateways in their own right. Thus, such routing therebetween may be due to contractual arrangements between the two gateways (each fulfilling location requests for a different network, wireless carrier, and/or geographical region). For example, for locating a stolen vehicle, it is not uncommon for the stolen vehicle to be transported rapidly beyond the coverage area of a local or regional wireless vehicle locating service. Moreover, a given location gateway may provide location information for only certain areas corresponding, e.g., to contractual arrangements with the wireless carriers with which the location gateway is affiliated. Thus, a first location gateway may provide vehicle locations for a first collection of one or more wireless networks, and a second location gateway may provide vehicle locations for a second collection of one or more wireless networks. Accordingly, for an MS 140 built into a vehicle which can be detected by one or more wireless networks (or portions thereof) in each of the first and second collections, then if the vehicle is stolen, the first gateway may be initially contacted for determining whether the vehicle can be located via communications with the first collection of one or more wireless networks, and if the vehicle can not be located, the first gateway may provide a location request to the second gateway for thereby locating the stolen vehicle via wireless communications with one or more wireless networks of the second collection. Furthermore, the first gateway may provide location requests for the stolen vehicle to other location gateways.

The present disclosure provides the following additional components:

(11.1) one or more mobile base stations 148 (MBS) which are optional, for physically traveling toward the target MS 140 or tracking the target MS;

(11.2) a plurality of location base stations 152 (LBS) which are optional, distributed within the radio coverage areas 120, each LBS 152 having a relatively small MS 140 detection area 154. Note that such LBSs 152 may also support Internet and/or TCP/IP transmissions for transmitting visual location related information (e.g., graphical, or pictorial) related to an MS location request.

Since location base stations 152 can be located on, e.g., each floor of a multi-story building, the wireless location technology described herein can be used to perform location in terms of height as well as by latitude and longitude.

In operation, an MS 140 may utilize one or more of the wireless technologies, CDMA, TDMA, AMPS, NAMPS or GSM for wireless communication with: (a) one or more infrastructure base stations 122, (b) mobile base station(s) 148, or (c) an LBS 152. Additionally, note that in some embodiments of the disclosure, there may be MS to MS communication.

Referring to FIG. 4 again, additional detail is provided of typical base station coverage areas, sectorization, and high level components within a radio coverage area 120, including the MSC 112. Three exemplary base stations (BSs) are 122A, 122B and 122C, each of which radiate referencing signals within their area of coverage 169 to facilitate mobile station (MS) 140 radio frequency connectivity, and various timing and synchronization functions. Note that some base stations may contain no sectors 130 (e.g. 122E), thus radiating and receiving signals in a 360 degree omnidirectional coverage area pattern, or the base station may contain "smart antennas" which have specialized coverage area patterns. However, the generally most frequent base stations 122 have three sector 130 coverage area patterns. For example, base station 122A includes sectors 130, additionally labeled a, b and c. Accordingly, each of the sectors 130 radiate and receive signals in an approximate 120 degree arc, from an overhead view. As one skilled in the art will understand, actual base station coverage areas 169 (stylistically represented by hexagons about the base stations 122) generally are designed to overlap to some extent, thus ensuring seamless coverage in a geographical area. Control electronics within each base station 122 are used to communicate with a mobile stations 140. Information regarding the coverage area for each sector 130, such as its range, area, and "holes" or areas of no coverage (within the radio coverage area 120), may be known and used by the location center 142 to facilitate location determination. Further, during communication with a mobile station 140, the identification of each base station 122 communicating with the MS 140 as well, as any sector identification information, may be known and provided to the location center 142.

In the case of the base station types 122, 148, and 152 communicating location information, a base station or mobility controller 174 (BSC) controls, processes and provides an interface between originating and terminating telephone calls from/to mobile station (MS) 140, and the mobile switch center (MSC) 112. The MSC 122, on-the-other-hand, performs various administration functions such as mobile station 140 registration, authentication and the relaying of various system parameters, as one skilled in the art will understand.

The base stations 122 may be coupled by various transport facilities 176 such as leased lines, frame relay, T-Carrier links, optical fiber links or by microwave communication links.

When an MS 140 is powered on and in the idle state, it constantly monitors the pilot signal transmissions from each of the base stations 122 located at nearby cell sites. Since base station/sector coverage areas may often overlap, such overlapping enables an MS 140 to detect, and, in the case of certain wireless technologies, communicate simultaneously along both the forward and reverse paths, with multiple base stations 122 and/or sectors 130. In FIG. 4, the constantly radiating pilot signals from base station sectors 130, such as sectors a, b and c of BS 122A, are detectable by MSs 140 within the coverage area 169 for BS 122A. That is, the mobile stations 140 scan for pilot channels, corresponding to a given base station/sector identifiers (IDs), for determining in which coverage area 169 (i.e., cell) it is contained. This is performed by comparing signal strengths of pilot signals transmitted from these particular cell-sites.

The mobile station 140 then initiates a registration request with the MSC 112, via the base station controller 174. The MSC 112 determines whether or not the mobile station 140 is allowed to proceed with the registration process (except, e.g., in the case of a 911 call, wherein no registration process is required). Once any required registration is complete, calls may be originated from the mobile station 140 or calls or short message service messages can be received from the network. Note that the MSC 112 communicates as appropriate, with a class 4/5 wireline telephony circuit switch or other central offices, connected to the PSTN 124 network. Such central offices connect to wireline terminals, such as telephones, or any communication device compatible with a wireline. The PSTN 124 may also provide connections to long distance networks and other networks.

The MSC 112 may also utilize IS/41 data circuits or trunks connecting to signal transfer point 110, which in turn connects to a service control point 104, via Signaling System #7 (SS7) signaling links (e.g., trunks) for intelligent call processing, as one skilled in the art will understand. In the case of wireless AIN services such links are used for call routing instructions of calls interacting with the MSC 112 or any switch capable of providing service switching point functions, and the public switched telephone network (PSTN) 124, with possible termination back to the wireless network.

Referring still to FIG. 4, the location center/gateway (LC) 142 interfaces with the MSC 112 either via dedicated transport facilities 178, using, e.g., any number of LAN/WAN technologies, such as Ethernet, fast Ethernet, frame relay, virtual private networks, etc., or via the PSTN 124. The gateway 142 may receive autonomous (e.g., unsolicited) command/response messages regarding, for example: (a) the state of the wireless network of each commercial radio service provider utilizing the LC 142 for wireless location services, (b) MS 140 and BS 122 radio frequency (RF) measurements, (c) communications with any MBSs 148, and (d) location applications requesting MS locations using the location center/gateway 142. Conversely, the LC 142 may provide data and control information to each of the above components in (a)-(d). Additionally, the LC 142 may provide location information to an MS 140, via a BS 122. Moreover, in the case of the use of a mobile base station (MBS) 148, several communications paths may exist with the LC 142.

The MBS 148 may act as a low cost, partially-functional, moving base station, and is, in one embodiment, situated in a vehicle (e.g., land, water or aircraft) where an operator may engage in MS 140 searching and tracking activities. In providing these activities using CDMA, the MBS 148 provides a forward link pilot channel for a target MS 140, and subsequently receives unique BS pilot strength measurements from the MS 140. The MBS 148 also includes a mobile station 140 for data communication with the gateway 142, via a BS 122. In particular, such data communication includes telemetering at least the geographic position (or estimates thereof) of the MBS 148, various RF measurements related to signals received from the target MS 140, and in some embodiments, MBS 148 estimates of the location of the target MS 140. In some embodiments, the MBS 148 may utilize multiple-beam fixed antenna array elements and/or a moveable narrow beam antenna, such as a microwave dish 182. The antennas for such embodiments may have a known orientation in order to further deduce a radio location of the target MS 140 with respect to an estimated current location of the MBS 148. As will be described in more detail herein below, the MBS 148 may further contain a satellite (e.g., global positioning system (GPS)) receiver (or other receiver for non-terrestrial wireless signals) for determining the location of the MBS 148 and/or providing wireless location assistance a target MS 140, e.g., providing GPS information to the MS to assist the MS in determining its location. Additionally, the MBS 148 may include distance sensors, dead-reckoning electronics, as well as an on-board computing system and display devices for locating both the MBS 148 itself as well as tracking and locating the target MS 140. The computing and display provides a means for communicating the position of the target MS 140 on a map display to an operator of the MBS 148. It is important to note that in one embodiment, an MBS 148 may determine its location substantially independent of the communications network(s) with which the MBS communicates.

Each location base station (LBS) 152 is a low cost location device. In some embodiments, to provide such LBS's cost effectively, each LBS 152 only partially or minimally supports the air-interface standards of the one or more wireless technologies used in communicating with both the BSs 122 and the MSs 140. Each LBS 152, when put in service, is placed at a fixed location, such as at a traffic signal, lamp post, etc., wherein the location of the LBS may be determined as accurately as, for example, the accuracy of the locations of the infrastructure BSs 122. Assuming the wireless technology, CDMA, is used, each BS 122 uses a time offset of the pilot PN sequence to identify a forward CDMA pilot channel. In one embodiment, each LBS 152 emits a unique, time-offset pilot PN sequence channel in accordance with the CDMA standard in the RF spectrum designated for BSs 122, such that the channel does not interfere with neighboring BSs 122 cell site channels, and does not interfere with neighboring LBSs 152. Each LBS 152 may also contain multiple wireless receivers in order to monitor transmissions from a target MS 140. Additionally, each LBS 152 contains mobile station 140 electronics, thereby allowing the LBS to both be controlled by, e.g., the gateway 142 or the wireless carrier(s) for the LBS, and to transmit information to, e.g., the gateway 142 (via, e.g., at least one neighboring BS 122), or to another wireless location service provider such as one providing one or more FOMs.

As mentioned above, when the location of a particular target MS 140 is desired, the gateway 142 may request location information about the target MS 140 from, for instance, one or more activated LBSs 152 in a geographical area of interest. Accordingly, whenever the target MS 140 is in an LBS coverage area, or is suspected of being in the coverage area, either upon command from the gateway 142 (or other location service provider), or in a substantially continuous (or periodic) fashion, the LBS's pilot channel appears to the target MS 140 as a potential neighboring base station channel, and consequently, is placed, for example, in the CDMA neighboring set, or the CDMA remaining set of the target MS 140 (as one familiar with the CDMA standards will understand).

During the normal CDMA pilot search sequence of the mobile station initialization state (in the target MS), the target MS 140 will, if within range of such an activated LBS 152, detect the LBS pilot presence during the CDMA pilot channel acquisition substate. Consequently, the target MS 140 performs RF measurements on the signal from each detected LBS 152. Similarly, an activated LBS 152 can perform RF measurements on the wireless signals from the target MS 140. Accordingly, each LBS 152 detecting the target MS 140 may subsequently telemeter back to the LC 142 measurement results related to signals from/to the target MS 140. Moreover, upon command, the target MS 140 may telemeter back to the gateway 142 its own measurements of the detected LBSs 152, and consequently, this new location information, in conjunction with location related information received from the BSs 122, can be used to locate the target MS 140.

It should be noted that an LBS 152 will normally deny hand-off requests, since typically the LBS does not require the added complexity of handling voice or traffic bearer channels, although economics and peak traffic load conditions may dictate preference here. Note that GPS timing information, needed by any CDMA base station, is either achieved via a the inclusion of a local GPS receiver or via a telemetry process from a neighboring conventional BS 122, which contains a GPS receiver and timing information. Since energy requirements are minimal in such an LBS 152, (rechargeable) batteries or solar cells may be used to power the LBSs. Further, no expensive terrestrial transport link is typically required since two-way communication is provided by an included MS 140 (or an electronic variation thereof) within each LBS. Thus, LBSs 152 may be placed in numerous locations, such as:

(a) in dense urban canyon areas (e.g., where signal reception may be poor and/or very noisy);
(b) in remote areas (e.g., hiking, camping and skiing areas);
(c) along highways (e.g., for emergency as well as monitoring traffic flow), and their rest stations; or
(d) in general, wherever more location precision is required than is obtainable using other wireless infrastructure network components.

Location Center—Network Elements API Description

A location application programming interface 136 (FIG. 4), denoted L-API, is may be provided between the location center/gateway 142 (LC) and the mobile switch center (MSC) network element type, in order to send and receive various control, signals and data messages. The L-API may be implemented using a preferably high-capacity physical layer communications interface, such as IEEE standard 802.3 (10 baseT Ethernet), although other physical layer interfaces could be used, such as fiber optic ATM, frame relay, etc. At least two forms of L-API implementation are possible. In a first case, the signal control and data messages are provided using the MSC 112 vendor's native operations messages inherent in the product offering, without any special modifications. In a second case, the L-API includes a full suite of commands and messaging content specifically optimized for wireless location purposes, which may require some, although minor development on the part of an MSC vendor.

Signal Processor Description

Figure 17:
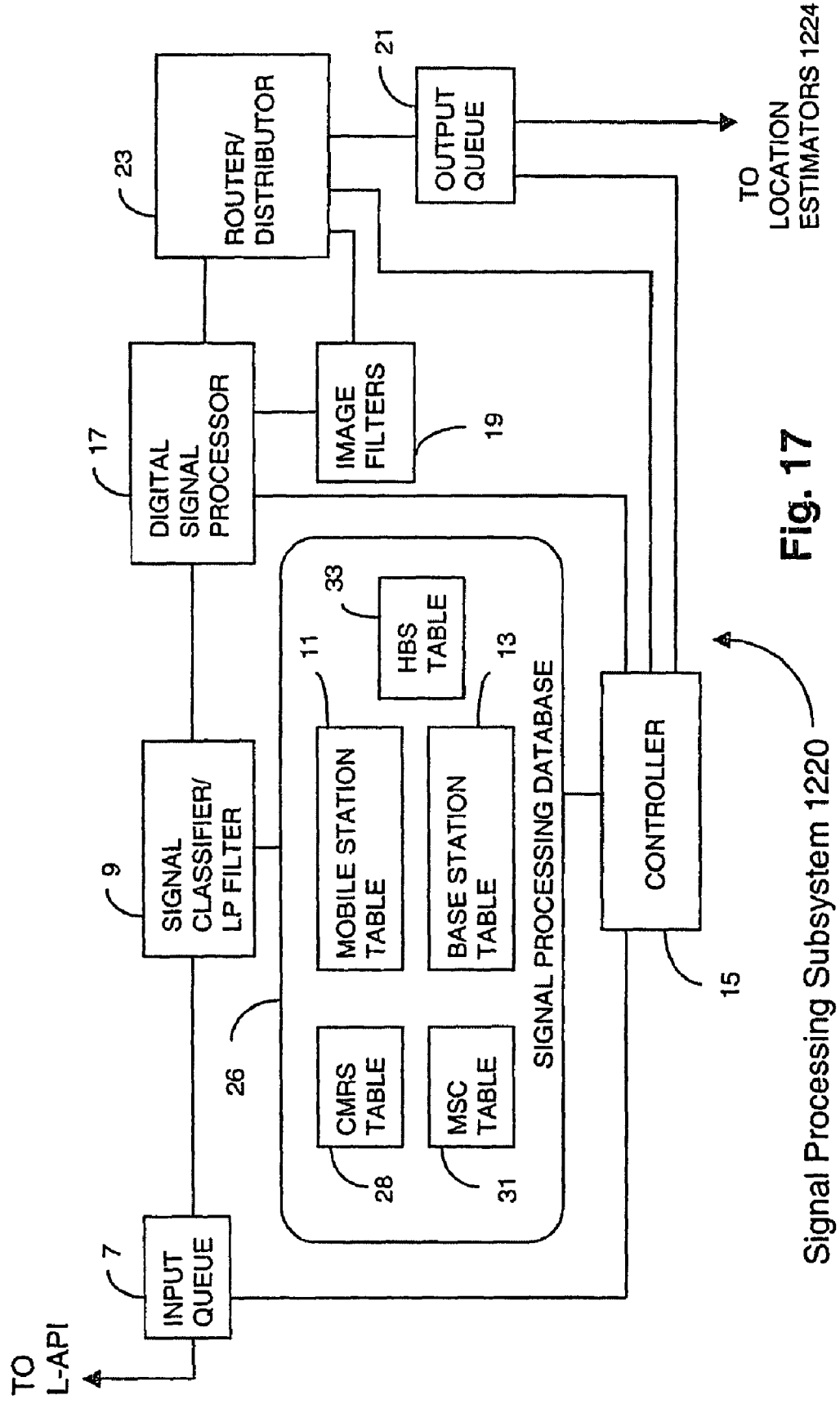
FIG. 17 illustrates the primary components of the signal processing subsystem.

Referring to FIG. 17, a signal processing subsystem (labeled 1220 in other figures) may be provided (or accessed) by the gateway 142. Such a signal processing subsystem may: (a) receive control messages and signal measurements from one or more wireless service provider networks, and (b) transmit appropriate control messages to such wireless networks via the location applications programming interface 136 referenced earlier, for wireless location purposes. The signal processing subsystem 1220 additionally provides various signal identification, conditioning and pre-processing functions, including buffering, signal type classification, signal filtering, message control and routing functions to the location estimating modules or FOMs.

Figure 1:
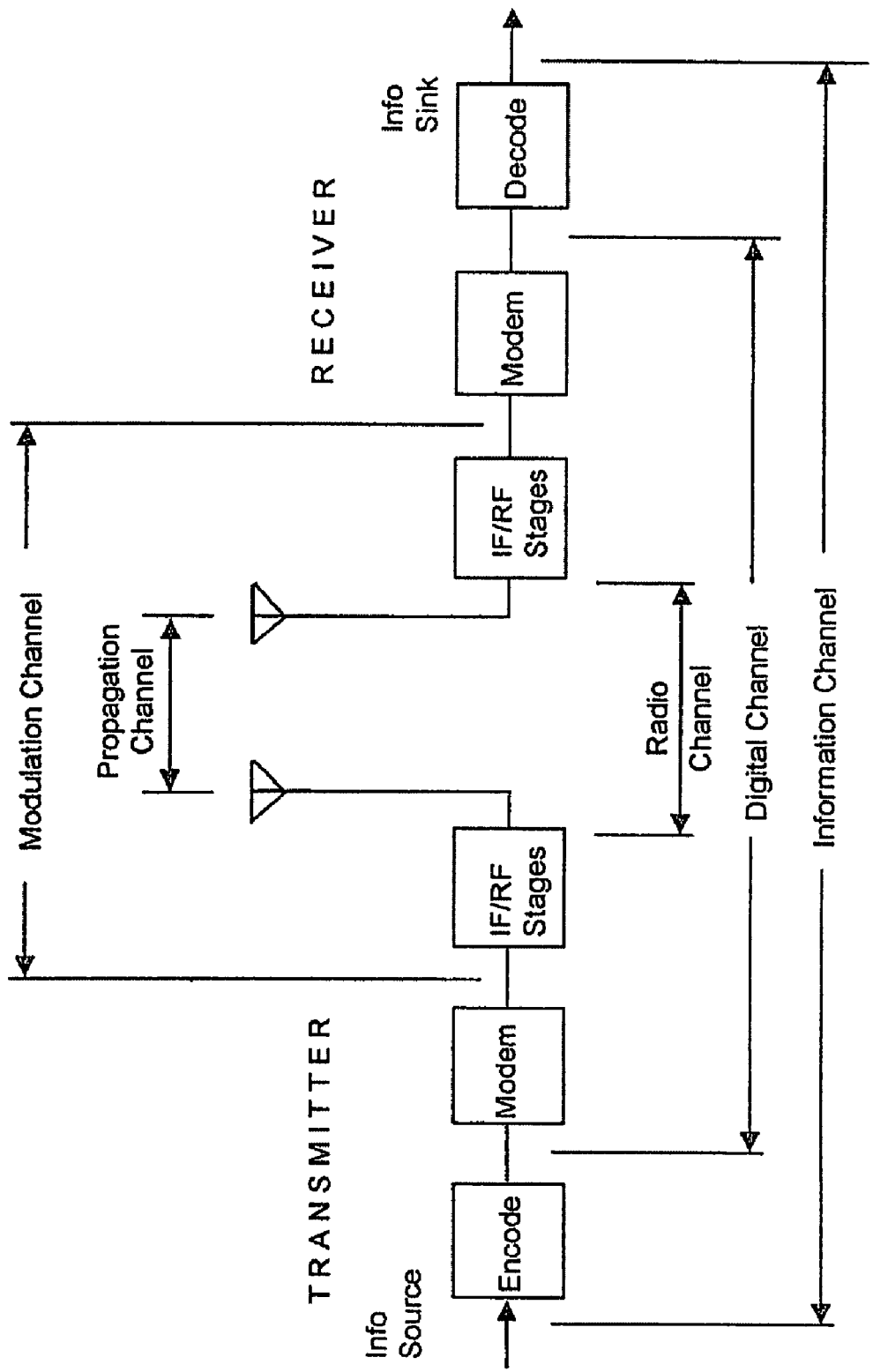
FIG. 1 illustrates various perspectives of radio propagation opportunities which may be considered in addressing correlation with mobile to base station ranging.

There can be several combinations of Delay Spread/Signal Strength sets of measurements made available to the signal processing subsystem 1220. In some cases a mobile station 140 (FIG. 1) may be able to detect up to three or four pilot channels representing three to four base stations, or as few as one pilot channel, depending upon the environment and wireless network configuration. Similarly, possibly more than one BS 122 can detect a mobile station 140 transmitter signal, and the fact that multiple CMRS' base station equipment commonly will overlap coverage areas.

For each mobile station 140 or BS 122 transmitted signal that is detected by a receiver group at a base or mobile station, respectively, multiple delayed signals, or "fingers" may be detected (e.g., in CDMA) and tracked resulting from multipath radio propagation conditions from a given transmitter. In typical spread spectrum diversity CDMA receiver design, the "first" finger represents the most direct, or least delayed multipath signal. Second or possibly third or fourth fingers may also be detected and tracked, assuming the detecting base station and/or mobile station 140 contains a sufficient number of data receivers for doing so. The signal processing subsystem may utilize various wireless signal measurements of transmissions between a target mobile station 140 and a network of base stations 122, 152 and/or 148. Such measurements can be important in effectively estimating the location of mobile stations 140 in that it is well known that measurements of wireless signal propagation characteristics, such as signal strength (e.g., RSSI), time delay, angle of arrival, and any number other measurements, can individually lead to gross errors in MS 140 location estimates.

Accordingly, one aspect of the present disclosure is directed to utilizing a larger number of wireless signal measurements, and utilizing a plurality of MS 140 estimation techniques to compensate for location estimation errors generated by some such techniques. For example, due to the large capital outlay costs associated with providing three or more overlapping base station coverage signals in every possible location, most practical digital PCS deployments result in fewer than three base station pilot channels being reportable in the majority of location areas, thus resulting in a larger, more amorphous location estimates by terrestrial triangulation systems. Thus, by utilizing wireless signal measurements from a variety of sources substantially simultaneously and/or "greedily" (i.e., use whatever signal measurements can be obtained from any of the signal sources as they are obtained), additional location enhancements can be obtained. For example, by enhancing a mobile station 140 with electronics for detecting satellite transmissions (as done with mobile base stations 148 and which also can be viewed as such an enhanced mobile station 140) additional location related signals maybe obtained from:

(a) the GPS satellite system,
(b) the Global Navigation Satellite System (GLONASS) satellite system, a Russian counterpart to the U.S. GPS system, and/or
(c) the numerous low earth orbit satellite systems (LEOs) and medium earth orbit satellite systems (MEOs) such as the IRIDIUM system being developed by Motorola Corp., the GLOBALSTAR system by Loral and Qualcomm, and the ICO satellite system by ICO Global Communications.

Thus, by combining even insufficient wireless location measurements from different wireless communication systems, accurate location of an MS 140 is possible. For example, by if only two GPS satellites are detectable, but there is an additional reliable wireless signal measurement from, e.g., a terrestrial base station 122, then by triangulating using wireless signal measurements derived from transmissions from each of these three sources, a potentially reliable and accurate MS location can be obtained.

Moreover, the transmissions from the MS 140 used for determining the MS's location need not be transmitted to terrestrial base stations (e.g., 122). It is within the scope of the present disclosure that a target MS 140 may transmit location related information to satellites as well. For example, if a target MS 140 detects two GPS satellite transmissions and is able to subsequently transmit the GPS signal measurements (e.g., timing measurements) to an additional satellite capable of determining additional MS location measurements according to the signals received, then by performing a triangulation process at the location center/gateway 142 (which may be co-located with the additional satellite, or at a remote terrestrial site), a potentially reliable and accurate MS location can be obtained. Accordingly, an embodiment of the present disclosure is capable of resolving wireless location ambiguities due to a lack of location related information of one type by utilizing supplemental location related information of a different type. Note that by "type" as used here it is intended to be interpreted broadly as, e.g., (a) a data type of location information, and/or
(b) communications from a particular commercial wireless system as opposed to an alternative system, each such system having distinct groups of known or registered MS users.

Moreover, it can be that different FOMs are provided for at least some wireless location computational models utilizing different types of location related information. For example, in certain contexts wireless networks based on different wireless signaling technologies may be used to locate an MS 140 during the time period of a single emergency call such as E911. Moreover, in other contexts it may be possible for the target MS 140 to use one or more of a plurality of wireless communication networks, possibly based on different wireless communication technologies, depending on availability the of technology in the coverage area. In particular, since so called "dual mode" or "tri-mode" mobile stations 140 are available, wherein such mobile stations are capable of wireless communication in a plurality of wireless communication technologies, such as digital (e.g., CDMA, and/or TDMA) as well as analog or AMP/NAMPS, such mobile stations may utilize a first (likely a default) wireless communication technology whenever possible, but switch to another wireless communication technology when, e.g., coverage of the first wireless technology becomes poor. Moreover, such different technologies are typically provided by different wireless networks (wherein the term "network" is understood to include a network of communication supporting nodes geographically spaced apart that provide a communications infrastructure having access to information regarding subscribers to the network prior to a request to access the network by the subscribers). Accordingly, an embodiment of the present disclosure may include (or access) FOMs for providing mobile station location estimates wherein the target MS 140 communicates with various networks using different wireless communication technologies. Moreover, such FOMs may be activated according to the wireless signal measurements received from various wireless networks and/or wireless technologies supported by a target MS 140 and to which there is a capability of communicating measurements of such varied wireless signals to the FOM(s). Thus, in one embodiment of the present disclosure, there may be a triangulation (or trilateration) based FOM for each of CDMA, TDMA and AMP/NAMPS which may be singly, serially, or concurrently for obtaining a particular location of an MS 140 at a particular time (e.g., for an E911 call). Thus, when locating a target MS 140, the MS may, if there is overlapping coverage of two wireless communication technologies and the MS supports communications with both, repeatedly switch back and forth between the two thereby providing additional wireless signal measurements for use in locating the target MS 140.

In one embodiment of the present disclosure, wherein multiple FOMs may be activated substantially simultaneously (or alternatively, wherever appropriate input is received that allow particular FOMs to be activated). Note that at least some of the FOMs may provide "inverse" estimates of where a target MS 140 is not instead of where it is. Such inverse analysis can be very useful in combination with location estimates indicating where the target MS is in that the accuracy of a resulting MS location estimate may be substantially decreased in size when such inverse estimates are utilized to rule out areas that otherwise appear to be likely possibilities for containing the target MS 140. Note that one embodiment of a FOM that can provide such reverse analysis is a location computational model that generates target MS location estimates based on archived knowledge of base station coverage areas (such an archive being the result of, e.g., the compilation a RF coverage database—either via RF coverage area simulations or field tests). In particular, such a model may provide target MS location inverse estimates having a high confidence or likelihood that that the target MS 140 is not in an area since either a base station 122 (or 152) can not detect the target MS 140, or the target MS can not detect a particular base station. Accordingly, the confidences or likelihoods on such estimates may be used by diminishing a likelihood that the target MS is in an area for the estimate, or alternatively the confidence or likelihood of all areas of interest outside of the estimate can increased.

Note that in some embodiments of the present disclosure, both measurements of forward wireless signals to a target MS 140, and measurements of reverse wireless signals transmitted from the target MS to a base station can be utilized by various FOMs. In some embodiments, the received relative signal strength ($RRSS_{BS}$) of detected nearby base station transmitter signals along the forward link to the target mobile station can be more readily used by the location estimate modules (FOMs) since the transmission power of the base stations 122 typically changes little during a communication with a mobile station. However, the relative signal strength ($RRSS_{MS}$) of target mobile station transmissions received by the base stations on the reverse link may require more adjustment prior to location estimate model use, since the mobile station transmitter power level changes nearly continuously.

Location Center High Level Functionality

At a very high level the location center/gateway 142 computes (or requests computation of) location estimates for a wireless mobile station 140 by performing at least some of the following steps:

(23.0) receiving an MS location request;

(23.1) receiving measurements of signal transmission characteristics of communications communicated between the target MS 140 and one or more wireless infrastructure base stations 122. Note, this step may only be performed if the gateway provides such measurements to a FOM (e.g, a FOM co-located therewith);

(23.2) filtering the received signal transmission characteristics (by a signal processing subsystem 1220 illustrated in, e.g., FIGS. 5 and 30) as needed so that target MS location data can be generated that is uniform and consistent with location data generated from other target MSs 140. In particular, such uniformity and consistency is both in terms of data structures and interpretation of signal characteristic values provided by the MS location data, as will be described hereinbelow. Note, this step may also only be performed if the gateway provides such measurements to a FOM. Otherwise, such FOM is likely to perform such filtering;

(23.3) inputting the generated target MS location data to one or more MS location estimating models (FOMs, labeled collectively as 1224 in FIG. 5), so that each such FOM may use the input target MS location data for generating a "location hypothesis" providing an estimate of the location of the target MS 140. Note, this step may also only be performed if the gateway provides such measurements to a FOM;

(23.4) receiving the resulting location hypotheses from the activated FOMs, and providing the generated location hypotheses to an hypothesis evaluation module (denoted the hypothesis evaluator 1228 in FIG. 5) for:

(a) (optionally) adjusting the target MS location estimates of the generated location hypotheses and/or adjusting confidence values of the location hypotheses, wherein for each location hypothesis, its confidence value indicates the confidence or likelihood that the target MS is located in the location estimate of the location hypothesis. Moreover, note that such adjusting uses archival information related to the accuracy and/or reliability of previously generated location hypotheses;

(b) (optionally) evaluating the location hypotheses according to various heuristics related to, for example, the radio coverage area 120 terrain, the laws of physics, characteristics of likely movement of the target MS 140; and (c) (necessarily) determining a most likely location area for the target MS 140, wherein the measurement of confidence associated with each input MS location area estimate may be used for determining a "most likely location area"; and (23.5) outputting a most likely target MS location estimate to one or more applications 146 (FIG. 5) requesting an estimate of the location of the target MS 140.

Location Hypothesis Data Representation

In order to describe how the steps (23.1) through (23.5) are performed in the sections below, some introductory remarks related to the data denoted above as location hypotheses will be helpful. Additionally, it will also be helpful to provide introductory remarks related to historical location data and the data base management programs associated therewith.

For each target MS location estimate generated and utilized by an embodiment of the present disclosure, the location estimate may be provided in a data structure (or object class) denoted as a "location hypothesis" (illustrated in Table LH-1). Brief descriptions of the data fields for a location hypothesis is provided in the Table LH-1.

TABLE LH-1

| | |
|---|---|
| FOM_ID | First order model ID (providing this Location Hypothesis); note, since it is possible for location hypotheses to be generated by other than the FOMs 1224, in general, this field identifies the module that generated this location hypothesis. |
| MS_ID | The identification of the target MS 140 to this location hypothesis applies. |
| pt_est | The most likely location point estimate of the target MS 140. |
| valid_pt | Boolean indicating the validity of "pt_est". |
| area_est | Location Area Estimate of the target MS 140 provided by the FOM. This area estimate will be used whenever "image_area" below is NULL. |
| valid_area | Boolean indicating the validity of "area_est" (one of "pt_est" and "area_est" must be valid). |
| adjust | Boolean (true if adjustments to the fields of this location hypothesis are to be performed in the Context adjuster Module). |
| pt_covering | Reference to a substantially minimal area (e.g., mesh cell) covering of "pt_est". Note, since this MS 140 may be substantially on a cell boundary, this covering may, in some cases, include more than one cell. |
| image_area | Reference to a substantially minimal area (e.g., mesh cell) covering of "pt_covering" (see detailed description of the function, "confidence_adjuster"). Note that if this field is not NULL, then this is the target MS location estimate used by the location center 142 instead of "area_est". |

TABLE LH-1-continued

| | |
|---|---|
| extrapolation_area | Reference to (if non-NULL) an extrapolated MS target estimate area provided by the location extrapolator submodule 1432 of the hypothesis analyzer 1332. That is, this field, if non-NULL, is an extrapolation of the "image_area" field if it exists, otherwise this field is an extrapolation of the "area_est" field. Note other extrapolation fields may also be provided depending on the embodiment of the present disclosure, such as an extrapolation of the "pt_covering". |
| Confidence | In one embodiment, this is a probability indicating a likelihood that the target MS 140 is in (or out) of a particular area. If "image_area" exists, then this is a measure of the likelihood that the target MS 140 is within the area represented by "image_area", or if "image_area" has not been computed (e.g., "adjust" is FALSE), then "area_est" must be valid and this is a measure of the likelihood that the target MS 140 is within the area represented by "area_est". Other embodiments, are also within the scope of the present disclosure that are not probabilities; e.g., translations and/or expansions of the [0, 1] probability range as one skilled in the art will understand. |
| Original_Timestamp | Date and time that the location signature cluster (defined hereinbelow) for this location hypothesis was received by the signal processing subsystem 1220. |
| Active_Timestamp | Run-time field providing the time to which this location hypothesis has had its MS location estimate(s) extrapolated (in the location extrapolator 1432 of the hypothesis analyzer 1332). Note that this field is initialized with the value from the "Original_Timestamp" field. |
| Processing Tags and environmental categorizations | For indicating particular types of environmental classifications not readily determined by the "Original_Timestamp" field (e.g., weather, traffic), and restrictions on location hypothesis processing. |
| loc_sig_cluster | Provides access to the collection of location signature signal characteristics derived from communications between the target MS 140 and the base station(s) detected by this MS (discussed in detail hereinbelow); in particular, the location data accessed here is provided to the first order models by the signal processing subsystem 1220; i.e., access to the "loc sigs" (received at "timestamp" regarding the location of the target MS) |
| descriptor | Original descriptor (from the First order model indicating why/how the Location Area Estimate and Confidence Value were determined). |

As can be seen in the Table LH-1, each location hypothesis data structure includes at least one measurement, denoted hereinafter as a confidence value (or simply confidence), that is a measurement of the perceived likelihood that an MS location estimate in the location hypothesis is an accurate location estimate of the target MS 140. Since, in some embodiments of the disclosure, such confidence values are an important aspect, much of the description and use of such confidence values are described below; however, a brief description is provided here.

In one embodiment, each confidence value is a probability indicative of a likeliness that the target MS 140 resides within an geographic area represented by the hypothesis to which the confidence value applies. Accordingly, each such confidence value is in the range [0, 1]. Moreover, for clarity of discussion, it is assumed that unless stated otherwise that the probabilistic definition provided here is to be used when confidence values are discussed.

Note, however, other definitions of confidence values are within the scope of the present disclosure that may be more general than probabilities, and/or that have different ranges other than [0, 1]. For example, one such alternative is that each such confidence value is in the range −1.0 to 1.0, wherein the larger the value, the greater the perceived likelihood that the target MS 140 is in (or at) a corresponding MS location estimate of the location hypothesis to which the confidence value applies. As an aside, note that a location hypothesis may have more than one MS location estimate (as will be discussed in detail below) and the confidence value will typically only correspond or apply to one of the MS location estimates in the location hypothesis. Further, values for the confidence value field may be interpreted as: (a) −1.0 means that the target MS 140 is NOT in such a corresponding MS area estimate of the location hypothesis area, (b) 0 means that it is unknown as to the likelihood of whether the MS 140 in the corresponding MS area estimate, and (c) +1.0 means that the MS 140 is perceived to positively be in the corresponding MS area estimate.

Additionally, in utilizing location hypotheses in, for example, the location evaluator 1228 as in (23.4) above, it is important to keep in mind that for confidences, $cf_1$ and $cf_2$, if $cf_1 <= cf_2$, then for a location hypotheses $H_1$ and $H_2$ having $cf_1$ and $cf_2$, respectively, the target MS 140 is expected to more likely reside in a target MS estimate of $H_2$ than a target MS estimate of $H_1$. Moreover, if an area, A, is such that it is included in a plurality of location hypothesis target MS estimates, then a confidence score, $CS_A$, can be assigned to A, wherein the confidence score for such an area is a function of the confidences for all the location hypotheses whose (most pertinent) target MS location estimates contain A. That is, in order to determine a most likely target MS location area estimate for outputting from the location center/gateway 142, a confidence score is determined for areas within the location center/gateway service area.

Coverage Area: Types and Their Determination

The notion of "area type" as related to wireless signal transmission characteristics has been used in many investigations of radio signal transmission characteristics. Some investigators, when investigating such signal characteristics of areas have used somewhat naive area classifications such as urban, suburban, rural, etc. However, it is desirable for the purposes of the present disclosure to have a more operational definition of area types that is more closely associated with wireless signal transmission behaviors.

To describe embodiments of the an area type scheme that may be used in the present disclosure, some introductory remarks are first provided. Note that the wireless signal transmission behavior for an area depends on at least the following criteria:

(23.8.1) substantially invariant terrain characteristics (both natural and man-made) of the area; e.g., mountains, buildings, lakes, highways, bridges, building density;

(23.8.2) time varying environmental characteristics (both natural and man-made) of the area; e.g., foliage, traffic, weather, special events such as baseball games;

(23.8.3) wireless communication components or infrastructure in the area; e.g., the arrangement and signal communication characteristics of the base stations 122 in the area (e.g., base station antenna downtilt). Further, the antenna characteristics at the base stations 122 may be important criteria.

Accordingly, a description of wireless signal characteristics for determining area types could potentially include a characterization of wireless signaling attributes as they relate to each of the above criteria. Thus, an area type might be: hilly, treed, suburban, having no buildings above 50 feet, with base stations spaced apart by two miles. However, a categorization of area types is desired that is both more closely tied to the wireless signaling characteristics of the area, and is capable of being computed substantially automatically and repeatedly over time. Moreover, for a wireless location system, the primary wireless signaling characteristics for categorizing areas into at least minimally similar area types are: thermal noise and, more importantly, multipath characteristics (e.g., multipath fade and time delay).

Focusing for the moment on the multipath characteristics, it is believed that (23.8.1) and (23.8.3) immediately above are, in general, more important criteria for accurately locating an MS 140 than (23.8.2). That is, regarding (23.8.1), multipath tends to increase as the density of nearby vertical area changes increases. For example, multipath is particularly problematic where there is a high density of high rise buildings and/or where there are closely spaced geographic undulations. In both cases, the amount of change in vertical area per unit of area in a horizontal plane (for some horizontal reference plane) may be high. Regarding (23.8.3), the greater the density of base stations 122, the less problematic multipath may become in locating an MS 140. Moreover, the arrangement of the base stations 122 in the radio coverage area 120 in FIG. 4 may affect the amount and severity of multipath.

Accordingly, it would be desirable to have a method and system for straightforwardly determining area type classifications related to multipath, and in particular, multipath due to (23.8.1) and (23.8.3). The present disclosure provides such a determination by utilizing a novel notion of area type, hereinafter denoted "transmission area type" (or, "area type" when both a generic area type classification scheme and the transmission area type discussed hereinafter are intended) for classifying "similar" areas, wherein each transmission area type class or category is intended to describe an area having at least minimally similar wireless signal transmission characteristics. That is, the novel transmission area type scheme of the present disclosure is based on: (a) the terrain area classifications; e.g., the terrain of an area surrounding a target MS 140, (b) the configuration of base stations 122 in the radio coverage area 120, and (c) characterizations of the wireless signal transmission paths between a target MS 140 location and the base stations 122.

In one embodiment of a method and system for determining such (transmission) area type approximations, a partition (denoted hereinafter as $P_0$) is imposed upon the radio coverage area 120 for partitioning radio coverage area 120 into subareas, wherein each subarea is an estimate of an area having included MS 140 locations that are likely to have is at least a minimal amount of similarity in their wireless signaling characteristics. To obtain the partition $P_0$ of the radio coverage area 120, the following steps are performed:

(23.8.4.1) Partition the radio coverage area 120 into subareas, wherein in each subarea is: (a) connected, (b) the subarea is not too oblong, e.g., the variations in the lengths of chords sectioning the subarea through the centroid of the subarea are below a predetermined threshold, (c) the size of the subarea is below a predetermined value, and (d) for most locations (e.g., within a first or second deviation) within the subarea whose wireless signaling characteristics have been verified, it is likely (e.g., within a first or second deviation) that an MS 140 at one of these locations will detect (forward transmission path) and/or will be detected (reverse transmission path) by a same collection of base stations 122. For example, in a CDMA context, a first such collection may be (for the forward transmission path) the active set of base stations 122, or, the union of the active and candidate sets, or, the union of the active, candidate and/or remaining sets of base stations 122 detected by "most" MSs 140 in. Additionally (or alternatively), a second such collection may be the base stations 122 that are expected to detect MSs 140 at locations within the subarea. Of course, the union or intersection of the first and second collections is also within the scope of the present disclosure for partitioning the radio coverage area 120 according to (d) above. It is worth noting that it is believed that base station 122 power levels will be substantially constant. However, even if this is not the case, one or more collections for (d) above may be determined empirically and/or by computationally simulating the power output of each base station 122 at a predetermined level. Moreover, it is also worth mentioning that this step is relatively straightforward to implement using the data stored in the location signature data base 1320 (i.e., the verified location signature clusters discussed in detail hereinbelow). Denote the resulting partition here as $P_1$.

(23.8.4.2) Partition the radio coverage area 120 into subareas, wherein each subarea appears to have substantially homogeneous terrain characteristics. Note, this may be performed periodically substantially automatically by scanning radio coverage area images obtained from aerial or satellite imaging. For example, EarthWatch Inc. of Longmont, Colo. can provide geographic with 3 meter resolution from satellite imaging data. Denote the resulting partition here as $P_2$.

(23.8.4.3) Overlay both of the above partitions, $P_1$ and $P_2$ of the radio coverage area 120 to obtain new subareas that are intersections of the subareas from each of the above partitions. This new partition is $P_0$ (i.e., $P_0 = P_1$ intersect $P_2$), and the subareas of it are denoted as "$P_0$ subareas".

Now assuming $P_0$ has been obtained, the subareas of $P_0$ are provided with a first classification or categorization as follows:

(23.8.4.4) Determine an area type categorization scheme for the subareas of $P_1$. For example, a subarea, A, of $P_1$, may be categorized or labeled according to the number of base stations 122 in each of the collections used in (23.8.4.1)(d) above for determining subareas of $P_1$. Thus, in one such categorization scheme, each category may correspond to a single number x (such as 3), wherein for a subarea, A, of this category, there is a group of x (e.g., three) base stations 122 that are expected to be detected by a most target MSs 140 in the area A. Other embodiments are also possible, such as a categorization scheme wherein each category may correspond to a triple: of numbers such as (5, 2, 1), wherein for a subarea A of this category, there is a common group of 5 base stations 122 with two-way signal detection expected with most locations (e.g., within a first or second deviation) within A, there are 2 base stations that are expected to be detected by a target MS 140 in A but these base stations can not detect the target MS, and there is one base station 122 that is expected to be able to detect a target MS in A but not be detected.

(23.8.4.5) Determine an area type categorization scheme for the subareas of $P_2$. Note that the subareas of $P_2$ may be categorized according to their similarities. In one embodiment, such categories may be somewhat similar to the naive area types mentioned above (e.g., dense urban, urban, suburban, rural, mountain, etc.). However, it is also an aspect of the present disclosure that more precise categorizations may be used, such as a category for all areas having between 20,000 and 30,000 square feet of vertical area change per 11,000 square feet of horizontal area and also having a high traffic volume (such a category likely corresponding to a "moderately dense urban" area type).

(23.8.4.6) Categorize subareas of $P_0$ with a categorization scheme denoted the "$P_0$ categorization," wherein for each $P_0$ subarea, A, a "$P_0$ area type" is determined for A according to the following substep(s):

(a) Categorize A by the two categories from (23.8.4.4) and (23.8.5) with which it is identified. Thus, A is categorized (in a corresponding $P_0$ area type) both according to its terrain and the base station infrastructure configuration in the radio coverage area 120.

(23.8.4.7) For each $P_0$ subarea, A, of $P_0$ perform the following step(s):

(a) Determine a centroid, C(A), for A;
  (b) Determine an approximation to a wireless transmission path between C(A) and each base station 122 of a predetermined group of base stations expected to be in (one and/or two-way) signal communication with most target MS 140 locations in A. For example, one such approximation is a straight line between C(A) and each of the base stations 122 in the group. However, other such approximations are within the scope of the present disclosure, such as, a generally triangular shaped area as the transmission path, wherein a first vertex of this area is at the corresponding base station for the transmission path, and the sides of the generally triangular shaped defining the first vertex have a smallest angle between them that allows A to be completely between these sides.
  (c) For each base station 122, $BS_i$, in the group mentioned in (b) above, create an empty list, $BS_i$-list, and put on this list at least the $P_0$ area types for the "significant" $P_0$ subareas crossed by the transmission path between C(A) and $BS_i$. Note that "significant" $P_0$ subareas may be defined as, for example, the $P_0$ subareas through which at least a minimal length of the transmission path traverses. Alternatively, such "significant" $P_0$ subareas may be defined as those $P_0$ subareas that additionally are know or expected to generate substantial multipath.
  (d) Assign as the transmission area type for A as the collection of $BS_i$-lists. Thus, any other $P_0$ subarea having the same (or substantially similar) collection of lists of $P_0$ area types will be viewed as having approximately the same radio transmission characteristics.

Note that other transmission signal characteristics may be incorporated into the transmission area types. For example, thermal noise characteristics may be included by providing a third radio coverage area 120 partition, $P_3$, in addition to the partitions of $P_1$ and $P_2$ generated in (23.8.4.1) and (23.8.4.2) respectively. Moreover, the time varying characteristics of (23.8.2) may be incorporated in the transmission area type frame work by generating multiple versions of the transmission area types such that the transmission area type for a given subarea of $P_0$ may change depending on the combination of time varying environmental characteristics to be considered in the transmission area types. For instance, to account for seasonality, four versions of the partitions $P_1$ and $P_2$ may be generated, one for each of the seasons, and subsequently generate a (potentially) different partition $P_0$ for each season. Further, the type and/or characteristics of base station 122 antennas may also be included in an embodiment of the transmission area type.

Other embodiments of area types are also within the scope of the present disclosure. As mentioned above, each of the first order models 1224 have default confidence values associated therewith, and these confidence values may be probabilities. More precisely, such probability confidence values can be determined as follows. Assume there is a partition of the coverage area into subareas, each subarea being denoted a "partition area." For each partition area, activate each first order model 1224 with historical location data in the Location Signature Data Base 1320 (FIG. 6), wherein the historical location data has been obtained from corresponding known mobile station locations in the partition area. For each first order model, determine a probability of the first order model generating a location hypothesis whose location estimate contains the corresponding known mobile station location. To accomplish this, assume the coverage area is partitioned into partition areas A, wherein each partition area A is specified as the collection of coverage area locations such that for each location, the detected wireless transmissions between the network base stations and a target mobile station at the location can be straightforwardly equated with other locations of area A. For example, one such partition, $P_0$, can be defined wherein each partition area A is specified in terms of three sets of base station identifiers, namely, (a) the base station identifiers of the base stations that can be both detected at each location of A and can detect a target mobile station at each location, (b) the identifiers for base stations that can detect a target mobile station at each location of A, but can not be detected by the target mobile station, and (c) the identifiers for base stations that can be detected by a target mobile station at each location of A, but these base stations can not detect the target mobile station. That is, two locations, $l_1$ and $l_2$ are identified as being in A if and only if the three sets of (a), (b), and (c) for $l_1$ are, respectively, identical to the three sets of (a), (b), and (c) for $l_2$.

Accordingly, assuming the partition $P_0$ is used, a description can be given as to how probabilities may be assigned as the confidence values of location hypotheses generated by the first order models 1224. For each partition area A, a first order model 1224 is supplied with wireless measurements of archived location data in the Location Signature Data Base associated with corresponding verified mobile station locations. Thus, a probability can be determined as to how likely the first order model is to generate a location hypothesis having a location estimate containing the corresponding verified mobile station location. Accordingly, a table of partition area probabilities can be determined for each first order model 1224. Thus, when a location hypothesis is generated and identified as belonging to one of the partition areas, the corresponding probability for that partition area may be assigned as the confidence value for the location hypothesis. The advantages to using actual probabilities here is that, as will be discussed below, the most likelihood estimator 1344 can compute a straightforward probability for each distinct intersection of the multiple location hypotheses generated by the multiple first order models, such that each such probability indicates a likelihood that the target mobile station is in the corresponding intersection.

Location Information Data Bases and Data
Location Data Bases Introduction

It is an aspect of the present disclosure that MS location processing performed by the location center/gateway 142 should become increasingly better at locating a target MS 140 both by (a) building an increasingly more detailed model of the signal characteristics of locations in the service area for the present disclosure, and also (b) by providing capabilities for the location center processing to adapt to environmental changes.

One way these aspects of the present disclosure are realized is by providing one or more data base management systems and data bases for:

(a) storing and associating wireless MS signal characteristics with known locations of MSs 140 used in providing the signal characteristics. Such stored associations may not only provide an increasingly better model of the signal characteristics of the geography of the service area, but also provide an increasingly better model of more changeable signal characteristic affecting environmental factors such as weather, seasons, and/or traffic patterns;

(b) adaptively updating the signal characteristic data stored so that it reflects changes in the environment of the service area such as, for example, a new high rise building or a new highway.

Referring again to FIG. 5 of the collective representation of these data bases is the location information data bases 1232. Included among these data bases is a data base for providing training and/or calibration data to one or more trainable/calibratable FOMs 1224, as well as an archival data base for archiving historical MS location information related to the performance of the FOMs. These data bases will be discussed as necessary hereinbelow. However, a further brief introduction to the archival data base is provided here. Accordingly, the term, "location signature data base" is used hereinafter to denote the archival data base and/or data base management system depending on the context of the discussion. The location signature data base (shown in, for example, FIG. 6 and labeled 1320) is a repository for wireless signal characteristic data derived from wireless signal communications between an MS 140 and one or more base stations 122, wherein the corresponding location of the MS 140 is known and also stored in the location signature data base 1320. More particularly, the location signature data base 1320 associates each such known MS location with the wireless signal characteristic data derived from wireless signal communications between the MS 140 and one or more base stations 122 at this MS location. Accordingly, it is an aspect of the present disclosure to utilize such historical MS signal location data for enhancing the correctness and/or confidence of certain location hypotheses as will be described in detail in other sections below.

Data Representations for the Location Signature Data Base

In one embodiment, there are four fundamental entity types (or object classes in an object oriented programming paradigm) utilized in the location signature data base 1320. Briefly, these data entities are described in the items (24.1) through (24.4) that follow:

(24.1) (verified) location signatures: Each such (verified) location signature describes the wireless signal characteristic measurements between a given base station (e.g., BS 122 or LBS 152) and an MS 140 at a (verified or known) location associated with the (verified) location signature. That is, a verified location signature corresponds to a location whose coordinates such as latitude-longitude coordinates are known, while simply a location signature may have a known or unknown location corresponding with it. Note that the term (verified) location signature is also denoted by the abbreviation, "(verified) loc sig" hereinbelow;

(24.2) (verified) location signature clusters: Each such (verified) location signature cluster includes a collection of (verified) location signatures corresponding to all the location signatures between a target MS 140 at a (possibly verified) presumed substantially stationary location and each BS (e.g., 122 or 152) from which the target MS 140 can detect the BS's pilot channel regardless of the classification of the BS in the target MS (i.e., for CDMA, regardless of whether a BS is in the MS's active, candidate or remaining base station sets, as one skilled in the art will understand). Note that for simplicity here, it is presumed that each location signature cluster has a single fixed primary base station to which the target MS 140 synchronizes or obtains its timing;

(24.3) "composite location objects (or entities)": Each such entity is a more general entity than the verified location signature cluster. An object of this type is a collection of (verified) location signatures that are associated with the same MS 140 at substantially the same location at the same time and each such loc sig is associated with a different base station. However, there is no requirement that a loc sig from each BS 122 for which the MS 140 can detect the BS's pilot channel is included in the "composite location object (or entity)"; and (24.4) MS location estimation data that includes MS location estimates output by one or more MS location estimating first order models 1224, such MS location estimate data is described in detail hereinbelow.

It is important to note that a loc sig is, in one embodiment, an instance of the data structure containing the signal characteristic measurements output by the signal filtering and normalizing subsystem also denoted as the signal processing subsystem 1220 describing the signals between: (i) a specific base station 122 (BS) and (ii) a mobile station 140 (MS), wherein the BS's location is known and the MS's location is assumed to be substantially constant (during a 2-5 second interval in one embodiment of the present disclosure), during communication with the MS 140 for obtaining a single instance of loc sig data, although the MS location may or may not be known. Further, for notational purposes, the BS 122 and the MS 140 for a loc sig hereinafter will be denoted the "BS associated with the loc sig", and the "MS associated with the loc sig" respectively. Moreover, the location of the MS 140 at the time the loc sig data is obtained will be denoted the "location associated with the loc sig" (this location possibly being unknown).

Note that additional description of this aspect of the present disclosure can be found in one of the following two copending U.S. patent applications which are incorporated herein by reference: (a) "Location Of A Mobile Station" filed Nov. 24, 1999 having application Ser. No. 09/194,367 whose inventors are D. J. Dupray and C. L. Karr, and (b) "A Wireless Location System For Calibrating Multiple Location Estimators" filed Oct. 21, 1998 having application Ser. No. 09/176,587 whose inventor is D. J. Dupray, wherein these copending patent applications may have essential material for the present specification. In particular, these copending patent applications may have essential material relating to the location signature data base 1320.

Location Center Architecture

Overview of Location Center/Gateway Functional Components

Figure 5:
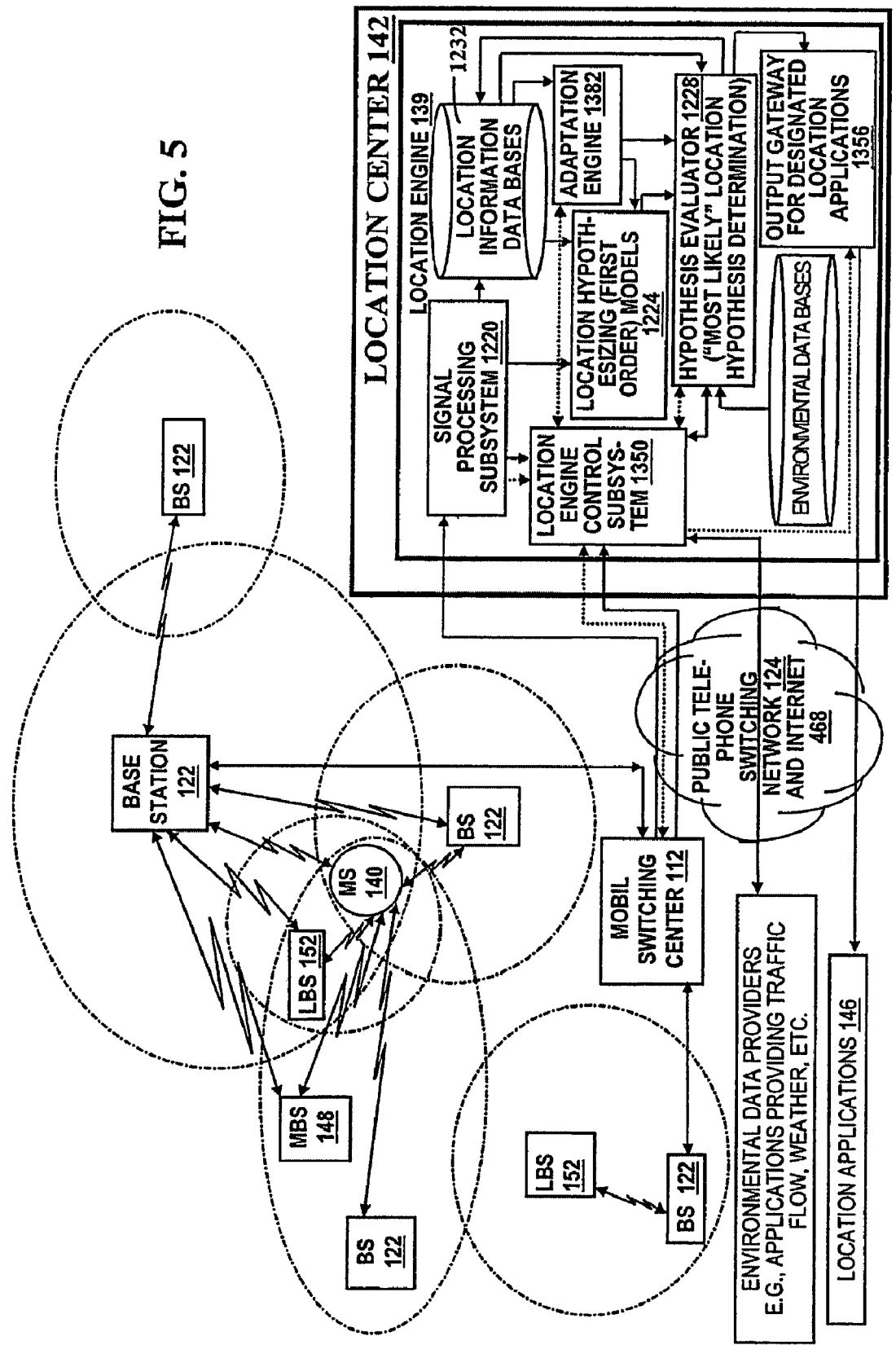
FIG. 5 is a high level block diagram of an embodiment of the present disclosure for locating a mobile station (MS) within a radio coverage area for an embodiment of the present disclosure.

FIG. 5 presents a high level diagram of an embodiment of the location center/gateway 142 and the location engine 139 in the context of the infrastructure for the entire location system of the present disclosure.

It is important to note that the architecture for the location center/gateway 142 and the location engine 139 provided by the present disclosure is designed for extensibility and flexibility so that MS 140 location accuracy and reliability may be enhanced as further location data become available and as enhanced MS location techniques become available. In addressing the design goals of extensibility and flexibility, the high level architecture for generating and processing MS location estimates may be considered as divided into the following high level functional groups described hereinbelow.

Figure 8:
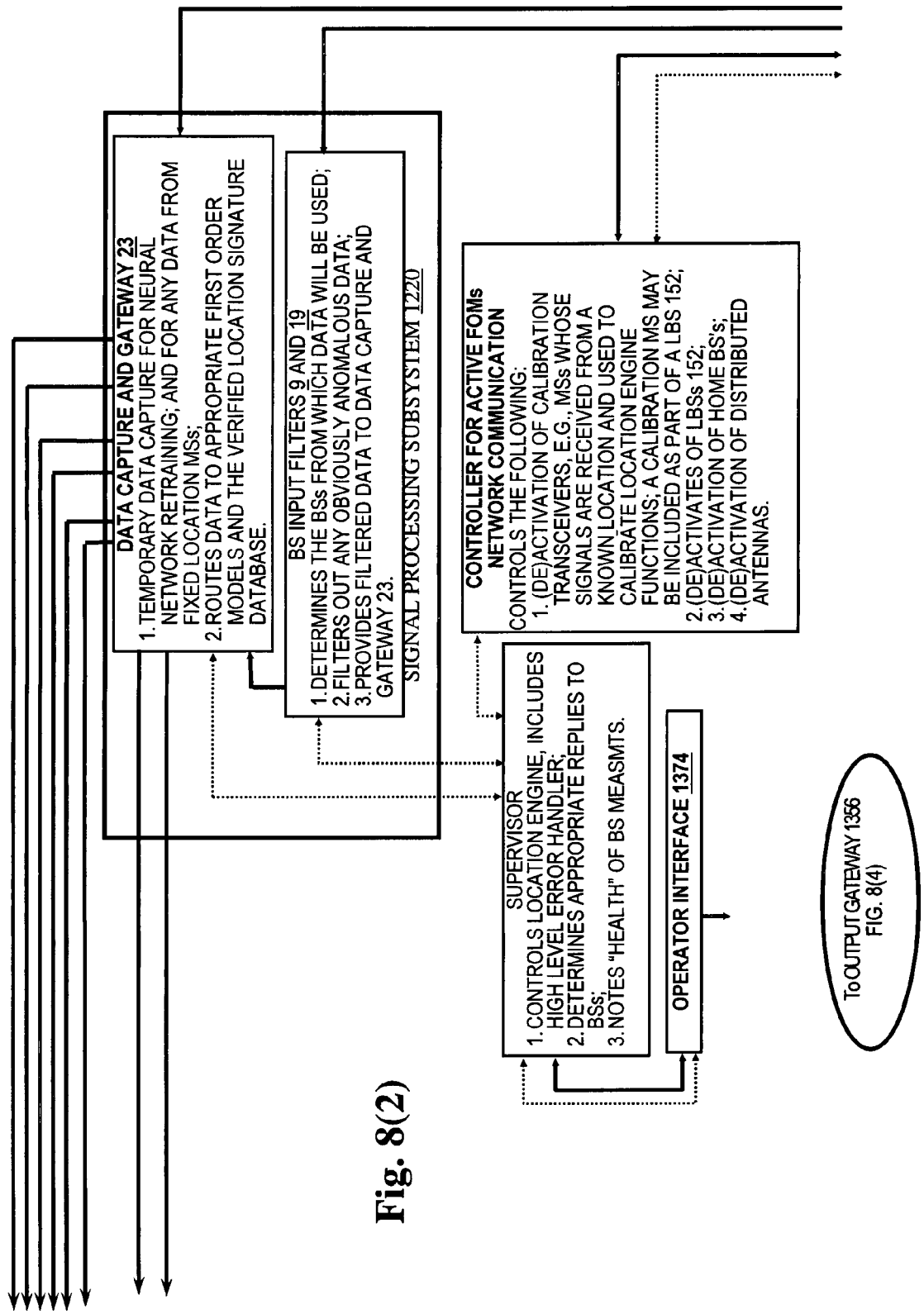
FIG. 8 is a substantially comprehensive high level block diagram illustrating data and control flows between the components of (and/or accessed by) the location center/gateway 142, as well the functionality of these components.
Figure 8:
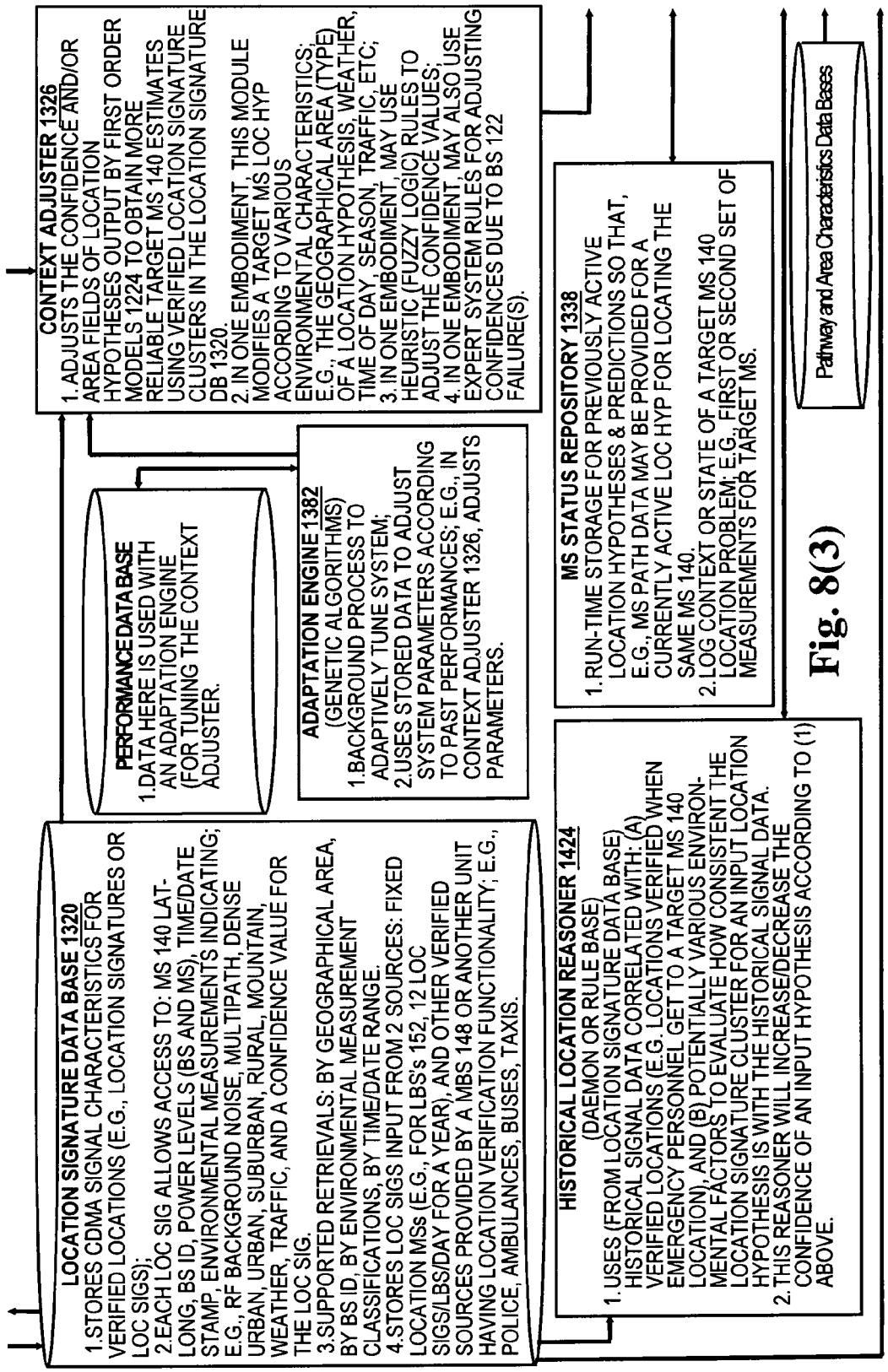
Figure 8:
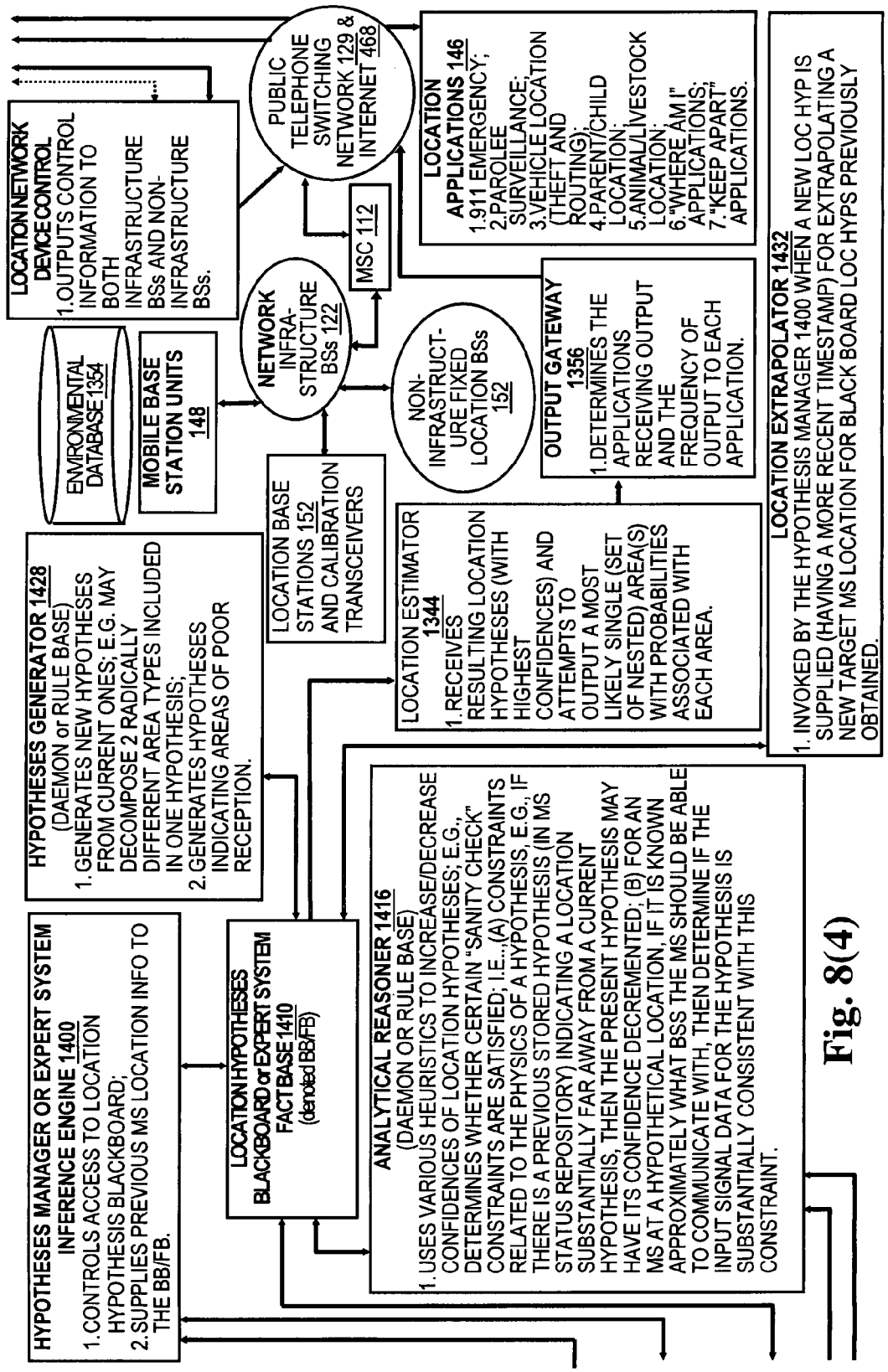
Figure 10:
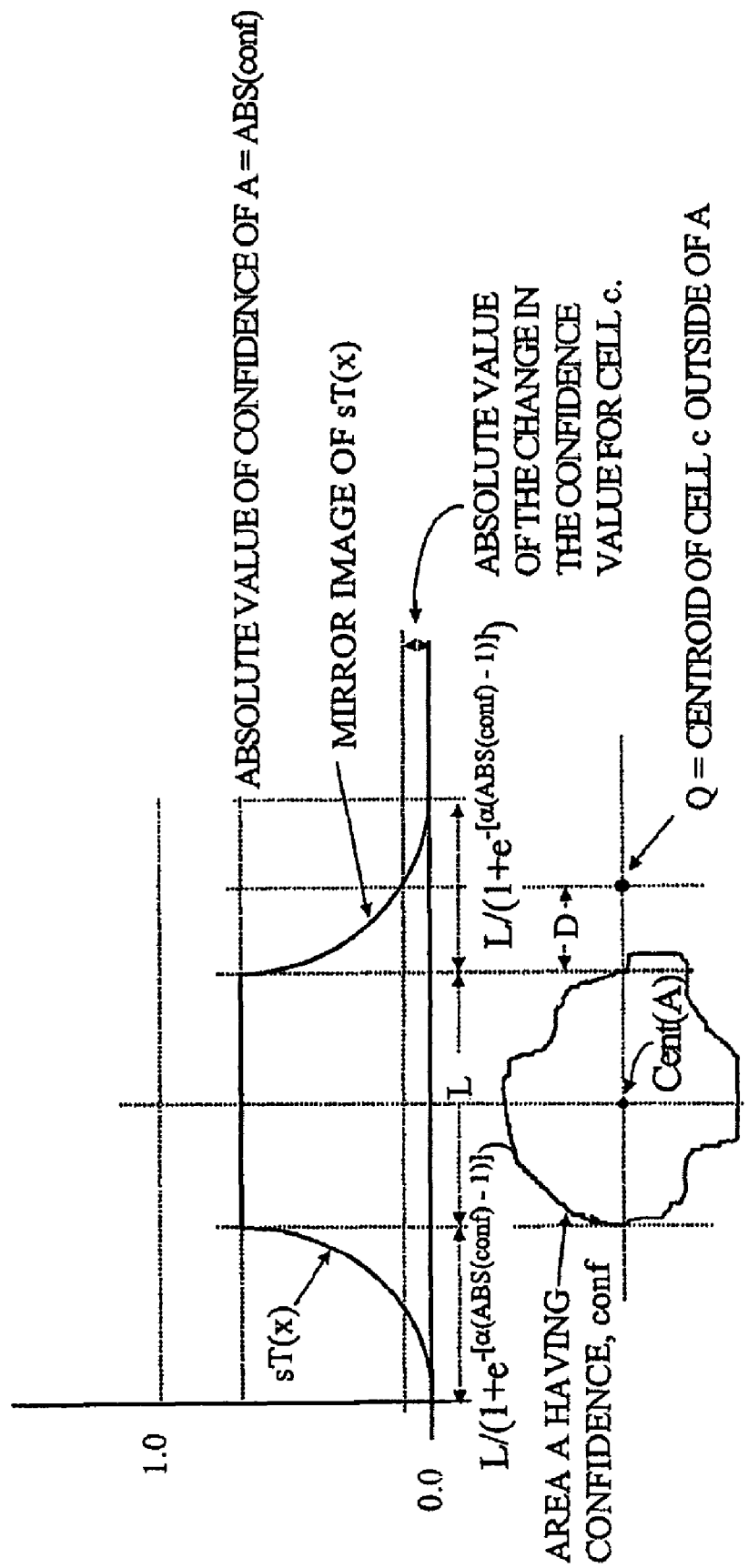
FIG. 10 is a graphical illustration of the computation performed by the most likelihood estimator 1344 of the hypothesis evaluator.

Low Level Wireless Signal Processing Subsystem for Receiving and Conditioning Wireless Signal Measurements A first functional group of location engine 139 modules is for performing signal processing and filtering of MS location signal data received from a conventional wireless (e.g., CDMA) infrastructure, as discussed in the steps (23.1) and (23.2) above. This group is denoted the signal processing subsystem 1220 herein. One embodiment of such a subsystem is described in the U.S. copending patent application titled, "Wireless Location Using A Plurality of Commercial Network Infrastructures," by F. W. LeBlanc, Dupray and Karr filed Jan. 22, 1999 and having U.S. Pat. No. 6,236,365. Note that this U.S. patent is incorporated herein entirely by reference Initial Location Estimators: First Order Models A second functional group of modules at least accessible by the location engine 139 are the FOM 1224 for generating various target MS 140 location initial estimates, as described in step (23.3). A brief description of some types of first order models is provided immediately below. Note that FIG. 8 illustrates another, more detail view of an embodiment of the location center/gateway 142 for the present disclosure. In particular, this figure illustrates some of the FOMs 1224 at least accessible (but not necessarily co-located with the other location center/gateway modules shown in this figure), and additionally illustrates the primary communications with other modules of the gateway. However, it is important to note that the present disclosure is not limited to the FOMs 1224 shown and discussed herein. That is, it is a primary aspect of the present disclosure to easily incorporate FOMs using other signal processing and/or computational location estimating techniques than those presented herein. Further, note that each FOM type may have a plurality of its MS location estimating models (at least) accessible by the gateway 142.

For example, (as will be described in further detail below), one such type of model or FOM 1224 (hereinafter models of this type are referred to as "terrestrial communication station offset (TCSO) models" or "terrestrial communication station offset (TCSO) first order models", or "terrestrial communication station offset (TCSO) FOMs") may be based on a range, offset, and/or distance computation such as on a base station signal reception angle determination between the target MS 140 from each of one or more base stations. Basically, such TCSO models 1224 determine a location estimate of the target MS 140 by determining an offset from each of one or more base stations 122, possibly in a particular direction from each (some of) the base stations, so that, e.g., an intersection of each area locus defined by the base station offsets may provide an estimate of the location of the target MS. TCSO FOMs 1224 may compute such offsets based on, e.g.:

(a) signal timing measurements between the target mobile station 140 and one or more base stations 122; e.g., timing measurements such as time difference of arrival (TDOA), or time of arrival (TOA). Note that both forward and reverse signal path timing measurements may be utilized;

(b) signal strength measurements (e.g., relative to power control settings of the MS 140 and/or one or more BS 122); and/or (c) signal angle of arrival measurements, or ranges thereof, at one or more base stations 122 (such angles and/or angular ranges provided by, e.g., base station antenna sectors having angular ranges of 120° or 60°, or, so called "SMART antennas" with variable angular transmission ranges of 2° to 120°).

Accordingly, a terrestrial communication station offset (TCSO) model may utilize, e.g., triangulation or trilateration to compute a location hypothesis having either an area location or a point location for an estimate of the target MS 140. Additionally, in some embodiments location hypothesis may include an estimated error.

Another type of FOM 1224 is a statistically based first order model 1224, wherein a statistical technique, such as regression techniques (e.g., least squares, partial least squares, principle decomposition), or e.g., Bollenger Bands (e.g., for computing minimum and maximum base station offsets). In general, models of this type output location hypotheses determined by performing one or more statistical techniques or comparisons between the verified location signatures in location signature data base 1320, and the wireless signal measurements from a target MS. Models of this type are also referred to hereinafter as a "stochastic signal (first order) model" or a "stochastic FOM" or a "statistical model." Of course, statistically based FOMs may be a hybrid combination with another type of FOM such as a TCSO FOM.

Still another type of FOM 1224 is an adaptive learning model, such as an artificial neural net or a genetic algorithm, wherein the FOM may be trained to recognize or associate each of a plurality of locations with a corresponding set of signal characteristics for communications between the target MS 140 (at the location) and the base stations 122. Moreover, typically such a FOM is expected to accurately interpolate/extrapolate target MS 140 location estimates from a set of signal characteristics from an unknown target MS 140 location. Models of this type are also referred to hereinafter variously as "artificial neural net models" or "neural net models" or "trainable models" or "learning models." Note that a related type of FOM 1224 is based on pattern recognition. These FOMs can recognize patterns in the signal characteristics of communications between the target MS 140 (at the location) and the base stations 122 and thereby estimate a location area of the target MS. However, such FOMs may not be trainable.

Yet another type of FOM 1224 can be based on a collection of dispersed low power, low cost fixed location wireless transceivers (also denoted "location base stations 152" hereinabove) that are provided for detecting a target MS 140 in areas where, e.g., there is insufficient base station 122 infrastructure coverage for providing a desired level of MS 140 location accuracy. For example, it may uneconomical to provide high traffic wireless voice coverage of a typical wireless base station 122 in a nature preserve or at a fair ground that is only populated a few days out of the year. However, if such low cost location base stations 152 can be directed to activate and deactivate via the direction of a FOM 1224 of the present type, then these location base stations can be used to both location a target MS 140 and also provide indications of where the target MS is not. For example, if there are location base stations 152 populating an area where the target MS 140 is presumed to be, then by activating these location base stations 152, evidence may be obtained as to whether or not the target MS is actually in the area; e.g., if the target MS 140 is detected by a location base station 152, then a corresponding location hypothesis having a location estimate corresponding to the coverage area of the location base station may have a very high confidence value. Alternatively, if the target MS 140 is not detected by a location base station 152, then a corresponding location hypothesis having a location estimate corresponding to the coverage area of the location base station may have a very low confidence value. Models of this type are referred to hereinafter as "location base station models."

Yet another type of FOM 1224 can be based on input from a mobile base station 148, wherein location hypotheses may be generated from target MS 140 location data received from the mobile base station 148.

Still other types of FOM 1224 can be based on various techniques for recognizing wireless signal measurement patterns and associating particular patterns with locations in the coverage area 120. For example, artificial neural networks or other learning models can used as the basis for various FOMs.

Note that the FOM types mentioned here as well as other FOM types are discussed in detail hereinbelow. Moreover, it is important to keep in mind that in one embodiment of the present disclosure, the substantially simultaneous use or activation of a potentially large number of such first order models 1224, may be able to enhance both the reliability of location estimates and the accuracy of such estimates. Additionally, note that in some embodiments of the present disclosure, the first order models 1224 can be activated when appropriate signal measurements are obtained. For example, a TDOA FOM may be activated when only a single signal time delay measurement is obtained from some plurality of base station 122. However, if, for instance, additional time delay values are obtained (and assuming such additional values are necessary), then one or more wireless signal pattern matching FOM may also be activated in conjunction with the TDOA FOM. Additionally, a FOM using satellite signals (e.g., GPS) to perform a triangulation may be activated whenever appropriate measurements are received regardless of whether additional FOMs are capable of being substantially simultaneously activated or not. Accordingly, since such satellite signal FOMs are generally more accurate, output from such a FOM may dominate any other previous or simultaneous estimates unless there is evidence to the contrary.

Moreover, the present disclosure provides a framework for incorporating MS location estimators to be subsequently provided as new FOMs in a straightforward manner. For example, a FOM 1224 based on wireless signal time delay measurements from a distributed antenna system for wireless communication may be incorporated into embodiments of the present disclosure for thereby locating a target MS 140 in an enclosed area serviced by the distributed antenna system. Accordingly, by using such a distributed antenna FOM, embodiments of the present disclosure may determine the floor of a multi-story building from which a target MS is transmitting. Thus, MSs 140 can be located in three dimensions using such a distributed antenna FOM. Additionally, FOMs for detecting certain registration changes within, for example, a public switched telephone network can also be used for locating a target MS 140. For example, for some MSs 140 there may be an associated or dedicated device for each such MS that allows the MS to function as a cordless phone to a line based telephone network when the device detects that the MS is within signaling range. In one use of such a device (also denoted herein as a "home base station"), the device registers with a home location register of the public switched telephone network when there is a status change such as from not detecting the corresponding MS to detecting the MS, or visa versa, as one skilled in the art will understand. Accordingly, by providing a FOM that accesses the MS status in the home location register, the location engine 139 can determine whether the MS is within signaling range of the home base station or not, and generate location hypotheses accordingly. Moreover, other FOMs based on, for example, chaos theory and/or fractal theory are also within the scope of the present disclosure.

It is important to note the following aspects of the present disclosure relating to FOMs 1224:

(28.1) Each such first order model 1224 may be relatively easily incorporated into and/or removed from embodiments of the present disclosure. For example, assuming that the signal processing subsystem 1220 provides uniform input to the FOMs, and there is a uniform FOM output interface (e.g., API), it is believed that a large majority (if not substantially all) viable MS location estimation strategies may be accommodated. Thus, it is straightforward to add or delete such FOMs 1224.

(28.2) First order models 1224 may be relatively simple and still provide significant MS 140 locating functionality and predictability. For example, much of what is believed to be common or generic MS location processing has been coalesced into, for example: a location hypothesis evaluation subsystem, denoted the hypotheses evaluator 1228 and described immediately below. Thus, embodiments of the present disclosure can be modular and extensible such that, for example, (and importantly) different first order models 1224 may be utilized depending on the signal transmission characteristics of the geographic region serviced by an embodiment of the present disclosure. Thus, a simple configuration of the present disclosure may have (or access) a small number of FOMs 1224 for a simple wireless signal environment (e.g., flat terrain, no urban canyons and low population density). Alternatively, for complex wireless signal environments such as in cities like San Francisco, Tokyo or New York, a large number of FOMs 1224 may be simultaneously utilized for generating MS location hypotheses.

An Introduction to an Evaluator for Location Hypotheses: Hypothesis Evaluator

A third functional group of location engine 139 modules evaluates location hypotheses output by the first order models 1224 and thereby provides a "most likely" target MS location estimate. The modules for this functional group are collectively denoted the hypothesis evaluator 1228.

Hypothesis Evaluator

A primary purpose of the hypothesis evaluator 1228 is to mitigate conflicts and ambiguities related to location hypotheses output by the first order models 1224 and thereby output a "most likely" estimate of an MS for which there is a request for it to be located. In providing this capability, there are various related embodiments of the hypothesis evaluator that are within the scope of the present disclosure. Since each location hypothesis includes both an MS location area estimate and a corresponding confidence value indicating a perceived confidence or likelihood of the target MS being within the corresponding location area estimate, there is a monotonic relationship between MS location area estimates and confidence values. That is, by increasing an MS location area estimate, the corresponding confidence value may also be increased (in an extreme case, the location area estimate could be the entire coverage area 120 and thus the confidence value may likely correspond to the highest level of certainty; i.e., +1.0). Accordingly, given a target MS location area estimate (of a location hypothesis), an adjustment to its accuracy may be performed by adjusting the MS location area estimate and/or the corresponding confidence value. Thus, if the confidence value is, for example, excessively low then the area estimate may be increased as a technique for increasing the confidence value. Alternatively, if the estimated area is excessively large, and there is flexibility in the corresponding confidence value, then the estimated area may be decreased and the confidence value also decreased. Thus, if at some point in the processing of a location hypothesis, if the location hypothesis is judged to be more (less) accurate than initially determined, then (i) the confidence value of the location hypothesis may be increased (decreased), and/or (ii) the MS location area estimate can be decreased (increased). Moreover, note that when the confidence values are probabilities, such adjustments are may require the reactivation of one or more FOMs 1224 with requests to generate location hypotheses having location estimates of different sizes. Alternatively, adjuster modules 1436 and/or 1440 (FIG. 16 discussed hereinbelow) may be invoked for generating location hypotheses having area estimates of different sizes. Moreover, the confidence value on such an adjusted location hypothesis (actually a new location hypothesis corresponding to the originally generated hypothesis) may also be a probability in that combinations of FOMs 1224 and adjuster modules 1436 and 1440 can also be calibrated for thereby yielding probabilities as confidence values to the resulting location hypotheses.

In a first class of embodiments (typically wherein the confidence values are not maintained as probabilities), the hypothesis evaluator 1228 evaluates location hypotheses and adjusts or modifies only their confidence values for MS location area estimates and subsequently uses these MS location estimates with the adjusted confidence values for determining a "most likely" MS location estimate for outputting. Alternatively, in a second class of embodiments for the hypothesis evaluator 1228 (also typically wherein the confidence values are not maintained as probabilities), MS location area estimates can be adjusted while confidence values remain substantially fixed. However, in one preferred embodiment of the present embodiment, both location hypothesis area estimates and confidence values are modified.

The hypothesis evaluator 1228 may perform any or most of the following tasks depending on the embodiment of the hypothesis evaluator. That is, (30.1) it may enhance the accuracy of an initial location hypothesis generated by an FOM by using the initial location hypothesis as, essentially, a query or index into the location signature data base 1320 for obtaining one or more corresponding enhanced location hypotheses, wherein the enhanced location hypotheses have both an adjusted target MS location area estimates and an adjusted confidences based on past performance of the FOM in the location service surrounding the target MS location estimate of the initial location hypothesis;

Additionally, for embodiments of the hypothesis evaluator 1228 wherein the confidence values for location hypotheses are not maintained as probabilities, the following additional tasks (30.2) through (30.7) may be performed:

(30.2) the hypothesis evaluator 1228 may utilize environmental information to improve and reconcile location hypotheses supplied by the first order models 1224. A basic premise in this context is that the accuracy of the individual first order models may be affected by various environmental factors such as, for example, the season of the year, the time of day, the weather conditions, the presence of buildings, base station failures, etc.;

(30.3) the hypothesis evaluator 1228 may determine how well the associated signal characteristics used for locating a target MS compare with particular verified loc sigs stored in the location signature data base 1320 (see the location signature data base section for further discussion regarding this aspect of the disclosure). That is, for a given location hypothesis, verified loc sigs (which were previously obtained from one or more verified locations of one or more MS's) are retrieved for an area corresponding to the location area estimate of the location hypothesis, and the signal characteristics of these verified loc sigs are compared with the signal characteristics used to generate the location hypothesis for determining their similarities and subsequently an adjustment to the confidence of the location hypothesis (and/or the size of the location area estimate);

(30.4) the hypothesis evaluator 1228 may determine if (or how well) such location hypotheses are consistent with well known physical constraints such as the laws of physics. For example, if the difference between a previous (most likely) location estimate of a target MS and a location estimate by a current location hypothesis requires the MS to:

(a1) move at an unreasonably high rate of speed (e.g., 200 mph), or (b1) move at an unreasonably high rate of speed for an area (e.g., 80 mph in a corn patch), or (c1) make unreasonably sharp velocity changes (e.g., from 60 mph in one direction to 60 mph in the opposite direction in 4 sec), then the confidence in the current Location Hypothesis is likely to be reduced.

Alternatively, if for example, the difference between a previous location estimate of a target MS and a current location hypothesis indicates that the MS is:

(a2) moving at an appropriate velocity for the area being traversed, or (b2) moving along an established path (e.g., a freeway), then the confidence in the current location hypothesis may be increased.

(30.5) the hypothesis evaluator 1228 may determine consistencies and inconsistencies between location hypotheses obtained from different first order models. For example, if two such location hypotheses, for substantially the same timestamp, have estimated location areas where the target MS is likely to be and these areas substantially overlap, then the confidence in both such location hypotheses may be increased. Additionally, note that a velocity of an MS may be determined (via deltas of successive location hypotheses from one or more first order models) even when there is low confidence in the location estimates for the MS, since such deltas may, in some cases, be more reliable than the actual target MS location estimates;

(30.6) the hypothesis evaluator 1228 determines new (more accurate) location hypotheses from other location hypotheses. For example, this module may generate new hypotheses from currently active ones by decomposing a location hypothesis having a target MS location estimate intersecting two radically different wireless signaling area types. Additionally, this module may generate location hypotheses indicating areas of poor reception; and (30.7) the hypothesis evaluator 1228 determines and outputs a most likely location hypothesis for a target MS.

Note that additional description of the hypothesis evaluator 1228 can be found in one of the following two copending U.S. patent applications which are incorporated herein by reference: (a) "Location Of A Mobile Station" filed Nov. 24, 1999 having application Ser. No. 09/194,367 whose inventors are D. J. Dupray and C. L. Karr, and (b) "A Wireless Location System For Calibrating Multiple Location Estimators" filed Oct. 21, 1998 having application Ser. No. 09/176,587 whose inventor is D. J. Dupray, wherein these copending patent applications may have essential material for the present specification. In particular, these copending patent applications may have essential material relating to their descriptions of the hypothesis evaluator.

Context Adjuster Introduction.

The context adjuster (alternatively denoted "location adjuster modules) 1326 module enhances both the comparability and predictability of the location hypotheses output by the first order models 1224. In one embodiment (typically where confidence values of location hypotheses are not maintained as probabilities), this module modifies location hypotheses received from the FOMs 1224 so that the resulting location hypotheses output by the context adjuster 1326 may be further processed uniformly and substantially without concern as to differences in accuracy between the first order models from which location hypotheses originate. Further, embodiments of the context adjuster may determine those factors that are perceived to impact the perceived accuracy (e.g., confidence) of the location hypotheses. For instance, environmental characteristics may be taken into account here, such as time of day, season, month, weather, geographical area categorizations (e.g., dense urban, urban, suburban, rural, mountain, etc.), area subcategorizations (e.g., heavily treed, hilly, high traffic area, etc.).

Figure 16:
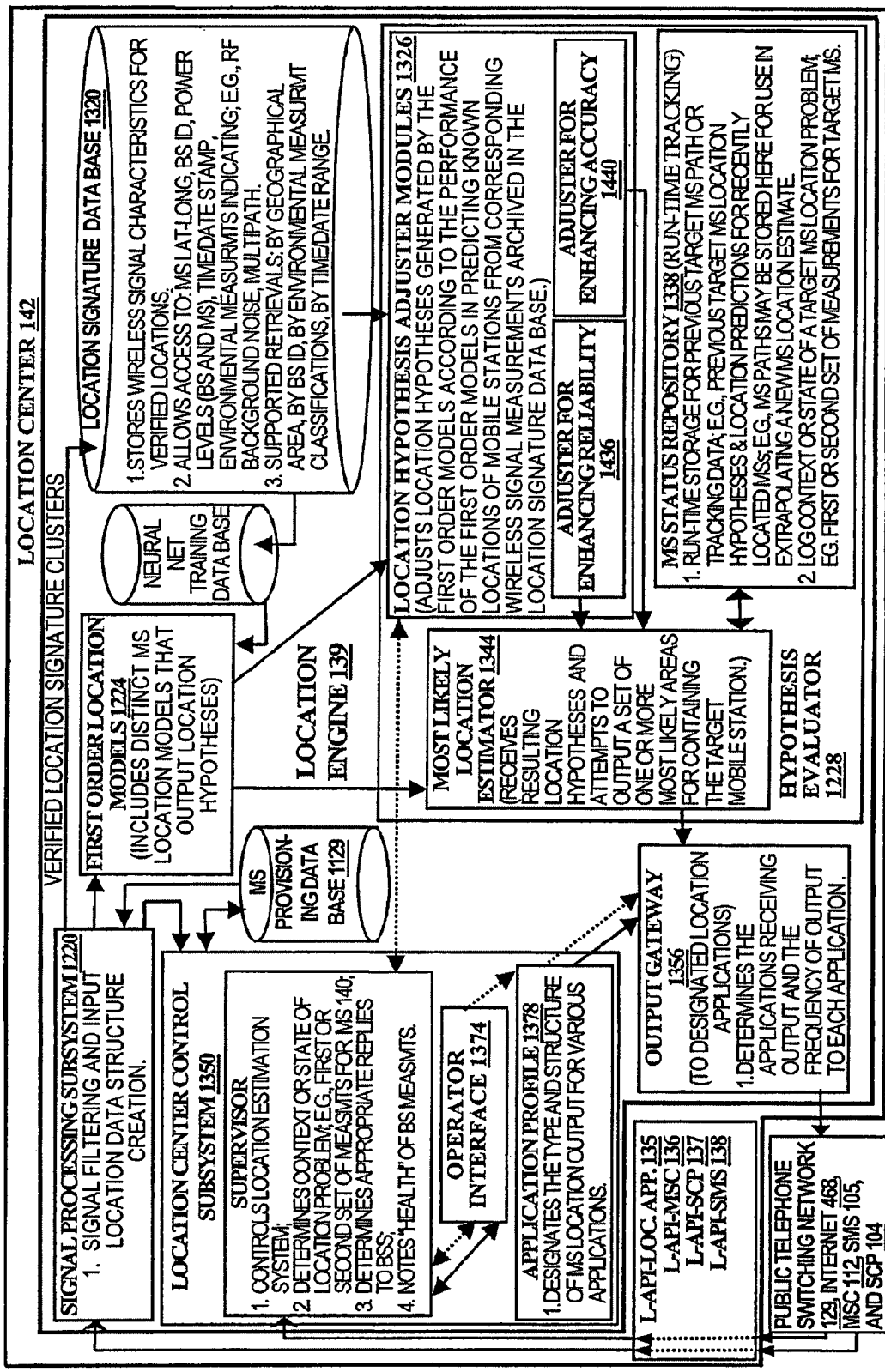
FIG. 16 illustrates another embodiment of the location engine 139, wherein the context adjuster 1326 (denoted in this figure as "location hypothesis adjuster modules") includes a module (1436) that is capable of adjusting location hypotheses for reliability, and another module (1440) that is capable of adjusting location hypotheses for accuracy.

In FIG. 16, two such adjuster modules are shown, namely, an adjuster for enhancing reliability 1436 and an adjuster for enhancing accuracy 1440. Both of these adjusters perform their location hypothesis adjustments in the manner described above. The difference between these two adjuster modules 1436 and 1440 is primarily the size of the localized area "nearby" the newly generated location estimate. In particular, since it is believed that the larger (smaller) the localized nearby area is, the more likely (less likely) the corresponding adjusted image is to contain the target mobile station location, the adjuster for enhancing reliability 1436 may determine its localized areas "nearby" a newly generated location estimate as, for example, having a 40% larger diameter (alternatively, area) than the location area estimate generated by a first order model 1224. Alternatively, the adjuster for enhancing accuracy 1444 may determine its localized areas "nearby" a newly generated location estimate as, for example, having a 30% smaller diameter (alternatively, area) than the location area estimate generated by a first order model 1224. Thus, each newly generated location hypothesis can potentially be used to derive at least two additional adjusted location hypotheses with some of these adjusted location hypotheses being more reliable and some being more accurate than the location hypotheses generated directly from the first order models 1224.

Note that additional description of context adjuster aspects of the present disclosure can be found in the following two copending U.S. patent applications which are incorporated herein by reference: (a) "Location Of A Mobile Station" filed Nov. 24, 1999 having application Ser. No. 09/194,367 whose inventors are D. J. Dupray and C. L. Karr, and (b) "A Wireless Location System For Calibrating Multiple Location Estimators" filed Oct. 21, 1998 having application Ser. No. 09/176,587 whose inventor is D. J. Dupray, wherein these copending patent applications may have essential material for the present specification. In particular, these copending patent applications may have essential material relating to the context adjuster 1326.

MS Status Repository Introduction

The MS status repository 1338 is a run-time storage manager for storing location hypotheses from previous activations of the location engine 139 (as well as for storing the output "most likely" target MS location estimate(s)) so that a target MS 140 may be tracked using target MS location hypotheses from previous location engine 139 activations to determine, for example, a movement of the target MS 140 between evaluations of the target MS location.

Location Hypothesis Analyzer Introduction

The location hypothesis analyzer 1332, may adjust confidence values of the location hypotheses, according to:
(a) heuristics and/or statistical methods related to how well the signal characteristics for the generated target MS location hypothesis matches with previously obtained signal characteristics for verified MS locations.
(b) heuristics related to how consistent the location hypothesis is with physical laws, and/or highly probable reasonableness conditions relating to the location of the target MS and its movement characteristics. For example, such heuristics may utilize knowledge of the geographical terrain in which the MS is estimated to be, and/or, for instance, the MS velocity, acceleration or extrapolation of an MS position, velocity, or acceleration.
(c) generation of additional location hypotheses whose MS locations are consistent with, for example, previous estimated locations for the target MS.

Note that additional description of this aspect of the present disclosure can be found in one of the following copending U.S. patent application which is incorporated herein by reference: "Location Of A Mobile Station" filed Nov. 24, 1999 having application Ser. No. 09/194,367 whose inventors are D. J. Dupray and C. L. Karr.

Most Likelihood Estimator

The most likelihood estimator 1344 is a module for determining a "most likely" location estimate for a target MS being located by the location engine 139. The most likelihood estimator 1344 receives a collection of active or relevant location hypotheses from the hypothesis analyzer 1332 and uses these location hypotheses to determine one or more most likely estimates for the target MS 140.

There are various embodiments of the most likelihood estimator 1344 that may be utilized with embodiments of the present disclosure. One such embodiment will now be described. At a high level, an area of interest is first determined which contains the target MS 140 whose location is desired. This can be straightforwardly determined by identifying the base stations 122 that can be detected by the target MS 140 and/or the base stations 140 that can detect the target MS. Subsequently, assuming that this area of interest has been previously partitioned into "cells" (e.g., small rectangular areas of, for example, 50 to 200 feet per side) and that the resulting location hypotheses for estimating the location of the target MS 140 each have a likelihood probability associated therewith, then for each such location hypothesis, a probability (more generally confidence value) is capable of being assigned to each cell intersecting and/or included in the associated target MS location estimate. In particular, for each location hypothesis, a portion of the probability value, P, for the associated location estimate, A, can be assigned to each cell, C, intersecting the estimate. One simple way to perform this is to divide P by the number of cells C, and increment, for each cell C, a corresponding probability indicative of the target MS 140 being in C with the result from the division. One skilled in the art will readily recognize numerous other ways of incrementing such cell probabilities, including: providing a Gaussian or other probabilistic distribution of probability values according to, e.g., the distance of the cell from the centroid of the location estimate. Accordingly, assuming all such probability increments have been assigned to all such cells C from all location hypotheses generated for locating the target MS 140, then the following is one embodiment of a program for determining one or more most likely locations of the target MS.

```
Desired_rel ← get the desired reliability for the resulting location estimate;
Max_size ← get the desired maximum extent for the resulting location estimate;
Binned_cells ← sort the cells of the area of interest by their probabilities into bins where each
              successive bin includes those cells whose confidence values are within a smaller
              (non-overlapping) range from that of any preceding bin. Further, assume there
              are, e.g., 100 bins B_I wherein B_1 has cells with confidences within the range [0,
              0.1], and B_I has cells with confidences within the range [(i − 1) * 0.01, i * 0.01].
Result ← nil;
Curr_rel ← 0; /* current likelihood of target MS 140 being in the area represented by "Result" */
Done ← FALSE;
Repeat
    Cell_bin ← get first (next) bin of cells from Binned_cells;
    While (there are cells in Cell_bin) do
        Curr_cell ← get a next cell from Cell_bin that is closest to the centroid of
                "Result";
        Result ← Result + Curr_cell;
        /* now determine a new reliability value corresponding to adding "Curr_cell" to
           the most likely location estimate being built in "Result" */
        Curr_rel ← Curr_rel + confidence_of_MS_in(Curr_cell);
        If (Curr_rel > Desired_rel) then
            Done ← TRUE;
Until Done;
/* reliability that the target MS is in "Result" is sufficient */
Curr_size ← current maximum geographic extent (i.e., dimension) of the area represented by
            "Result";
If (Curr_size <= Max_size) then output(Result);
Else Determine whether "Result" has one or more outlying cells that can be replaced by other cells
     closer to the centroid of "Result" and still have a reliability >= "Desired_rel";
    If (there are replaceable outlier cells) then
        replace them in Result and output(Result);
    Else output(Result);
```

Note that numerous similar embodiments of the above program maybe used, as one skilled in the art will understand. For instance, instead of "building" Result as provided in the above program, Result can be "whittled" from the area of interest. Accordingly, Result would be initialized to the entire area of interest, and cells would be selected for removal from Result. Additionally, note that the above program determines a fast approximation to the optimal most likely area containing the target MS 140 having at least a particular desired confidence. However, a similar program may be readily provided where a most likely area having less than a desired extent or dimension is output; e.g., such a program would could be used to provide an answer to the question: "What city block is the target MS most likely in?"

Additionally, note that a center of gravity type of computation for obtaining the most likely location estimate of the target MS 140 may be used as described in U.S. Pat. No. 5,293,642 ('642 patent) filed Dec. 19, 1990 having an issue data of Mar. 8, 1994 with inventor Lo which is incorporated by reference herein.

Still referring to the hypothesis evaluator 1228, it is important to note that not all the above mentioned modules are required in all embodiments of the present disclosure. In particular, the hypothesis analyzer 1332 may be unnecessary. Accordingly, in such an embodiment, the enhanced location hypotheses output by the context adjuster 1326 are provided directly to the most likelihood estimator 1344.

Control and Output Gating Modules

A fourth functional group of location engine 139 modules is the control and output gating modules which includes the location center control subsystem 1350, and the output gateway 1356. The location control subsystem 1350 provides the highest level of control and monitoring of the data processing performed by the location center 142. In particular, this subsystem performs the following functions:

(a) controls and monitors location estimating processing for each target MS 140. Note that this includes high level exception or error handling functions;

(b) receives and routes external information as necessary. For instance, this subsystem may receive (via, e.g., the public telephone switching network and Internet 468) such environmental information as increased signal noise in a particular service area due to increase traffic, a change in weather conditions, a base station 122 (or other infrastructure provisioning), change in operation status (e.g., operational to inactive);

(c) receives and directs location processing requests from other location centers 142 (via, e.g., the Internet);

(d) performs accounting and billing procedures such as billing according to MS location accuracy and the frequency with which an MS is located;

(e) interacts with location center operators by, for example, receiving operator commands and providing output indicative of processing resources being utilized and malfunctions;

(f) provides access to output requirements for various applications requesting location estimates. For example, an Internet location request from a trucking company in Los Angeles to a location center 142 in Denver may only want to know if a particular truck or driver is within the Denver area. Alternatively, a local medical rescue unit is likely to request a precise a location estimate as possible.

Figure 6:
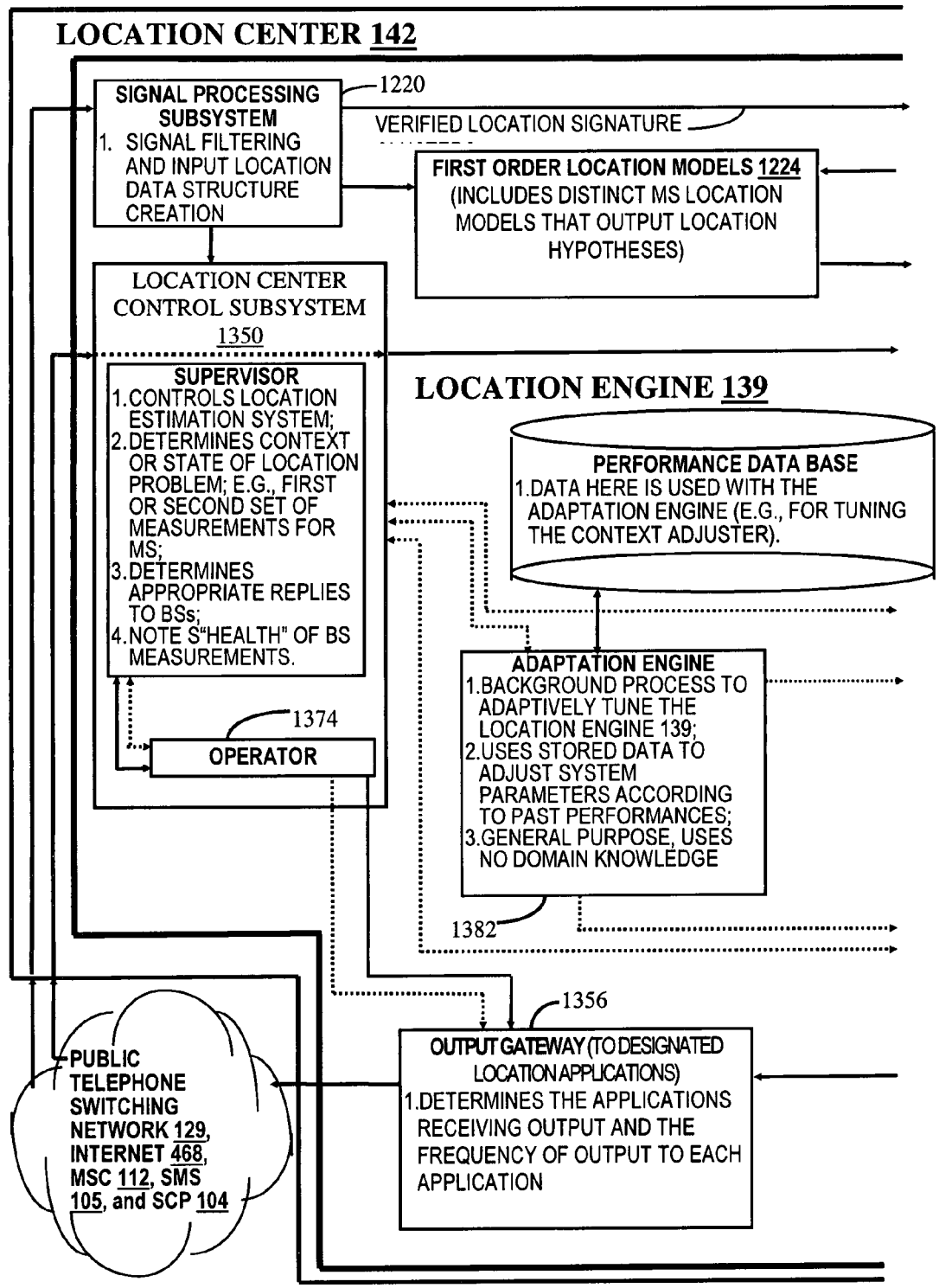
FIG. 6 is a high level block diagram of the location center 142.
Figure 6:
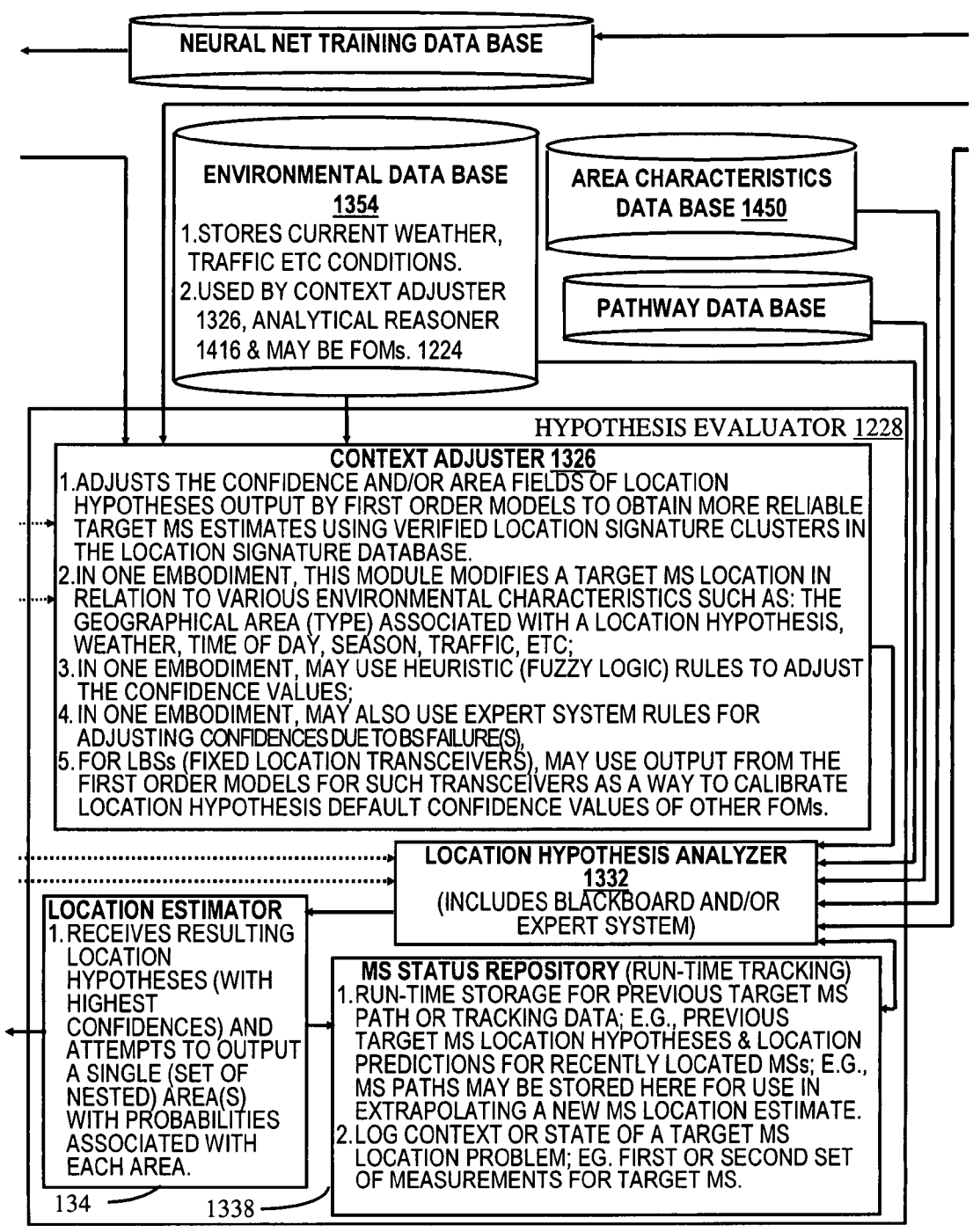
Figure 6:
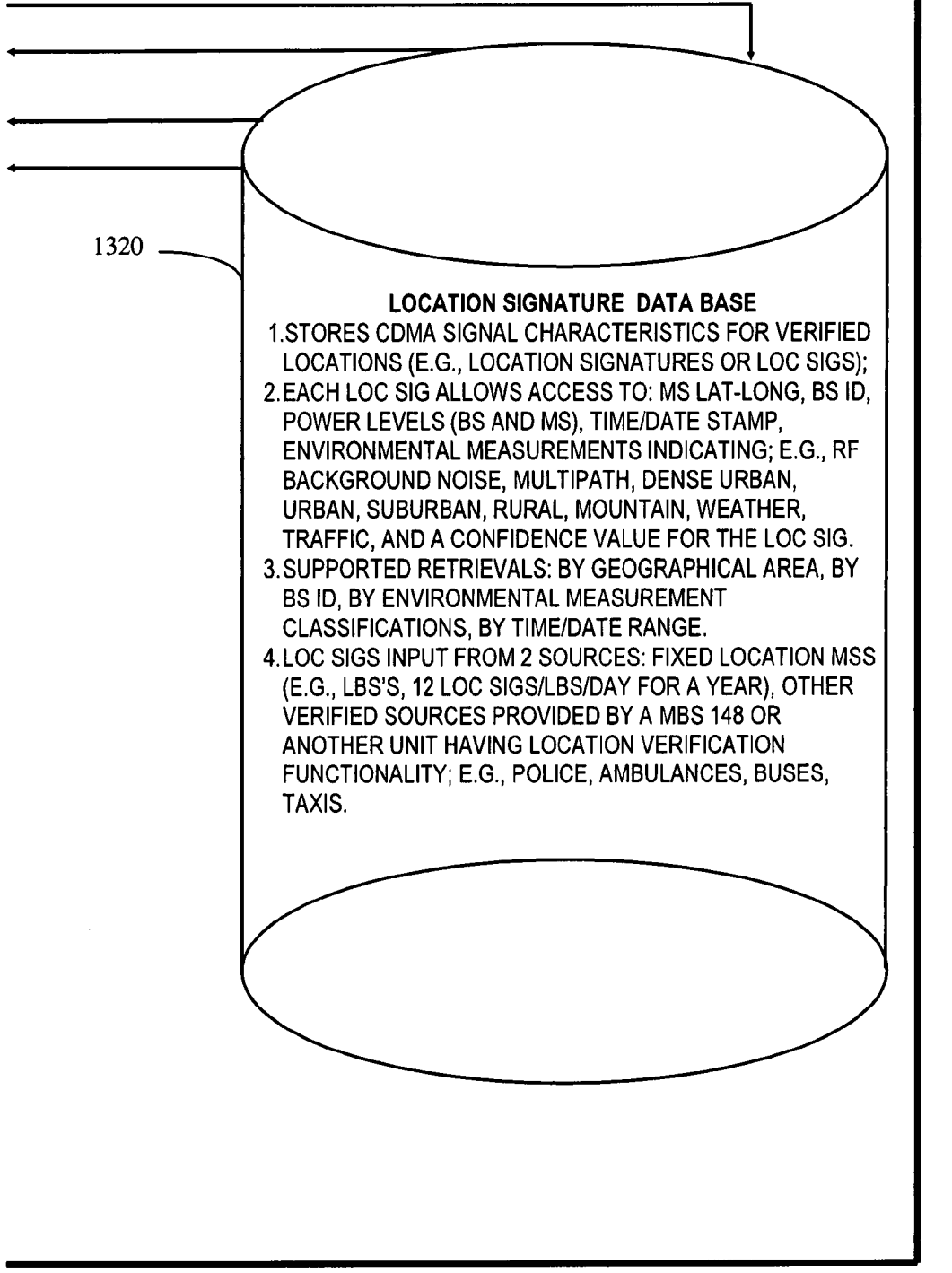
Figure 7:
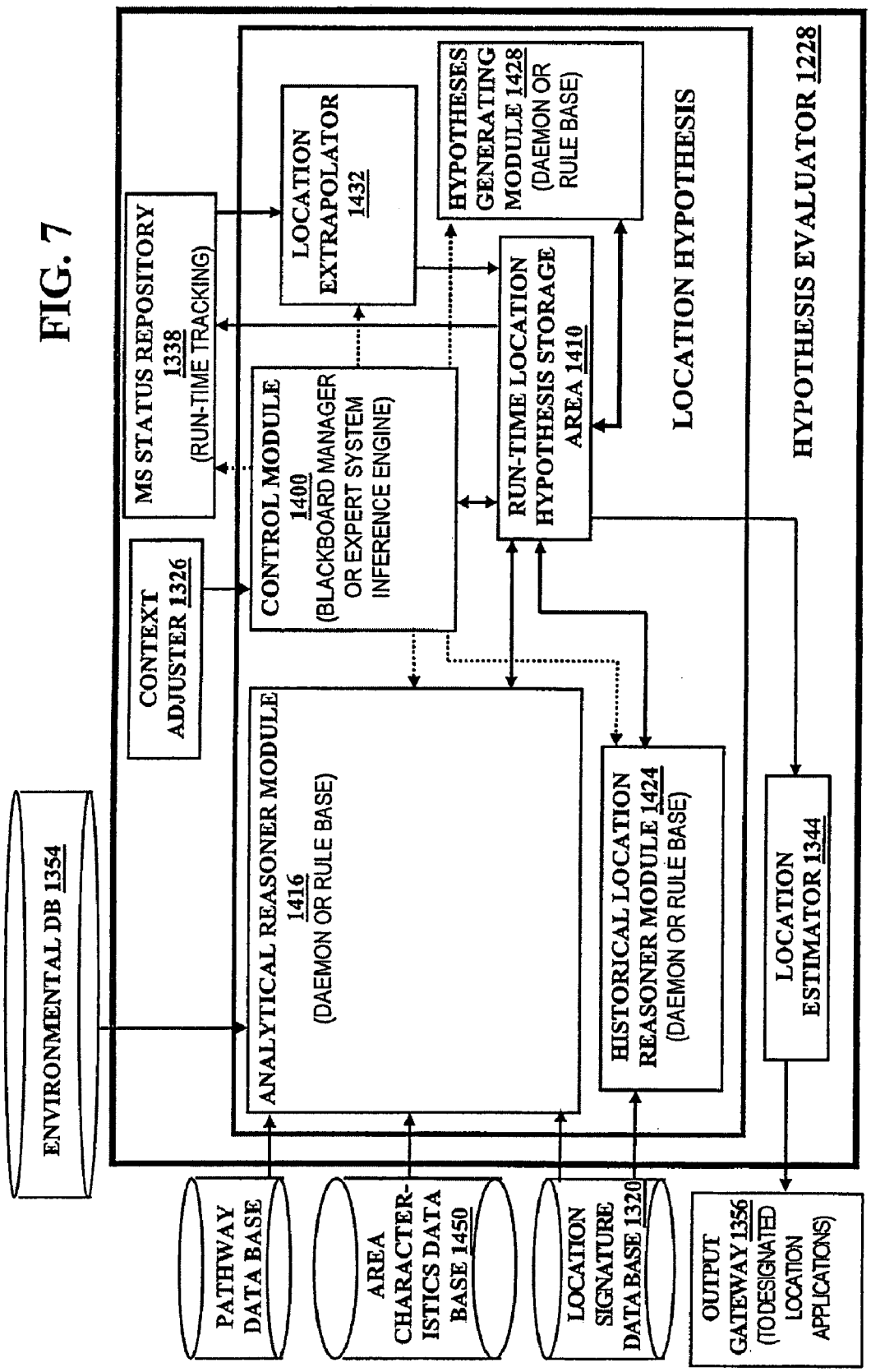
FIG. 7 is a high level block diagram of the hypothesis evaluator for the location center.

Note that in FIG. 6, (a)-(d) above are, at least at a high level, performed by utilizing the operator interface 1374.

Referring now to the output gateway 1356, this module routes target MS 140 location estimates to the appropriate location application(s). For instance, upon receiving a location estimate from the most likelihood estimator 1344, the output gateway 1356 may determine that the location estimate is for an automobile being tracked by the police and therefore must be provided must be provided according to the particular protocol.

System Tuning and Adaptation: The Adaptation Engine

A fifth functional group of location engine 139 modules provides the ability to enhance the MS locating reliability and/or accuracy of embodiments of the present disclosure by providing it with the capability to adapt to particular operating configurations, operating conditions and wireless signaling environments without performing intensive manual analysis of the performance of various embodiments of the location engine 139. That is, this functional group automatically enhances the performance of the location engine for locating MSs 140 within a particular coverage area 120 using at least one wireless network infrastructure therein. More precisely, this functional group allows embodiments of the present disclosure to adapt by tuning or optimizing certain system parameters according to location engine 139 location estimate accuracy and reliability.

There are a number location engine 139 system parameters whose values affect location estimation, and it is an aspect of the present disclosure that the MS location processing performed should become increasingly better at locating a target MS 140 not only through building an increasingly more detailed model of the signal characteristics of location in the coverage area 120 such as discussed above regarding the location signature data base 1320, but also by providing automated capabilities for the location center processing to adapt by adjusting or "tuning" the values of such location center system parameters.

Accordingly, embodiments of the present disclosure may include a module, denoted herein as an "adaptation engine" 1382, that performs an optimization procedure on the location center 142 system parameters either periodically or concurrently with the operation of the location center in estimating MS locations. That is, the adaptation engine 1382 directs the modifications of the system parameters so that the location engine 139 increases in overall accuracy in locating target MSs 140. In one embodiment, the adaptation engine 1382 includes an embodiment of a genetic algorithm as the mechanism for modifying the system parameters. Genetic algorithms are basically search algorithms based on the mechanics of natural genetics.

Note that additional description of this aspect of the present disclosure can be found in one of the following two copending U.S. patent applications which are incorporated herein by reference: (a) "Location Of A Mobile Station" filed Nov. 24, 1999 having application Ser. No. 09/194,367 whose inventors are D. J. Dupray and C. L. Karr, and (b) "A Wireless Location System For Calibrating Multiple Location Estimators" filed Oct. 21, 1998 having application Ser. No. 09/176,587 whose inventor is D. J. Dupray, wherein these copending patent applications may have essential material for the present specification. In particular, these copending patent applications may have essential material relating to the use of genetic algorithm implementations for adaptively tuning system parameters of a particular embodiment of the present disclosure.

Implementations of First Order Models

Further descriptions of various first order models 1224 are provided in this section. However, it is important to note that these are merely representative embodiments of location estimators that are within the scope of the present disclosure. In particular, two or more of the wireless location technologies described hereinbelow may be combined to created additional First Order Models. For example, various triangulation techniques between a target MS 140 and the base station infrastructure (e.g., time difference of arrival (TDOA) or time of arrival (TOA)), may be combined with an angle of arrival (AOA) technique. For instance, if a single direct line of sight angle measurement and a single direct line of sight distance measurement determined by, e.g., TDOA or TOA can effectively location the target MS 140. In such cases, the resulting First Order Models may be more complex. However, location hypotheses may generated from such models where individually the triangulation techniques and the AOA techniques would be unable to generate effective location estimates.

Terrestrial Communication Station Offset (TCSO) First Order Models (e.g., TOA/TDOA/AOA)

As discussed in the Location Center Architecture Overview section herein above, TCSO models determine a presumed direction and/or distance (more generally, an offset) that a target MS 140 is from one or more base stations 122. In some embodiments of TCSO models, the target MS location estimate(s) generated are obtained using radio signal analysis techniques that are quite general and therefore are not capable of taking into account the peculiarities of the topography of a particular radio coverage area. For example, substantially all radio signal analysis techniques using conventional procedures (or formulas) are based on "signal characteristic measurements" such as:

(a) signal timing measurements (e.g., TOA and TDOA), and/or (b) signal strength measurements.

Furthermore, such signal analysis techniques are likely predicated on certain very general assumptions that can not fully account for signal attenuation and multipath due to a particular radio coverage area topography.

Taking CDMA or TDMA base station network as an example, each base station (BS) 122 is required to emit a constant signal-strength pilot channel pseudo-noise (PN) sequence on the forward link channel identified uniquely in the network by a pilot sequence offset and frequency assignment. It is possible to use the pilot channels of the active, candidate, neighboring and remaining sets, maintained in the target MS, for obtaining signal characteristic measurements (e.g., TOA and/or TDOA measurements) between the target MS 140 and the base stations in one or more of these sets.

Based on such signal characteristic measurements and the speed of signal propagation, signal characteristic ranges or range differences related to the location of the target MS 140 can be calculated. Using TOA and/or TDOA ranges as exemplary, these ranges can then be input to either the radius-radius multilateration or the time difference multilateration algorithms along with the known positions of the corresponding base stations 122 to thereby obtain one or more location estimates of the target MS 140. For example, if there are, four base stations 122 in the active set, the target MS 140 may cooperate with each of the base stations in this set to provide signal arrival time measurements. Accordingly, each of the resulting four sets of three of these base stations 122 may be used to provide an estimate of the target MS 140 as one skilled in the art will understand. Thus, potentially (assuming the measurements for each set of three base stations yields a feasible location solution) there are four estimates for the location of the target MS 140. Further, since such measurements and BS 122 positions can be sent either to the network or the target MS 140, location can be determined in either entity.

Since many of the signal measurements utilized by embodiments of TCSO models are subject to signal attenuation and multipath due to a particular area topography. Many of the sets of base stations from which target MS location estimates are desired may result in either no location estimate, or an inaccurate location estimate.

Accordingly, some embodiments of TCSO FOMs may attempt to mitigate such ambiguity or inaccuracies by, e.g., identifying discrepancies (or consistencies) between arrival time measurements and other measurements (e.g., signal strength), these discrepancies (or consistencies) may be used to filter out at least those signal measurements and/or generated location estimates that appear less accurate. In particular, such identifying and filtering may be performed by, for example, an expert system residing in the TCSO FOM.

Another approach for enhancing certain location techniques such as TDOA or angle or arrival (AOA) is that of super resolution as disclosed in U.S. Pat. No. 5,890,068 filed on Oct. 3, 1996 having an issue date of Mar. 30, 1999 with inventors Fattouche et. al. which is incorporated by reference herein. In particular, the following portions of the '068 patent are particularly important: the Summary section, the Detailed Description portion regarding FIGS. 12-17, and the section titled "Description Of The Preferred Embodiments Of The Invention." In particular the '068 patent describes a technique for estimating a time of arrival (TOA) of a received signal relative to a time reference at each one of a plurality of wireless signal monitoring stations using an inverse transform whose resolution is greater than Rayleigh resolution.

Another approach, regardless of the FOM utilized, for mitigating such ambiguity or conflicting MS location estimates is particularly novel in that each of the target MS location estimates is used to generate a location hypothesis regardless of its apparent accuracy. Accordingly, these location hypotheses are input to an embodiment of the context adjuster 1326. In particular, in one context adjuster 1326 embodiment each location hypothesis is adjusted according to past performance of its generating FOM 1224 in an area of the initial location estimate of the location hypothesis (the area, e.g., determined as a function of distance from this initial location estimate), this alternative embodiment adjusts each of the location hypotheses generated by a first order model according to a past performance of the model as applied to signal characteristic measurements from the same set of base stations 122 as were used in generating the location hypothesis. That is, instead of only using only an identification of the first order model (i.e., its FOM ID) to, for example, retrieve archived location estimates generated by the model in an area of the location hypothesis' estimate (when determining the model's past performance), the retrieval retrieves the archived location estimates that are, in addition, derived from the signal characteristics measurement obtained from the same collection of base stations 122 as was used in generating the location hypothesis. Thus, the adjustment performed by this embodiment of the context adjuster 1326 adjusts according to the past performance of the distance model and the collection of base stations 122 used.

Note in one embodiment, such adjustments can also be implemented using a precomputed vector location error gradient field. Thus, each of the location error vectors (as determined by past performance for the FOM) of the gradient field has its starting location at a location previously generated by the FOM, and its vector head at a corresponding verified location where the target MS 140 actually was. Accordingly, for a location hypothesis of an unknown location, this embodiment determines or selects the location error vectors having starting locations within a small area (e.g., possibly of a predetermined size, but alternatively, dependent on the density of the location error vector starting locations nearby to the location hypothesis) of the location hypothesis. Additionally, the determination or selection may also be based upon a similarity of signal characteristics also obtained from the target MS 140 being located with signal characteristics corresponding to the starting locations of location error vectors of the gradient field. For example, such sign characteristics may be, e.g., time delay/signal strength multipath characteristics.

Angle of Arrival First Order Model

Various mobile station location estimating models can be based on the angle of arrival (AOA) of wireless signals transmitted from a target MS 140 to the base station infrastructure as one skilled in the art will understand. Such AOA models (sometimes also referred to as direction of arrival or DOA models) typically require precise angular measurements of the wireless signals, and accordingly utilize specialized antennas at the base stations 122. The determined signal transmission angles are subject to multipath aberrations. Therefore, AOA is most effective when there is an unimpeded line-of-sight simultaneous transmission between the target MS 140 and at least two base stations 122.

TCSO (Grubeck) FOM with Increased Accuracy Via Multiple Ms Transmissions

Another TCSO first order model 1224, denoted the Grubeck model (FOM) herein, is disclosed in U.S. Pat. No. 6,009,334 filed Nov. 26, 1997 and issued Dec. 28, 1999 having Grubeck, Fischer, and Lundqvist as inventors, this patent being fully incorporated herein by reference. The Grubeck model includes a location estimator for determining more accurately the distance between a wireless receiver at (RX), e.g., a CMRS fixed location communication station (such as a BS 122) and a target MS 140, wherein wireless signals are repeatedly transmitted from the target MS 140 and may be subject to multipath. An embodiment of the Grubeck model may be applied to TOA, TDOA, and/or AOA wireless measurements. For the TOA case, the following steps are performed:

(a) transmitting "M" samples $s_i$, $1<=I<=M$ of the same wireless signal from, e.g., the target MS 140 to the RX. Preferably M is on the order of 50 to 100 (e.g., 70) wireless signal bursts, wherein each such burst contains a portion having an identical known contents of bits (denoted a training sequence). However, note that a different embodiment can use (e.g., 70) received bursts containing different (non-identical) information, but information still known to the RX;

(b) receiving the "M" signal samples $s_i$ along with multipath components and noise at, e.g., RX;

(c) for each of the received "M" samples $s_i$, determining at the RX an estimated channel power profile (CPPi). Each CPPi is determined by first determining, via a processor at the RX, a combined correlation response ("Channel Impulse Response" or CIRi) of a small number of the bursts (e.g., 5) by correlating each burst with its known contents. Accordingly; the squared absolute value of the CIRi is the "estimated channel power profile" or CPPi;

(d) (randomly) selecting "N" (e.g., 10) out of the "M" received samples;

(e) performing incoherent integration of the CPPi for the "N" samples selected, which results in an integrated signal, i.e., one integrated channel power profile_ICPP (Ni);

(f) determining if the signal-to-noise quality of the ICPP (Ni) is greater than or equal to a predetermined threshold value, and if not, improving the signal-to-noise quality of ICPP(Ni) as required, by redoing the incoherent integration with successively one additional received sample CPPi until the signal-to-noise quality of the ICPP(Ni) is greater than or equal to the predetermined threshold value;

(g) determining the TOA(i), including the case of determining TOA(i) from the maximum signal amplitude;

(h) entering the determined TOA(i) value into a diagram that shows a frequency of occurrence as a function of TOA(i);

(i) repeating the whole procedure "X" times by selecting a new combination of "N" out of "M" samples, which results in "X" additional points in the frequency of occurrence diagram;

(j) reading the minimum value TOA(min) as the time value having "z" of all occurrences with higher TOA(i) values and "1−z" of all occurrences with lower TOA(i) values, where z>0.7.

As mentioned above, an embodiment of the Grubeck FOM may also be provides for TDOA and/or AOA wireless location techniques, wherein a similar incoherent integration may be performed.

Note that a Grubeck FOM may be particularly useful for locating a target MS 140 in a GSM wireless network.

TCSO (Parl) FOM Using Different Tones and Multiple Antennas at BSS 122

A first order model 1224, denoted the Parl model herein, is substantially disclosed in U.S. Pat. No. 5,883,598 (denoted the '598 patent herein) filed Dec. 15, 1995 and issued Mar. 16, 1999 having Parl, Bussgang, Weitzen and Zagami as inventors, this patent being fully incorporated herein by reference. The Parl FOM includes a system for receiving representative signals (denoted also "locating signal(s)") from the target MS 140 via, e.g., base stations 122 and subsequently combines information regarding the amplitude and phase of the MS transmitted signals received at the base stations to determine the position of the target MS 140. In one embodiment, the Parl model uses input from a locating signal having two or more single-frequency tones, as one skilled in the art will understand. Moreover, at least some of the base stations 122 preferably includes at least two antennas spaced from each other by a distance between a quarter wavelength and several wavelengths of the wireless locating signals received from the target MS 140. Optionally, another antenna vertically above or below the two or more antennas also spaced by a distance of between a quarter wavelength and several wavelengths can be used where elevation is also being estimated. The base stations 122 sample locating signals from the target MS 140. The locating signals include tones that can be at different frequencies. The tones can also be transmitted at different times, or, in an alternative embodiment, they can be transmitted simultaneously. Because, in one embodiment, only single-frequency tones are used as the locating signal instead of modulated signals, substantial transmission circuitry may be eliminated. The Parl FOM extracts information from each representative signal received from a target MS 144, wherein at least some of the extracted information is related to the amplitude and phase of the received signal.

In one embodiment of a Parl FOM, related to the disclosure in the '598 patent, when the locations of the BSs 122 are known, and the direction from any two of the BSs 122 to the target MS 140, the MS's location can be initially (roughly) determined by signal direction finding techniques. For example, an estimate of the phase difference between the signals at a pair of antennas at any BS 122 (having two such antennas) can lead to the determination of the angle from the base station to the target MS 140, and thus, the determination of the target MS direction. Subsequently, an enhanced location of the target MS 140 is computed directly from received target MS signal data using an ambiguity function A(x,y) described in the '598 patent, wherein for each point at x,y, the ambiguity function A(x,y) depends upon the probability that the MS is located at the geolocation represented by (x,y). Essentially the Parl FOM combines angle of arrival related data and TDOA related data for obtaining an optimized estimate of the target MS 140. However, it appears that independent AOA and TDOA MS locations are not used in determining a resulting target MS location (e.g., without the need for projecting lines at angles of arrival or computing the intersection of hyperbolas defined by pairs of base stations). Instead, the Parl FOM estimates the target MS's location by minimizing a joint probability of location related errors. In particular, such minimization may use the mean square error, and the location (x,y) at which minimization occurs is taken as the estimate of the target MS 140. In particular, the ambiguity function A(x,y) defines the error involved in a position determination for each point in a geolocation Cartesian coordinate system. The Parl model optimizes the ambiguity function to select a point x,y at which the associated error is minimized. The resulting location for (x, y) is taken as the estimate of the location of the target MS 140. Any of several different optimization procedures can be used to optimize the ambiguity function A(x,y). E.g., a first rough estimate of the target MS's location may be obtained by direction finding (as discussed above). Next, six points x,y may be selected that are in close proximity to the estimated point. The ambiguity function A(x,y) is solved for each of the x,y points to obtain six values. The six computed values are then used to define a parabolic surface. The point x,y at which the maximum value of the parabolic surface occurs is then taken as the estimate of the target MS 140. However, other optimization techniques may also be used. For example, a standard technique such as an iterative progression through trial and error to converge to the maximum can be used. Also, gradient search can be used to optimize the ambiguity function. In the case of three-dimensional location, the two-dimensional ambiguity function A(x, y) is extended to a three-dimensional function A(x,y,z). As in the two-dimensional case, the ambiguity function may be optimized to select a point x,y,z as the best estimate of the target MS's location in three dimensions. Again, any of several known optimization procedures, such as iterative progression through trial and error, gradient search, etc., can be used to optimize the ambiguity function.

TCSO FOM Using TDOA/AOA Measurements from an MBS 148 and/or an LBS 152

It is believed clear from the location center/gateway 142 architecture and from the architecture of the mobile station location subsystem (described in a separate section hereinbelow) that target MS 140 location related information can be obtained from an MBS 148 and/or one or more LBSs 152. Moreover, such location related information can be supplied to any FOM 1224 that is able to accept such information as input. Thus, pattern recognition and adaptive FOMs may accept such information. However, to provide an alternative description of how MS location related information from an MBS and/or LBS may be used, reference is made to U.S. Pat. No. 6,031,490 (denoted the '490 patent herein) filed Dec. 23, 1997 and issued Feb. 29, 2000 having Forssen, Berg and Ghisler as inventors, this patent being fully incorporated herein fully by reference. A TCSO FOM (denoted the FORSSEN FOM herein) using TDOA/AOA is disclosed in the '490 patent.

The FORSSEN FOM includes a location estimator for determining the Time Difference of Arrival (TDOA) of the position of a target MS 140, which is based on Time of Arrival (TOA) and/or AOA measurements. This FOM uses data received from "measuring devices" provided within a wireless telecommunications network. The measuring devices measure TOA on demand and (optionally) Direction of Arrival (DOA), on a digital uplink time slot or on digital information on an analog uplink traffic channel in one or more radio base stations. The TOA and DOA information and the traffic channel number are reported to a Mobile Services Switching Center (MSC), which obtains the identity of the target MS 140 from the traffic channel number and sends the terminal identity and TOA and DOA measurement information to a Service Node (e.g., location center 142) of the network. The Service Node calculates the position of the target MS 140 using the TOA information (supplemented by the DOA information when available). Note, that the TCSO model may utilize data from a second mobile radio terminal that is colocated on a mobile platform (auto, emergency vehicle, etc.) with one of the radio base stations (e.g., MBS 148), which can be moved into relatively close proximity with the target MS 140. Consequently, by moving one of the radio base stations (MBSs) close to the region of interest (near the target MS 140), the position determination accuracy is significantly improved.

Note that the '490 patent also discloses techniques for rising the target MS's transmission power for thereby allowing wireless signals from the target MS to be better detected by distant BSs 122.

For a mobile radio system having base stations for wirelessly communicating with a mobile unit M (e.g., MS 140), and further including: (i) a network controller and for at least three of the base stations, each of the at least three communication stations includes an uplink TOA measuring unit operable to communicate with the network controller, wherein one of the three base stations is co-located with and connected to a second wireless mobile unit (e.g., a MBS 148) in a manner such that the second wireless mobile unit communicates with the network controller via a radio interface, and a service node operable to store known positions of at least two of the three base stations, (ii) a control unit ("control section 110" in the '490 Patent), and (iii) a time reference unit operable to provide timing reference signals to the uplink TOA measuring unit, such a FORSSEN FOM may perform the following steps:

(a) receiving a request in the mobile radio system to determine the geographical position of the mobile unit M;
(b) determining and reporting the position of the second mobile unit $M_2$ (e.g., a MBS 148) to the service node;
(c) directing the mobile unit M to transmit digital signals on an uplink traffic channel when the mobile unit M is not transmitting or transmitting only analog signals;
(d) measuring in each uplink TOA measuring unit an uplink TOA of the digital signals transmitted by the mobile unit M;
(e) receiving in said network controller said uplink TOA measurements from the at least three communication stations and a traffic channel number to the traffic channel;
(f) translating the traffic channel number to an identity of the mobile unit M;
(g) conveying the uplink TOA measurements and the mobile unit M identity to the service node; and
(h) calculating in the service node the position of the mobile unit M using the known positions of the at least three communication stations and the uplink TOA measurements.

Coverage Area First Order Model

Radio coverage area of individual base stations 122 may be used to generate location estimates of the target MS 140. Although a first order model 1224 based on this notion may be less accurate than other techniques, if a reasonably accurate RF coverage area is known for each (or most) of the base stations 122, then such a FOM (denoted hereinafter as a "coverage area first order model" or simply "coverage area model") may be very reliable. To determine approximate maximum radio frequency (RF) location coverage areas, with respect to BSs 122, antennas and/or sector coverage areas, for a given class (or classes) of (e.g., CDMA or TDMA) mobile station(s) 140, location coverage should be based on an MS's ability to adequately detect the pilot channel, as opposed to adequate signal quality for purposes of carrying user-acceptable traffic in the voice channel. Note that more energy is necessary for traffic channel activity (typically on the order of at least −94 to −104 dBm received signal strength) to support voice, than energy needed to simply detect a pilot channel's presence for location purposes (typically a maximum weakest signal strength range of between −104 to −110 dBm), thus the "Location Coverage Area" will generally be a larger area than that of a typical "Voice Coverage Area", although industry studies have found some occurrences of "no-coverage" areas within a larger covered area The approximate maximum RF coverage area for a given sector of (more generally angular range about) a base station 122 may be represented as a set of points representing a polygonal area (potentially with, e.g., holes therein to account for dead zones and/or notches). Note that if such polygonal RF coverage area representations can be reliably determined and maintained over time (for one or more BS signal power level settings), then such representations can be used in providing a set theoretic or Venn diagram approach to estimating the location of a target MS 140. Coverage area first order models utilize such an approach.

One embodiment, a coverage area model utilizes both the detection and non-detection of base stations 122 by the target MS 140 (conversely, of the MS by one or more base stations 122) to define an area where the target MS 140 may likely be. A relatively straightforward application of this technique is to:

(a) find all areas of intersection for base station RF coverage area representations, wherein: (i) the corresponding base stations are on-line for communicating with MSs 140; (ii) the RF coverage area representations are deemed reliable for the power levels of the on-line base stations; (iii) the on-line base stations having reliable coverage area representations can be detected by the target MS; and (iv) each intersection must include a predetermined number of the reliable RF coverage area representations (e.g., 2 or 3); and
(b) obtain new location estimates by subtracting from each of the areas of intersection any of the reliable RF coverage area representations for base stations 122 that can not be detected by the target MS.

Accordingly, the new areas may be used to generate location hypotheses.

Satellite Signal Triangulation First Order Models

As mentioned hereinabove, there are various satellite systems that may be used to provide location estimates of a target MS 140 (e.g., GPS, GLONASS, LEOs, and MEOs). In many cases, such location estimates can be very accurate, and accordingly such accuracy would be reflected in embodiments of the present disclosure by relatively high confidence values for the location hypotheses generated from such models in comparison to other FOMs. However, it may be difficult for the target MS 140 to detect and/or lock onto such satellite signals sufficiently well to provide a location estimate. For example, it may be very unlikely that such satellite signals can be detected by the MS 140 in the middle of high rise concrete buildings or parking structures having very reduced exposure to the sky.

Hybrid Satellite and TCSO FOMs

A first order model 1224, denoted the WATTERS FOM herein, is disclosed in U.S. Pat. No. 5,982,324 filed May 14, 1998 and issued Nov. 9, 1999 having Watters, Strawczynski, and Steer as inventors, this patent being fully incorporated herein by reference. The WATTERS FOM includes a location estimator for determining the location of a target MS 140 using satellite signals to the target MS 140 as well as delay in wireless signals communicated between the target MS and base stations 122. For example, aspects of global positioning system (GPS) technology and cellular technology are combined in order to locate a target MS 140. The WATTERS FOM may be used to determine a target MS location in a wireless network, wherein the network is utilized to collect differential GPS error correction data, which is forwarded to the target MS 140 via the wireless network. The target MS 140 (which includes a receiver R for receiving non-terrestrial wireless signals from, e.g., GPS, or other satellites, or even airborne craft) receives this data, along with GPS pseudoranges using its receiver R, and calculates its position using this information. However, when the requisite number of satellites are not in view of the MS 140, then a pseudosatellite signal, broadcast from a BS 122 of the wireless network, is received by the target MS 140 and processed as a substitute for the missing satellite signal. Additionally, in at least some circumstances, when the requisite number of satellites (more generally, non-terrestrial wireless transmitters) are not detected by the receiver R, then the target MS's location is calculated using the wireless network infrastructure via TDOA/TOA with the BSs 122 of the network. When the requisite number of satellites (more generally, non-terrestrial wireless transmitters) are again detected by the receiver R, then the target MS is again calculated using wireless signals from the non-terrestrial wireless transmitters. Additionally, the WATTERS FOM may use wireless signals already transmitted from base stations 122 to the target MS 140 in a wireless network to calculate a round trip time delay, from which a distance calculation between the base station and the target MS can be made. This distance calculation substitutes for a missing non-terrestrial transmission signal.

Location Base Station First Order Model

In the location base station (LBS) model (FOM 1224), a database is accessed which contains electrical, radio propagation and coverage area characteristics of each of the location base stations in the radio coverage area. The LBS model is an active model, in that it can probe or excite one or more particular LBSs 152 in an area for which the target MS 140 to be located is suspected to be placed. Accordingly, the LBS model may receive as input a most likely target MS 140 location estimate previously output by the location engine 139 of the present disclosure, and use this location estimate to determine which (if any) LBSs 152 to activate and/or deactivate for enhancing a subsequent location estimate of the target MS. Moreover, the feedback from the activated LBSs 152 may be provided to other FOMs 1224, as appropriate, as well as to the LBS model. However, it is an important aspect of the LBS model that when it receives such feedback, it may output location hypotheses having relatively small target MS 140 location area estimates about the active LBSs 152 and each such location hypothesis also has a high confidence value indicative of the target MS 140 positively being in the corresponding location area estimate (e.g., a confidence value of 0.9 to +1), or having a high confidence value indicative of the target MS 140 not being in the corresponding location area estimate (i.e., a confidence value of −0.9 to −1). Note that in some embodiments of the LBS model, these embodiments may have functionality similar to that of the coverage area first order model described above. Further note that for LBSs within a neighborhood of the target MS wherein there is a reasonable chance that with movement of the target MS may be detected by these LBSs, such LBSs may be requested to periodically activate. (Note, that it is not assumed that such LBSs have an on-line external power source; e.g., some may be solar powered). Moreover, in the case where an LBS 152 includes sufficient electronics to carry voice communication with the target MS 140 and is the primary BS for the target MS (or alternatively, in the active or candidate set), then the LBS model will not deactivate this particular LBS during its procedure of activating and deactivating various LBSs 152.

Stochastic First Order Model

The stochastic first order models may use statistical prediction techniques such as principle decomposition, partial least squares, partial least squares, or other regression techniques for predicting, for example, expected minimum and maximum distances of the target MS from one or more base stations 122, e.g., Bollenger Bands. Additionally, some embodiments may use Markov processes and Random Walks (predicted incremental MS movement) for determining an expected area within which the target MS 140 is likely to be. That is, such a process measures the incremental time differences of each pilot as the MS moves for predicting a size of a location area estimate using past MS estimates such as the verified location signatures in the location signature data base 1320.

Pattern Recognition and Adaptive First Order Models

It is a particularly important aspect of the present disclosure to provide:

(a) one or more FOMs 1224 that generate target MS 140 location estimates by using pattern recognition or associativity techniques, and/or (b) one or more FOMs 1224 that are adaptive or trainable so that such FOMs may generate increasingly more accurate target MS location estimates from additional training.

Statistically Based Pattern Recognition First Order Models

Regarding FOMs 1224 using pattern recognition or associativity techniques, there are many such techniques available. For example, there are statistically based systems such as "CART" (acronym for Classification and Regression Trees) by ANGOSS Software International Limited of Toronto, Canada that may be used for automatically for detecting or recognizing patterns in data that were not provided (and likely previously unknown). Accordingly, by imposing a relatively fine mesh or grid of cells of the radio coverage area, wherein each cell is entirely within a particular area type categorization, such as the transmission area types (discussed in the section, "Coverage Area: Area Types And Their Determination" above), the verified location signature clusters within the cells of each area type may be analyzed for signal characteristic patterns. Accordingly, if such a characteristic pattern is found, then it can be used to identify one or more of the cells in which a target MS is likely to be located. That is, one or more location hypotheses may be generated having target MS 140 location estimates that cover an area having the identified cells wherein the target MS 140 is likely to be located. Further note that such statistically based pattern recognition systems as "CART" include software code generators for generating expert system software embodiments for recognizing the patterns detected within a training set (e.g., the verified location signature clusters).

A related statistical pattern recognition FOM 1224 is also disclosed in U.S. Pat. No. 6,026,304, filed Jan. 8, 1997 and issued Feb. 15, 2000, having Hilsenrath and Wax as inventors, this patent (denoted the Hilsenrath patent herein) being incorporated herein fully by reference. An embodiment of a FOM 1224 based on the disclosure of the Hilsenrath patent is referred to herein as the Hilsenrath FOM. The Hilsenrath FOM includes a wireless location estimator that locates a target MS 140 using measurements of multipath signals in order to accurately determine the location of the target MS 140. More particularly, to locate the target MS 140, the Hilsenrath FOM uses wireless measurements of both a direct signal transmission path and multipath transmission signals from the MS 140 to a base station 122 receiver. The wireless signals from the target MS 140 arrive at and are detected by an antenna array of the receiver at the BS 122, wherein the antenna array includes a plurality of antennas. A signal signature (e.g., an embodiment of a location signature herein) for this FOM may be derived from any combination of amplitude, phase, delay, direction, and polarization information of the wireless signals transmitted from the target MS 140 to the base station 122 receiver. The Hilsenrath FOM 1224 determines a signal signature from a signal subspace of a covariance matrix. In particular, for p antennas included in the base station receiver, these antennas are used to receive complex signal envelopes $x_{\cdot 1}(t), x_{\cdot 2}(t), \ldots, x_{\cdot p}(t)$, respectively, which are conventionally grouped together to form a p-dimensional array vector $x(t)=[x_1(t), x_2(t), \ldots, x_{\cdot p}(t)]^T$. The signal subspace may be determined from a collection of M such array vectors x(t) by several techniques. In one such technique, the outer products of the M vectors are added together to form a p×p signal covariance matrix, $R=1/M [x(t_1)x(t_1)^H + \ldots + x(t_M)x(t_M)^H]$. The eigenvalues of R whose magnitudes exceed a predetermined threshold determine a set of dominant eigenvectors. The signal subspace is the space spanned by these dominant eigenvectors. The signal signature is compared to a database of calibrated signal signatures and corresponding locations (e.g., an embodiment of the location signature database 1320), wherein the signal signatures in the database include representations of the signal subspaces (such as the dominant eigenvectors of the covariance matrices. Accordingly, a location whose calibrated signature best matches the signal signature of the target MS 140 is selected as the most likely location of the target MS 140. Note that the database of calibrated signal signatures and corresponding verified locations is generated by a calibration procedure in which a calibrating MS 140 transmits location data derived from a co-located GPS receiver to the base stations 122. Thus, for each of a plurality of locations distributed through a service area, the location has associated therewith: the (GPS or verified) location information and the corresponding signal signature of the calibrating MS 140.

Accordingly, the location of a target MS 140 in the service area may be determined as follows. Signals originating from the target MS 140 at an unknown location are received at a base station 122. A signal processor, e.g., at the base station 122, then determines the signal signature as described above. The signal signature is then compared with the calibrated signal signatures stored in the above described embodiment of the location signature database 1320 during the calibration procedure. Using a measure of difference between subspaces (e.g., an angle between subspaces), a set of likely locations is selected from this location signature database embodiment. These selected likely locations are those locations whose associated calibrated signal signatures differ by less than a minimum threshold value from the target MS 140 signal signature. The difference measure is further used to provide a corresponding measure of the probability that each of the selected likely locations is the actual target MS location. Moreover, for one or more of the selected likely location, the corresponding measure may be output as the confidence value for a corresponding location hypothesis output by a Hilsenrath FOM 1224.

Thus, an embodiment of the present disclosure using such a Hilsenrath FOM 1224 performs the following steps (a)-(d):

(a) receiving at an antenna array provided at one of the base stations 122, signals originating from the target MS 140, wherein the signals comprise p-dimensional array vectors sampled from p antennas of the array;

(b) determining from the received signals, a signal signature, wherein the signal signature comprises a measured subspace, wherein the array vectors x(t) are approximately confined to the measured subspace;

(c) comparing the signal signature to previously obtained (and similarly computed) signal signatures, wherein each of the previously obtained signal signatures, SS, has associated therewith corresponding location data verifying the location where SS was obtained, wherein this step of comparing comprises substep of calculating differences between: (i) the measured subspace, and (ii) a similarly determined subspace for each of a plurality of the previously obtained signal signatures; and (d) selecting from the previously obtained signal signatures a most likely signal signature and a corresponding most likely location of the target MS 140 by using the calculated differences;

Note that regardless of the reliability some FOMs as described here may not be exceedingly accurate, but may be very reliable. Thus, since an aspect of at least some embodiments of the present disclosure is to use a plurality of MS location techniques (FOMs) for generating location estimates and to analyze the generated estimates (likely after being adjusted) to detect patterns of convergence or clustering among the estimates, even large MS location area estimates may be useful. For example, it can be the case that four different and relatively large MS location estimates, each having very high reliability, have an area of intersection that is acceptably precise and inherits the very high reliability from each of the large MS location estimates from which the intersection area was derived.

Note, that another statistically based FOM 1224 may be provided wherein the radio coverage area is decomposed substantially as above, but in addition to using the signal characteristics for detecting useful signal patterns, the specific identifications of the base station 122 providing the signal characteristics may also be used. Thus, assuming there is a sufficient density of verified location signature clusters in some of the mesh cells so that the statistical pattern recognizer can detect patterns in the signal characteristic measurements, an expert system may be generated that outputs a target MS 140 location estimate that may provide both a reliable and accurate location estimate of a target MS 140.

Adaptive/Trainable First Order Models

The term adaptive is used to describe a data processing component that can modify its data processing behavior in response to certain inputs that are used to change how subsequent inputs are processed by the component. Accordingly, a data processing component may be "explicitly adaptive" by modifying its behavior according to the input of explicit instructions or control data that is input for changing the component's subsequent behavior in ways that are predictable and expected. That is, the input encodes explicit instructions that are known by a user of the component. Alternatively, a data processing component may be "implicitly adaptive" in that its behavior is modified by other than instructions or control data whose meaning is known by a user of the component. For example, such implicitly adaptive data processors may learn by training on examples, by substantially unguided exploration of a solution space, or other data driven adaptive strategies such as statistically generated decision trees. Accordingly, it is an aspect of the present disclosure to utilize not only explicitly adaptive MS location estimators within FOMs 1224, but also implicitly adaptive MS location estimators. In particular, artificial neural networks (also denoted neural nets and ANNs herein) are used in some embodiments as implicitly adaptive MS location estimators within FOMs. Thus, in the sections below, neural net architectures and their application to locating an MS is described.

Artificial Neural Networks for MS Location

Artificial neural networks may be particularly useful in developing one or more first order models 1224 for locating an MS 140, since, for example, ANNs can be trained for classifying and/or associatively pattern matching of various RF signal measurements such as the location signatures. That is, by training one or more artificial neural nets using RF signal measurements from verified locations so that RF signal transmissions characteristics indicative of particular locations are associated with their corresponding locations, such trained artificial neural nets can be used to provide additional target MS 140 location hypotheses. Moreover, it is an aspect of the present disclosure that the training of such artificial neural net based FOMs (ANN FOMs) is provided without manual intervention as will be discussed hereinbelow. Additional description of this aspect of the present disclosure can be found in the copending U.S. patent application titled "Location Of A Mobile Station" filed Nov. 24, 1999 having application Ser. No. 09/194,367 whose inventors are D. J. Dupray and C. L. Karr, which is incorporated herein by reference and wherein this copending patent application may have essential material for the present disclosure. In particular, this copending patent application may have essential material relating to the use of ANNs as mobile station location estimators 1224.

Other First Order Models

Figure 2:
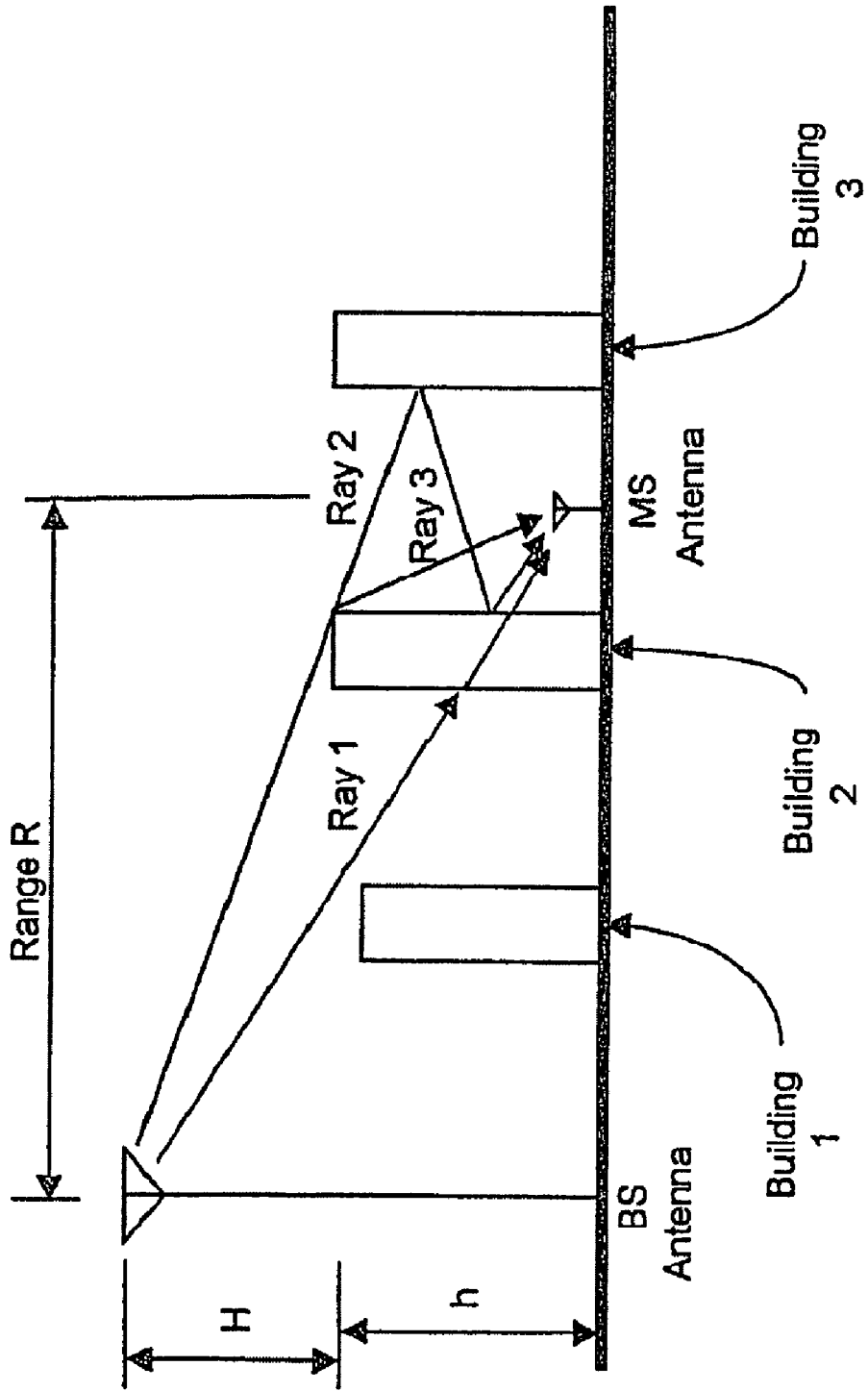
FIG. 2 shows aspects of the two-ray radio propagation model and the effects of urban clutter.
Figure 3:
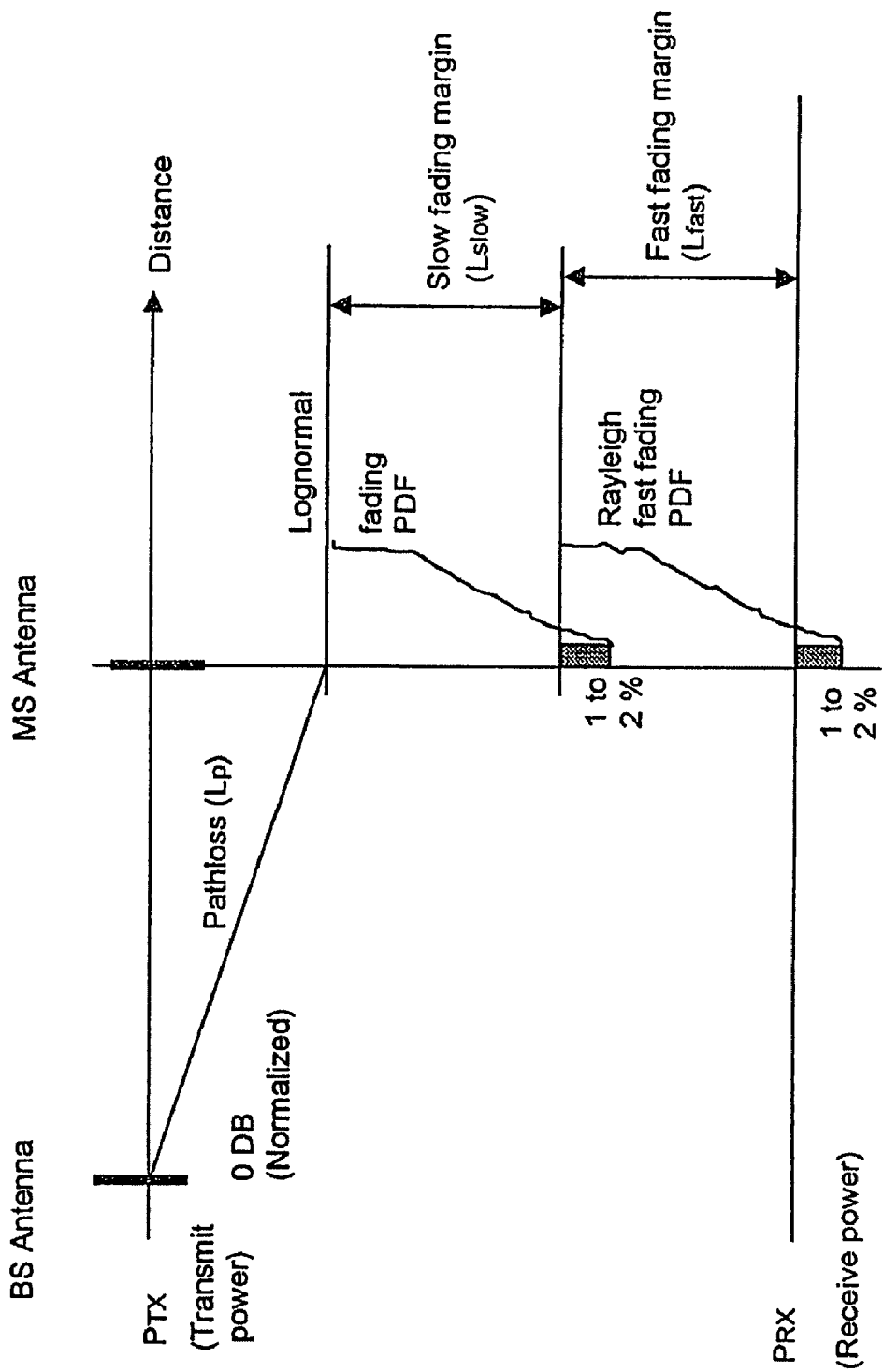
FIG. 3 provides a typical example of how the statistical power budget is calculated in design of a Commercial Mobile Radio Service Provider network.

U.S. Pat. No. 5,390,339 ('339 patent) filed Oct. 23, 1991 having an issue date of Feb. 14, 1995 with inventor being Bruckert et. al. provides number of embodiments of wireless location estimators for estimating the location of a "remote unit." In particular, various location estimator embodiments are described in relation to FIGS. 1B and 2B therein. The location estimators in the '339 patent are, in general, directed to determining weighted or adjusted distances of the "remote unit" (e.g., MS 140) from one or more "transceivers" (e.g., base stations 122). The distances are determined using signal strength measurements of wireless signals transmitted between the "remote unit" and the "transceivers." However, adjustments are in the signal strengths according to various signal transmission anomalies (e.g., co-channel interference), impairments and/or errors. Additionally, a signal RF propagation model may be utilized, and a likelihood of the "remote unit" being in the designated coverage areas (cells) of particular transceivers (e.g., base stations 122) is determined using probabilistic techniques such as posteriori probabilities. Accordingly, the Bruckert '339 patent is fully incorporated by reference herein.

U.S. Pat. No. 5,570,412 ('412 patent) filed Sep. 28, 1994 having an issue date of Oct. 29, 1996 with inventors LeBlanc et. al. provide further embodiments of wireless location estimators that may be used as First Order Models 1224. The location estimating techniques of the LeBlanc '412 patent are described with reference to FIG. 8 and succeeding figures therein. At a high level, wireless location techniques of the '412 patent can be characterized by the following quote therefrom:

"The location processing of the present invention focuses on the ability to predict and model RF contours using actual RF measurements, then performing data reduction techniques such as curve fitting technique, Bollinger Bands, and Genetic Algorithms, in order to locate a mobile unit and disseminate its location."

Accordingly, the LeBlanc '412 patent is fully incorporated by reference herein.

U.S. Pat. No. 5,293,645 ('645 patent) filed Oct. 4, 1991 having an issue date of Mar. 8, 1994 with inventor Sood. provide further embodiments of wireless location estimators that may be used as First Order Models 1224. In particular, the '645 patent describes wireless location estimating techniques using triangulations or other geographical intersection techniques. Further, one such technique is described in column 6, line 42 through column 7, line 7. Accordingly, the Sood '645 patent is fully incorporated by reference herein.

U.S. Pat. No. 5,293,642 ('642 patent) filed Dec. 19, 1990 having an issue data of Mar. 8, 1994 with inventor Lo provide further embodiments of wireless location estimators that may be used as First Order Models 1224. In particular, the '642 patent determines a corresponding probability density function (pdf) about each of a plurality of base stations in communication with the target MS 140. That is, upon receiving wireless signal measurements from the transmissions between the target MS 140 and base stations 122, for each BS 122, a corresponding pdf is obtained from prior measurements of a particular wireless signal characteristic at locations around the base station. Subsequently, a most likely location estimation is determined from a joint probability density function of the individual base station probability density functions. Further description can be found in the Description Of The Preferred Embodiment section of the '642 patent. Accordingly, the Lo '642 patent is incorporated by reference herein.

Hybrid First Order Models

Time Difference of Arrival and Timing Advance FOM

A first order model 1224 denoted the Yost model herein. The Yost model includes a location estimator that uses a combination of Time Difference of Arrival (TDOA) and Timing Advance (TA) location determining techniques for determining the location of a target MS 140, wherein there are minor modifications to a telecommunication network such as a CMRS. The hybrid wireless location technique utilized by this location estimator uses TDOA measurements and TA measurements to obtain substantially independent location estimates of the target MS 140, wherein the TDOA measurements determine hyperbolae MS loci, about base stations 122 communicating (uni or bi-directionally) with the target MS, and the TA measurements determine circles about the base stations 122. Accordingly, an enhanced location estimate of the MS 140 can be obtained by using a least squares (or other statistical technique), wherein the least-squares technique determines a location for the MS between the various curves (hyperbolae and circles) that best approximates a point of intersection. Note that TA is used in all Time Division Multiple Access (TDMA) systems as one skilled in the art will understand, and measurements of TA can provide a measurement of the distance of the MS from a TDMA communication station in communication with the target MS 140. The Yost model is disclosed in U.S. Pat. No. 5,987,329 ('329 patent) filed Jul. 30, 1997 and issued Nov. 16, 1999 having Yost and Panchapakesan as inventors, this patent being fully incorporated herein fully by reference to thereby further describe the Yost model. The following quote from the '329 patent describes an important aspect of the Yost model:

"Furthermore, the combination of TA and TDOA allows resolution of common ambiguities suffered by either technique separately. For example, in FIG. 5 a situation involving three base stations 24 (A, B and C as described, the latter being visible in the figure) is represented along with the resultant two hyperbolas AB and AC (and redundant hyperbola BC) for a TDOA position determination of the mobile M. FIG. 5 is a magnified view of the mobile terminal M location showing the nearby base stations and the nearby portions at the curves. It should be understood that, in this case, using TDOA alone, there are two possible solutions, where the hyperbolae cross. The addition of the TA circles (dashed curves) will allow the ambiguous solutions, which lie at different TA from all three base stations, to be clearly resolved without the need for additional base station 24 measurements."

As an aside note that a timing advance (TA) first order model may be provided as a separate FOM independent from the TDOA portion of the Yost model. Thus, if an embodiment of the present disclosure includes both a TA FOM and a TDOA FOM, then the multiple location estimator architecture of the present disclosure may substantially include the Yost model whenever both the TA FOM and TDOA FOM are both activated for a same location instance of a target MS 140. However, it is an aspect of the present disclosure to also activate such a TA FOM and a TDOA FOM asynchronously from one another.

Satellite and Terrestrial Base Station Hybrid FOM

A first order model 1224, denoted the Sheynblat model (FOM) herein, is disclosed in U.S. Pat. No. 5,999,124 (denoted the '124 patent herein) filed Apr. 22, 1998 and issued Dec. 7, 1999 having Sheynblat as the inventor, this patent being fully incorporated herein by reference The Sheynblat FOM provides a location estimator for processing target MS 140 location related information obtained from: (a) satellite signals of a satellite positioning system (denoted SPS in the '124 patent) (e.g., GPS or GLONASS, LEO positioning satellites, and/or MEO positioning satellites), and (b) communication signals transmitted in the terrestrial wireless cellular network of BSs 122 for a radio coverage area, e.g., coverage area 120 (FIG. 4), wherein there is two-way wireless communication between the target MS 140 and the BSs. In one embodiment of the Sheynblat FOM, the location related information obtained from the satellite signals includes a representation of a time of travel of SPS satellite signals from a SPS satellite to a corresponding SPS receiver operatively coupled to (and co-located with) the target MS 140 (such "time of travel" is referred to as a pseudorange to the SPS satellite), Additionally for this embodiment, the location related information obtained from the communication signals in the wireless cellular network includes time of travel related information for a message in the communication signals between a BS 122 transceiver and the target MS 140 (this second "time of travel" related information is referred to as a cellular pseudorange). Accordingly, various combinations of pseudoranges to SPS satellites, and cellular pseudoranges can be used to determine a likely location of the target MS 140. As an example, if the target MS 140 (enhanced with a SPS receiver) can receive SPS satellite signals from one satellite, and additionally, the target MS is also in wireless communication (or can be in wireless communication) with two BSs 122, then three pseudoranges may be obtained and used to determine the position of the target MS by, e.g., triangulation. Of course, other combinations are possible for determining a location of the target MS 140, e.g., pseudoranges to two SPS satellites and one cellular pseudorange. Additionally, various techniques may be used to mitigate the effects of multipath on these pseudoranges. For example, since it is typical for the target MS 140 to detect (or be detected by) a plurality of BSs 122, a corresponding plurality of cellular pseudoranges may be obtained, wherein such cellular psuedoranges may be used in a cluster analysis technique to disambiguate MS locations identified by the satellite pseudoranges. Moreover, the determination of a location hypothesis is performed, in at least one embodiment, at a site remote from the target MS 140, such as the location center/gateway 142, or another site that communicates with the location center/gateway for supplying a resulting MS location to the gateway. Alternatively, the target MS 140 may perform the calculations to determine its own location. Note that this alternative technique may be particularly useful when the target MS 140 is a mobile base station 148.

MS Status Repository Embodiment

The MS status repository 1338 is a run-time storage manager for storing location hypotheses from previous activations of the location engine 139 (as well as the output target MS location estimate(s)) so that a target MS may be tracked using target MS location hypotheses from previous location engine 139 activations to determine, for example, a movement of the target MS between evaluations of the target MS location. Thus, by retaining a moving window of previous location hypotheses used in evaluating positions of a target MS, measurements of the target MS's velocity, acceleration, and likely next position may be determined by the location hypothesis analyzer 1332. Further, by providing accessibility to recent MS location hypotheses, these hypotheses may be used to resolve conflicts between hypotheses in a current activation for locating the target MS; e.g., MS paths may be stored here for use in extrapolating a new location Mobile Base Station Location Subsystem Description Mobile Base Station Subsystem Introduction Any collection of mobile electronics (denoted mobile location unit) that is able to both estimate a location of a target MS 140 and communicate with the base station network may be utilized by embodiments of the present disclosure to more accurately locate the target MS. Such mobile location units may provide greater target MS location accuracy by, for example, homing in on the target MS and by transmitting additional MS location information to the location center 142. There are a number of embodiments for such a mobile location unit contemplated by the present disclosure. For example, in a minimal version, such the electronics of the mobile location unit may be little more than an onboard MS 140, a sectored/directional antenna and a controller for communicating between them. Thus, the onboard MS is used to communicate with the location center 142 and possibly the target MS 140, while the antenna monitors signals for homing in on the target MS 140. In an enhanced version of the mobile location unit, a GPS receiver may also be incorporated so that the location of the mobile location unit may be determined and consequently an estimate of the location of the target MS may also be determined. However, such a mobile location unit is unlikely to be able to determine substantially more than a direction of the target MS 140 via the sectored/directional antenna without further base station infrastructure cooperation in, for example, determining the transmission power level of the target MS or varying this power level. Thus, if the target MS or the mobile location unit leaves the coverage area 120 or resides in a poor communication area, it may be difficult to accurately determine where the target MS is located. None-the-less, such mobile location units may be sufficient for many situations, and in fact the present disclosure contemplates their use. However, in cases where direct communication with the target MS is desired without constant contact with the base station infrastructure, the present disclosure includes a mobile location unit that is also a scaled down version of a base station 122. Thus, given that such a mobile base station or MBS 148 includes at least an onboard MS 140, a sectored/directional antenna, a GPS receiver, a scaled down base station 122 and sufficient components (including a controller) for integrating the capabilities of these devices, an enhanced autonomous MS mobile location system can be provided that can be effectively used in, for example, emergency vehicles, air planes and boats. Accordingly, the description that follows below describes an embodiment of an MBS 148 having the above mentioned components and capabilities for use in a vehicle.

As a consequence of the MBS 148 being mobile, there are fundamental differences in the operation of an MBS in comparison to other types of BS's 122 (152). In particular, other types of base stations have fixed locations that are precisely determined and known by the location center, whereas a location of an MBS 148 may be known only approximately and thus may require repeated and frequent re-estimating. Secondly, other types of base stations have substantially fixed and stable communication with the location center (via possibly other BS's in the case of LBSs 152) and therefore although these BS's may be more reliable in their in their ability to communicate information related to the location of a target MS with the location center, accuracy can be problematic in poor reception areas. Thus, MBSs may be used in areas (such as wilderness areas) where there may be no other means for reliably and cost effectively locating a target MS 140 (i.e., there may be insufficient fixed location BS's coverage in an area).

Figure 11:
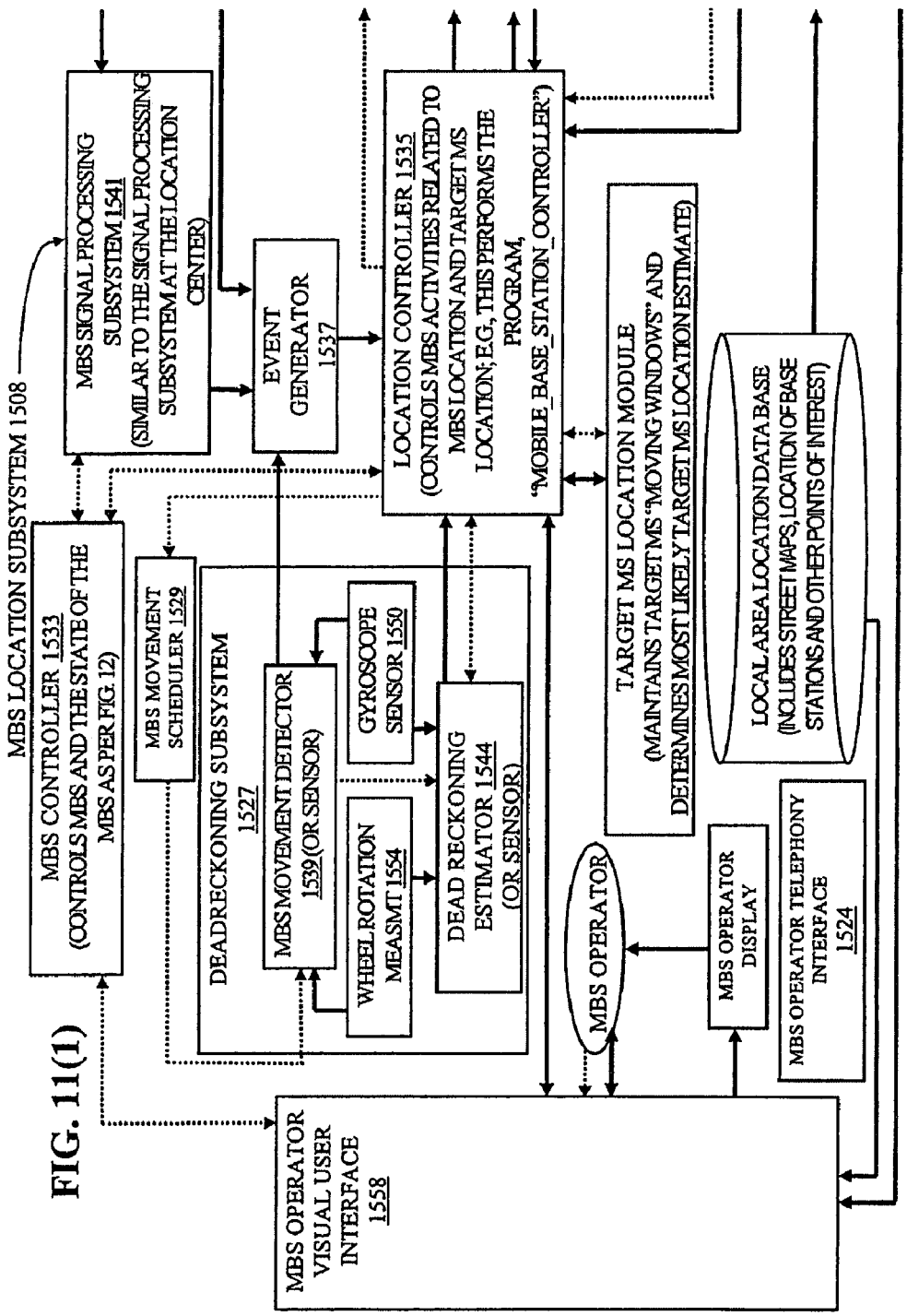
FIG. 11 is a high level block diagram of the mobile base station (MBS).
Figure 11:
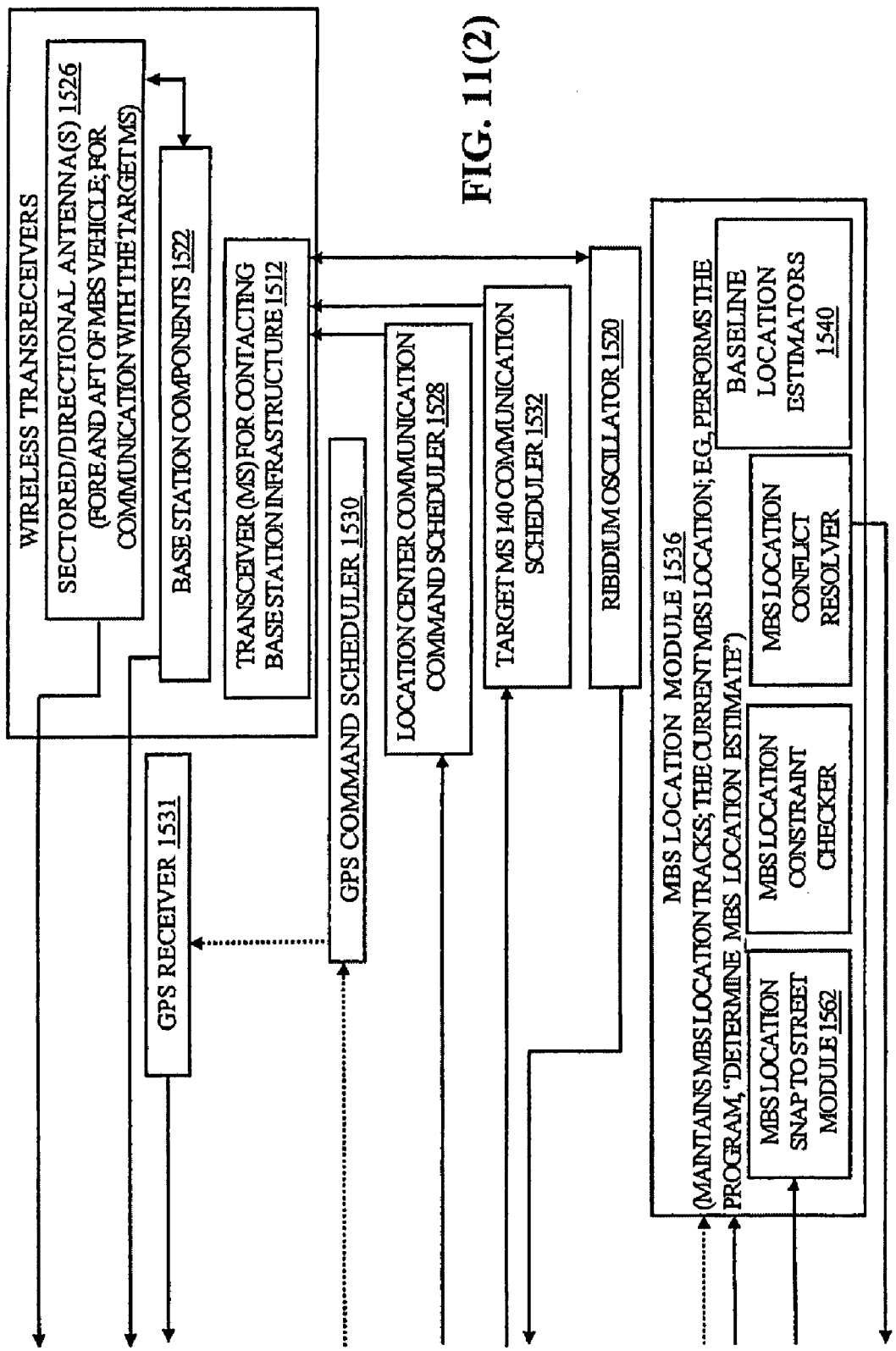
Figure 12:
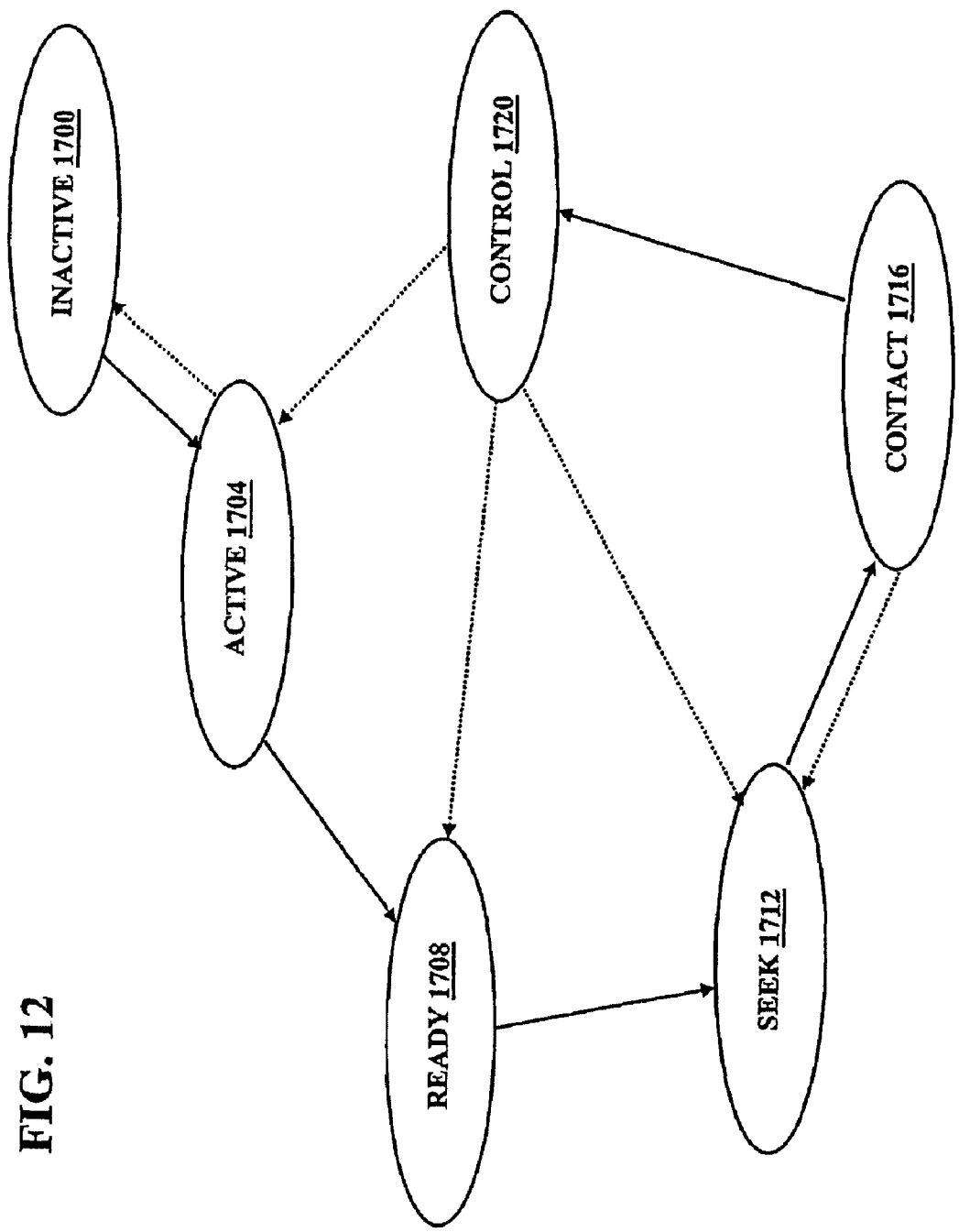
FIG. 12 is a high level state transition diagram describing computational states the Mobile Base station enters during operation.

FIG. 11 provides a high level block diagram architecture of one embodiment of the MBS location subsystem 1508. Accordingly, an MBS may include components for communicating with the fixed location BS network infrastructure and the location center 142 via an on-board transceiver 1512 that is effectively an MS 140 integrated into the location subsystem 1508. Thus, if the MBS 148 travels through an area having poor infrastructure signal coverage, then the MBS may not be able to communicate reliably with the location center 142 (e.g., in rural or mountainous areas having reduced wireless telephony coverage). So it is desirable that the MBS 148 must be capable of functioning substantially autonomously from the location center. In one embodiment, this implies that each MBS 148 must be capable of estimating both its own location as well as the location of a target MS 140.

Additionally, many commercial wireless telephony technologies require all BS's in a network to be very accurately time synchronized both for transmitting MS voice communication as well as for other services such as MS location. Accordingly, the MBS 148 will also require such time synchronization. However, since an MBS 148 may not be in constant communication with the fixed location BS network (and indeed may be off-line for substantial periods of time), on-board highly accurate timing device may be necessary. In one embodiment, such a device may be a commercially available ribidium oscillator 1520 as shown in FIG. 11.

Since the MBS 148, includes a scaled down version of a BS 122 (denoted 1522 in FIG. 11), it is capable of performing most typical BS 122 tasks, albeit on a reduced scale. In particular, the base station portion of the MBS 148 can:
 (a) raise/lower its pilot channel signal strength,
 (b) be in a state of soft hand-off with an MS 140, and/or
 (c) be the primary BS 122 for an MS 140, and consequently be in voice communication with the target MS (via the MBS operator telephony interface 1524) if the MS supports voice communication.
Further, the MBS 148 can, if it becomes the primary base station communicating with the MS 140, request the MS to raise/lower its power or, more generally, control the communication with the MS (via the base station components 1522). However, since the MBS 148 will likely have substantially reduced telephony traffic capacity in comparison to a standard infrastructure base station 122, note that the pilot channel for the MBS is preferably a nonstandard pilot channel in that it should not be identified as a conventional telephony traffic bearing BS 122 by MS's seeking normal telephony communication. Thus, a target MS 140 requesting to be located may, depending on its capabilities, either automatically configure itself to scan for certain predetermined MBS pilot channels, or be instructed via the fixed location base station network (equivalently BS infrastructure) to scan for a certain predetermined MBS pilot channel.

Moreover, the MBS 148 has an additional advantage in that it can substantially increase the reliability of communication with a target MS 140 in comparison to the base station infrastructure by being able to move toward or track the target MS 140 even if this MS is in (or moves into) a reduced infrastructure base station network coverage area. Furthermore, an MBS 148 may preferably use a directional or smart antenna 1526 to more accurately locate a direction of signals from a target MS 140. Thus, the sweeping of such a smart antenna 1526 (physically or electronically) provides directional information regarding signals received from the target MS 140. That is, such directional information is determined by the signal propagation delay of signals from the target MS 140 to the angular sectors of one of more directional antennas 1526 on-board the MBS 148.

Before proceeding to further details of the MBS location subsystem 1508, an example of the operation of an MBS 148 in the context of responding to a 911 emergency call is given. In particular, this example describes the high level computational states through which the MBS 148 transitions, these states also being illustrated in the state transition diagram of FIG. 12. Note that this figure illustrates the primary state transitions between these MBS 148 states, wherein the solid state transitions are indicative of a typical "ideal" progression when locating or tracking a target MS 140, and the dashed state transitions are the primary state reversions due, for example, to difficulties in locating the target MS 140.

Accordingly, initially the MBS 148 may be in an inactive state 1700, wherein the MBS location subsystem 1508 is effectively available for voice or data communication with the fixed location base station network, but the MS 140 locating capabilities of the MBS are not active. From the inactive state 1700 the MBS (e.g., a police or rescue vehicle) may enter an active state 1704 once an MBS operator has logged onto the MBS location subsystem of the MBS, such logging being for authentication, verification and journaling of MBS 148 events. In the active state 1704, the MBS may be listed by a 911 emergency center and/or the location center 142 as eligible for service in responding to a 911 request. From this state, the MBS 148 may transition to a ready state 1708 signifying that the MBS is ready for use in locating and/or intercepting a target MS 140. That is, the MBS 148 may transition to the ready state 1708 by performing the following steps:
 (1a) Synchronizing the timing of the location subsystem 1508 with that of the base station network infrastructure. In one embodiment, when requesting such time synchronization from the base station infrastructure, the MBS 148 will be at a predetermined or well known location so that the MBS time synchronization may adjust for a known amount of signal propagation delay in the synchronization signal.
 (1b) Establishing the location of the MBS 148. In one embodiment, this may be accomplished by, for example, an MBS operator identifying the predetermined or well known location at which the MBS 148 is located.

(1c) Communicating with, for example, the 911 emergency center via the fixed location base station infrastructure to identify the MBS 148 as in the ready state.

Thus, while in the ready state 1708, as the MBS 148 moves, it has its location repeatedly (re)-estimated via, for example, GPS signals, location center 142S location estimates from the base stations 122 (and 152), and an on-board deadreckoning subsystem 1527 having an MBS location estimator according to the programs described hereinbelow. However, note that the accuracy of the base station time synchronization (via the ribidium oscillator 1520) and the accuracy of the MBS 148 location may need to both be periodically recalibrated according to (1a) and (1b) above.

Assuming a 911 signal is transmitted by a target MS 140, this signal is transmitted, via the fixed location base station infrastructure, to the 911 emergency center and the location center 142, and assuming the MBS 148 is in the ready state 1708, if a corresponding 911 emergency request is transmitted to the MBS (via the base station infrastructure) from the 911 emergency center or the location center, then the MBS may transition to a seek state 1712 by performing the following steps:

(2a) Communicating with, for example, the 911 emergency response center via the fixed location base station network to receive the PN code for the target MS to be located (wherein this communication is performed using the MS-like transceiver 1512 and/or the MBS operator telephony interface 1524).

(2b) Obtaining a most recent target MS location estimate from either the 911 emergency center or the location center 142.

(2c) Inputting by the MBS operator an acknowledgment of the target MS to be located, and transmitting this acknowledgment to the 911 emergency response center via the transceiver 1512.

Subsequently, when the MBS 148 is in the seek state 1712, the MBS may commence toward the target MS location estimate provided. Note that it is likely that the MBS is not initially in direct signal contact with the target MS. Accordingly, in the seek state 1712 the following steps may be, for example, performed:

(3a) The location center 142 or the 911 emergency response center may inform the target MS, via the fixed location base station network, to lower its threshold for soft hand-off and at least periodically boost its location signal strength. Additionally, the target MS may be informed to scan for the pilot channel of the MBS 148. (Note the actions here are not, actions performed by the MBS 148 in the "seek state"; however, these actions are given here for clarity and completeness.)

(3b) Repeatedly, as sufficient new MS location information is available, the location center 142 provides new MS location estimates to the MBS 148 via the fixed location base station network.

(3c) The MBS repeatedly provides the MBS operator with new target MS location estimates provided substantially by the location center via the fixed location base station network.

(3d) The MBS 148 repeatedly attempts to detect a signal from the target MS using the PN code for the target MS.

(3e) The MBS 148 repeatedly estimates its own location (as in other states as well), and receives MBS location estimates from the location center.

Assuming that the MBS 148 and target MS 140 detect one another (which typically occurs when the two units are within 0.25 to 3 miles of one another), the MBS enters a contact state 1716 when the target MS 140 enters a soft hand-off state with the MBS. Accordingly, in the contact state 1716, the following steps are, for example, performed:

(4a) The MBS 148 repeatedly estimates its own location.

(4b) Repeatedly, the location center 142 provides new target MS 140 and MBS location estimates to the MBS 148 via the fixed location base infrastructure network.

(4c) Since the MBS 148 is at least in soft hand-off with the target MS 140, the MBS can estimate the direction and distance of the target MS itself using, for example, detected target MS signal strength and TOA as well as using any recent location center target MS location estimates.

(4d) The MBS 148 repeatedly provides the MBS operator with new target MS location estimates provided using MS location estimates provided by the MBS itself and by the location center via the fixed location base station network.

When the target MS 140 detects that the MBS pilot channel is sufficiently strong, the target MS may switch to using the MBS 148 as its primary base station. When this occurs, the MBS enters a control state 1720, wherein the following steps are, for example, performed:

(5a) The MBS 148 repeatedly estimates its own location.

(5b) Repeatedly, the location center 142 provides new target MS and MBS location estimates to the MBS 148 via the network of base stations 122 (152).

(5c) The MBS 148 estimates the direction and distance of the target MS 140 itself using, for example, detected target MS signal strength and TOA as well as using any recent location center target MS location estimates.

(5d) The MBS 148 repeatedly provides the MBS operator with new target MS location estimates provided using MS location estimates provided by the MBS itself and by the location center 142 via the fixed location base station network.

(5e) The MBS 148 becomes the primary base station for the target MS 140 and therefore controls at least the signal strength output by the target MS.

Note, there can be more than one MBS 148 tracking or locating an MS 140. There can also be more than one target MS 140 to be tracked concurrently and each target MS being tracked may be stationary or moving.

MBS Subsystem Architecture

An MBS 148 uses MS signal characteristic data for locating the MS 140. The MBS 148 may use such signal characteristic data to facilitate determining whether a given signal from the MS is a "direct shot" or an multipath signal. That is, in one embodiment, the MBS 148 attempts to determine or detect whether an MS signal transmission is received directly, or whether the transmission has been reflected or deflected. For example, the MBS may determine whether the expected signal strength, and TOA agree in distance estimates for the MS signal transmissions. Note, other signal characteristics may also be used, if there are sufficient electronics and processing available to the MBS 148; i.e., determining signal phase and/or polarity as other indications of receiving a "direct shot" from an MS 140.

In one embodiment, the MBS 148 (FIG. 11) includes an MBS controller 1533 for controlling the location capabilities of the MBS 148. In particular, the MBS controller 1533 initiates and controls the MBS state changes as described in FIG. 12. Additionally, the MBS controller 1533 also communicates with the location controller 1535, wherein this latter controller controls MBS activities related to MBS location and target MS location. The location controller 1535 receives data input from an event generator 1537 for generating event records to be provided to the location controller 1535. For example, records may be generated from data input received from: (a) the vehicle movement detector 1539 indicating that the MBS 148 has moved at least a predetermined amount and/or has changed direction by at least a predetermined angle, or (b) the MBS signal processing subsystem 1541 indicating that the additional signal measurement data has been received from either the location center 142 or the target MS 140. Note that the MBS signal processing subsystem 1541, in one embodiment, is similar to the signal processing subsystem 1220 of the location center 142. may have multiple command schedulers. In particular, a scheduler 1528 for commands related to communicating with the location center 142, a scheduler 1530 for commands related to GPS communication (via GPS receiver 1531), a scheduler 1529 for commands related to the frequency and granularity of the reporting of MBS changes in direction and/or position via the MBS dead reckoning subsystem 1527 (note that this scheduler is potentially optional and that such commands may be provided directly to the deadreckoning estimator 1544), and a scheduler 1532 for communicating with the target MS(s) 140 being located. Further, it is assumed that there is sufficient hardware and/or software to appear to perform commands in different schedulers substantially concurrently.

In order to display an MBS computed location of a target MS 140, a location of the MBS must be known or determined. Accordingly, each MBS 148 has a plurality of MBS location estimators (or hereinafter also simply referred to as location estimators) for determining the location of the MBS. Each such location estimator computes MBS location information such as MBS location estimates, changes to MBS location estimates, or, an MBS location estimator may be an interface for buffering and/or translating a previously computed MBS location estimate into an appropriate format. In particular, the MBS location module 1536, which determines the location of the MBS, may include the following MBS location estimators 1540 (also denoted baseline location estimators):

(a) a GPS location estimator 1540*a* (not individually shown) for computing an MBS location estimate using GPS signals, (b) a location center location estimator 1540*b* (not individually shown) for buffering and/or translating an MBS estimate received from the location center 142, (c) an MBS operator location estimator 1540*c* (not individually shown) for buffering and/or translating manual MBS location entries received from an MBS location operator, and (d) in some MBS embodiments, an LBS location estimator 1540*d* (not individually shown) for the activating and deactivating of LBS's 152. Note that, in high multipath areas and/or stationary base station marginal coverage areas, such low cost location base stations 152 (LBS) may be provided whose locations are fixed and accurately predetermined and whose signals are substantially only receivable within a relatively small range (e.g., 2000 feet), the range potentially being variable. Thus, by communicating with the LBS's 152 directly, the MBS 148 may be able to quickly use the location information relating to the location base stations for determining its location by using signal characteristics obtained from the LBSs 152.

Note that each of the MBS baseline location estimators 1540, such as those above, provide an actual MBS location rather than, for example, a change in an MBS location. Further note that it is an aspect of the present disclosure that additional MBS baseline location estimators 1540 may be easily integrated into the MBS location subsystem 1508 as such baseline location estimators become available. For example, a baseline location estimator that receives MBS location estimates from reflective codes provided, for example, on streets or street signs can be straightforwardly incorporated into the MBS location subsystem 1508.

Additionally, note that a plurality of MBS location technologies and their corresponding MBS location estimators are utilized due to the fact that there is currently no single location technology available that is both sufficiently fast, accurate and accessible in substantially all terrains to meet the location needs of an MBS 148. For example, in many terrains GPS technologies may be sufficiently accurate; however, GPS technologies: (a) may require a relatively long time to provide an initial location estimate (e.g., greater than 2 minutes); (b) when GPS communication is disturbed, it may require an equally long time to provide a new location estimate; (c) clouds, buildings and/or mountains can prevent location estimates from being obtained; (d) in some cases signal reflections can substantially skew a location estimate. As another example, an MBS 148 may be able to use triangulation or trilateralization technologies to obtain a location estimate; however, this assumes that there is sufficient (fixed location) infrastructure BS coverage in the area the MBS is located. Further, it is well known that the multipath phenomenon can substantially distort such location estimates. Thus, for an MBS 148 to be highly effective in varied terrains, an MBS is provided with a plurality of location technologies, each supplying an MBS location estimate.

In fact, much of the architecture of the location engine 139 could be incorporated into an MBS 148. For example, in some embodiments of the MBS 148, the following FOMs 1224 may have similar location models incorporated into the MBS:

(a) a variation of the TCSO FOM 1224 wherein TOA signals from communicating fixed location BS's are received (via the MBS transceiver 1512) by the MBS and used for providing a location estimate;

(b) a variation of the artificial neural net based FOMs 1224 (or more generally a location learning or a classification model) may be used to provide MBS location estimates via, for example, learned associations between fixed location BS signal characteristics and geographic locations;

(c) an LBS location FOM 1224 for providing an MBS with the ability to activate and deactivate LBS's to provide (positive) MBS location estimates as well as negative MBS location regions (i.e., regions where the MBS is unlikely to be since one or more LBS's are not detected by the MBS transceiver);

(d) one or more MBS location reasoning agents and/or a location estimate heuristic agents for resolving MBS location estimate conflicts and providing greater MBS location estimate accuracy. For example, modules similar to the analytical reasoner module 1416 and the historical location reasoner module 1424.

However, for those MBS location models requiring communication with the base station infrastructure, an alternative embodiment is to rely on the location center 142 to perform the computations for at least some of these MBS FOM models. That is, since each of the MBS location models mentioned immediately above require communication with the network of fixed location BS's 122 (152), it may be advantageous to transmit MBS location estimating data to the location center 142 as if the MBS were another MS 140 for the location center to locate, and thereby rely on the location estimation capabilities at the location center rather than duplicate such models in the MBS 148. The advantages of this approach are that:

(a) an MBS is likely to be able to use less expensive processing power and software than that of the location center;

(b) an MBS is likely to require substantially less memory, particularly for data bases, than that of the location center.

As will be discussed further below, in one embodiment of the MBS 148, there are confidence values assigned to the locations output by the various location estimators 1540. Thus, the confidence for a manual entry of location data by an MBS operator may be rated the highest and followed by the confidence for (any) GPS location data, followed by the confidence for (any) location center location 142 estimates, followed by the confidence for (any) location estimates using signal characteristic data from LBSs. However, such prioritization may vary depending on, for instance, the radio coverage area 120. In an one embodiment of the present disclosure, it is an aspect of the present disclosure that for MBS location data received from the GPS and location center, their confidences may vary according to the area in which the MBS 148 resides. That is, if it is known that for a given area, there is a reasonable probability that a GPS signal may suffer multipath distortions and that the location center has in the past provided reliable location estimates, then the confidences for these two location sources may be reversed.

In one embodiment of the present disclosure, MBS operators may be requested to occasionally manually enter the location of the MBS 148 when the MBS is stationary for determining and/or calibrating the accuracy of various MBS location estimators.

There is an additional important source of location information for the MBS 148 that is incorporated into an MBS vehicle (such as a police vehicle) that has no comparable functionality in the network of fixed location BS's. That is, the MBS 148 may use deadreckoning information provided by a deadreckoning MBS location estimator 1544 whereby the MBS may obtain MBS deadreckoning location change estimates. Accordingly, the deadreckoning MBS location estimator 1544 may use, for example, an on-board gyroscope 1550, a wheel rotation measurement device (e.g., odometer) 1554, and optionally an accelerometer (not shown). Thus, such a deadreckoning MBS location estimator 1544 periodically provides at least MBS distance and directional data related to MBS movements from a most recent MBS location estimate. More precisely, in the absence of any other new MBS location information, the deadreckoning MBS location estimator 1544 outputs a series of measurements, wherein each such measurement is an estimated change (or delta) in the position of the MBS 148 between a request input timestamp and a closest time prior to the timestamp, wherein a previous deadreckoning terminated. Thus, each deadreckoning location change estimate includes the following fields:

(a) an "earliest timestamp" field for designating the start time when the deadreckoning location change estimate commences measuring a change in the location of the MBS;

(b) a "latest timestamp" field for designating the end time when the deadreckoning location change estimate stops measuring a change in the location of the MBS; and (c) an MBS location change vector.

That is, the "latest timestamp" is the timestamp input with a request for deadreckoning location data, and the "earliest timestamp" is the timestamp of the closest time, T, prior to the latest timestamp, wherein a previous deadreckoning output has its a timestamp at a time equal to T.

Further, the frequency of such measurements provided by the deadreckoning subsystem 1527 may be adaptively provided depending on the velocity of the MBS 148 and/or the elapsed time since the most recent MBS location update. Accordingly, the architecture of at least some embodiments of the MBS location subsystem 1508 must be such that it can utilize such deadreckoning information for estimating the location of the MBS 148.

In one embodiment of the MBS location subsystem 1508 described in further detail hereinbelow, the outputs from the deadreckoning MBS location estimator 1544 are used to synchronize MBS location estimates from different MBS baseline location estimators. That is, since such a deadreckoning output may be requested for substantially any time from the deadreckoning MBS location estimator, such an output can be requested for substantially the same point in time as the occurrence of the signals from which a new MBS baseline location estimate is derived. Accordingly, such a deadreckoning output can be used to update other MBS location estimates not using the new MBS baseline location estimate.

It is assumed that the error with dead reckoning increases with deadreckoning distance. Accordingly, it is an aspect of the embodiment of the MBS location subsystem 1508 that when incrementally updating the location of the MBS 148 using deadreckoning and applying deadreckoning location change estimates to a "most likely area" in which the MBS 148 is believed to be, this area is incrementally enlarged as well as shifted. The enlargement of the area is used to account for the inaccuracy in the deadreckoning capability. Note, however, that the deadreckoning MBS location estimator is periodically reset so that the error accumulation in its outputs can be decreased. In particular, such resetting occurs when there is a high probability that the location of the MBS is known. For example, the deadreckoning MBS location estimator may be reset when an MBS operator manually enters an MBS location or verifies an MBS location, or a computed MBS location has sufficiently high confidence.

Thus, due to the MBS 148 having less accurate location information (both about itself and a target MS 140), and further that deadreckoning information must be utilized in maintaining MBS location estimates, a first embodiment of the MBS location subsystem architecture is somewhat different from the location engine 139 architecture. That is, the architecture of this first embodiment is simpler than that of the architecture of the location engine 139. However, it important to note that, at a high level, the architecture of the location engine 139 may also be applied for providing a second embodiment of the MBS location subsystem 1508, as one skilled in the art will appreciate after reflecting on the architectures and processing provided at an MBS 148. For example, an MBS location subsystem 1508 architecture may be provided that has one or more first order models 1224 whose output is supplied to, for example, a blackboard or expert system for resolving MBS location estimate conflicts, such an architecture being analogous to one embodiment of the location engine 139 architecture.

Furthermore, it is also an important aspect of the present disclosure that, at a high level, the MBS location subsystem architecture may also be applied as an alternative architecture for the location engine 139. For example, in one embodiment of the location engine 139, each of the first order models 1224 may provide its MS location hypothesis outputs to a corresponding "location track," analogous to the MBS location tracks described hereinbelow, and subsequently, a most likely MS current location estimate may be developed in a "current location track" (also described hereinbelow) using the most recent location estimates in other location tracks. Thus, the location estimating models of the location center 139 and those of the MBS 148 are may be interchanged depending on the where it is deemed most appropriate for such each such model to reside. Additionally, note that in different embodiments of the present disclosure, various combinations of the location center location architecture and the mobile station architecture may be utilized at either the location center or the MBS 148. Thus, by providing substantially all location estimating computational models at the location center 142, the models described here for locating the MBS 148 (and equivalently, its incorporated MS 140) can be used for locating other MSs 140 that are be capable of supporting transmission of wireless signal measurements that relate to models requiring the additional electronics available at the MBS 140 (e.g., GPS or other satellite signals used for location).

Further, note that the ideas and methods discussed here relating to MBS location estimators 1540 and MBS location tracks, and, the related programs hereinbelow are sufficiently general so that these ideas and methods may be applied in a number of contexts related to determining the location of a device capable of movement and wherein the location of the device must be maintained in real time. For example, the present ideas and methods may be used by a robot in a very cluttered environment (e.g., a warehouse), wherein the robot has access: (a) to a plurality of "robot location estimators" that may provide the robot with sporadic location information, and (b) to a deadreckoning location estimator.

Each MBS 148, additionally, has a location display (denoted the MBS operator visual user interface 1558 in FIG. 11) where area maps that may be displayed together with location data. In particular, MS location data may be displayed on this display as a nested collection of areas, each smaller nested area being the most likely area within (any) encompassing area for locating a target MS 140. Note that the MBS controller algorithm below may be adapted to receive location center 142 data for displaying the locations of other MBSs 148 as well as target MSs 140.

Further, the MBS 148 may constrain any location estimates to streets on a street map using the MBS location snap to street module 1562. For example, an estimated MBS location not on a street may be "snapped to" a nearest street location. Note that a nearest street location determiner may use "normal" orientations of vehicles on streets as a constraint on the nearest street location. Particularly, if an MBS 148 is moving at typical rates of speed and acceleration, and without abrupt changes direction. For example, if the deadreckoning MBS location estimator 1544 indicates that the MBS 148 is moving in a northerly direction, then the street snapped to should be a north-south running street. Moreover, the MBS location snap to street module 1562 may also be used to enhance target MS location estimates when, for example, it is known or suspected that the target MS 140 is in a vehicle and the vehicle is moving at typical rates of speed. Furthermore, the snap to street location module 1562 may also be used in enhancing the location of a target MS 140 by either the MBS 148 or by the location engine 139. In particular, the location estimator 1344 or an additional module between the location estimator 1344 and the output gateway 1356 may utilize an embodiment of the snap to street location module 1562 to enhance the accuracy of target MS 140 location estimates that are known to be in vehicles. Note that this may be especially useful in locating stolen vehicles that have embedded wireless location transceivers (MSs 140), wherein appropriate wireless signal measurements can be provided to the location center 142.

MBS Data Structure Remarks

Figure 13:
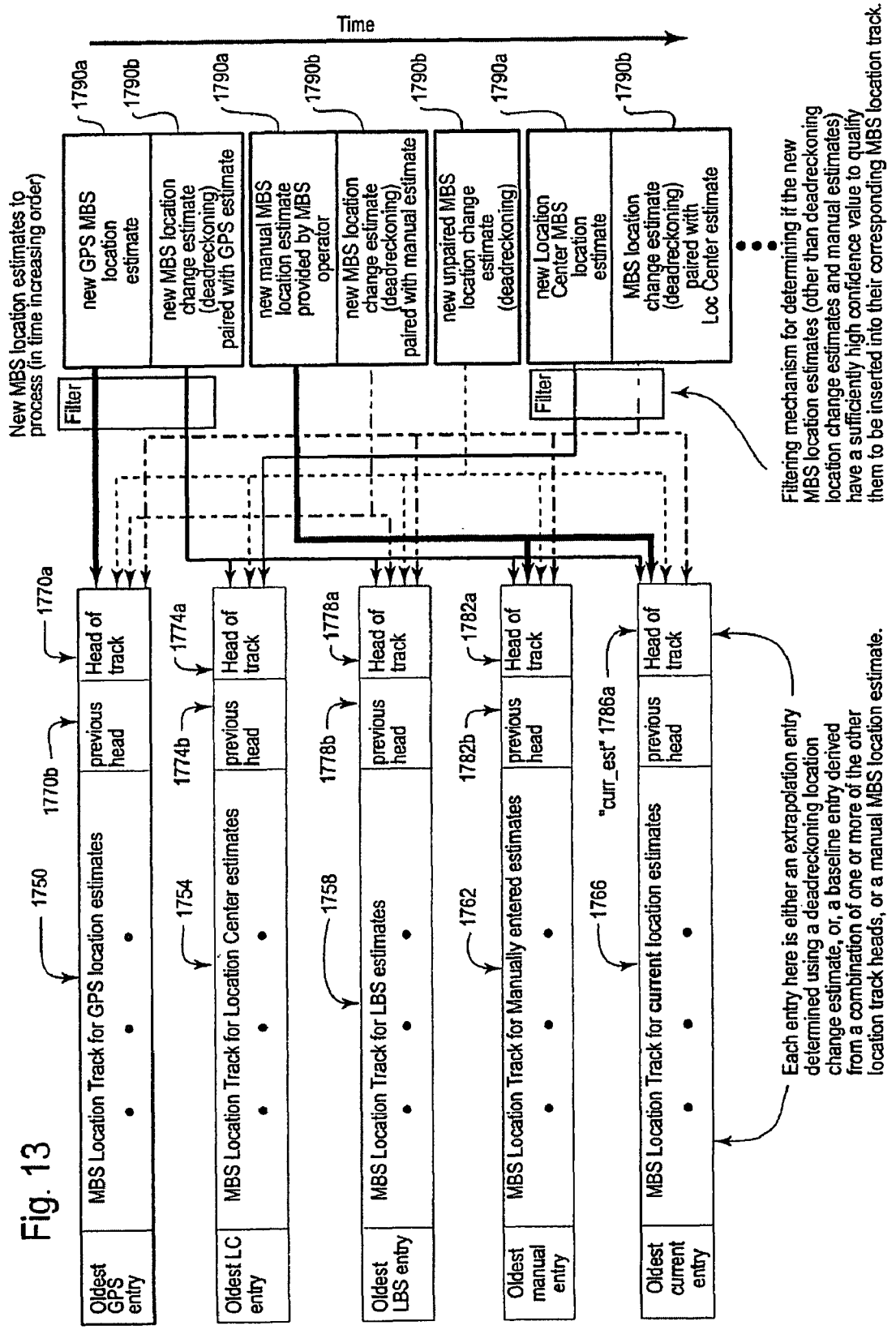
FIG. 13 is a high level diagram illustrating the data structural organization of the Mobile Base station capability for autonomously determining a most likely MBS location from a plurality of potentially conflicting MBS location estimating sources.
Figure 14:
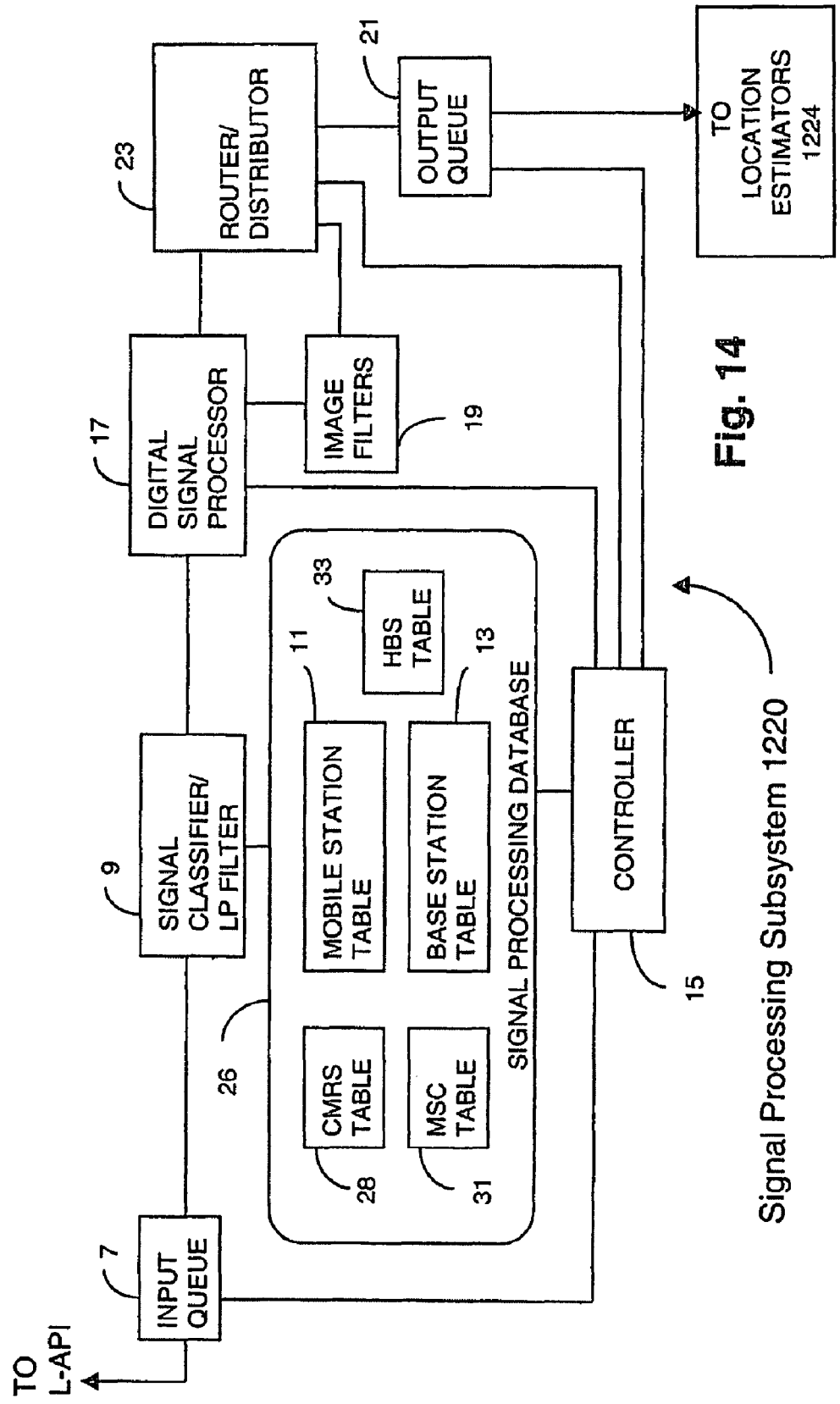
FIG. 14 illustrates the primary components of the signal processing subsystem.
Figure 15:
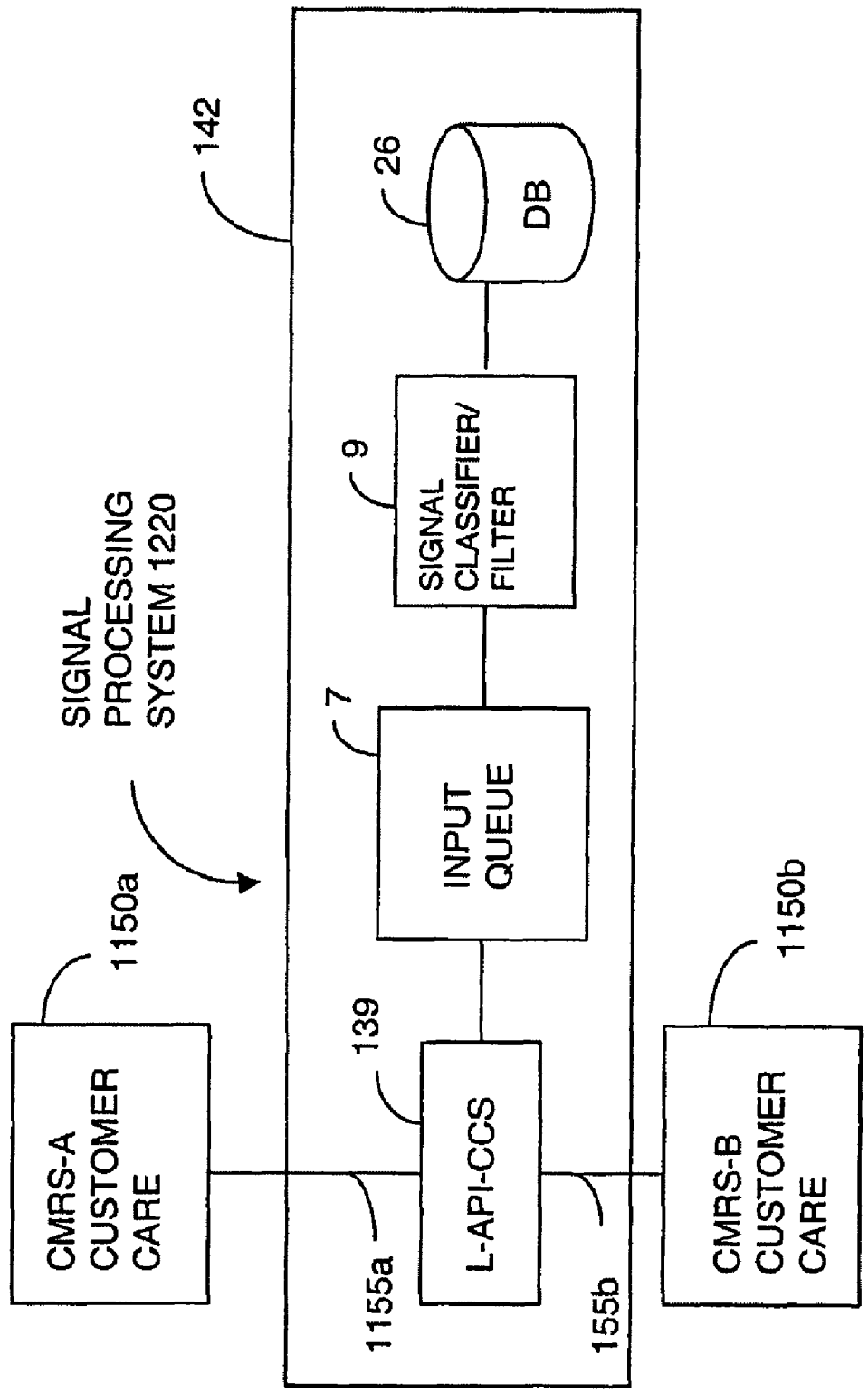
FIG. 15 illustrates how automatic provisioning of mobile station information from multiple CMRS occurs.

Assuming the existence of at least some of the location estimators 1540 that were mentioned above, the discussion here refers substantially to the data structures and their organization as illustrated in FIG. 13.

The location estimates (or hypotheses) for an MBS 148 determining its own location each have an error or range estimate associated with the MBS location estimate. That is, each such MBS location estimate includes a "most likely MBS point location" within a "most likely area". The "most likely MBS point location" is assumed herein to be the centroid of the "most likely area." In one embodiment of the MBS location subsystem 1508, a nested series of "most likely areas" may be provided about a most likely MBS point location. However, to simplify the discussion herein each MBS location estimate is assumed to have a single "most likely area". One skilled in the art will understand how to provide such nested "most likely areas" from the description herein. Additionally, it is assumed that such "most likely areas" are not grossly oblong; i.e., area cross sectioning lines through the centroid of the area do not have large differences in their lengths. For example, for any such "most likely area", A, no two such cross sectioning lines of A through the centroid thereof may have lengths that vary by more than a factor of five.

Each MBS location estimate also has a confidence associated therewith providing a measurement of the perceived accuracy of the MBS being in the "most likely area" of the location estimate.

A (MBS) "location track" is an data structure (or object) having a queue of a predetermined length for maintaining a temporal (timestamp) ordering of "location track entries" such as the location track entries 1770a, 1770b, 1774a, 1774b, 1778a, 1778b, 1782a, 1782b, and 1786a (FIG. 13), wherein each such MBS location track entry is an estimate of the location of the MBS at a particular corresponding time.

There is an MBS location track for storing MBS location entries obtained from MBS location estimation information from each of the MBS baseline location estimators described above (i.e., a GPS location track 1750 for storing MBS location estimations obtained from the GPS location estimator 1540, a location center location track 1754 for storing MBS location estimations obtained from the location estimator 1540 deriving its MBS location estimates from the location center 142, an LBS location track 1758 for storing MBS location estimations obtained from the location estimator 1540 deriving its MBS location estimates from base stations 122 and/or 152, and a manual location track 1762 for MBS operator entered MBS locations). Additionally, there is one further location track, denoted the "current location track" 1766 whose location track entries may be derived from the entries in the other location tracks (described further hereinbelow). Further, for each location track, there is a location track head that is the head of the queue for the location track. The location track head is the most recent (and presumably the most accurate) MBS location estimate residing in the location track. Thus, for the GPS location track 1750 has location track head 1770; the location center location track 1754 has location track head 1774; the LBS location track 1758 has location track head 1778; the manual location track 1762 has location track head 1782; and the current location track 1766 has location track head 1786. Additionally, for notational convenience, for each location track, the time series of previous MBS location estimations (i.e., location track entries) in the location track will herein be denoted the "path for the location track." Such paths are typically the length of the location track queue containing the path. Note that the length of each such queue may be determined using at least the following considerations:
- (i) In certain circumstances (described hereinbelow), the location track entries are removed from the head of the location track queues so that location adjustments may be made. In such a case, it may be advantageous for the length of such queues to be greater than the number of entries that are expected to be removed;
- (ii) In determining an MBS location estimate, it may be desirable in some embodiments to provide new location estimates based on paths associated with previous MBS location estimates provided in the corresponding location track queue.

Also note that it is within the scope of the present disclosure that the location track queue lengths may be a length of one.

Regarding location track entries, each location track entry includes:
- (a) a "derived location estimate" for the MBS that is derived using at least one of:
  - (i) at least a most recent previous output from an MBS baseline location estimator 1540 (i.e., the output being an MBS location estimate);
  - (ii) deadreckoning output information from the deadreckoning subsystem 1527. Further note that each output from an MBS location estimator has a "type" field that is used for identifying the MBS location estimator of the output.
- (b) an "earliest timestamp" providing the time/date when the earliest MBS location information upon which the derived location estimate for the MBS depends. Note this will typically be the timestamp of the earliest MBS location estimate (from an MBS baseline location estimator) that supplied MBS location information used in deriving the derived location estimate for the MBS 148.
- (c) a "latest timestamp" providing the time/date when the latest MBS location information upon which the derived location estimate for the MBS depends. Note that earliest timestamp=latest timestamp only for so called "baseline entries" as defined hereinbelow. Further note that this attribute is the one used for maintaining the "temporal (timestamp) ordering" of location track entries.
- (d) A "deadreckoning distance" indicating the total distance (e.g., wheel turns or odometer difference) since the most recently previous baseline entry for the corresponding MBS location estimator for the location track to which the location track entry is assigned.

For each MBS location track, there are two categories of MBS location track entries that may be inserted into a MBS location track:
- (a) "baseline" entries, wherein each such baseline entry includes (depending on the location track) a location estimate for the MBS 148 derived from: (i) a most recent previous output either from a corresponding MBS baseline location estimator, or (ii) from the baseline entries of other location tracks (this latter case being the for the "current" location track);
- (b) "extrapolation" entries, wherein each such entry includes an MBS location estimate that has been extrapolated from the (most recent) location track head for the location track (i.e., based on the track head whose "latest timestamp" immediately precedes the latest timestamp of the extrapolation entry). Each such extrapolation entry is computed by using data from a related deadreckoning location change estimate output from the deadreckoning MBS location estimator 1544. Each such deadreckoning location change estimate includes measurements related to changes or deltas in the location of the MBS 148. More precisely, for each location track, each extrapolation entry is determined using: (i) a baseline entry, and (ii) a set of one or more (i.e., all later occurring) deadreckoning location change estimates in increasing "latest timestamp" order. Note that for notational convenience this set of one or more deadreckoning location change estimates will be denoted the "deadreckoning location change estimate set" associated with the extrapolation entry resulting from this set.
- (c) Note that for each location track head, it is either a baseline entry or an extrapolation entry. Further, for each extrapolation entry, there is a most recent baseline entry, B, that is earlier than the extrapolation entry and it is this B from which the extrapolation entry was extrapolated. This earlier baseline entry, B, is hereinafter denoted the "baseline entry associated with the extrapolation entry." More generally, for each location track entry, T, there is a most recent previous baseline entry, B, associated with T, wherein if T is an extrapolation entry, then B is as defined above, else if T is a baseline entry itself, then T=B. Accordingly, note that for each extrapolation entry that is the head of a location track, there is a most recent baseline entry associated with the extrapolation entry.

Further, there are two categories of location tracks:
- (a) "baseline location tracks," each having baseline entries exclusively from a single predetermined MBS baseline location estimator; and
- (b) a "current" MBS location track having entries that are computed or determined as "most likely" MBS location estimates from entries in the other MBS location tracks.

MBS Location Estimating Strategy

In order to be able to properly compare the track heads to determine the most likely MBS location estimate it is an aspect of the present disclosure that the track heads of all location tracks include MBS location estimates that are for substantially the same (latest) timestamp. However, the MBS location information from each MBS baseline location estimator is inherently substantially unpredictable and unsynchronized. In fact, the only MBS location information that may be considered predicable and controllable is the deadreckoning location change estimates from the deadreckoning MBS location estimator 1544 in that these estimates may reliably be obtained whenever there is a query from the location controller 1535 for the most recent estimate in the change of the location for the MBS 148. Consequently (referring to FIG. 13), synchronization records 1790 (having at least a 1790b portion, and in some cases also having a 1790a portion) may be provided for updating each location track with a new MBS location estimate as a new track head. In particular, each synchronization record includes a deadreckoning location change estimate to be used in updating all but at most one of the location track heads with a new MBS location estimate by using a deadreckoning location change estimate in conjunction with each MBS location estimate from an MBS baseline location estimator, the location track heads may be synchronized according to timestamp. More precisely, for each MBS location estimate, E, from an MBS baseline location estimator, there is substantially simultaneously a query of the deadreckoning MBS location estimator for a corresponding most recent change in the location of the MBS 148. Accordingly, E and the retrieved MBS deadreckoning location change estimate, C, have substantially the same "latest timestamp". Thus, the location estimate E may be used to create a new baseline track head for the location track having the corresponding type for E, and C may be used to create a corresponding extrapolation entry as the head of each of the other location tracks. Accordingly, since for each MBS location estimate, E, there is a MBS deadreckoning location change estimate, C, having substantially the same "latest timestamp", E and C will be hereinafter referred to as "paired."

High Level Description of a Wireless Platform

Figure 20:
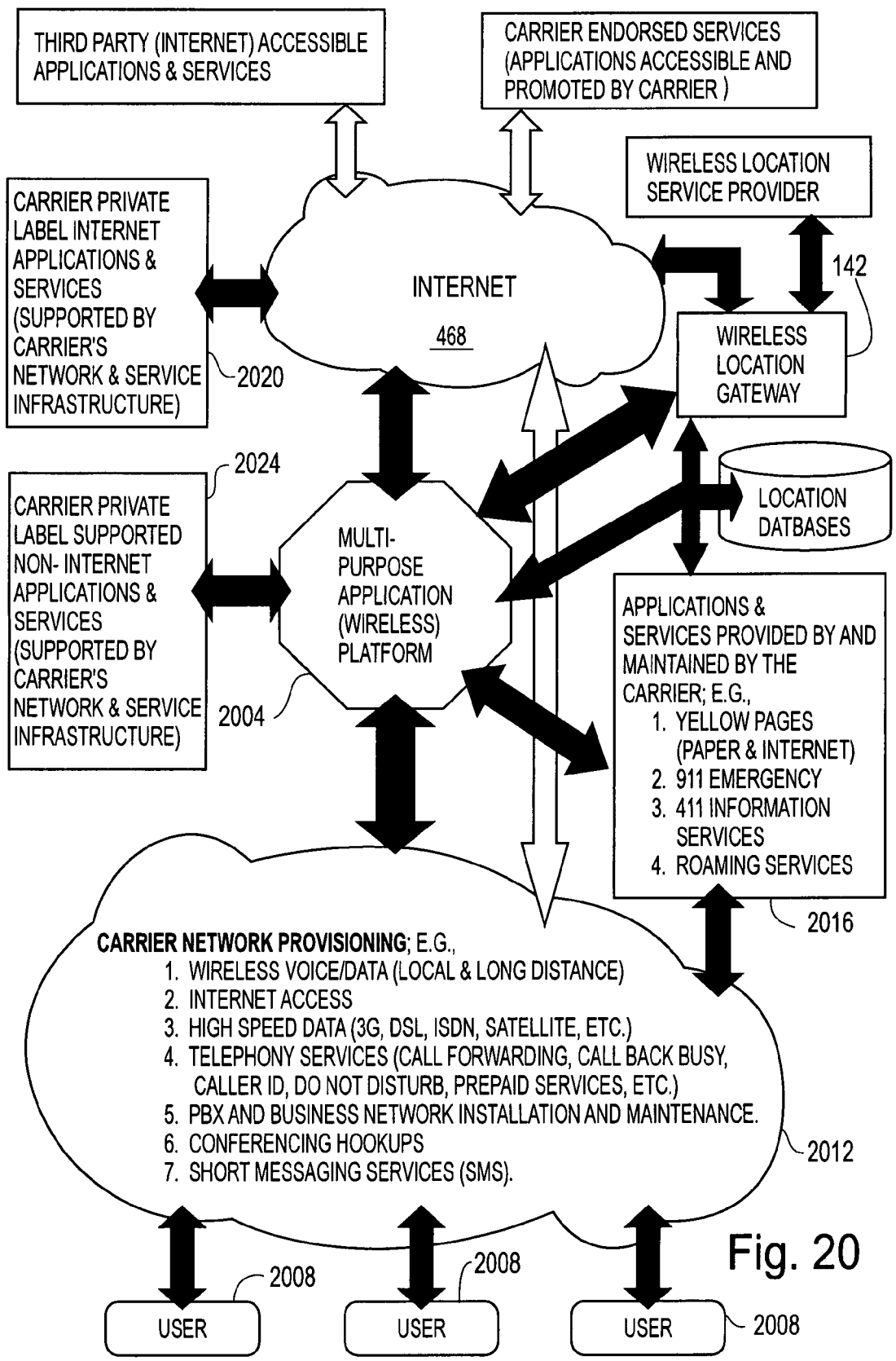
FIG. 20 is a high level block diagram illustrating the wireless application platform of the present disclosure.

FIG. 20 is a high level block diagram illustrating the wireless application platform 2004 of the present disclosure in combination with various services and network components with which the platform communicates. In particular, the embodiment of FIG. 20 is illustrative of how the platform 2004 communicates with, e.g., the subscribers (e.g., users 2008), applications (e.g., applications 2016, 2020, 2024, 2028, and 2032 which may or may not receive wireless location related information from the wireless location gateway 142), and network accessible components (e.g., wireless equipment) for a single commercial wireless carrier. The platform 2004 communicates with subscribers or users 2008 of the wireless carrier via, e.g., a mobile station 140 in communication with various provisioning equipment and communication services of the wireless carrier, collectively this equipment and communication services are identified as carrier network provisioning 2012, and may include e.g.:

1. wireless voice and/or wireless data (local and/or long distance) services;
2. Internet access;
3. high speed data and/or Internet services such as (3G, cable, DSL, ISDN, satellite communications, etc.);
4. telephony specific services (e.g., call forwarding, call back busy, Caller ID, Do Not Disturb, prepaid calling card services, etc.);
5. PBX and/or business network installation and maintenance services;
6. teleconferencing provisioning and services; and/or
7. short messaging services (SMS).

More particularly, users 2008 can communicate various requests to the platform 2004 for various wireless location related services such as:

PR 1. Requests for routing the user from his/her location to a desired location;
PR 2. Requests for information about products, services, places and/or persons that are geographically related to a location of the user 2008;
PR 3. Requests for displaying and/or modifying, e.g., user profile information to thereby change access permissions, and/or profile visibility;
PR 4. Requests for activating or deactivating services, e.g., wireless services such as hotel concierge wireless location and routing services offered by hotel, such services capable of, e.g., being attached and detached from a user's profile as a unit;
PR 5. Requests for procuring products and/or services (location related or otherwise); and/or
PR 6. Standard telephony, Internet and data services.

It is worth noting that embodiments of related wireless platforms have been described in the art. In particular, International Patent Application PCT/US01/02526, filed Jan. 26, 2001 by McDowell et. al. titled: "Method and Apparatus For Sharing Mobile User Event Information Between Wireless Between Wireless and Fixed IP Networks" incorporated herein fully by reference, and, International Patent Application PCT/US02/04533, filed Feb. 15, 2002 by McDowell et. al. titled: "Use Of Presence And Location Information Concerning Wireless Subscribers For Instant Messaging And Mobile Commerce" also incorporated herein fully by reference. However, these platforms appear directed to short messaging service applications and ecommerce (i.e., merchant advertising), and do not appear to address issues related to the easy incorporation of entirely new complex network services, and in particular, for network services wherein there is a uniform architecture for communications between the platform and new network service applications. Instead, the PCT/US02/04533 application is directed to: "the integration of presence determination, location determination, Instant Messaging, and mobile commerce into a functionally seamless system" wherein such presence determination "determines whether a mobile device is ON or OFF in real-time." So that this system (i.e., McDowell's) "may then share the revenue generated through the sale of subscriber information with the participating wireless carriers that host the subscribers.", and "determines both Internet presence and wireless network presence, and makes this information available to entities on both networks." However, the above-identified McDowell et. al. PCT patent applications do provide appropriate supportive and enabling information for the present disclosure, and in particular, the platform 2004.

Figure 21:
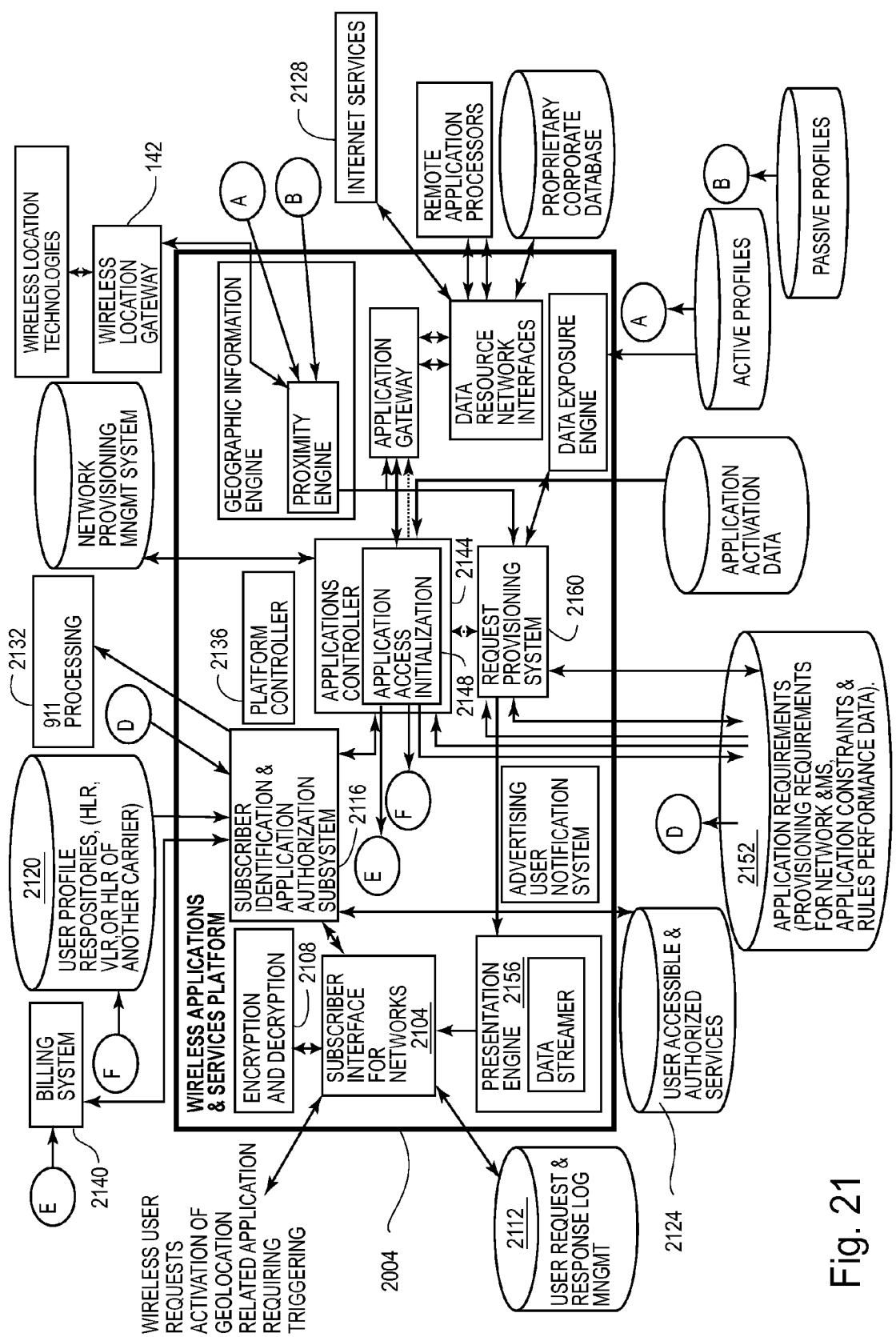
FIG. 21 is a more detailed block diagram illustrating the wireless application platform of the present disclosure.
Figure 22:
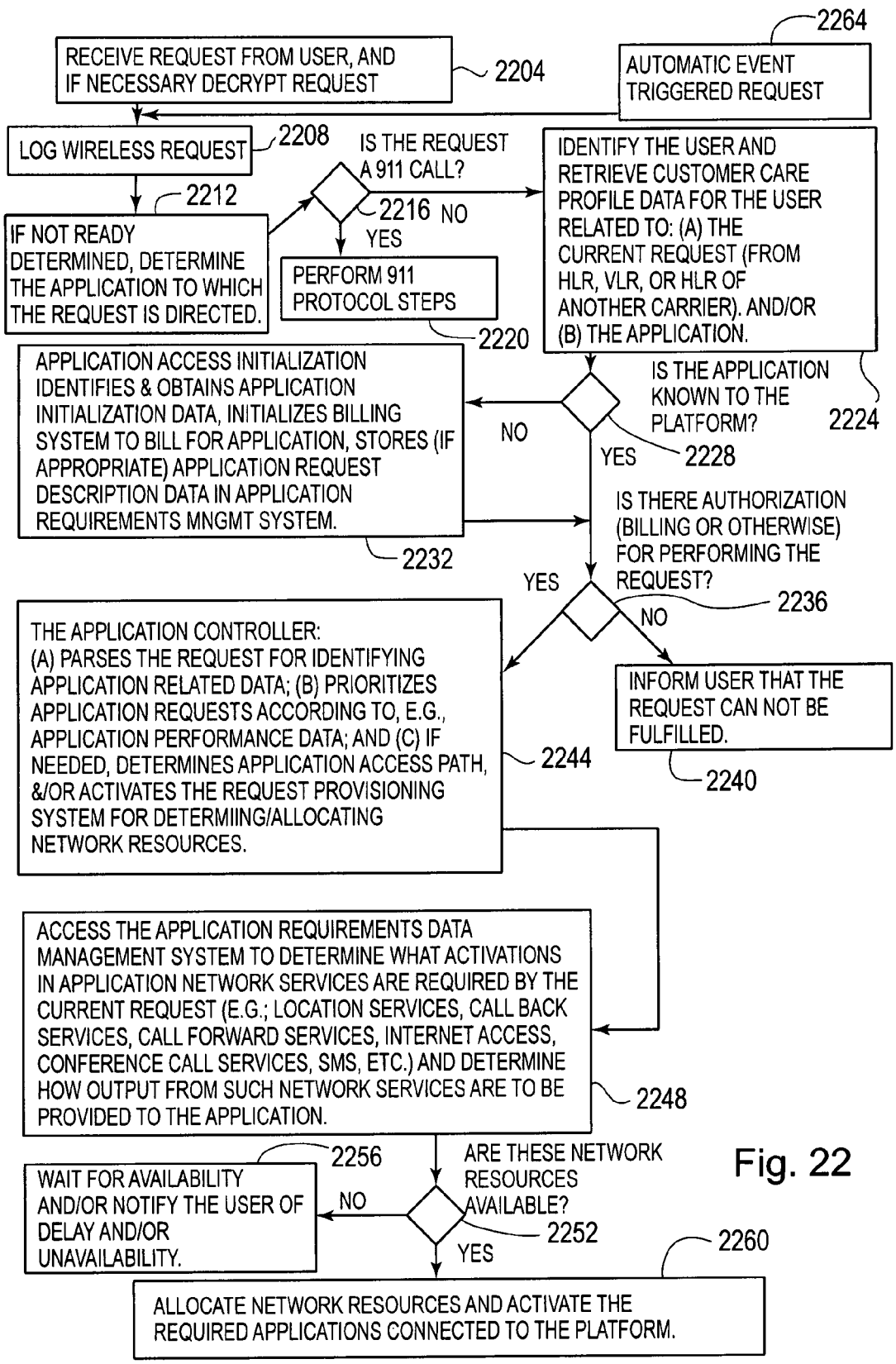
FIG. 22 is a high level flowchart of the operation of the wireless application platform of the present disclosure.

FIG. 22 shows an embodiment of the high level steps performed that can be performed by the platform 2004. Descriptions of these steps follows:

Step 2204: The subscriber interfaces 2104 (FIG. 21) receives a service request from a user 2008, via the carrier network provisioning 2012 (FIG. 20). Note that such service requests may be from users 2008 where such users include not only persons, but also entities such as businesses, employers, other telecommunication carriers, government agencies (e.g., command, control, and communications centers), law enforcement, etc. In at least some circumstances, the actual payload of the data describing the service request and/or related data in the request may be encrypted. Thus, the present step determines whether one or more portions of the service request is encrypted, and if so, activates the encryption and decryption component 2108 (FIG. 21) for decrypting the service request. Encryption/decryption cyphers are well known in the art, and accordingly will not be discussed at length here. However, the encryption and decryption component 2108 may support a substantial number encryption/decryption cyphers, (e.g., RC4 and RSA, by Security Inc, Belford, Mass., USA) as well as such general encryption techniques as public/private key cryptographic technique such as Diffie-Hellman.

Note that the present step may identify, e.g., at least some of the following data items:
(i) the identity of the requester;
(ii) the identity of an entity (or entities) to whom an action of the request is directed, e.g., (a) the identity of the person or MS 140 whose wireless location is requested (this may be the mobile identification number (MIN) as one skilled in the art will understand), or (b) the identity of a package whose whereabouts is being tracked, (c) the location of an MS 140 which to be identified (e.g., in a battlefield context to determine if the location of the MS corresponds to friend or foe);
(iii) any additional data that may be needed by an application activated to fulfill the request, e.g., for an MS 140 location request, this may include the last known location of the MS;
(iv) any timing constraints that the service requesting application should aware of;
(v) any authorization code needed for granting access to any generated information about the entity (e.g., for determining a subscriber's location, a code indicating that permission has been obtained to locate the subscriber, or a code indicating that location of the subscriber is at the request of the government agency responsible for national security or crime prevention);

(vi) any encryption parameters needed for a resulting response to the request;

(vii) the identity of any specific application to be activated to fulfill the request;

(viii) any billing code required in order to bill for fulfilling the service request;

(ix) a priority for fulfilling the service request (note, emergency 911 and other time critical life threatening or emergency services will have highest priority and may pre-empt other service requests being processed by the platform 2004);

(x) identity of all destinations, entities and/or persons to which the results from the fulfillment (and/or activation) of the service request is to be transmitted;

(xi) any authorization code or protocol to be used in identifying the appropriate person or entity prior to presenting information related to the results of the service request.

Further note, however, that it is not intended that the user 2008 be required to enter all of the items identified in this step. In particular, many of these items may be automatically filled in with default values residing on the user's service requesting device.

Step 2208: With any decryption completed, the service request is now readable and accordingly may be logged in the user request & response log management database 2112 (FIG. 21) so that, e.g., (i) audits can be performed for verifying what service requests have been received, (ii) analyzing platform 2004 performance, diagnosing errors in service request processing, and/or statistical analysis of service request volume may be performed, and (iii) tracking or identifying criminal behavior and/or misuse of a service offered by the platform 2004.

Regarding the request & response log management database 2112, this database may capture and store at least most of the following information related to a service request received by the platform 2004:

(a) The identity of the party initiating the service request, e.g., a user ID or log in name;

(b) The time of receipt of the service request;

(c) The identity of the service requested;

(d) The priority of the service request (if any provided);

(e) Any time constraints that the service request is imposing (e.g., a response within 30 seconds);

(f) Information related to the source of the request, e.g., the MIN (or other identification) of an MS 140 requesting service, or an Internet address of a service requester;

(g) Any authorization code for permitting the service request to be performed; and (h) Any billing code identifying who is to be charged.

Step 2212: Subsequently, a readable version of the service request is provided to the subscriber identification & application authorization subsystem 2116 (FIG. 21), wherein the identification of both the requester and the application to be activated to fulfill the service request is determined. The subsystem 2116 may access various user identification repositories, such as user profile repositories collectively labeled 2120 (FIG. 21), including customer care data management systems that are maintained by, e.g., a wireless carrier responsible for the operation of the platform 2004, such repositories being, e.g., home location registers (HLRs) and Visitor Location Registers (VLRs). Additionally, some of the repositories 2120 may be accessed only via another network carrier not affiliated or responsible for the operation of the platform 2004. Such repositories may be accessed for obtaining, e.g., (i) additional user information that may not have been provided with the service request, and/or (ii) an identification of the carrier network (if any) to which the user is a subscriber. In particular, such additional information may relate to an authorization to activate, e.g., a wireless location based application, and receive a response therefrom. Note that such authorization may include two processes: a determination of whether the user is eligible to make the request (e.g., such eligibility may be substantially determined according to, e.g., the service package to which the user 2008 has subscribed and whether the user's subscription remains active), and a determination as to whether the current service request can be honored given privacy, security, and/or legal constraints that must satisfied for fulfilling the service request, e.g., location based network services where a person different from the user 2008 is to be located.

In one embodiment, if the user 2004 is a roamer (civilian or military), the network carrier operably responsible for the platform 2004 may initiate, via the subsystem 2116, a request for user profile information to be transmitted from the user's subscriber network or other central profile repository. Various embodiments of such profiles and/or data within them are provided throughout this description. Thus, a user profile may include substantially any user information that is required to allow or prohibit access, activation, or fulfillment of a network service by the user, or, by another user where the requested service, by the other user, requires accessing information about the user that is identified as being confidential or private. However, in one preferred embodiment such user profiles may be automatically requested when the roamer activates his/her MS 140 for out of network service. Moreover, it may be the case that when fulfillment of the service request requires the location or other personal information (e.g., financial information) of another user or entity, at least a portion of the profile for this other user or entity must be queried or accessed for determining whether such a location activity is permissible and/or legal, and such information may be substantially only accessible from the carrier network to which the user is a subscriber.

In order to identify the service being requested, the subsystem 2116 can access the user assessable & authorized services database 2124 (FIG. 21) for determining the services that are currently accessible from via the platform 2004, e.g., as called services or platform aware connection services as described in the Summary section hereinabove. Additionally, the database 2124 may be accessed by the subsystem 2116 for retrieving information related to who is authorized to access certain services. For example, certain network services may be available for only a particular time period(s). For example, a particular network based game may extend for a predetermined time period such as three weeks, or may be only played on non-holiday weekends when there is less network traffic. In such a case, it may more expedient to associate game activation authorization data with information identifying the game in the database 2124 than iteratively modifying, e.g., user 2008 profiles of game players for indicating when the game can be accessed as a network service. Additionally, note that a network service that is malfunctioning may be easily prevented from being accessed if such authorizations are associated with network service identifications. Furthermore, it may be the case, that an alternative service provider may be utilized for fulfilling the service. Thus, the preferred (now malfunctioning) service provider may be effectively disconnected from being accessed by users 2008, and a second less preferred backup network service activated for the providing substantially the same service in a manner that is transparent to the users 2008. Examples where such backup service providers may be desirable are: (i) when wireless location requests must be fulfilled (e.g., E911 requests) and the primary wireless location service provider is experiencing operational difficulties, then a second less desirable backup wireless location service provider may be easily activated (assuming all communication and data flow paths with the second location service provider have been previously established) by merely changing the value of the activation information for each of the primary and secondary wireless location service providers in the database 2124, (ii) when a service provider for an Internet service 2128 (FIG. 21) such as a service provider for an Internet connection, or some other Internet accessible service such as a search engine or a battlefield command and control Internet site becomes inoperative, then users 2004 may be transparently (or substantially so) switched to a corresponding backup service provider for the Internet service. Thus, the database 2124 may allow for providing a simple and effective technique for providing the platform 2004 with a measure of fail safeness to network services that are accessible via the platform 2004.

Note that the services & applications 2016 (FIG. 20) are representative examples of some of the services that may be requested as called services. However, these services may also be connection services, e.g., a 911 call may be a voice over IP connection which also provides the FCC mandated information to the 911 center. The services identified in 2016 will how be briefly described:

i. Yellow page services related to the purchase of products and/or services, and in particular electronic networked yellow page services as described more fully under the section Wireless Location Applications hereinbelow;

ii. Emergency services such as E911 in the USA (note that emergency services are typically routed through substantially dedicated channels; however, it is believed that with increasing network bandwidth and robustness, such dedicated channels can be substantially dispensed with and, instead, such emergency services can be appropriately and timely performed by using the platform 2004 of the present disclosure. Moreover, by utilizing the platform 2004, emergency services may be significantly enhanced by, e.g., accessing the emergency caller's profile and thereby alerting friends, relatives, neighbors, and/or appropriate passersby. Additionally, caller medical information may be provided in the caller's profile such as type of medical insurance, caller medical conditions, and/or medical personal to be alerted;

iii. 411 information services, and in particular, location based information services, and more particularly "intelligent" location based information services such as the location based routing services described hereinbelow in the section titled Routing Applications, and the section titled Point of Interest Applications hereinbelow;

iv. Roaming services such as wireless concierge services that may offered to travelers by, e.g., hotels as described more fully in the section titled Roaming Services hereinbelow.

Note, however, that for different application domains very different network services may be available. For example, in a military or battlefield context there may be analogous services to some of the items (i) through (iv) immediately above; however, certainly additional network services are likely such as network services for real time control over robotic or surveillance battlefield devices.

Step 2216: Subsequently, a determination is made by the subscriber identification & application authorization subsystem 2116 as to whether the network service request is an emergency such as an E911 request.

Step 2220: If the results from Step 2216 is positive, then the subsystem 2116 activates an emergency protocol for communicating with one or more emergency response service providers 2132 (represented in FIG. 21 by the 911 processing block 2132), whereby, e.g., a predetermined series of emergency tasks or steps are performed for: (i) locating the emergency, (ii) identifying the type of emergency, and (iii) directing assistance to the emergency or directing persons out of the emergency. When the platform 2004 is used for accessing network services within a U.S. commercial mobile radio provider network (CMRS), the U.S. Federal Communications Commission (FCC) provides guidelines and mandates regarding how and what emergency tasks are performed. Such emergency protocols are well known in the art and are not elaborated on here. However, note that such emergency protocols may be different when the platform 2004 is utilized in a military or battlefield context, or in the context of a major disaster such as damage from a hurricane or a biological terrorist attack in that there may be many requests for emergency services within a relatively short timeframe (e.g., 1 minute to 12 hours or longer). However, whether the platform 2004 is utilized in a civilian or military context, a high rate of emergency service requests can be problematic for the communications network to appropriately handle. In one embodiment, of the platform 2004, the subsystem 2116 detects high rates of emergency requests, and alerts a platform controller 2136 (FIG. 21) which, e.g., allocates computational resources within the platform 2004, and handles error or exceptional event processing. The controller 2136 may in one embodiment, modify the database 2124 so that when the subsystem 2116 subsequently accesses this database for determining an emergency response service provider to service emergency requests, the database 2124 commences to distribute the output identifications of emergency response service over a plurality of such service providers. Thus, two successive requests for an emergency response service provider by the subsystem 2116 may result in different in identifications of two different service providers, whereas without the controller 2136 database modification, the same emergency response service provider would have been provided to the subsystem 2116. Note that the database 2124 may use a static or fixed allocation scheme for allocating emergency service requests among a plurality of emergency response service providers 2132 operatively connected to the platform 2004. Alternatively, a dynamic scheme may be used wherein there is feedback to the platform 2004 (and more particularly, the controller 2136) from each (or at least some) of the emergency response service providers 2132 providing data indicative of the emergency processing loads they are experiencing. For example, such feedback from an emergency response service provider may include one or more of: (i) a measurement related to the number of emergency requests that are queued and not currently being processed (e.g., the current number or the average over some time period); (ii) a measurement related to the rate at which emergency requests are being processed (e.g., an average number of emergency requests fully processed in a particular time period); (iii) one or more measurements related to the time to process a specified number of emergency requests (e.g., an average time for fully processing a moving window of 10 emergency requests, a percentage of the number of emergency requests being currently processed that are identified as likely to require very lengthy or an indeterminate amount of time to process; (iv) a measurement related to the overall emergency response processing load (e.g., this measurement identified as high whenever a measurement for (i) above exceeds a predetermined threshold, or a measurement for (iii) above exceeds a predetermine threshold).

Thus, upon receiving such feedback, the controller 2136 may be able to adjust the distribution of emergency requests among the emergency response service providers to thereby balance the loads on these service providers, or provide a higher emergency response completion rate, or provide a lower average time for providing an initial response to emergency requests. Additionally, the controller 2136 may provide instructions to, e.g., subscriber identification & application authorization subsystem 2116 so that during such load balancing, geographic location information of the user initiating emergency or 911 requests is used in the routing of such requests to particular emergency service providers (e.g., public safety answering points, or PSAPs). For example, a large hurricane may impact an area having a radius of 100 miles or more. Accordingly, numerous emergency service providers local to such an area may be overwhelmed with emergency calls. Accordingly, one or more emergency command centers may be setup to coordinate emergency response services, wherein such emergency command centers communicate with the emergency service providers (e.g., PSAPs) in the emergency affected area. Accordingly, when load balancing is initiated to direct some (or all) calls to alternative emergency service providers (e.g., PSAPs), instead of such local emergency service providers, at least emergency command center communication information is also provided to the alternative emergency service providers so that they can communicate with the one or more emergency command centers for the geographic areas from which such alternative emergency service providers are receiving emergency requests. Thus, in one embodiment, when load balancing between emergency service providers (e.g., PSAPs), the geographic location of each emergency request may be determined and used for determining the alternative emergency service provider to route the request. In particular, the alternative emergency service provider should have communications established with the corresponding emergency command center responsible for the area from which the emergency request is received. Accordingly, such load balancing may additionally cause all calls which are to be re-routed from an overloaded (or non-functioning) emergency service provider to be re-routed to one or more predetermined or pre-selected alternative emergency service providers. Thus, the following substeps may be performed during load balancing for each emergency request within an emergency or disaster area: i.e., if at least one load balancing metric indicates load balancing between an emergency service provider P and some alternative emergency service provider $Q_i$ is needed, then:

(a) Determine a percentage (or other measurement) of the emergency requests to be off-loaded from P to some $Q_i$. In one embodiment, such a percentage may be:

The maximum, less than or equal to 100 (100 otherwise), of:

[100*((terminated requests not processed by P within time period T)/(emergency requests received by P within T))+predetermined additional percentage (e.g., 5)], and

[100*(1+((emergency requests fulfilled by P within T)/(emergency requests received by P within T))], wherein the time period T may be, e.g., from one minute to 5 minutes, and wherein T may vary inversely with the number (or change in number) of emergency call requests in the immediately preceding one or more time periods (denoted here the "call volume"). Thus, assuming a substantially inversely linear relationship between T and the emergency call volume, if the call volume rises from an average of 50 calls for the time period sT of a preceding collection of one or more time periods (e.g., having an average length of 3 minutes) to 100 calls in the current time period $T_C$ (e.g., of say 3.5 minutes), then the next time period $T_N$ may be between 1.75 and 1.5 minutes depending the number of preceding time periods used.

(b) For each emergency request to be re-routed to an alternative emergency service provider $Q_i$, select $Q_i$ according to whether $Q_i$ is configured to communicate with the command center C for the area containing the geographic location of the source of the request, and wherein $Q_i$ is the first such configured alternative emergency service provider on a list of alternative emergency service providers for P that is not also requiring load balancing.

(c) If no $Q_i$ was selected in (b) above, notify emergency command center C.

Additionally, such re-routing of emergency requests may also be dependent upon a geographical location of the emergency caller. In particular, emergency requests from predetermined geographical subareas of an overloaded emergency service provider may be routed to the same alternative emergency service provider. Note, that such re-routing based on emergency caller location can be performed by identifying (for wireless emergency requests) the primary base station with which the caller is in contact. Accordingly, it is believed that in most emergency or disaster designated areas, emergency calls from subareas thereof will be processed by at most one or two emergency service providers (e.g., PSAPs) while at the same time balancing call loads between emergency service providers.

Moreover, the present step also includes providing what is known as "reverse 911" protocols, wherein persons in a given area are alerted to an eminent or likely emergency situation or event which may be dangerous to them, e.g., an impending flood, an enemy aircraft that is nearby, a change in the direction of a forest fire or hurricane, etc.

Thus, for such reverse 911 service requests, the requestor is likely to be a governmental agency or designated agent (e.g., a field observer), and location information, e.g., indicating the area to likely be affected by the imminent threat is provided with the service request. Accordingly, subscribers (and others that can be contacted) whose locations are identified as being in a designated area are notified of the danger. Thus, it is an aspect of the platform 2004 to push certain types of information to users' MSs 140 such as reverse 911 information.

Step 2224: If the result from step 2216 indicates that the service request is not for an emergency, then in step 2224 the subsystem 2116 may access a home location register for the user, or a visitor location register providing user information, wherein such an access is for obtaining profile data for the user related to the current request. That is, the present step accesses the database(s) 2120 for retrieving profile information for the user 2008 requesting the service, and/or the user profile information related to the service or application being requested.

Step 2228: In the present step a determination is made by the subsystem 2116 as to whether the application being requested (or a comparable application) is known to the platform 2004; e.g., registered with the platform so that platform can enable the service and/or perform accounting for the service. Note that for roaming MS 140 users, they may request one or more services that are not available in a network in which they are roaming. However, substantially or somewhat comparable services may be available, and the platform 2004 may inform such a (roaming) user of the comparable service for thereby obtaining user input regarding whether to allocate resources for the comparable service, or alternatively automatically activate the comparable service for the user. For example, for a user whose medical condition is monitored continuously or periodically via automatic transmissions from the user's MS 140 to a medical monitoring service, the user may roam to a geographical area where the user's medical monitoring service is not provided. For instance, a user may have his/her heart rhythms monitored by a medical monitoring service. However, upon roaming to an area not covered by the medical monitoring service (or not covered efficiently due to time delays and/or cost), the user may be: (i) informed of such lack of coverage, and (ii) allow the user to request activation of an alternative service, (if available) and/or the user may automatically be provided with the alternative service such as a service that merely monitors blood pressure. Other examples may be also instructive. A user may have contracted with a particular rental car agency to supply the user with a particular type of car substantially wherever the user travels, and the user has requested such a car for his/her arrival in Santa Fe, N. Mex. However, upon arriving in Santa Fe, N. Mex., the user may be notified via the platform 2004: (i) that the particular type of car is unavailable, and (ii) of what alternative car selections the rental agency has, and/or that other car rental agencies have the particular car that the user can rent. In another example, a user may be provided with periodic information regarding another user's or object's status, e.g., user/object's geographic location, the temperature of the user/object, a movement of the user/object, a configuration of user/object (e.g., computer network configuration), etc. However, if the user/object moves to an area that can not support (or cost effectively) can support the transmission of such information, a comparable service (if available) may be offered to the user.

Step 2232: If the result from step 2228 is negative, then in one embodiment of the present step, an applications controller 2144 (FIG. 21) and more particularly, application access initialization 2148 attempts to obtain data for initializing access to the requested (or comparable) service, and/or to provide the billing system 2140 with sufficient information for billing for the service request. For example, the platform 2004 may request activation schema or script data from the requested service for activating the service for the user. Such schema or script data may include identifications of network bandwidth required/desired, when to activate the service, the length of time network resources will be needed, network quality of transmission characteristics required/desired, and/or payment information for billing the user via the user's network provider. If the application access initialization 2148 is successful in obtaining sufficient information, then the retrieved application request description data may be in the application requirements database management system 2152. However, in another alternative embodiment of the present step, the application access initialization 2148 outputs a failure code for the request, and this code is provided to the subscriber interfaces component 2104, wherein an appropriate representation of this failure is presented to the user 2008 by accessing the presentation engine 2156 for generating a presentation that is presentable at the user's network device such as an MS 140. Subsequently, in this alternative embodiment, the process of FIG. 22 terminates relative to the service request being processed.

Step 2236: If the result from step 2228 is positive or the requested application can be otherwise initiated via step 2232, then in one embodiment the subsystem 2116 determines whether there is authorization for activating an application for fulfilling the service request. In one embodiment, the billing system 2140 (FIG. 21) may be accessed for determining whether the request by a user 2008 should be honored. Note such access to the billing system 2140 may be desirable since an important aspect of the platform 2004 is the ability to provide common network services (and in particular complex network services, and more particularly, wireless location based network services) to a large and potentially varying number of network services. For example, it may be the case that a user 2008 is denied further access to a particular network service by the platform 2004 due to a delinquent payment or disputed charges, but the user is given access to other network services (e.g., network services paid by another, such as an employer, a parent, a financial institution, etc.).

Step 2240: If the result of step 2236 is negative, then in a similar manner to the alternative embodiment of step 2232 a failure indication is output to the user.

Step 2244: If the result of step 2236 is positive, then the applications controller 2144 performs the following steps: (a) it parses the service request for identifying service request specific data; (b) it prioritizes the service request according to, e.g., desired performance requirements (e.g., network bandwidth requirements, security requirements, encryption requirements, response requirements, etc.) for fulfilling the service request and priority; and (c) if needed, determines network access paths for accessing the application that can fulfill the service request, and/or activates the request provisioning system 2160 for determining/allocating network resources such as equipment and bandwidth (e.g., virtual private communication channels or allocating bandwidth for a user requested movie to be streamed to his/her MS 140).

Step 2248: In the present step, the applications controller 2144 in combination with the request provisioning system 2160: (a) accesses the applications requirements data management system 2152 to determine what activations of other network services are required by the current service request being processed by the applications controller 2144, and (b) determines how such additional network service output(s) is to be provided to the current service request being processed; e.g., output format, output timing restrictions, accuracy restrictions, etc. Note that the applications requirements data management system 2152 may include scripts or other interpretative or executable code that identifies a series of intermediate service requests that must be performed to the fulfill the user's input service request. Moreover, in some embodiments, the user's input service request may substantially identify such intermediate steps and thereby over ride any default intermediate service requests in the data management system 2152. In particular, the user service request input may be declarative in nature, wherein the user input identifies what is to be performed in as much detail as desired, and the system 2152 determines the mapping between a desired output and the one or more service requests that need to be fulfilled in order to fulfill the user's request. Thus, for each service request for which the platform 2004 is responsible for processing, the system 2152 includes, e.g., a script, schema or other data structure indicating the services to be activated, and any sequencing of those services. Note that by providing such data structures (e.g., service request scripts) so that they are accessible by the platform 2004, the following advantages are obtained: (1) any backup or alternative services that can be used may be performed as necessary without the users 2004 having to specify such alternatives; (2) network and/or service request enhancements may be more easily utilized in fulfilling certain service requests; e.g., certain location based service requests may require a particular location accuracy and such accuracy may require activating more than one location service provider. Typically, the wireless location gateway or location center 142 would provide such functionality. However, certain networks may assume such functionality, and not utilize such a gateway, and the platform 2004 may assume such responsibility. Accordingly, such scripts for location based services that require a predetermined accuracy may be modified without the need to change user service request inputs to the platform 2004. Thus, a location based dating service may require location based information of mobile stations 140 that are within 20 meters of one another, and it may be determined (e.g., through user complaints) that the accuracy currently being provided is insufficient. Thus, the corresponding script for fulfilling an activation of the dating service request may be changed to use additional location service providers and/or a location gateway 142 entirely transparent to the users 2008. In another example, if the platform 2004 offers a service to obtain estimates for obtaining discounted hotel rooms for users 2008 seeking immediate occupancy in a relatively local geographical area (e.g., a city or within 5 miles of the user), the script for such a service may change frequently according to season, occupancy rates, hotels opting in or out of such a service.

Step 2252: A determination is made by the applications controller 2144 as to whether there are currently sufficient network resources available to appropriately fulfill the service request currently being processed (more precisely, attempting to be processed).

Step 2256: If the result from step 2252 is negative, then in one embodiment of the present step, the applications controller 2144 requeues the current service for examining at a later time and commences processing another service request as the current request. Additionally, the applications controller 2144 may issue an allocation request to the request provisioning system 2160 to reserve certain network resources (e.g., reserve a high bandwidth data channel) if such is needed by the previous "current" service that has been requeued. If the requeued service request is not processed within a request specific amount of time, then as in the alternative embodiment of step 2232, the user 2008 is informed of the failure of the service request. However, in one alternative embodiment, instead of notifying the user 2008 of failure, the user may be notified that there is a delay in fulfilling the service request, and the user may be provided with the option of canceling the service request or waiting for its fulfillment.

Step 2260: The applications controller 2144 activates one or more applications for fulfilling the service request currently being processed since all the network resources it requires are available as well as the application(s) for fulfillment of the request. For example, the applications illustrated in FIG. 20 may be activated by applications controller 2144, and such an activation(s) may be via the application gateway (FIG. 21) for activating specific applications as one of ordinary skill in the art will understand. Note that the service request data processed by the applications controller 2144 may be in the form of a script that the controller 2144 interprets.

Step 2264: In some circumstances, service requests are automatically activated as, e.g., intermediate steps in fulfilling another service request. Accordingly, the present step illustrates the performance of such automatically activated service requests.

The above high level description of the processing performed by the platform 2004 is also applicable to disaster or large scale emergency management and communication such as occurs during hurricanes, floods, earthquakes, combat situations, and the like where communications and applications may need to be modified rapidly. In particular, by providing a standard script or schema for requesting network services and/or provisioning, network applications may be easily incorporated into embodiments of the present disclosure. For example, during a hurricane or earthquake, high call volume capacity mobile base stations may be required to compensate for damaged or malfunctioning geographically fixed base stations of a wireless carrier's infrastructure, and/or to handle an increase in call volume. However, network services not related to disaster assistance may need to be severely restricted, and such restrictions may be easily provided via the platform 2004 since the applications requirements database management system 2152 (FIG. 21) to temporarily disable or restrict non-essential network services (e.g., high bandwidth network games, etc.). Moreover, by establishing appropriate profiles for emergency responder personnel in the user profile repositories 2120, such personnel may be able to activate network services/applications that may be restricted from general use. So, e.g., while non-emergency requests for multi-point conference calls may be restricted or unavailable to the public in general, such network services may be available to various emergency responder personnel. Thus, it is aspect of the present disclosure that authorization for accessing network services/applications can be selectively provided to one or more groups of users, wherein individuals are identified as to whether they are in such groups by accessing each individual's profile in the profile repositories 2120. Accordingly, large numbers network users (where most of the users are unrelated to one another at least in the sense that the network services for which each has contracted is unrelated to the contracted network services of most others) may be restricted from accessing certain network services, and/or allowed to access certain network services dependent upon, e.g., which group of a hierarchy of network user groups with which each user is identified via his/her profile. Moreover, it important to note that network service requests may be grouped into one or more groups, wherein access and/or denial of network services may depend on the user's geographic location (and/or the location network infrastructure by which the user accesses the network). For example, an MS 140 user within an area hit by a disaster may not be provided with wireless Internet service, whereas if this same user were in an area remote from the disaster wireless Internet service may be provided. Thus, in one embodiment, the following hierarchy of network service requests may be utilized (from highest priority for network services to lowest priority for network services) when a disaster is declared, e.g., by a governmental entity:

(a) Emergency requests by personnel directors and supervisors directing emergency assistance efforts related to the disaster (such individuals having profiles for identifying themselves as emergency personnel directors and supervisors). Note that such directors and supervisors may be individuals in charge of governmental and/or military operations related to the disaster;

(b) Emergency command center communications for directing emergency assistance efforts related to the disaster (e.g., with emergency responder personnel and/or emergency response centers, e.g., PSAPs);

(c) Network emergency request calls by users dialing an emergency number, e.g., 911; note that in one embodiment, the locations of such users may be aggregated on a display device for emergency response personnel (e.g., PSAP 911 operators) so that emergency assistance personnel assisting one user can also be directed to assist other nearby users also seeking emergency assistance while such personnel reside in the area.

(d) Network service requests by users requesting non-emergency network services within the disaster area (e.g., as defined by a governmental entity). Accordingly, for each user within a disaster area, each requested network access by the user may be accompanied by information indicating the user is in the disaster area (e.g., the identification of the primary base station with which the user is communicating) so that the request can be identified as having relatively low priority. Additionally, a user outside of the disaster area that is requesting access to network resources in the disaster area may be prevented or delayed from doing so. For example, if the last known wireless coverage area of a user being called is in the disaster area (as, e.g., identified in the called user's home location register or visitor location register), then the call may be given a relatively low priority.

Thus, it is an aspect of the present disclosure that within a disaster area, network allocation may be driven at least partially by geographical location of network resources being requested.

Additional processing capabilities that various embodiments of the platform 2004 will now be described:

(a) billing system 2140: Note that in one embodiment of the platform 2004, the billing system 2140 (or an enhancement thereto) is the billing system of the wireless carrier with whom the user 2008 subscribes for wireless services. It is contemplated that for various wireless applications, and particularly location based applications, such applications can be more quickly made available to subscribers 2008 if the already existing network infrastructure and support services (such as billing) are used. Thus, assuming an appropriate and preferably uniform interface between service request fulfillment application management processes (not shown) and the billing system 2140 is provided, business rules, charges for existing, new and removed application services maybe communicated to the billing system 2140. Furthermore, such a central billing system 2140 makes it easier for network services, and in particular, complex network services such as location based services to be bundled or packaged together and potentially provided under the trademarks or servicemarks of the wireless carrier even though such "private label" applications (identified in FIG. 20 by the components labeled 2020 and 2024) are owned and operated by third parties. Moreover, such a central billing system 2140 also has the advantage of providing fewer individual bills to the subscribers 2008 in that charges for such services may be incorporated into the bill provided by the subscriber's wireless carrier;

(b) data exposure engine (FIG. 21): This component provides the functionality described in the Wireless Application Platform Services and Architecture section of the Summary entitled "data exposure processing".

Wireless Location Applications

Such wireless location applications as were briefly described above in reference to the gateway 142 will now be described in further detail. Note that the following location related services are considered within the scope of the disclosure, and such services can, in general, be provided without use of a gateway 142, albeit, e.g., in a likely more restricted context wherein not all available wireless location estimating techniques are utilized, and/or by multiplying the number of interfaces to geolocation service providers (e.g., distinct wireless location interfaces are provided directly to each wireless location service provider utilized).

Routing Applications

In one noteworthy routing application, hotels and other personal service providers, such as auto rental agencies, resorts and cruise ships may provide inexpensive or free wireless concierge services to their customers, wherein an inexpensive MS 140 can offered to customers that can be used substantially only for contacting: (i) the personal service, (ii) emergency services, (iii) receiving directions to return to the personal service, and/or (iv) routing or directing customers predetermined locations such as historic sites, shopping areas, and/or entertainment. In a similar fashion, instead of providing such a dedicated MS 140, the personal service could in an alternative embodiment, allow customers access such information from their own personal mobile stations 140. In one embodiment, this may be accomplished by allowing a user to attach such information to their user profiles and thereby obtain at least temporary access to a wireless concierge providing one or more of the location based services (i)-(iv) immediately above. Accordingly, the MS 140 may be wirelessly located during operations (ii) and (iii) via wireless communications between the MS 140 and a local commercial wireless service provider wherein a request to locate the MS 140 is provided to, e.g., the gateway 142, and the resulting MS location estimate is: (1) provided to a public safety emergency center (e.g., E911) for dispatching emergency services, or (2) provided to a mapping and routing system such as provided by MapInfo or disclosed in the LeBlanc et. al. patent application filed Jan. 22, 1999 and having U.S. Pat. No. 6,236,365 (which is fully incorporated herein by reference) so that the MS 140 user may be routed safely and expeditiously to a predetermined location of the personal service. Note that data representing the location of the personal service can be associated with an identification of the MS 140 so that MS activation for (iii) above results in one or more audio and/or visual presentations of directions for directing the user to return to the personal service.

Additionally, directions to such personal services may be made available to the personal MS 140 of a user, wherein upon calling a number (or accessing a website via the MS), the directions to a desired destination may be transmitted to the MS and presented to the user. Moreover, such directions may be dependent upon how the MS user is traveling. For example, if it is known (or presumed) that the user is in a vehicle such as an auto, the user may be directed first to a parking garage rather than to the front door of a government agency building. Alternatively, if it is known (or presumed) that the user is on foot, then the MS user may indeed be directed to the front door of the government agency building. Similarly, if the MS 140 is determined to be on a train, bicycle, watercraft, etc. such modes of conveyance may be used in determining an appropriate route to present to the MS user. In one embodiment of the present disclosure, traffic congestion may also be used to determine an appropriate route to present to the MS user.

Moreover, it is an aspect of the present disclosure that the MS 140 user may be tracked by, e.g., periodic MS location determinations, until the MS user is substantially at the personal service. Note that if the MS 140 user does not correctly follow the directions received, then for a predetermined deviation (e.g., dependent upon whether it is perceived that the user is on foot or in a vehicle, which may be determined according to the user's velocity and/or acceleration) the MS user may be alerted to the deviation and a new route determined dependent upon, e.g., the user's new location, the direction that the user is traveling, and/or the mode of transportation. For example, if the MS 140 user got on an subway train, then after one or more locations of the MS user have been performed, if such locations are sufficiently accurate, it can be determined whether the user is proceeding along a route consistent with directions provided, and that the user is on the subway. In the case where the MS user got onto the wrong subway train, the user can be alerted of this fact and given the opportunity to have a new route determined which takes into account not only the user's location, but where the user can exit the subway train, and likely, the subway train schedules for expeditiously getting the MS user to his/her destination.

The MS 140 and the MS location providing wireless network (e.g., a CMRS, a PSTN 124 or the Internet 468) may also provide the MS user with the ability to explicitly request to be substantially continuously tracked, wherein the MS tracked locations are stored for access by those having permission (e.g., the user, parents and/or associates of the user). Additionally, the velocity and/or expected time of arrival at a predetermined destination may be derived from such tracking and may be provided to the user or his/her associates (e.g., employer, friends, and/or family). Further, note that this tracking and notification of information obtained therefrom may be provided via a commercial telephony or Internet enabled mobile station, or a mobile station in operable communication with a short messaging service. For example, the MS registered owner may provide permissions for those able to access such MS tracking information so that such information can be automatically provided to certain associates and/or provided on request to certain associates. Additionally, note that the MS 140 and the MS location providing wireless network may also allow the MS user to deactivate such MS tracking functionality. In one embodiment, an MS user may activate such tracking for his/her MS 140 during working hours and deactivate such tracking during non-working hours. Accordingly, an employer can then track employee's whereabouts during work hours, while the employee is able to retain his/her location privacy when not working although the employer may be still able to contact the employee in case of an emergency during the employee's non-working time. Note, that this location capability and method of obtaining location information about an MS user while assuring privacy at other times may be useful for appropriately monitoring in personnel in the military, hospitals, transportation services (e.g., for couriers, bus and taxis drivers), telecommunications personnel, emergency rescue and correctional institution personnel. Further, note that this selective MS location capability may be performed in a number of ways. For example, the MS 140 may activate and deactivate such tracking by dialing a predetermined number (e.g., by manually or speed dialing the number) for switching between activation of a process that periodically requests a wireless location of the MS 140 from, e.g., the location gateway 142. Note that the resulting MS location information may be made available to other users at a predetermined phone number, Internet address or having sufficient validation information (e.g., a password). Alternatively, the MS location providing wireless network may automatically activate such MS tracking for predetermined times of the day and for predetermined days of the week. Note that this latter embodiment may be particularly useful for both tracking employees, e.g., at large construction sites, and, e.g., determining when each employee is at his/her work site. Thus, in this embodiment, the MS location providing wireless network may provide database storage of times and days of the week for activation and deactivation of this selective MS tracking capability that is accessible via, e.g., a network service control point 104 (or other telephony network control points as one skilled in the art will understand), wherein triggers may be provided within the database for generating a network message (to, e.g., the gateway 142) requesting the commencement of tracking the MS 140 or the deactivation of such tracking. Accordingly, the resulting MS location information may be provided to an employer's tracking and payroll system so that the employer is able to determine the actual time an employee arrives at and leaves a work location site.

In another routing related application of the present disclosure, an MS 140 and the MS location providing wireless network may provide the MS user with functionality to register certain locations so that data representing such locations can be easily accessed for use at a later time. For example, the MS 140 user may be staying at a hotel in an unfamiliar area. Accordingly, using the present capability of the disclosure, the user can request, via his/her MS 140, that his/her location at the hotel be determined and registered so that it is available at a later time for routing the user back to the hotel. In fact, the user may have personal location registrations of a plurality of locations in various cities and countries so that when traveling the user has wireless access to directions to preferred locations such as his/her hotel, preferred restaurants, shopping areas, rendezvous points, theatres, athletic events, churches, entertainment establishments, locations of acquaintances, etc. Note, that such personal location registration information may reside primarily on the user's subscriber network, but upon the MS user's request, his/her personal location registrations may be transmitted to another network from which the user is receiving wireless services as a roamer. Moreover, any new location registrations (or deletions) may be duplicated in the user's personal registration of the user's subscriber network. However, in some instances an MS user may wish to retain such registered locations only temporarily while the user is in a particular area; e.g., a predetermined network coverage area. Accordingly, the MS user may indicate (or such may be the default) that a new personal location registration be retained for a particular length of time, and/or until a location of the user is outside the area to which such new location registrations appear to be applicable. However, prior to deleting any such registrations, the MS user may be queried to confirm such deletions. For example, if the MS user has new location registrations for the Dallas, Tex. area, and the MS user subsequently travels to London, then upon the first wireless location performed by the MS user for location registration services, the MS user may be queried as to whether to save the new Dallas, Tex. location registrations permanently, for an particular length of time (e.g. 30 days), or delete all or selected portions thereof.

Other routing related applications of the present disclosure are for security (e.g., tracking how do I get back to my hotel safely), and, e.g., sight seeing guided tour where the is interactive depending on feedback from users Roaming Services Roaming services such as wireless concierge services that may offered to travelers by, e.g., hotels, resorts, theme parks, and/or ski areas. Additionally and/or alternatively, a user 2008 may be able to store and associate a location with a user input description (and possibly a picture if the user's MS 140 supports such) and store such information so that it is available at a later time, e.g., when the user is once again in the same geographical area.

There may also be roaming services wherein the various portions of the user's profile and/or attachments thereto may become active depending on the geographical location of the user. For example, a hotel chain may offer regional and/or global wireless concierge services wherein local location based information, such as pre-selected restaurants, shopping areas, points of interest, entertainment, exercise areas, travel routes, bus (train or boat) schedules, parking areas (e.g., that may be subsidized by the hotel chain), sports equipment rentals, emergency services (police, fire, etc.), that is in a geographical area (such as a metropolitan area, a resort area, a theme park or other relatively local area) where the user is located is automatically activated as the "current" set of locations to receive priority when the user enters a request that can be satisfied by entities identified in such local location based information. Note that a potentially simple embodiment of this aspect of the present disclosure may be for the hotel chain to have an Internet website having for each of their hotels, corresponding web pages dedicated to local location based information in geographic areas surrounding the hotel. Such web pages may provide searching and routing capabilities related to the local location base information for relatively local geographical areas surrounding the hotel and these web pages may be made the default wireless concierge service capability. In one embodiment, a user's profile (or specific portions thereof) maintained, e.g., (i) by a network service, such as a wireless carrier, (ii) by the user himself (i.e., on the user's MS 140, assuming the user's MS 140 has sufficient storage capacity), (iii) by an electronic yellow pages entity, (iv) by an Internet search engine, may be made available (at least temporarily) to the hotel's Internet wireless concierge capabilities so that user service requests can be easily customized to the user's preferences. Moreover, such Internet access may provide access (at least while the user is staying at the hotel) to discounts, coupons, and/or free access to various local facilities.

Advertising Applications

Advertising may be directed to an MS 140 according to its location. In at least some studies it is believed that MS 140 users do not respond well to unsolicited wireless advertisement whether location based or otherwise. However, in response to certain user queries for locally available merchandise, certain advertisements may be viewed as more friendly. Thus, by allowing an MS user to contact, e.g., a wireless advertising portal by voice or via wireless Internet, and describe certain products or services desired (e.g., via interacting with an automated speech interaction unit), the user may be able to describe and receive (at his/her MS 140) audio and/or visual presentations of such products or services that may satisfy such a user's request. For example, a user may enter a request: "I need a Hawaiian shirt, who has such shirts near here?"

Figure 23A:
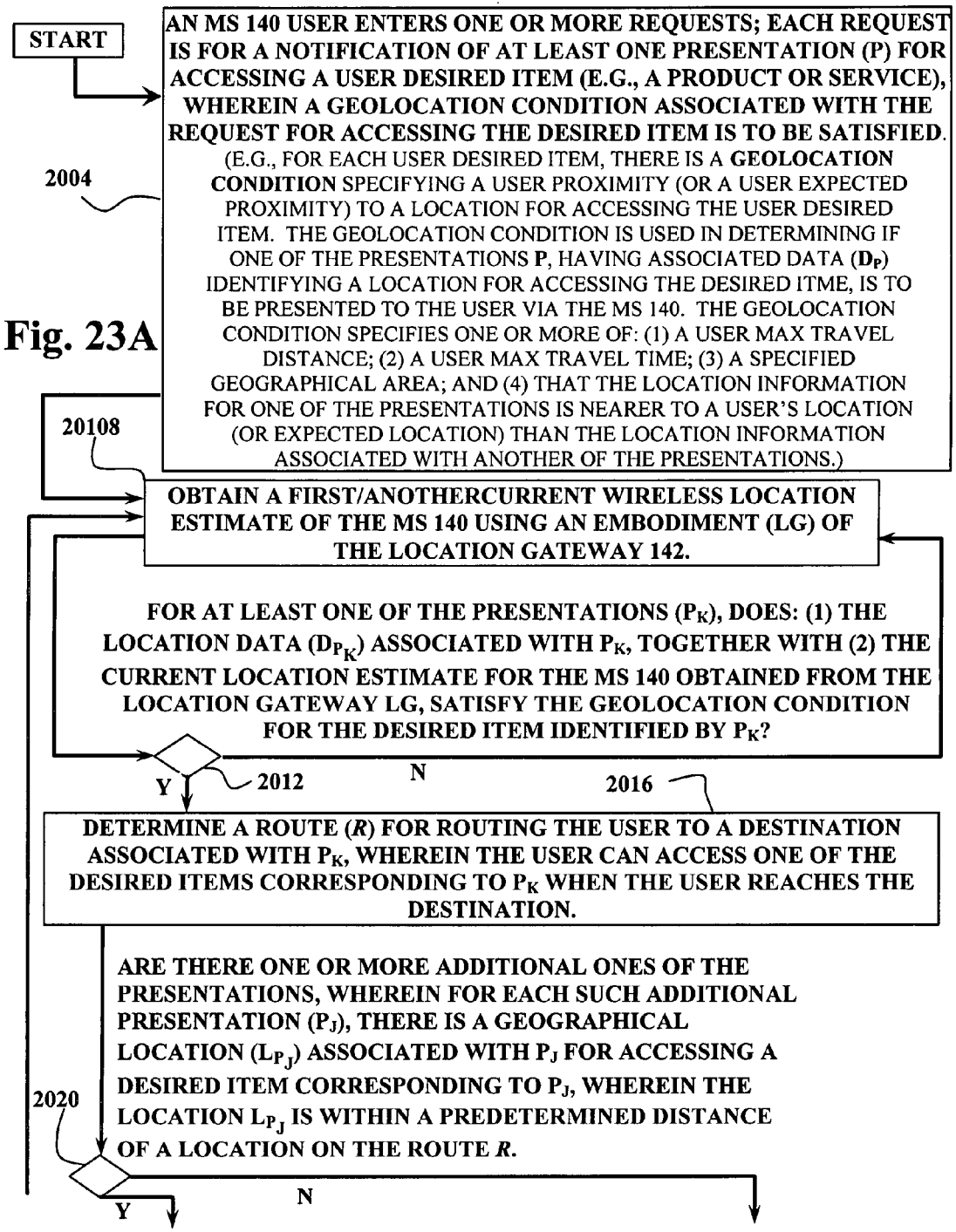
FIGS. 23A and 23B show a flowchart of the steps performed for routing a user along a route that includes a plurality of locations where the user can access a desired item (product or service) at each of the plurality of locations.
Figure 23B:
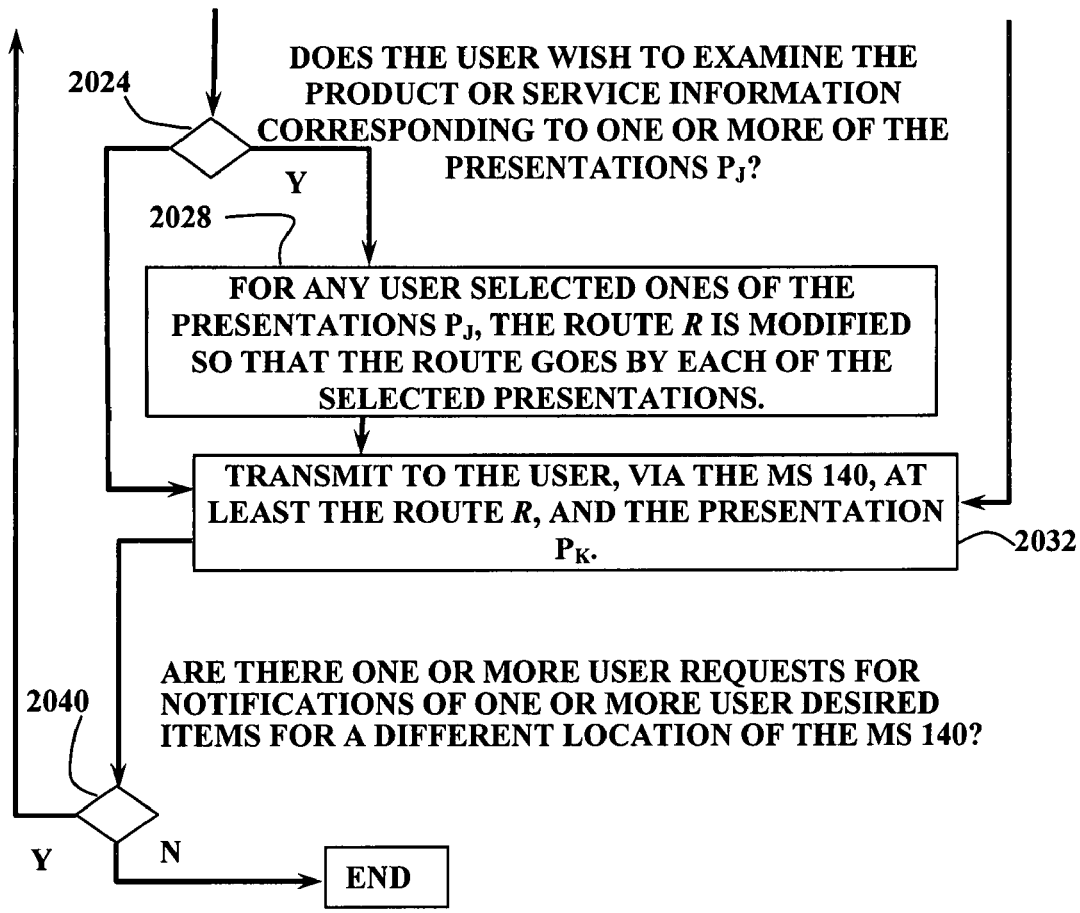

In the area of advertising, the present disclosure has advantages both for the MS user (as well as the wireline user), and for product and service providers that are nearby to the MS user. For instance, an MS user may be provided with (or request) a default set of advertisements for an area when the MS user enters the area, registers with a hotel in the area, or makes a purchase in the area, and/or requests information about a particular product or service in the area. Moreover, there may be different collections of advertisements for MS users that are believed to have different demographic profiles and/or purposes for being in the area. Accordingly, an MS whose location is being determined periodically may be monitored by an advertisement wizard such that this wizard may maintain a collection the MS user's preferences, and needs so that when the MS user comes near a business that can satisfy such a preference or need, then an advertisement relating to the fulfillment of the preference or need may be presented to the MS user. However, it is an aspect of the disclosure that such potential advertising presentations be intelligently selected using as much information about the user as is available. In particular, in one embodiment of the disclosure MS user preferences and needs may be ordered according to importance. Moreover, such user preferences and needs may be categorized by temporal importance (i.e., must be satisfied within a particular time frame, e.g., immediately, today, or next month) and by situational importance wherein user preferences and needs in this category are less time critical (e.g., do not have to satisfied immediately, and/or within a specified time period), but if certain criteria are meet the user will consider satisfying such a preference or need. Thus, finding a Chinese restaurant for dinner may be in the temporal importance category while purchasing a bicycle and a new pair of athletic shoes may be ordered as listed here in the situational category. Accordingly, advertisements for Chinese restaurants may be provided to the user at least partially dependent upon the user's location. Thus, once such a restaurant is selected and routing directions are determined, then the advertising wizard may examine advertisements (or other available product inventories and/or services that are within a predetermined distance of the route to the restaurant for determining whether there is product or service along the route that could potentially satisfy one of the user's preferences or needs from the situational importance category. If so, then the MS user be may provided with the option of examining such product or service information and registering the locations of user selected businesses providing such products or services. Accordingly, the route to the restaurant may be modified to incorporate detours to one or more of these selected businesses. The flowchart of FIGS. 23A and 23B provides steps that illustrate the modification (if necessary) of such a route so that the MS user can visit one or more locations along the route for accessing one or more additional products or services.

Of course, an MS user's situationally categorized preferences and needs may allow the MS user to receive unrequested advertising during other situations as well. Thus, whenever an MS user is moving such an advertisement wizard (e.g., if activated by the user) may attempt to satisfy the MS user's preferences and needs by presenting to the user advertisements of nearby merchants that appear to be directed to such user preferences and needs.

Accordingly, for MS user preferences and needs, the wizard will attempt to present information (e.g., advertisements, coupons, discounts, product price and quality comparisons) related to products and/or services that may satisfy the user's corresponding preference or need: (a) within the time frame designated by the MS user when identified as having a temporal constraint, and/or (b) consistent with situational criteria provided by the MS user (e.g., item on sale, item is less than a specified amount, within a predetermined traveling distance and/or time) when identified as having a situational constraint. Moreover, such information may be dependent on the geolocation of both the user and a merchant(s) having such products and/or services. Additionally, such information may be dependent on a proposed or expected user route (e.g., a route to work, a trip route). Thus, items in the temporal category are ordered according how urgent must a preference or need must be satisfied, while items in the situational category may be substantially unordered and/or ordered according to desirableness (e.g., an MS user might want a motorcycle of a particular make and maximum price, want a new car more). However, since items in the situational category may be fulfilled substantially serendipitous circumstances detected by the wizard, various orderings or no ordering may be used. Thus, e.g., if the MS user travels from one commercial area to another, the wizard may compare a new collection of merchant products and/or services against the items on an MS user's temporal and situational lists, and at least alerting the MS user that there may be new information available about a user desired service or product which is within a predetermined traveling time from where the user is. Note that such alerts may be visual (e.g., textual, or iconic) displays, or audio presentations using, e.g., synthesized speech (such as "Discounted motorcycles ahead three blocks at Cydes Cycles").

Figure 19:
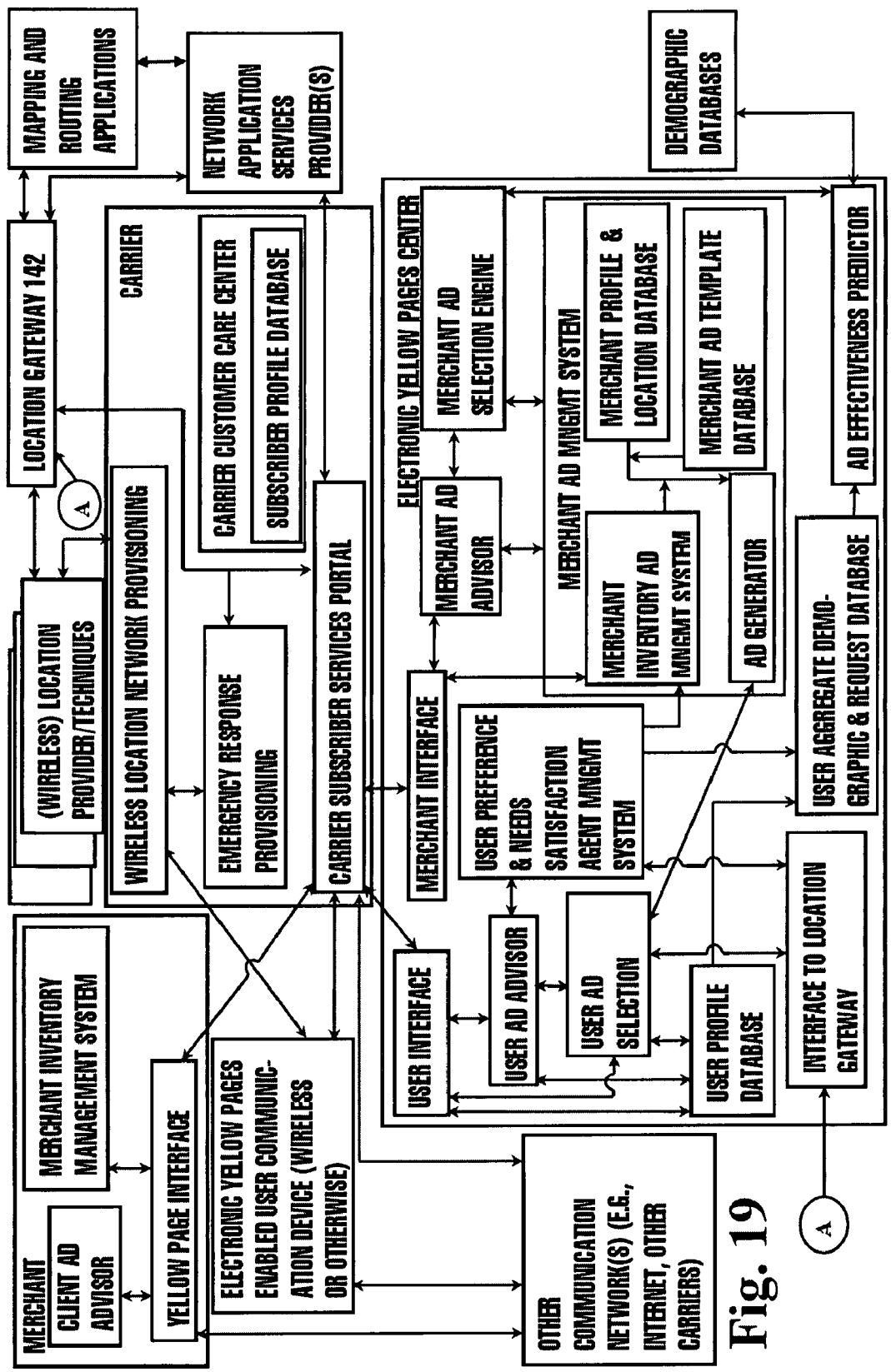
FIG. 19 is a block diagram of an electronic networked yellow pages for providing intelligent advertising services, wherein wireless location services may be utilized.

Note that the advertising aspects of the present disclosure may be utilized by an intelligent electronic yellow pages which can utilize the MS user's location (and/or anticipated locations; e.g., due to roadways being traversed) together with user preferences and needs (as well as other constraints) to both intelligently respond to user requests as well as intelligently anticipate user preferences and needs. A block diagram showing the high level components of an electronic yellow pages according to this aspect of the present disclosure is shown in FIG. 19. Accordingly, in one aspect of the present disclosure advertising is user driven in that the MS user is able to select advertising based on attributes such as: merchant proximity, traffic/parking conditions, the product/service desired, quality ratings, price, user merchant preferences, product/service availability, coupons and/or discounts. That is, the MS user may be able to determine an ordering of advertisements presented based on, e.g., his/her selection inputs for categorizing such attributes. For example, the MS user may request advertisements athletic shoes be ordered according to the following values: (a) within 20 minutes travel time of the MS user's current location, (b) midrange in price, (c) currently in stock, and (d) no preferred merchants. Note that in providing advertisements according to the MS user's criteria, the electronic yellow pages may have to make certain assumptions such if the MS user does not specify a time for being at the merchant, the electronic yellow pages may default the time to a range of times somewhat longer than the travel time thereby going on the assumption that MS user will likely be traveling to an advertised merchant relatively soon. Accordingly, the electronic yellow pages may also check stored data on the merchant to assure that the MS user can access the merchant once the MS user arrives at the merchant's location (e.g., that the merchant is open for business). Accordingly, the MS user may dynamically, and in real time, vary such advertising selection parameters for thereby substantially immediately changing the advertising being provided to the user's MS. For example, the MS display may provide an area for entering an identification of a product/service name wherein the network determines a list of related or complementary products/services. Accordingly, if an MS user desires to purchase a wedding gift, and knows that the couple to be wed are planning a trip to Australia, then upon the MS user providing input in response to activating a "related products/services" feature, and then inputting, e.g., "trip to Australia" (as well as any other voluntary information indicating that the purchase is for: a gift, for a wedding, and/or a price of less than $100.00), then the intelligent yellow pages may be able to respond with advertisements for related products/services such as portable electric power converter for personal appliances that is available from a merchant local (and/or non-local) to the MS user. Moreover, such related products/services (and/or "suggestion") functionality may be interactive with the MS user. For example, there may be a network response to the MS user's above gift inquiry such as "type of gift: conventional or unconventional?". Moreover, the network may inquire as to the maximum travel time (or distance) the MS user is willing to devote to finding a desired product/service, and/or the maximum travel time (or distance) the MS user is willing to devote to visiting any one merchant. Note that in one embodiment of the electronic yellow pages, priorities may be provided by the MS user as to a presentation ordering of advertisements, wherein such ordering may be by: price Note that various aspects of such an electronic yellow pages described herein are not constrained to using the MS user's location. In general, the MS user's location is but one attribute that can be intelligently used for providing users with targeted advertising, and importantly, advertising that is perceived as informative and/or addresses current user preferences and needs. Accordingly, such electronic yellow page aspects of the present disclosure are not related to a change in the MS user's location over time also apply to stationary communication stations such home computers wherein, e.g., such electronic yellow pages are accessed via the Internet. Additionally, the MS user may be able to adjust, e.g., via iconic selection switches (e.g., buttons or toggles) and icon range specifiers (e.g., slider bars) the relevancy and a corresponding range for various purchasing criteria. In particular, once a parameter is indicated as relevant (e.g., via activating a toggle switch), a slider bar may be used for indicating a relative or absolute value for the parameter. Thus, parameter values may be for: product/service quality ratings (e.g., display given to highest quality), price (low comparable price to high comparable price), travel time (maximum estimated time to get to merchant), parking conditions.

Accordingly, such electronic yellow pages may include the following functionality:

(a) dynamically change as the user travels from one commercial area to another when the MS user's location periodically determined such that local merchant's are given preference;

(b) routing instructions are provided to the MS user when a merchant is selected;

(c) provide dynamically generated advertising that is related to an MS user's preferences or needs. For example, if an MS user wishes to purchase a new dining room set, then such an electronic yellow pages may dynamically generate advertisements with dining room sets therein for merchants that sell them. Note that this aspect of the present disclosure is can be accomplished by having, e.g., a predetermined collection of advertising templates that are assigned to particular areas of an MS user's display wherein the advertising information selected according to the item(s) that the MS user has expressed a preferences or desire to purchase, and additionally, according to the user's location, the user's preferred merchants, and/or the item's price, quality, as well as coupons, and/or discounts that may be provided. Thus, such displays may have a plurality of small advertisements that may be selected for hyperlinking to more detailed advertising information related to a product or service the MS user desires. Note that this aspect of the present disclosure may, in one embodiment, provide displays (and/or corresponding audio information) that is similar to Internet page displays. However, such advertising may dynamically change with the MS user's location such that MS user preferences and needs for a items (including services) having higher priority are given advertisement preference on the MS display when the MS user comes within a determined proximity of the merchant offering the item. Moreover, the MS user may be able dynamically reprioritize the advertising displayed and/or change a proximity constraint so that different advertisements are displayed. Furthermore, the MS user may be able to request advertising information on a specified number of nearest merchants that provide a particular category of products or services. For example, an MS user may be able to request advertising on the three nearest Chinese restaurants that have a particular quality rating. Note, that such dynamically generated advertising (d) information about MS user's preferences and needs may be supplied to yellow page merchants regarding MS user's reside and/or travel nearby yellow subscriber merchant locations as described hereinabove The following is a high level description of some of the components shown in FIG. 19 of an illustrative embodiment of the electronic yellow pages of the present disclosure.

a. Electronic yellow pages center: Assists both the users and the merchants in providing more useful advertising for enhancing business transactions. The electronic yellow pages center may be a regional center within the carrier, or (as shown) an enterprise separate from the carrier. The center receives input from users regarding preferences and needs which first received by the user interface.

b. User interface: Receives input from a user that validates the user via password, voice identification, or other biometric capability for identifying the user. Note that the that the identification of user's communication device (e.g., phone number) is also provided. For a user contact, the user interface does one of: (a) validates the user thereby allowing user access to further electronic yellow page services, (b) requests additional validation information from the user, or (c) invalidates the user and rejects access to electronic yellow pages. Note that the user interface retrieves user identification information from the user profile database (described hereinbelow), and allows a validated user to add, delete, and/or modify such user identification information.

c. User ad advisor: Provides user interface and interactions with the user. Receives an identification/description of the user's communication device for determining an appropriate user communication technique. Note that the user ad advisor may also query (any) user profile available (using the user's identity) for determining a preferred user communication technique supported by the user's communication device. For example, if the user's communication device supports visual presentations, then the user ad advisor defaults to visual presentations unless there are additional constraints that preclude providing such visual presentations. In particular, the user may request only audio ad presentations, or merely graphical pages without video. Additionally, if the user's communication supports speech recognition, then the user ad advisor may interact with user solely via verbal interactions. Note that such purely verbal interactions may be preferable in some circumstances such as when the user can not safely view a visual presentation; e.g., when driving. Further note that the user's communication device may sense when it is electronically connected to a vehicle and provide such sensor information to the user ad advisor so that this module will then default to only a verbal presentation unless the user requests otherwise. Accordingly, the user ad advisor includes a speech recognition unit (not shown) as well as a presentation manager (not shown) for outputting ads in a form compatible both with the functional capabilities of the user's communication device and with the user's interaction preference.

Note that the user ad advisor communicates: (a) with the user ad selection engine for selecting advertisements to be presented to the user, (b) with the user profile database for inputting thereto substantially persistent user personal information that can be used by the user ad selection engine, and for retrieving user preferences such as media preference(s) for presentations of advertisements, and (c) with the user preference and needs satisfaction agents for instantiating intelligent agents (e.g., database triggers, initiating merchant requests for a product/service to satisfy a user preference or need).

Also note that in some embodiments of the present disclosure, the user ad advisor may also interact with a user for obtaining feedback regarding: (a) whether the advertisements presented, the merchants represented, and/or the products/services offered are deemed appropriate by the user, and (b) the satisfaction with a merchant with which the user has interactions. In particular, such feedback may be initiated and/or controlled substantially by the user preference and needs satisfaction agent management system (described hereinbelow).

d. User profile database: A database management system for accessing and retaining user identification information, user personal information, and identification of the user's communication device (e.g., make, model, and/or software version(s) being used). Note that the user profile database may contain information about the user that is substantially persistent; e.g., preferences for: language (e.g., English, Spanish, etc.), ad presentation media (e.g., spoken, textual, graphical, and/or video), maximum traveling time/distance for user preferences and needs of temporal importance (e.g., what is considered "near" to the user), user demographic information (e.g., purchasing history, income, residential address, age, sex, ethnicity, marital status, family statistics such as number of child and their ages), and merchant preferences/preclusions (e.g., user prefers one restaurant chain over another, or the user wants no advertisements from a particular merchant).

e. User ad selection engine: This module selects advertisements that are deemed appropriate to the user's preferences and needs. In particular, this module determines the categories and presentation order of advertisements to be presented to the user. To perform this task, the user ad selection engine uses a user's profile information (from the user profile database), a current user request (via the user ad advisor), and/or the user's current geolocation (via the interface to the location gateway 142). Thus, for a user requesting the location of an Italian restaurant within ½ mile of the user's current location, in a medium price range, and accepting out of town checks, the user ad selection engine identifies the ad criteria within the user's request, and determines the advertising categories (and/or values thereof) from which advertisements are desired. In one embodiment, Note that the user ad selection engine can suggest advertisement categories and/or values thereto to the user if requested to do so.

When an MS 140 appears to be traveling an extended distance through a plurality of areas (as determined, e.g., by recent MS locations along an interstate that traverse a plurality of areas), then upon entering each new area having a new collection of location registrations (and possibly a new location registration wizard) may be provided. For example, a new default set of local location registrations may become available to the user. Accordingly, the user may be notified that new temporary location registrations are available for the MS user to access if desired. For example, such notification may be a color change on a video display indicating that new temporary registrations are available. Moreover, if the MS user has a personal profile that also is accessible by a location registration wizard, then the wizard may provide advertising for local businesses and services that are expected to better meet the MS user's tastes and needs. Thus, if such wizard knows that the MS user prefers fine Italian food but does not want to travel more than 20 minutes by auto from his/her hotel to reach a restaurant, then advertisements for restaurants satisfying such criteria will become available to the user However, MS users may also remain anonymous to such wizards, wherein the Note, that by retaining MS user preferences and needs, if permission is provided, e.g., for anonymously capturing such user information, this information could be provided to merchants. Thus, merchants can get an understanding of what nearby MS user's would like to purchase (and under what conditions, e.g., an electric fan for less than $10). Note such user's may be traveling through the area, or user's may live nearby. Accordingly, it is a feature of the present disclosure to provide merchant's with MS user preferences and needs according to whether the MS user is a passerby or lives nearby so that the merchant can better target his/her advertising.

In one embodiment, a single wizard may be used over the coverage area of a CMRS and the database of local businesses and services changes as the MS user travels from one location registration area to another. Moreover, such a wizard may determine the frequency and when requests for MS locations are provided to the gateway 142. For example, such databases of local businesses and services may be coincident with LATA boundaries. Additionally, the wizard may take into account the direction and roadway the MS 140 is traveling so that, e.g., only businesses within a predetermined area and preferably in the direction of travel of the MS 140 are candidates to have advertising displayed to the MS user.

Figure 24A:
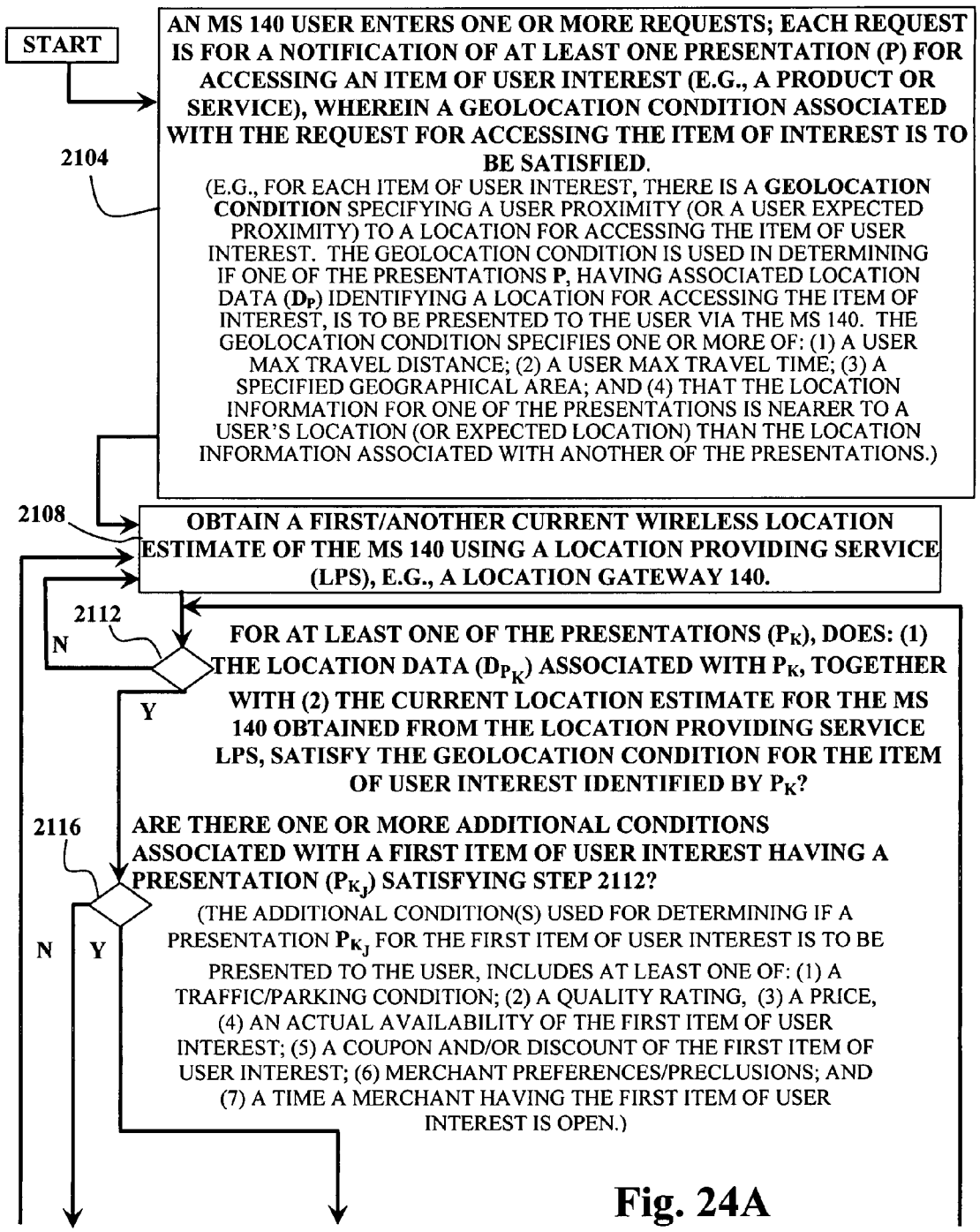
FIGS. 24A and 24B show a flowchart that is illustrative of the steps performed when, e.g., MS user input of preferences and needs is iteratively examined at various user locations for determining the location(s) that sufficiently satisfy user specified constraints (e.g., temporal or situational constraints) so that the user is alerted or notified of products and/or services that satisfy the user's input. The steps 2004 through 2040 are fully disclosed and explained in the sections hereinabove.
Figure 24B:
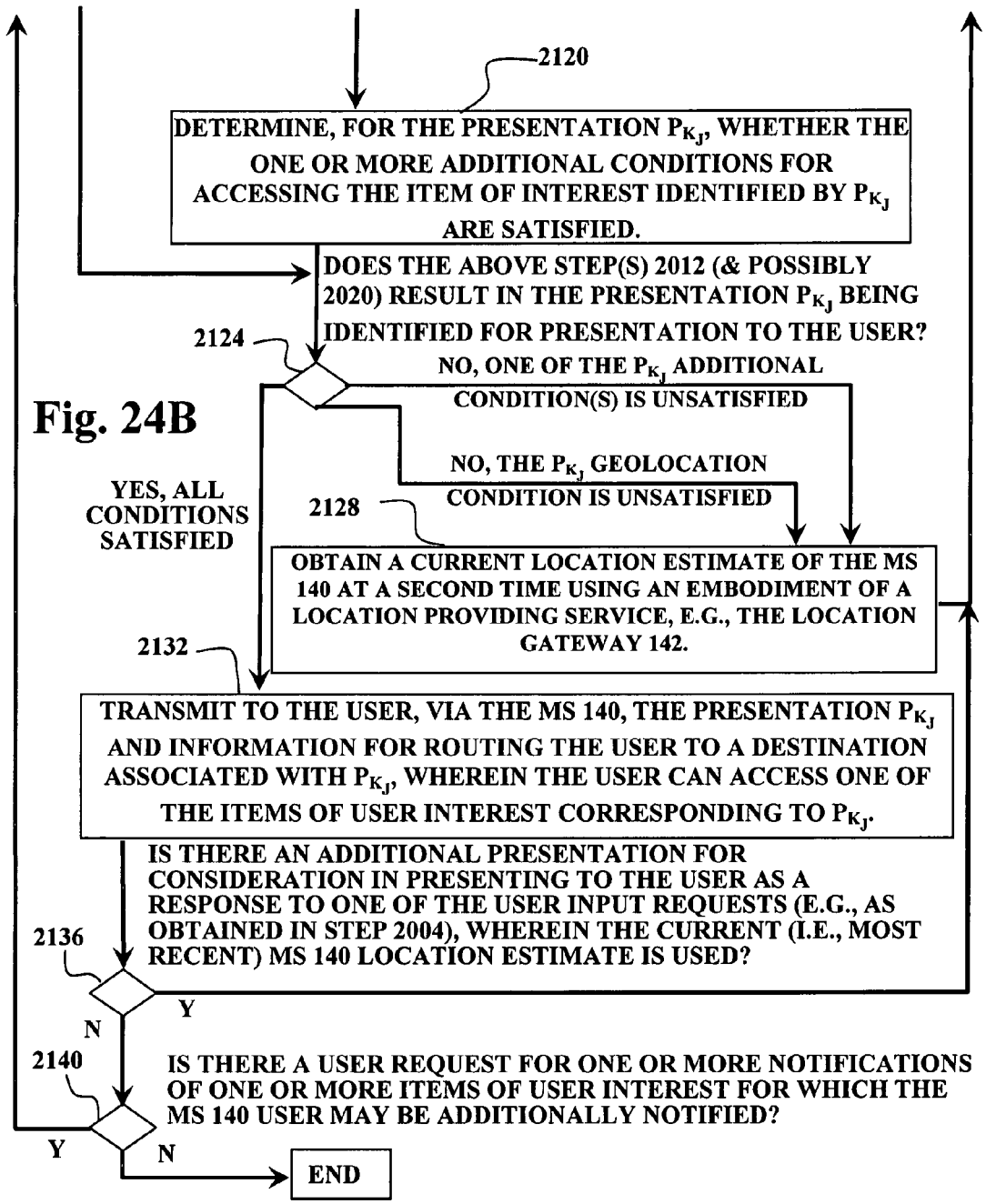

The flowchart of FIGS. 24A and 24B is illustrative of the steps performed when, e.g., MS user input of preferences and needs is iteratively examined at various user locations for determining the location(s) that sufficiently satisfy user specified constraints (e.g., temporal or situational constraints) so that the user is alerted or notified of products and/or services that satisfy the user's input. The steps 2004 through 2040 are fully disclosed and explained in the sections hereinabove.

Points of Interest Applications

Embodiments of the present disclosure can used for sight seeing guided tours where such embodiments are interactive depending on feedback from users. Such interactivity being both verbal descriptions and directions to points of interest.

Security Applications

Embodiments of the present disclosure may provide Internet picture capture with real time voice capture and location information for sightseeing, and/or security.

The foregoing description of preferred embodiments of the present disclosure has been provided for the purposes of illustration and description. It is not intended to be exhaustive or to limit the disclosure to the precise forms disclosed herein. Modifications and variations commensurate with the description herein will be apparent those skilled in the art and are intended to be within the scope of the present disclosure to the extent permitted by the relevant art. The embodiments provided are for enabling others skilled in the art to understand the disclosure, its various embodiments and modifications as are suited for uses contemplated. It is intended that the scope of the invention be defined by the following claims and their equivalents.

What is claimed is:

1. A method for providing network services to a plurality of mobile units, wherein each of the mobile units is located using wireless signal measurements obtained from transmissions between said mobile unit and a plurality of fixed location communication stations, wherein each of said communications stations includes one or more of a transmitter and a receiver for wirelessly communicating with said mobile unit, comprising:

providing first and second mobile unit location evaluators, wherein each of said location evaluators determine information related to the location of said mobile station units when said location evaluator is supplied with appropriate data for responding with information related to a location of one of the mobile units, wherein:

(A) said first location evaluator determines information related to the location for a mobile unit (M), by performing one or more of the following techniques (i) through (x) when the first location evaluator is supplied with a corresponding instance of said appropriate data, wherein the appropriate data includes values obtained from wireless signal measurements provided by transmissions between the mobile unit M and the communication stations:

(i) a first technique for determining, for at least one of the communication stations, one of: a distance, and a time difference of arrival between the mobile unit M and the at least one communication station, wherein said first technique estimates a time of arrival (TOA) of a received signal relative to a time reference at each one of a plurality of wireless signal monitoring stations using an inverse transform whose resolution is greater than Rayleigh resolution;

(ii) a second technique for estimating a location of said mobile unit M, using values from a corresponding instance of said appropriate data obtained from signals received by the mobile unit M from one or more satellites;

(iii) a third technique for recognizing a pattern of characteristics of a corresponding instance of said appropriate data, wherein said pattern of characteristics is indicative of a plurality of wireless signal transmission paths between the mobile unit M and each of one or more of the communication stations; and (iv) a fourth technique for estimating a location of said mobile unit M using a USW model, wherein the following steps (iv-a)-(iv-d) are performed:
  (iv-a) receiving at an antenna array provided at one of the communication stations, signals originating from the mobile unit M, wherein the signals comprise p-dimensional array vectors sampled from p antennas of the array;
  (iv-b) determining from the received signals, a signal signature, wherein the signal signature comprises a measured subspace, wherein the array vectors are approximately confined to the measured subspace;
  (iv-c) comparing the signal signature to a database comprising calibrated signal signatures and corresponding location data, wherein the comparing comprises calculating differences between the measured subspace and calibrated subspaces; and
  (iv-d) selecting from the database a most likely calibrated signal signature and a corresponding most likely location of the mobile unit M by using the calculated differences;

(v) a fifth technique for estimating a location of said mobile unit M using an E model, wherein the following steps (v-a)-(v-e) are performed:
  (v-a) receiving, at a multiplicity of the communication stations, a signal transmitted by the mobile unit M;
  (v-b) forwarding, by each of a multiplicity of the communication stations, said received signal and timing information to a central processing center;
  (v-c) calculating, within said central processing center, a time difference of arrival (TDOA) location estimate of said mobile unit M based upon said timing information;
  (v-d) calculating, within said central processing center, a timing advance (TA) location estimate of said mobile unit M based upon said timing information; and
  (v-e) determining said position of said mobile unit M using said TDOA and TA location estimates;

(vi) a sixth technique for estimating a location of said mobile unit M using an ST model, wherein the following steps (vi-a)-(vi-e) are performed:
  (vi-a) receiving, in a SPS receiver co-located with the mobile unit M, SPS signals from at least one SPS satellite;
  (vi-b) transmitting cell based communication signals between: a communications system having a first of the communication stations coupled to said SPS receiver, and a second of the communication stations which is remotely positioned relative to said mobile unit M, wherein said cell based communication signals are wireless;
  (vi-c) determining a first time measurement which represents a time of travel of a message in said cell based communication signals in a cell based communication system having at least some of the communication stations which comprises said second communication station and said communication system;
  (vi-d) determining a second time measurement which represents a time of travel of said SPS signals;
  (vi-e) determining a position of said mobile unit M from at least said first time measurement and said second time measurement, wherein said cell based communication signals are capable of communicating data messages in a two-way direction between said mobile unit M and said communication system;

(vii) a seventh technique for estimating a location of said mobile unit M using an TE model, wherein the following steps (vii-a)-(vii-l) are performed:
  (vii-a) transmitting from said mobile unit M, m samples of a signal;
  (vii-b) receiving at one of the communication stations, said m samples together with multipath components and noise;
  (vii-c) determining an estimated channel power profile for each of said m samples;
  (vii-d) selecting a first set of N samples from said m samples;
  (vii-e) performing incoherent integration for said estimated channel power profiles for said first set of N samples to form a first integrated signal;
  (vii-f) if a quality level of said first integrated signal with respect to signal to noise is less than a predetermined threshold, selecting another sample from said M samples;
  (vii-g) performing incoherent integration for said estimated channel power profiles for said first set of N samples and said another sample to form a second integrated signal;
  (vii-h) if a quality level of said second integrated signal with respect to signal to noise is greater than or equal to said predetermined threshold, determining a time-of-arrival of a maximum level of said second integrated signal;
  (vii-i) entering said time-of-arrival into a time-of-arrival versus frequency of occurrence array;
  (vii-j) selecting a second set of N samples from said m samples;
  (vii-k) repeating all of said performing through said entering steps for said second set of N samples; and
  (vii-l) determining a minimum value estimated time-of-arrival from said array;

(viii) an eighth technique for estimating a location of said mobile unit M using an SigT model, wherein the following steps (viii-a)-(viii-e) are performed:

(viii-a) within the mobile unit M, transmitting a locating signal composed of at least two tone components;

(viii-b) within each of a plurality of the communication stations, receiving the locating signal at one or more antennas, and within at least one of the communication stations, receiving the locating signal with at least two antennas;

(viii-c) coupling each antenna to a receiver;

(viii-d) within each receiver, generating amplitude and phase values from the locating signal as received by the antenna, the values indicative of amplitude and phase of at least two tone components of the locating signal, as received at the corresponding antenna and measured at defined times; and (viii-e) combining the values indicative of amplitude and phase for the tone components from a plurality of the receivers to determine the position of the mobile unit M;

(ix) an ninth technique for estimating a location of said mobile unit M using a TLME model, wherein the following steps (ix-a)-(ix-h) are performed therefor in a mobile radio system providing at least some of the communication stations, said mobile radio system including a network controller and at least three of the communication stations, each of said at least three communication stations including an uplink TOA measuring unit operable to communicate with said network controller, a control unit, and a time reference unit operable to provide timing reference signals to said uplink TOA measuring unit, at least one of said at least three communication stations co-located with and connected to a second mobile unit $M_2$, said second mobile unit $M_2$ coupled to said network controller via a radio interface, and a service node operable to store known positions of at least two of said at least three communication stations:

(ix-a) receiving a request in said mobile radio system to determine the geographical position of said mobile unit M;

(ix-b) determining and reporting the position of said second mobile unit $M_2$ to said service node;

(ix-c) directing said mobile unit M to transmit digital signals uplink on a traffic channel when said mobile unit M is not transmitting or transmitting only analog signals;

(ix-d) measuring in each uplink TOA measuring unit an uplink TOA of the digital signals transmitted by the mobile unit M;

(ix-e) receiving in said network controller said uplink TOA measurements from said at least three communication stations and a traffic channel number to said traffic channel;

(ix-f) translating said traffic channel number to an identity of said mobile unit M;

(ix-g) conveying said uplink TOA measurements and said mobile unit M identity to said service node; and (ix-h) calculating in said service node the position of said mobile unit M using said known positions of said at least three communication stations and said uplink TOA measurements;

(x) a tenth technique for estimating a location of said mobile unit M using an N model, wherein the following steps (x-a)-(x-d) are performed:

(x-a) receiving global positioning system satellite (GPS) signals from a plurality of global positioning system satellites;

(x-b) receiving a plurality of cellular position signals that do not contain data in a GPS-like format;

(x-c) calculating the geographic position of the mobile unit M using said received global positioning system satellite signals when a requisite number of the plurality of global positioning system satellites are in view of a global positioning system receiver; and (x-d) calculating the geographic position of the mobile unit M using both said received plurality of cellular position signals and substantially all of said received global positioning system satellite signals when the requisite number of the plurality of global positioning system satellites are not in view of the global positioning system receiver;

(B) for at least a particular one of said techniques (A)(i) through (A)(x) performed by said first location evaluator, said second location evaluator performs a different one of said techniques when supplied with a corresponding instance of said appropriate data for the different technique;

receiving, from a plurality of requesting sources, requests for location based services;

first obtaining, from said first location evaluator, first location related information for one of the mobile units in response to a first of the requests;

second obtaining, from said second location evaluator, second location related information for one of the mobile units in response to a second of the requests;

first determining a first destination for a first of the location based services for transmitting a first estimated location obtained from the first location related information;

second determining a second destination for a second of the location based services for transmitting a second estimated location obtained from the second location related information;

first communicating, to a first receiving source, a first communication responsive to the first request, wherein said first communication is dependent upon a first result from the first location based service;

wherein the first location based service determines the first result after receiving the first estimated location;

wherein the first request is used in identifying the first receiving source;

second communicating, to a second receiving source, a second communication responsive to the second request, wherein said second communication is dependent upon a second result from the second location based service;

wherein the second location based service determines the second result after receiving the second estimated location;

wherein the second request is used in identifying the second receiving source;

wherein the steps of at least one of (1) and (2) following are performed:

(1) first contacting a billing system for authorizing access to network services for the first request;
wherein the first contacting step is performed prior to the first estimated location being determined;
second contacting the same billing system for authorizing access to network services for the second request;
wherein the second contacting step is performed prior to the second estimated location being determined; and (2) the step of first determining, includes a step of selecting the first location based service from a plurality of location based services wherein each of the plurality of location based services is for fulfilling the first request, wherein said step of selecting includes obtaining data indicative of a load on each of two of the plurality of location based services and using the data to determine the first destination.

2. A method as claimed in claim 1, wherein said selecting step, of said first determining step, is performed.

3. A method as claimed in claim 1, wherein said step of first contacting is performed.

4. A method for providing network services to a plurality of mobile units, wherein each of the mobile units is located using wireless signal measurements obtained from transmissions between said mobile unit and a plurality of fixed location communication stations, wherein each of said communications stations includes one or more of a transmitter and a receiver for wirelessly communicating with said mobile unit, and wherein there are
  first and second mobile unit location evaluators, wherein each of said location evaluators determine information related to the location of said mobile units when said location evaluator is supplied with appropriate data for responding with information related to a location of one of the mobile units, wherein:
  (A) at least said first location evaluator determines information related to the location for a mobile unit (M), by performing one or more of the following techniques (i), (ii) and (iii) when the first location evaluator is supplied with a corresponding instance of said appropriate data, wherein the appropriate data includes values obtained from wireless signal measurements provided by transmissions between the mobile unit M and the communication stations:
    (i) a first technique for determining, for at least one of the communication stations, one of: a distance, and a time difference of arrival between the mobile unit M and the at least one communication station, wherein said first technique estimates a time of arrival (TOA) of a received signal relative to a time reference at each one of a plurality of wireless signal monitoring stations using an inverse transform whose resolution is greater than Rayleigh resolution;
    (ii) a second technique for estimating a location of said mobile unit M, using values from a corresponding instance of said appropriate data obtained from signals received by the mobile unit M from one or more satellites;
    (iii) a third technique for recognizing a pattern of characteristics of a corresponding instance of said appropriate data, wherein said pattern of characteristics is indicative of a plurality of wireless signal transmission paths between the mobile unit M and each of one or more of the communication stations;
comprising:
  receiving, from a plurality of requesting sources, requests for location based services;
  first obtaining, from said first location evaluator, first location related information for a first of the mobile units in response to a first of the requests;
  second obtaining, from one of the said location evaluators, second location related information for a second of the mobile units in response to a second of the requests;
  first determining a first destination for a first of the location based services for transmitting a first estimated location obtained from the first location related information;
  second determining a second destination for a second of the location based services for transmitting a second estimated location obtained from the second location related information;
  first communicating, to a first receiving source, a first communication responsive to the first request, wherein said first communication is dependent upon a first result from the first location based service;
  wherein the first location based service determines the first result after receiving the first estimated location;
  wherein the first request is used in identifying the first receiving source;
  second communicating, to a second receiving source, a second communication responsive to the second request, wherein said second communication is dependent upon a second result from the second location based service;
  wherein the second location based service determines the second result after receiving the second estimated location;
  wherein the second request is used in identifying the second receiving source;
  wherein the steps of at least one of (1) and (2) following are performed:
  (1) first contacting a billing system for authorizing access to network services for the first request;
    wherein the first contacting step is performed prior to the first estimated location being determined;
    second contacting the same billing system for authorizing access to network services for the second request;
    wherein the second contacting step is performed prior to the second estimated location being determined; and
  (2) the step of first determining, includes a step of selecting the first location based service from a plurality of location based services wherein each of the plurality of location based services is for fulfilling the first request, wherein said step of selecting includes obtaining data indicative of a load on each of two of the plurality of location based services and using the data to determine the first destination.

5. The method as claimed in claim 4, wherein said selecting step, of said first determining step, is performed.

6. The method as claimed in claim 4, wherein said first mobile unit is co-located with a processor for activating at least one of said location evaluators.

7. A method for providing network services to a plurality of mobile units, comprising:
  receiving, from a plurality of requesting sources, requests for location based services;
  wherein to fulfill a first of the requests, there is a requirement for at least a first estimated location of a first of a plurality of mobile units, said at least first estimated location for use by a first location based service in fulfilling the first request;
  wherein to fulfill a second of the requests, there is a requirement for at least a second estimated location of a second of the mobile units, said at least second estimated location for use by a second location based service in fulfilling the second request;
  first determining a first destination for the first location based service for transmitting the first estimated location;
  second determining a second destination for the second location based service for transmitting the second estimated location, wherein the first and second location based services are different;

first communicating, to a first receiving source, a first communication responsive to the first request, wherein said first communication is dependent upon a first result from the first location based service;
wherein the first location based service determines the first result after receiving the first estimated location;
wherein the first request is used in identifying the first receiving source;
second communicating, to a second receiving source, a second communication responsive to the second request, wherein said second communication is dependent upon a second result from the second location based service;
wherein the second location based service determines the second result after receiving the second estimated location;
wherein the second request is used in identifying the second receiving source;
wherein the steps of at least one of (a) and (b) following are performed:
(a) first contacting a billing system for authorizing access to network services for the first request;
wherein the first contacting step is performed prior to the first estimated location being determined;
second contacting the same billing system for authorizing access to network services for the second request;
wherein the second contacting step is performed prior to the second estimated location being determined; and
(b) the step of first determining, includes a step of selecting the first location based service from a plurality of location based services wherein each of the plurality of location based services is for fulfilling the first request, wherein said step of selecting includes obtaining data indicative of a load on each of two of the plurality of location based services and using the data to determine the first destination.

8. The method of claim 7, wherein at least the steps of first and second contacting are performed.

9. The method of claim 8, further including steps of requesting a wireless location of each the first and second mobile units.

10. The method of claim 7, wherein the step of selecting is performed.

11. The method of claim 7, further including the steps of:
requesting the first estimated location from a first location service provider;
requesting activation of the first location based service;
wherein the step of requesting the first estimated location is performed prior to the step of requesting activation of the first location based service.

12. The method of claim 1, wherein the first location related information includes the first estimated location, and the second location related information includes the second estimated location.

13. The method of claim 1, wherein the first location evaluator performs the second technique, and the second location evaluator performs one of: the third, fourth, and ninth techniques.

14. The method of claim 1, wherein the first location evaluator performs at least one of the sixth, and tenth techniques, and the second location evaluator performs one of: the third, fourth, and ninth techniques.

15. The method of claim 1, wherein for at least one of the mobile units, subsequent to the receiving step, the following step of selecting is performed regardless of whether the steps of first or second obtaining, and first or second determiningare performed or not:
selecting one location based service of at least two location based services for responding to one of the requests related to the at least one mobile unit, wherein said step of selecting one of at least two location based services includes obtaining data (D) indicative of a load on each of the at least two location based services and using the data D to determine the one location based service; and
wherein additional data indicative of a location of the at least one mobile unit is also used in determining the one location based service.

16. The method of claim 15, wherein the additional data includes an identity of a primary base station by which the at least one mobile unit is wirelessly communicating.

17. The method of claim 15, wherein the two location based services are different emergency response sites, and the one location based service is one of the two location based services.

18. The method of claim 1, wherein for at least one of the mobile units, subsequent to the receiving step, the following step is performed regardless of whether the steps of first or second obtaining, and first or second determiningare performed or not:
changing a priority for fulfillment of one of the requests related to the at least one mobile unit, wherein data indicative of a location of the at least one mobile unit is used in determining the change in priority.

19. The method of claim 7, further including steps of:
receiving, for the first request, a request for information from profile data for a user of the first mobile unit;
determining what portion of the profile data to provide in response to the request for information;
wherein the step of determining is dependent upon one of: a location of the user, and a location for a requestor for the first request.

20. The method of claim 19, wherein the step of determining includes:
overridding first information for determining a first portion of the profile data with second information for determining a second portion of the profile data, wherein the first and second portions are different;
wherein the step of overridding is dependent upon one of: a location of the user, data identfying the requestor of the first request, a time period related to the first request, and a location for the requestor; and
subsequently, using the first information for determining what portion of the profile data to provide in response to another request for information from profile data instead of the second information.

21. The method of claim 7, further comprising:
accessing user profile information for a user of one of the mobile units to fulfill one of the requests;
determining what portion of the user profile information to provide in response to the request;
wherein the step of determining is dependent upon one of: a location of the user, and a location for a requestor providing the request.

22. The method of claim 7, wherein the first and second location based services each includes one of: an emergency response processing site, a location based game service, a location based dating service, a location based service for providing navigation directions to a user of the first mobile unit, a location based advertising service for presenting advertising to the user based on the user's location, a location based service for providing the user with notifications of another nearby having a profile of interest to the user, and a location based concierge service.

23. The method of claim 7, wherein the first and second receiving sources includes one of:
(i) a corresponding one of the first and second mobile units, (ii) an emergency response processing site, and (iii) an associate of a user of the corresponding one of the first and second mobile units.

24. The method of claim 7, wherein the first and second requesting sources includes one of:
(i) a corresponding one of the first and second mobile units, (ii) an emergency response processing site, and (iii) a person or entity different from a user of the corresponding one of the first and second mobile units.

25. The method of claim 7, wherein the step of selecting is dependent upon additional data indicative of a location of the first mobile unit for determining the first location based service.

* * * * *